United States Patent
Endrizzi et al.

(10) Patent No.: US 10,960,941 B2
(45) Date of Patent: Mar. 30, 2021

(54) VEHICLE

(71) Applicant: Polaris Industries Inc., Medina, MN (US)

(72) Inventors: James J. Endrizzi, Plymouth, MN (US); Tristan M. Hipps, Buffalo, MN (US); Garth H. Bracy, Robbinsdale, MN (US); Anthony J. Kinsman, Wyoming, MN (US); Jerome J. Rubatt, Stacy, MN (US); Blake A. Anderson, Lindstrom, MN (US); Dennis J. Lutz, Lino Lakes, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 16/244,462

(22) Filed: Jan. 10, 2019

(65) Prior Publication Data

US 2019/0210668 A1 Jul. 11, 2019

Related U.S. Application Data

(60) Provisional application No. 62/615,684, filed on Jan. 10, 2018.

(51) Int. Cl.
*B60R 5/04* (2006.01)
*B62D 43/10* (2006.01)
(Continued)

(52) U.S. Cl.
CPC .............. *B62D 43/10* (2013.01); *B60K 11/00* (2013.01); *B60K 11/04* (2013.01); *B60K 13/00* (2013.01);
(Continued)

(58) Field of Classification Search
CPC .... B60R 5/04; B60R 7/02; B60R 5/00; B60R 11/00; B60R 2011/0042; B60R 9/06; B62D 43/06; B62D 43/10
(Continued)

(56) References Cited

U.S. PATENT DOCUMENTS 3,007,726 A 11/1961 Parkin
3,600,768 A 8/1971 Romanzi
(Continued)

FOREIGN PATENT DOCUMENTS

DE 2752798 6/1978
DE 3007726 9/1981
(Continued)

OTHER PUBLICATIONS

Patent Examination Report issued by the Australian Government IP Australia, dated Apr. 7, 2016, for Australian Patent Application No. 2013329090; 3 pages.
(Continued)

*Primary Examiner* — Dennis H Pedder
(74) *Attorney, Agent, or Firm* — Faegre Drinker Biddle & Reath LLP

(57) ABSTRACT

A vehicle shown herein is a side by side powersports vehicle having a utility bed recessed in the rear body portion below an upper surface, the utility bed forming a stepped portion relative to the rear body portion and having a maximum lateral width greater than a diameter of at least one of the wheels, and a minimum width less than a diameter of at least one of the wheels, whereby a spare wheel may be stored on the stepped portion of the utility bed. As shown herein, the utility bed is defined as a removable tub, which can be removed from the rear body portion. The utility bed has defined troughs in a floor thereof angled rearwardly wherein the utility bed has drains which drain away from any heat
(Continued)

source of the vehicle. The seats of the vehicle allow longitudinal movement and tilt capability.

23 Claims, 116 Drawing Sheets

(51) Int. Cl.

| | | |
|---|---|---|
| *B60N 2/015* | (2006.01) | |
| *B60K 17/34* | (2006.01) | |
| *B62D 27/06* | (2006.01) | |
| *B60N 2/68* | (2006.01) | |
| *B60N 2/07* | (2006.01) | |
| *B62D 23/00* | (2006.01) | |
| *B60K 11/04* | (2006.01) | |
| *B60K 13/04* | (2006.01) | |
| *B60K 13/00* | (2006.01) | |
| *F16H 57/02* | (2012.01) | |
| *B60N 2/30* | (2006.01) | |
| *B62D 33/02* | (2006.01) | |
| *B60K 11/00* | (2006.01) | |
| *B60R 11/00* | (2006.01) | |
| *B60R 3/00* | (2006.01) | |

(52) U.S. Cl.
CPC ............. *B60K 13/04* (2013.01); *B60K 17/34* (2013.01); *B60N 2/015* (2013.01); *B60N 2/0717* (2013.01); *B60N 2/3013* (2013.01); *B60N 2/68* (2013.01); *B60N 2/688* (2013.01); *B60R 5/04* (2013.01); *B62D 23/005* (2013.01); *B62D 27/065* (2013.01); *B62D 33/02* (2013.01); *F16H 57/02* (2013.01); *B60R 3/00* (2013.01); *B60R 2011/0042* (2013.01); *B60Y 2200/20* (2013.01)

(58) Field of Classification Search
USPC ..... 296/37.16, 37.1, 37.2, 37.6, 183.1, 39.1, 296/39.2, 97.23
See application file for complete search history.

(56) References Cited

U.S. PATENT DOCUMENTS

| | | | |
|---|---|---|---|
| 4,429,588 A | 2/1984 | Emundts | |
| 4,967,944 A * | 11/1990 | Waters | B60R 9/00 224/404 |
| 5,083,827 A * | 1/1992 | Hollenbaugh, Sr. | B60R 13/01 220/4.08 |
| 5,167,433 A * | 12/1992 | Ryan | B60R 7/02 220/533 |
| 5,201,562 A * | 4/1993 | Dorsey | A61H 33/028 296/37.6 |
| 5,306,044 A | 4/1994 | Tucker | |
| 6,086,158 A | 7/2000 | Zeoli | |
| 6,293,588 B1 | 9/2001 | Clune | |
| 6,309,024 B1 | 10/2001 | Busch | |
| 6,328,364 B1 * | 12/2001 | Darbishire | B60P 1/003 296/26.09 |
| 6,502,886 B1 * | 1/2003 | Bleau | B60R 5/04 224/42.13 |
| 6,644,709 B2 * | 11/2003 | Inagaki | B60N 2/3013 296/37.14 |
| 6,682,118 B2 * | 1/2004 | Ryan | B60R 11/00 296/37.16 |
| 6,733,060 B1 * | 5/2004 | Pavkov | B60R 5/04 108/110 |
| 6,880,875 B2 * | 4/2005 | McClure | B62D 43/10 224/42.2 |
| 6,883,851 B2 * | 4/2005 | McClure | B60R 13/01 224/42.2 |
| 7,118,151 B2 * | 10/2006 | Bejin | B60R 5/04 296/37.1 |
| 7,156,439 B2 * | 1/2007 | Bejin | B60R 5/04 296/208 |
| 7,503,610 B2 * | 3/2009 | Karagitz | B60R 5/04 296/37.14 |
| 7,625,048 B2 | 12/2009 | Rouhana | |
| 7,819,220 B2 | 10/2010 | Sunsdahl | |
| 7,832,770 B2 | 11/2010 | Bradley | |
| 7,954,679 B2 * | 6/2011 | Edwards | B62D 43/10 224/281 |
| 8,104,524 B2 | 1/2012 | Manesh | |
| 8,176,957 B2 | 5/2012 | Manesh | |
| 8,215,694 B2 | 7/2012 | Smith | |
| 8,231,164 B2 * | 7/2012 | Schubring | B60R 7/04 224/404 |
| 8,328,235 B2 | 12/2012 | Schneider | |
| 8,464,824 B1 | 6/2013 | Reisenberger | |
| 8,465,050 B1 | 6/2013 | Spindler | |
| 8,548,710 B1 | 10/2013 | Reisenberger | |
| 8,613,335 B2 | 12/2013 | Deckard | |
| 8,640,814 B2 | 2/2014 | Deckard | |
| 8,781,705 B1 | 7/2014 | Reisenberger | |
| 8,827,025 B2 | 9/2014 | Hapka | |
| 8,827,028 B2 | 9/2014 | Sunsdahl | |
| 9,573,561 B2 | 2/2017 | Muto | |
| 10,112,555 B2 * | 10/2018 | Aguilera Ramirez | B60R 5/04 |
| 10,154,377 B2 | 12/2018 | Post | |
| 2001/0041126 A1 | 11/2001 | Morin | |
| 2002/0135175 A1 | 9/2002 | Schroth | |
| 2003/0015531 A1 * | 1/2003 | Choi | B60R 7/02 220/200 |
| 2003/0057724 A1 * | 3/2003 | Inagaki | B60N 2/36 296/37.8 |
| 2005/0073187 A1 | 4/2005 | Frank | |
| 2005/0248173 A1 * | 11/2005 | Bejin | B60R 5/04 296/37.1 |
| 2006/0017301 A1 * | 1/2006 | Edwards | B62D 43/10 296/37.2 |
| 2006/0181104 A1 * | 8/2006 | Khan | B60R 5/04 296/37.16 |
| 2006/0255610 A1 * | 11/2006 | Bejin | B60R 5/04 296/37.1 |
| 2008/0296884 A1 | 12/2008 | Rouhana | |
| 2009/0184531 A1 | 7/2009 | Yamamura | |
| 2010/0090797 A1 | 4/2010 | Koenig | |
| 2010/0314191 A1 | 12/2010 | Deckard | |
| 2011/0297462 A1 | 12/2011 | Grajkowski | |
| 2011/0309118 A1 | 12/2011 | Wada | |
| 2012/0223500 A1 | 9/2012 | Kinsman | |
| 2013/0033070 A1 | 2/2013 | Kinsman | |
| 2013/0199097 A1 | 8/2013 | Spindler | |
| 2014/0103627 A1 | 4/2014 | Deckard | |
| 2016/0332553 A1 | 11/2016 | Miller | |
| 2017/0334500 A1 | 11/2017 | Jarek | |
| 2018/0065465 A1 | 3/2018 | Ward | |
| 2019/0110161 A1 | 4/2019 | Rentz | |
| 2019/0193501 A1 | 6/2019 | Brady | |
| 2019/0265064 A1 | 8/2019 | Koenig | |

FOREIGN PATENT DOCUMENTS

| | | |
|---|---|---|
| EP | 0697306 | 2/1996 |
| FR | 2907410 | 4/2008 |
| JP | 53101625 | 9/1978 |
| WO | 2003/70543 | 8/2003 |
| WO | 200370543 | 8/2003 |
| WO | 2014/047488 | 3/2014 |
| WO | 2014047488 | 3/2014 |
| WO | 2014/059258 | 4/2014 |
| WO | 2014059258 | 4/2014 |
| WO | 2019/140026 | 7/2019 |
| WO | 2019140026 | 7/2019 |

OTHER PUBLICATIONS

International Search Report and Written Opinion issued by the European Patent Office, dated Jan. 14, 2014, for International Patent Application No. PCT/US2013/064516; 24 pages.

(56) References Cited

OTHER PUBLICATIONS

MTX (MTX Audio Thunder Sports RZRPod65-owners-manual, 2016); 8 pages.
International Search Report and Written Opinion issued by the European Patent Office, dated Jul. 3, 2019, for International Patent Application No. PCT/US2019/012958; 27 pages.
International Preliminary Report on Patentability issued by the European Patent Office, dated Apr. 14, 2015, for International Patent Application No. PCT/US2013/064516; 18 pages.
International Preliminary Report on Patentability issued by The International Bureau of WIPO, dated Jul. 14, 2020, for International Patent Application No. PCT/US2019/012958; 19 pages.

* cited by examiner

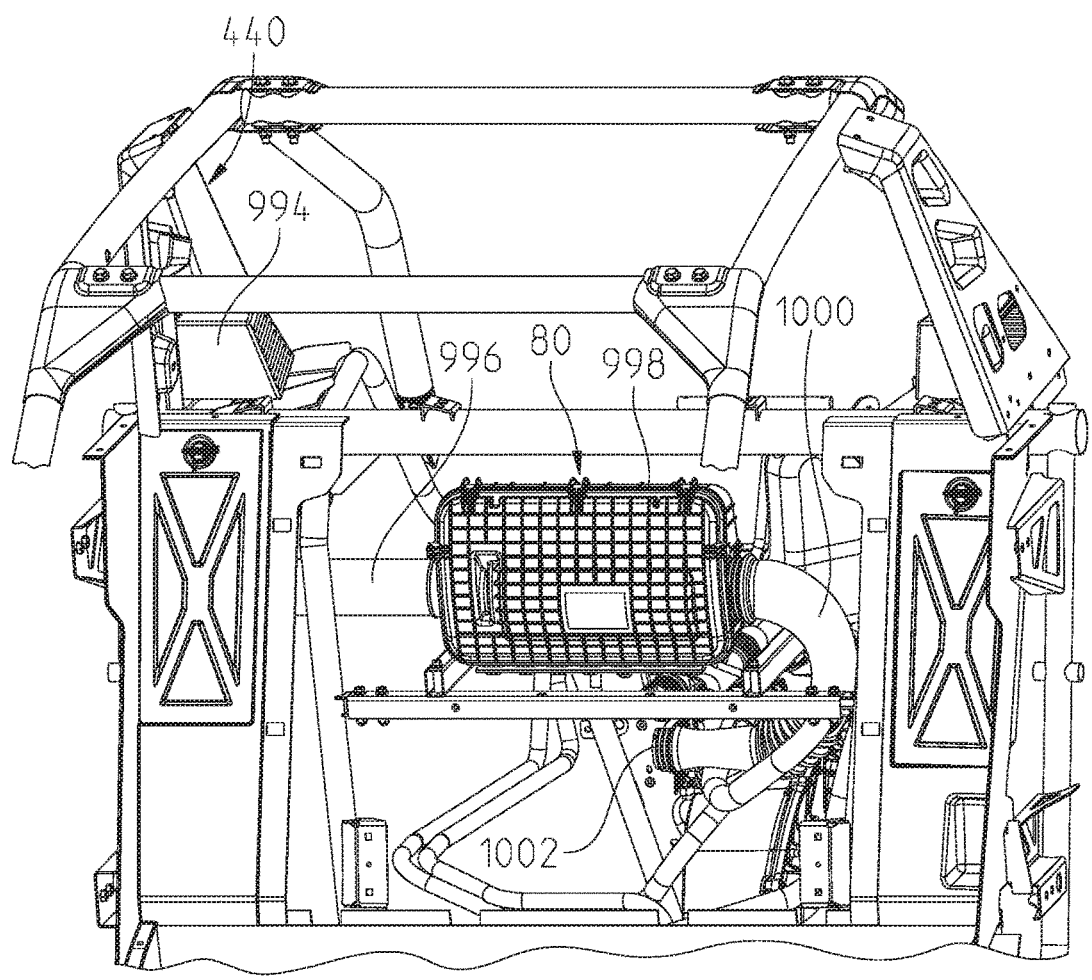
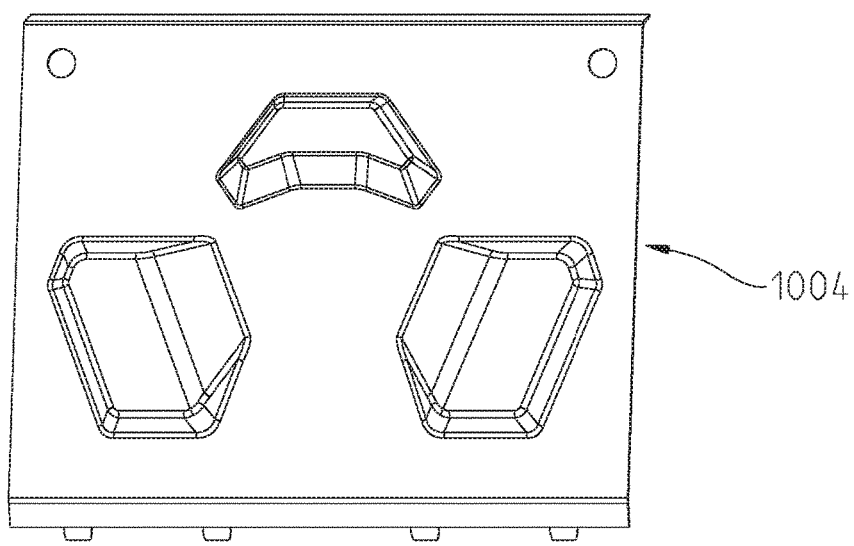
Fig. 52

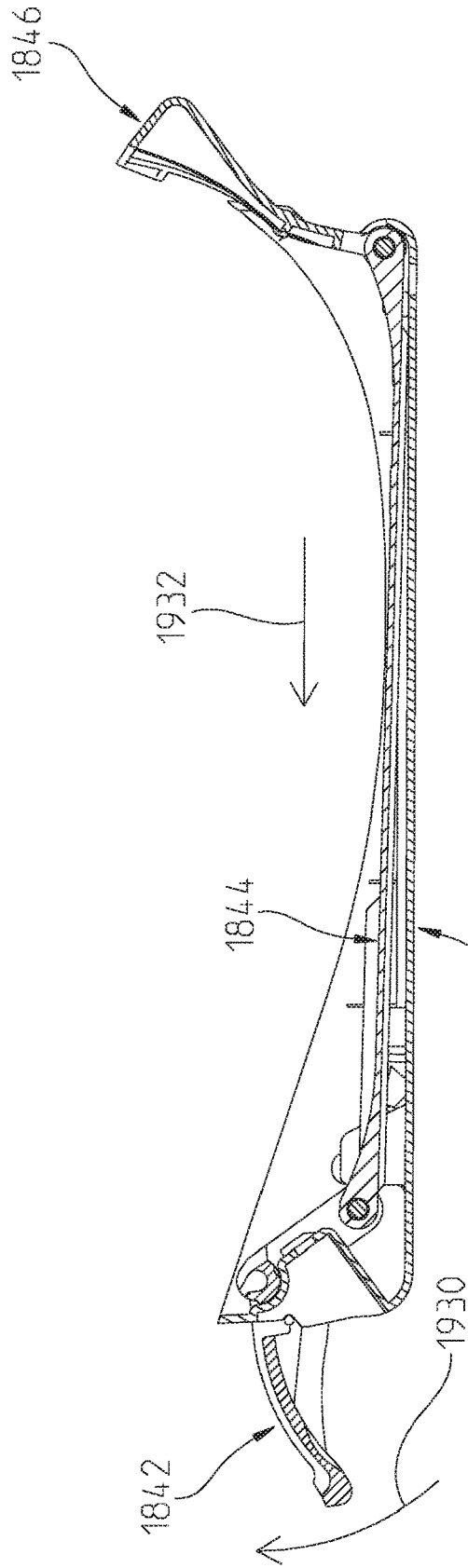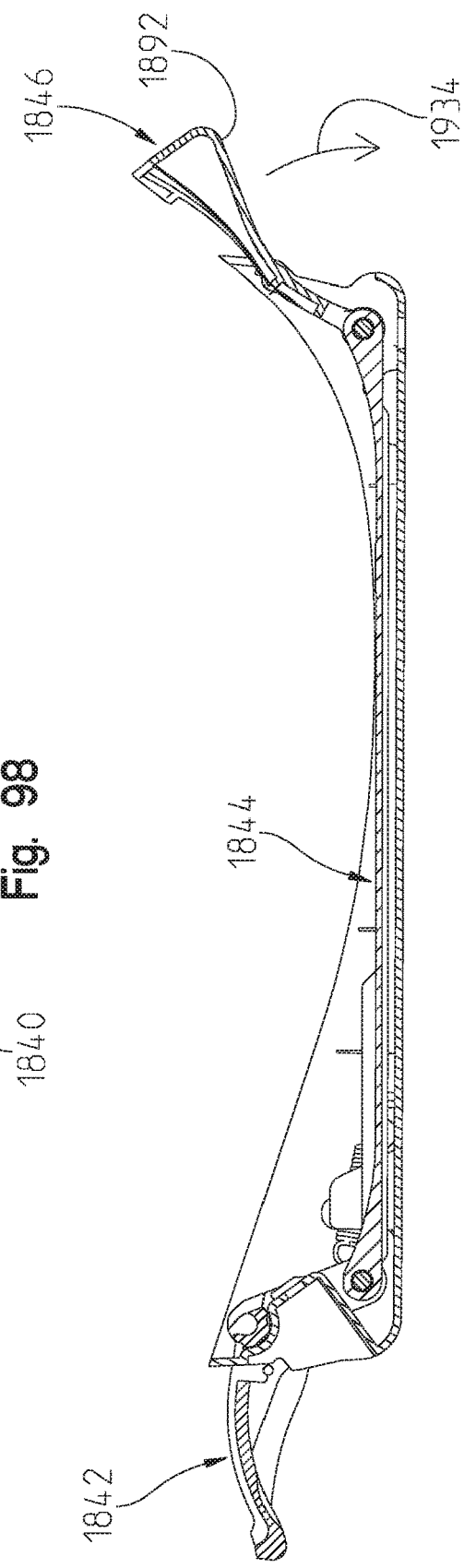

VEHICLE

RELATED APPLICATIONS

This application claims priority to Provisional Patent Application Ser. No. 62/615,684 filed Jan. 10, 2018, the subject matter of which is incorporated herein by reference.

FIELD OF THE INVENTION

The present invention relates to side-by-side vehicles and all-terrain vehicles.

BACKGROUND OF THE INVENTION

Generally, all-terrain vehicles ("ATVs") and utility vehicles ("UVs") are used to carry one or two passengers and a small amount of cargo over a variety of terrains. Due to increasing recreational interest in ATVs, specialty ATVs, such as those used for trail riding, racing, and cargo hauling have entered the market place. Most ATVs include seating for up to two passengers which are either seated side-by-side or with the passenger positioned behind the driver of the ATV. Side-by-side ATVs, in which the driver and passenger are seated beside each other on laterally spaced apart seats, have become popular because of the ability to allow the passenger to share the driver's viewpoint.

SUMMARY OF THE INVENTION

In one embodiment of the invention a vehicle comprises a frame; front and rear wheels; a powertrain drivingly coupled to the front and rear wheels; a seating area comprising side by side seats; a cab frame positioned over the seating area; a rear body portion having an upper surface and comprising a utility bed recessed in the rear body portion below the upper surface, the utility bed forming a stepped portion relative to the rear body portion and having a maximum lateral width greater than a diameter of at least one of the wheels, and a minimum width less than a diameter of at least one of the wheels, whereby a spare wheel may be stored on the stepped portion of the utility bed.

In another embodiment of the invention a vehicle comprises a frame; front and rear wheels; a powertrain drivingly coupled to the front and rear wheels; a seating area comprising side by side seats; a cab frame positioned over the seating area; a rear body portion having an upper surface and comprising a utility bed recessed in the rear body portion below the upper surface, wherein the utility bed is defined as a removable tub, which can be removed from the rear body portion.

In another embodiment, a vehicle comprises a frame; front and rear wheels; a powertrain drivingly coupled to the front and rear wheels; a seating area comprising side by side seats; and a rear body portion having an upper surface and comprising a utility bed recessed in the rear body portion below the upper surface, the utility bed having defined troughs in a floor thereof angled rearwardly wherein the utility bed has drains which drain away from any heat source of the vehicle.

In another embodiment, a vehicle comprises a frame; front and rear wheels; a powertrain drivingly coupled to the front and rear wheels; a seating area comprising side by side seats; a radiator positioned forward of the seating area for cooling components of the powertrain; and a headlight positioned forwardly of the radiator, the headlight having a notched area at a rear side thereof with the radiator positioned within the notched area, such that at least a portion of the headlight is positioned rearwardly of a forwardmost position of the radiator.

In another embodiment, a vehicle comprises a vehicle frame; front and rear wheels; a powertrain drivingly coupled to the front and rear wheels; a seating area comprising at least one seat; a seat frame allowing longitudinal movement of the seat relative to the vehicle frame, the seat frame comprising longitudinally extending tubes coupled to the frame; and followers coupled to side edges of the tubes, to guide the seat relative to the vehicle frame.

In yet another embodiment, a vehicle comprises a vehicle frame; front and rear wheels; a powertrain drivingly coupled to the front and rear wheels; a seating area comprising at least one seat, the seat having a seat bottom and a seat back; a shoulder harness assembly, comprising a seat belt retractor coupled to the frame forward of the seat, the seat belt extending under the seat bottom and rearward of the seat back, the seat belt extending over a top of the seat back and over the front of the seat back.

In another embodiment, a vehicle comprises a frame; front and rear wheels; a powertrain drivingly coupled to the front and rear wheels; a seating area comprising side by side seats; a cab frame positioned over the seating area, wherein the cab frame comprises: a single left side frame tube coupled to the frame at a position forward of the seating area and at a position rearward of the seating area with an intermediate frame tube portion over the seating area; a single right side frame tube coupled to the frame at a position forward of the seating area and at a position rearward of the seating area with an intermediate frame tube portion over the seating area; a left triangular brace coupling the left side frame tube to the frame; and a right triangular brace coupling the right side frame tube to the frame.

In another embodiment, a vehicle comprises a frame comprising a main frame portion and a front removable frame portion; front and rear wheels; a front suspension coupled to the front removable frame portion with the front wheels being coupled to the front suspension; a rear suspension coupled to the main frame portion with the rear wheels being coupled to the rear suspension; and a powertrain drivingly coupled to the front and rear wheels; whereby the front removable frame portion may be removed from the main frame portion.

In another embodiment, a vehicle comprises a frame comprising a main frame portion and a front removable frame portion; front and rear wheels; a front suspension coupled to the front removable frame portion with the front wheels being coupled to the front suspension; a rear suspension coupled to the main frame portion with the rear wheels being coupled to the rear suspension; and a powertrain drivingly coupled to the front and rear wheels; whereby the front removable frame portion may be removed from the main frame portion.

In another embodiment, a seat assembly comprises a seat frame having a seat bottom frame and a seat back frame; and individual pads coupled to the seat bottom frame and the seat back frame to define a cushioned seat.

In another embodiment, a seat assembly comprises a seat having a seat back and a seat bottom; a seat mount for coupling the seat, the seat mount being rotatably fixed about a rear transverse axis and being movable at a front end thereof to vary the tilt of the seat; and a retaining mechanism to retain the seat mount in various tilt positions.

In another embodiment, a continuously variable transmission (CVT) comprises an inner cover having a plurality of bosses surrounding an outer periphery thereof; an outer cover having a plurality of bosses surrounding an outer periphery thereof, wherein the bosses on the outer cover align with the bosses on the inner cover; and fasteners extending though the plurality of bosses on the inner and outer covers to retain the outer cover to the inner cover, the fasteners having a retention portion thereon which retains the fastener within the boss on the outer cover when the fastener is removed from the boss on the inner cover.

In another embodiment, a vehicle comprises a frame; front and rear wheels; a steering assembly which both tilts and telescope, the steering assembly including a frame portion, a steering column, a wiring housing extending generally along the steering column, a disengagement member, where the disengagement member allows the frame to tilt up and down, a steering wheel coupled to the steering column, and a coiled wire extending though the wiring housing and at least partially wraps around the steering column with an end of the coiled wire terminated within the steering wheel, whereby the coiled wire can expand and contract within the wiring housing for tilt and telescope and can expand around the steering column during turning of the steering wheel.

Finally, in another embodiment a vehicle comprises a frame; front and rear wheels; a powertrain motively coupled to the wheels; an air intake system for drawing ambient air into the powertrain, the air intake system including at least one bezel for air intake and at least one duct coupled between the bezel and powertrain, the bezel having an angled surface thereof with a component facing forward for direct air intake, wherein the angled surface includes a vent opening for air intake.

In another embodiment, a vehicle comprises a frame; front and rear wheels; a steering assembly which both tilts and telescopes; and a gauge is coupled to the steering assembly such that the gauge tilts with the steering assembly but is fixed in a telescopic axis.

BRIEF DESCRIPTION OF THE DRAWINGS

FIG. 52 is a view similar to that of FIG. 51 showing the protective panel removed from the vehicle main frame;

FIG. 98 shows a cross sectional view through lines 98-98 of FIG. 95, with the seat in the latched position;

FIG. 99 is a cross sectional view similar to that of FIG. 98 showing the seat released in the unlatched position;

DETAILED DESCRIPTION OF THE DRAWINGS

Figure 1:
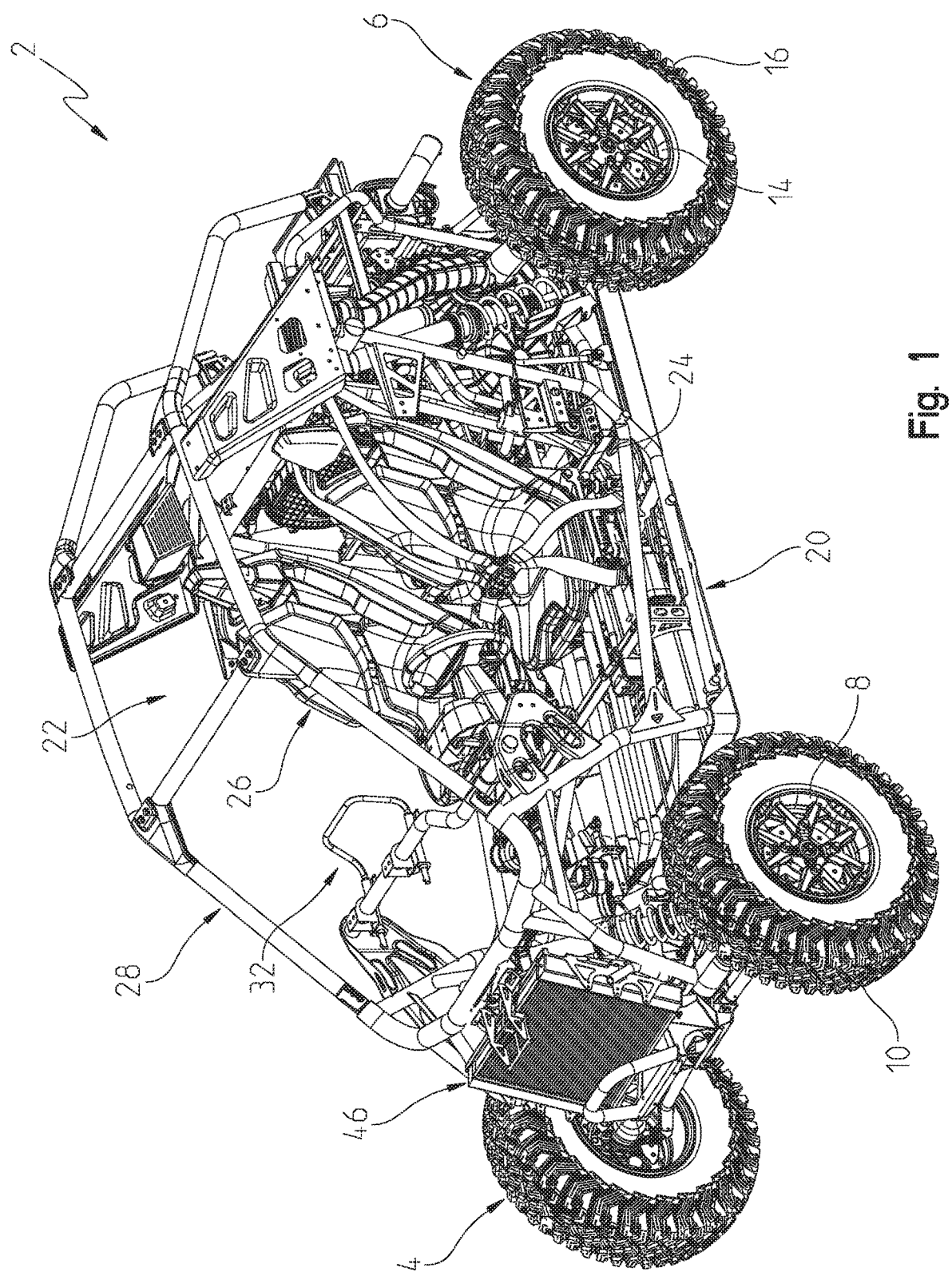
FIG. 1 is a front left perspective view of the vehicle of the present invention without the body panels.
Figure 2:
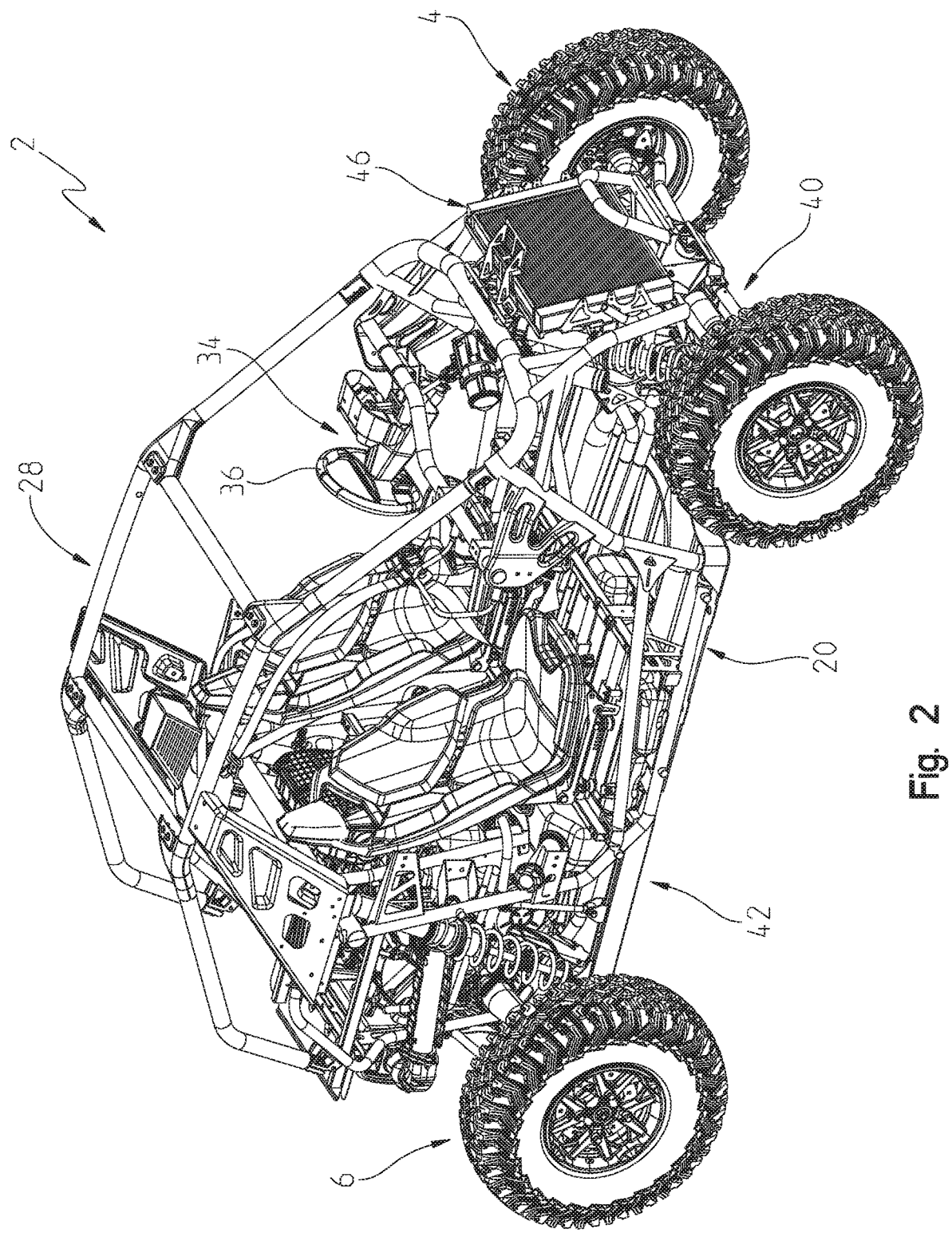
FIG. 2 is a right front perspective view of the vehicle of FIG. 1.
Figure 3:
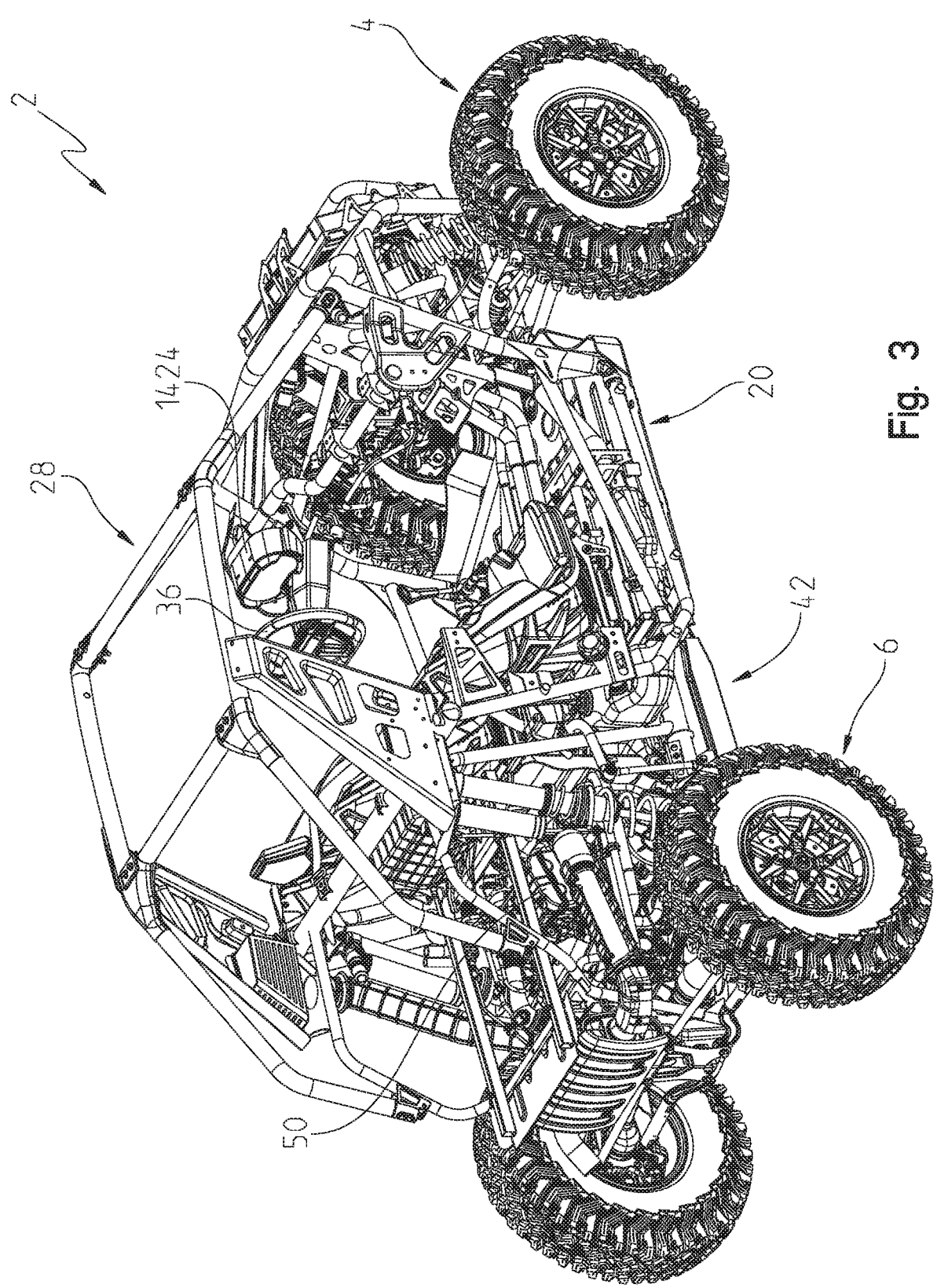
FIG. 3 is a right rear perspective view of the vehicle of FIG. 1.
Figure 4:
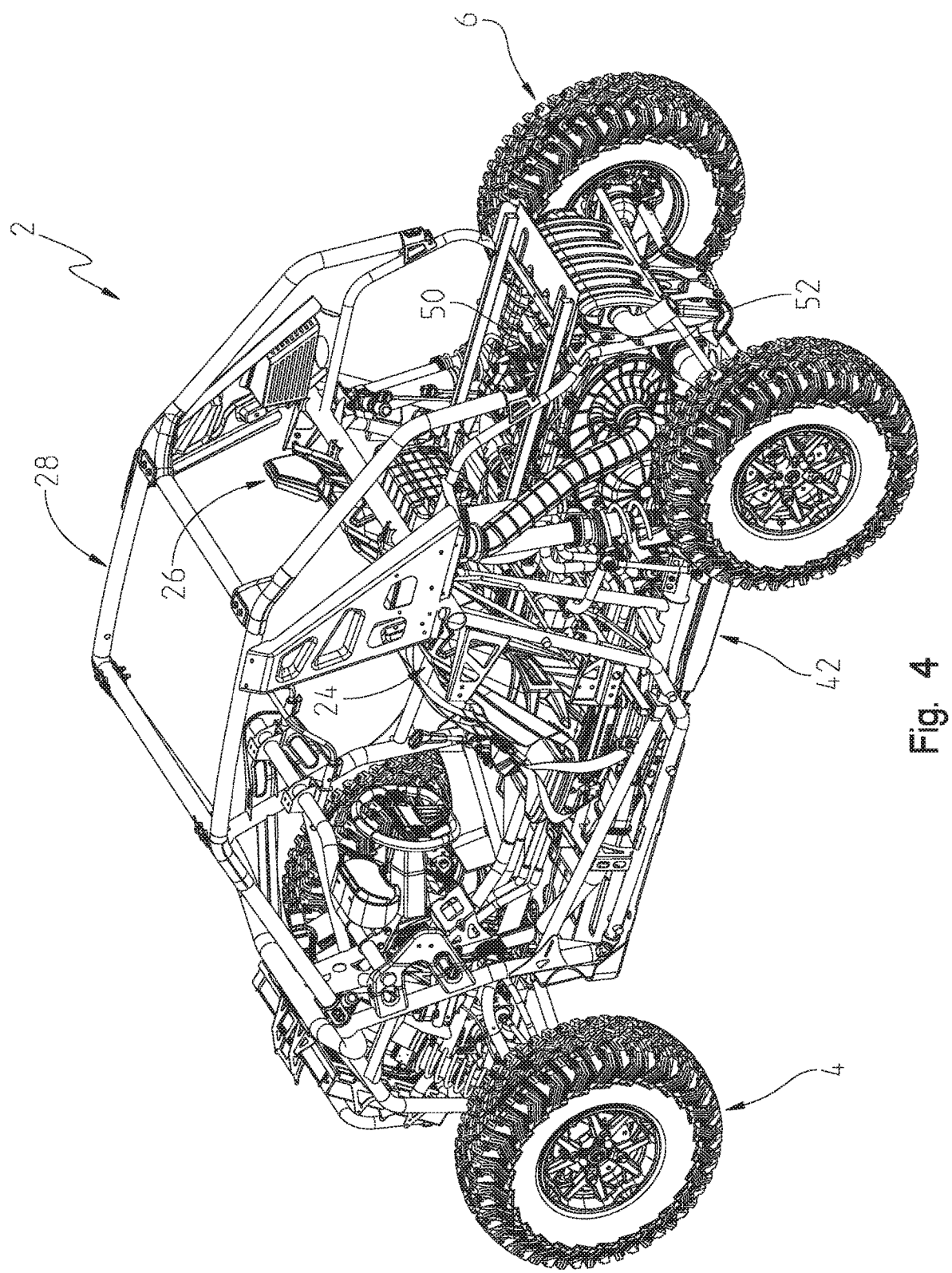
FIG. 4 is a left rear perspective view of the vehicle of FIG. 1.

With reference first to FIGS. 1-10, the vehicle of the present invention will be described. As shown, the vehicle is generally depicted as reference number 2 which includes front wheels 4 and rear wheels 6. Front wheels 4 are comprised of rims 8 and tires 10, whereas wheels 6 are comprised of rims 14 and tires 16. Wheels 4 and 6 support a vehicle frame which is shown generally at 20 and which supports a seating area 22 comprised of a driver's seat 24 and a passenger seat 26. A cab frame is shown at 28 and generally extends over the seating area 22 to protect the passengers from such objects as tree branches, etc. A 6-point shoulder harness 30 (FIG. 5) is also positioned over each of the seats 24, 26 although it is only shown in the figures as positioned over the driver's seat 24 for clarity. A passenger grab bar 32 is provided for the passenger in seat 26. As best shown in FIG. 2, vehicle 2 further includes a steering assembly at 34 for steering front wheels 4 whereby the steering assembly 34 includes a steering wheel 36 which is both tiltable and longitudinally movable as described further herein.

Figure 5:
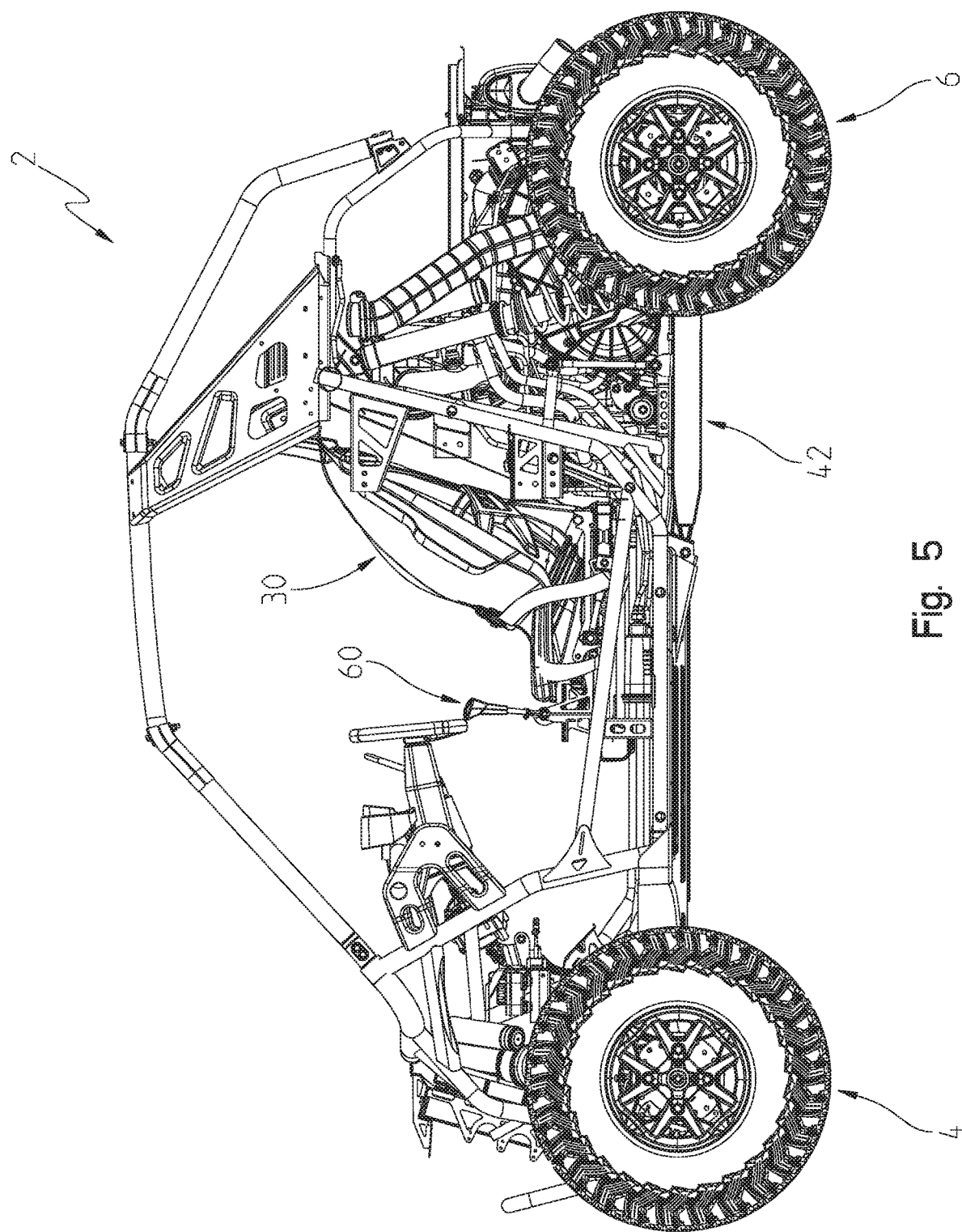
FIG. 5 is a left side view of the vehicle of FIG. 1.
Figure 6:
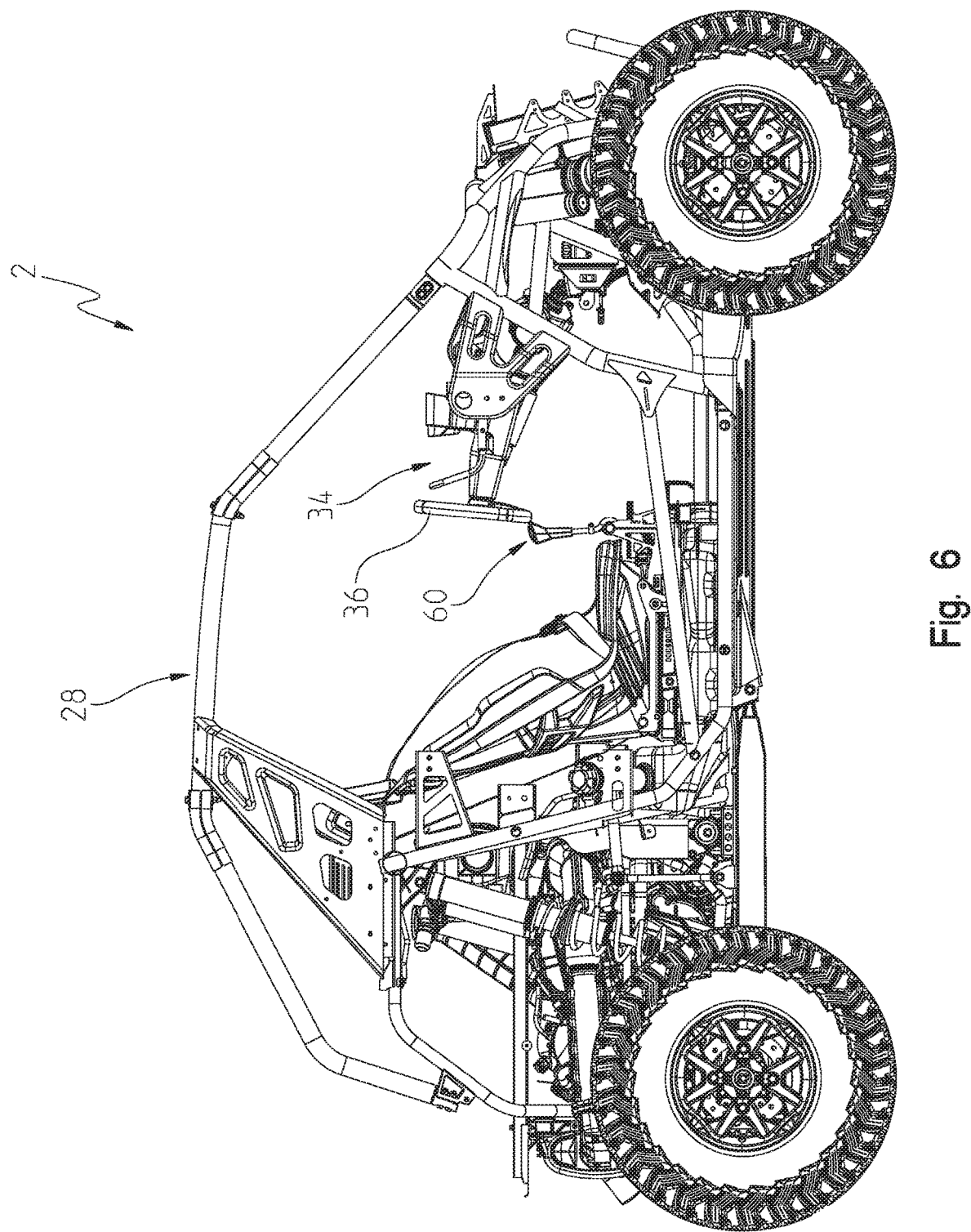
FIG. 6 is a right side view of the vehicle of FIG. 1.

Vehicle 2 further includes a front suspension at 40 (FIG. 2), which in the present disclosure is a double A-arm suspension and further includes a rear suspension 42, which as shown in the present disclosure is a trailing arm-type suspension. A radiator 46 is provided for cooling purposes of the powertrain. As shown best in FIGS. 3 and 4, powertrain is comprised of engine 50, a continuously variable transmission (CVT) 52 (FIG. 4) and a shiftable transmission 76 (FIG. 7) which is operated by a shifter assembly 60 (FIG. 5). In a preferred version of the present invention, the vehicle is a four-wheel drive vehicle including a front angled gear drive 70 (FIG. 9) having front stub shafts 72 coupled to the gear drive 70 for driving the front wheels 4. A rear angled gear drive 76 (FIG. 7) is provided to drive half shafts 78 which drives rear wheels 6. Finally, and with respect to FIG. 10, vehicle 2 includes an air intake system 80, an exhaust system 82 and a CVT cooling system 84.

Figure 11:
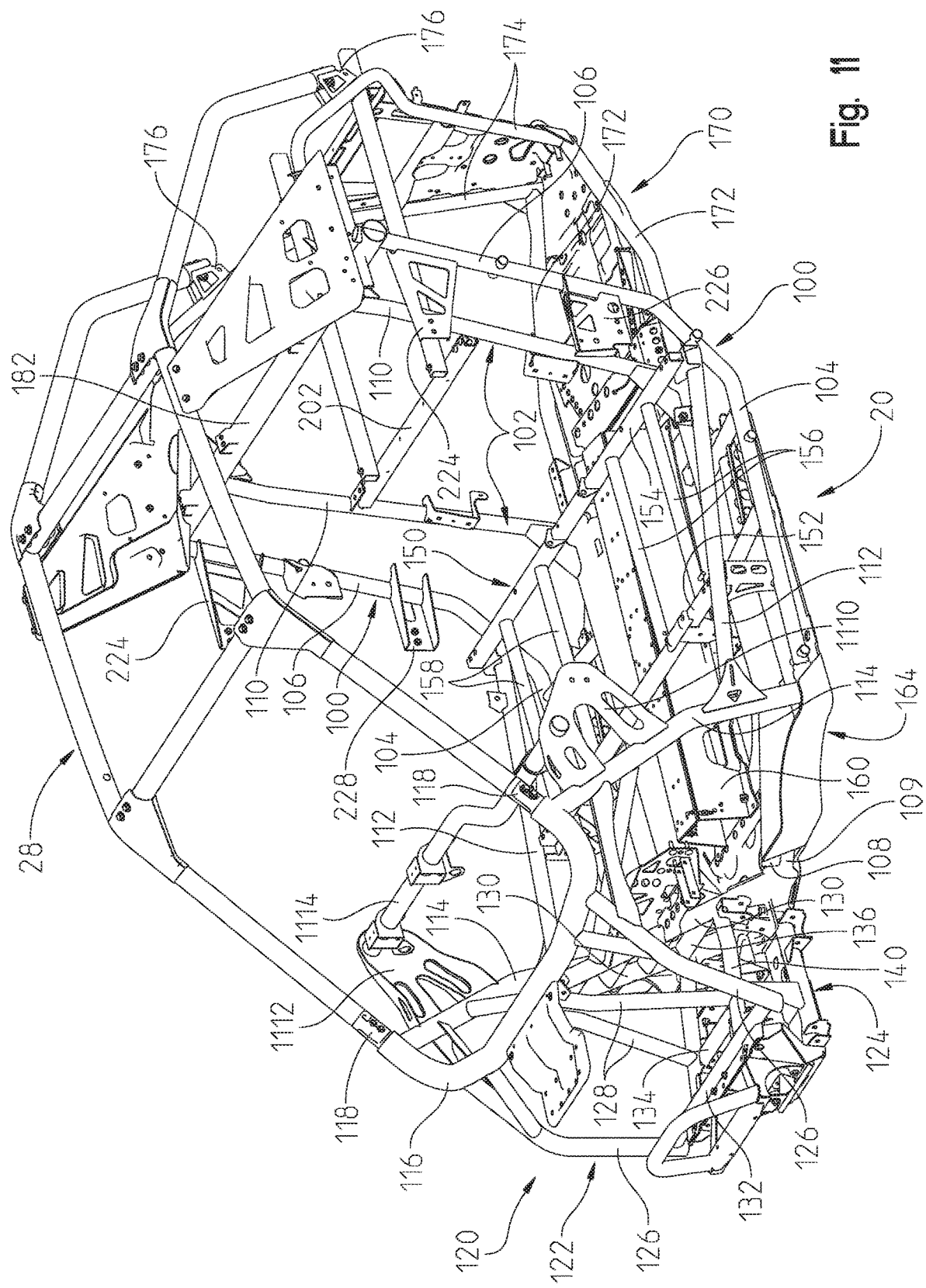
FIG. 11 is a front left perspective view of the frame of the vehicle of FIG. 1.
Figure 12:
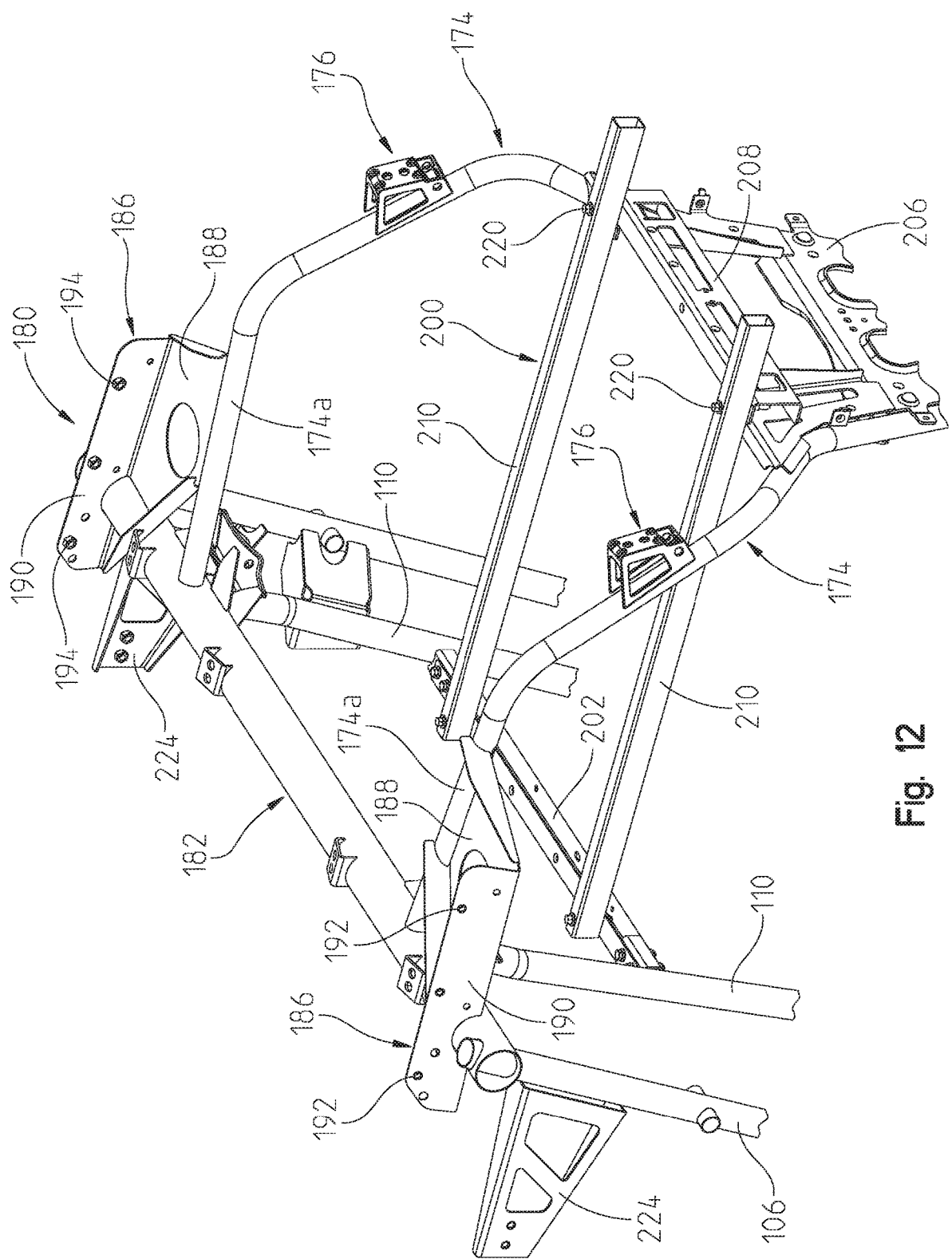
FIG. 12 is a left rear perspective view of the rear frame portion of the frame of FIG. 11.
Figure 13:
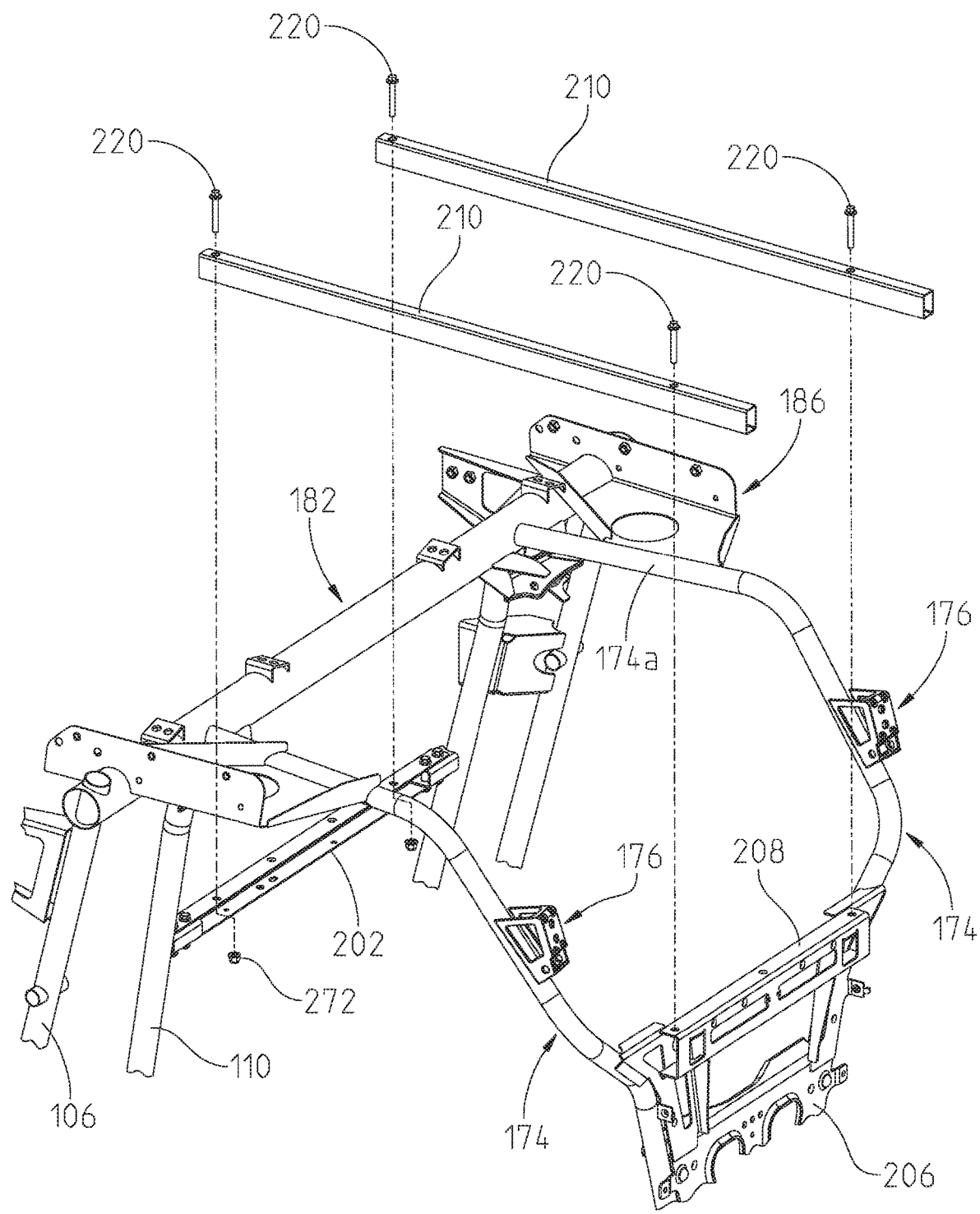
FIG. 13 is a partially exploded view of the rear frame portion of FIG. 12.

With reference now to FIGS. 11-13, frame 20 will be described in greater detail. With reference first to FIG. 11, frame 20 is comprised of outer frame tubes 100 and inner frame tubes 102. Outer tubes include a longitudinally extending portion 104 and vertically extending portions 106. Frame tubes 102 include horizontally extending portions 108 and vertically upstanding frame tubes 110. Outer frame tubes 112 extend forwardly and generally parallel with frame tubes 104 and couple to upright frame tubes 114. Frame tubes 114 support a U-shaped frame tube 116 having couplers 118 to which cab frame 28 is attached. U-shaped tube 116 is supported by a front frame portion 120 comprised of a fixed front frame portion 122 and a removable front frame portion 124. Fixed front frame portion 122 is comprised of three sets of upwardly extending frame tubes, namely frame tubes 126, frame tubes 128 and frame tubes 130. Fixed frame portion also includes transverse frame members 132, 134 and 136. Finally, fixed front frame portion 122 is comprised of longitudinal tube portions 140.

With reference still to FIG. 11, a seating support is generally shown at 150 including transverse frame tubes 152 and 154 and longitudinal frame tube pairs 156 and 158, which support the seats 24, 26 respectively as described further herein. A tunnel portion 160 is provided between the frame tube pairs 156, 158 and allows for routing of cabling, etc. from the front of the frame to the rear of the frame. A belly pan 164 is positioned under the seat frame 150 to protect the riders from rocks and dust as the vehicle traverses various terrain. It should be noted that belly pan 164 may also be viewed in FIG. 8 from an under side of vehicle 2.

With reference now to FIGS. 11-13, a rear of the frame will be described. With reference first to FIG. 11, a powertrain support area 170 is provided including rearwardly extending frame tubes 172 and upwardly extending frame tubes 174. Frame tubes 174 extend upwardly and include brackets 176, to which a rear portion of cab frame 28 is coupled, as further described herein. With reference now to FIG. 12, a cab frame support area 180 is provided having a transverse tube at 182, which couples to forwardly projecting tube portions 174a of frame tubes 174. Transverse tube 182 is also coupled to frame tubes 106, 110. Brackets 186 couple to both frame tubes 174a, 182 and include a base portion 188 and an upper plate portion 190 having apertures 192 therethrough with fasteners 194 on an inside thereof for receiving a bolt, as described further herein.

With reference now to FIGS. 12 and 13, a utility bed support area 200 will be described in greater detail. Support area 200 includes transverse tube 202 extending between upright frame tubes 110 and a rear plate 206 extends transversely of and is coupled to frame tubes 174. A channel-shaped bracket 208 is coupled to plate 206, and together with frame tube 202, supports longitudinally extending frame tubes 210. As shown in FIGS. 12 and 13, frame tubes 210 may be held in place by way of fasteners 220 and 222.

With respect again to FIG. 11, door support brackets are provided on both the driver and passenger side, whereby a bracket 224 and 226 extend forwardly from tube 106 on the driver's side and a bracket 224 and 238 extend forwardly on the passenger side.

Figure 14:
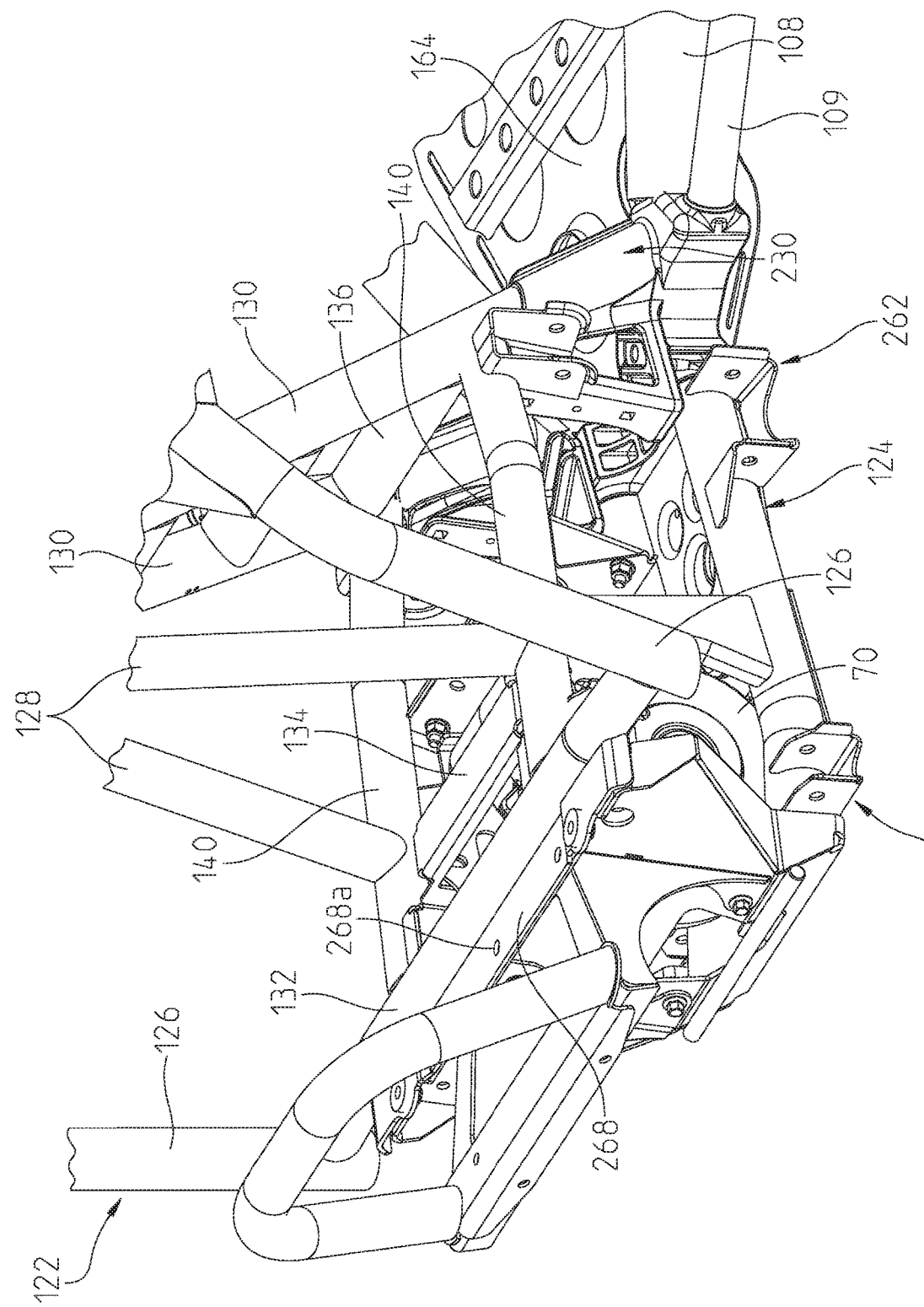
FIG. 14 is a left front perspective view of the front removable frame portion.
Figure 15:
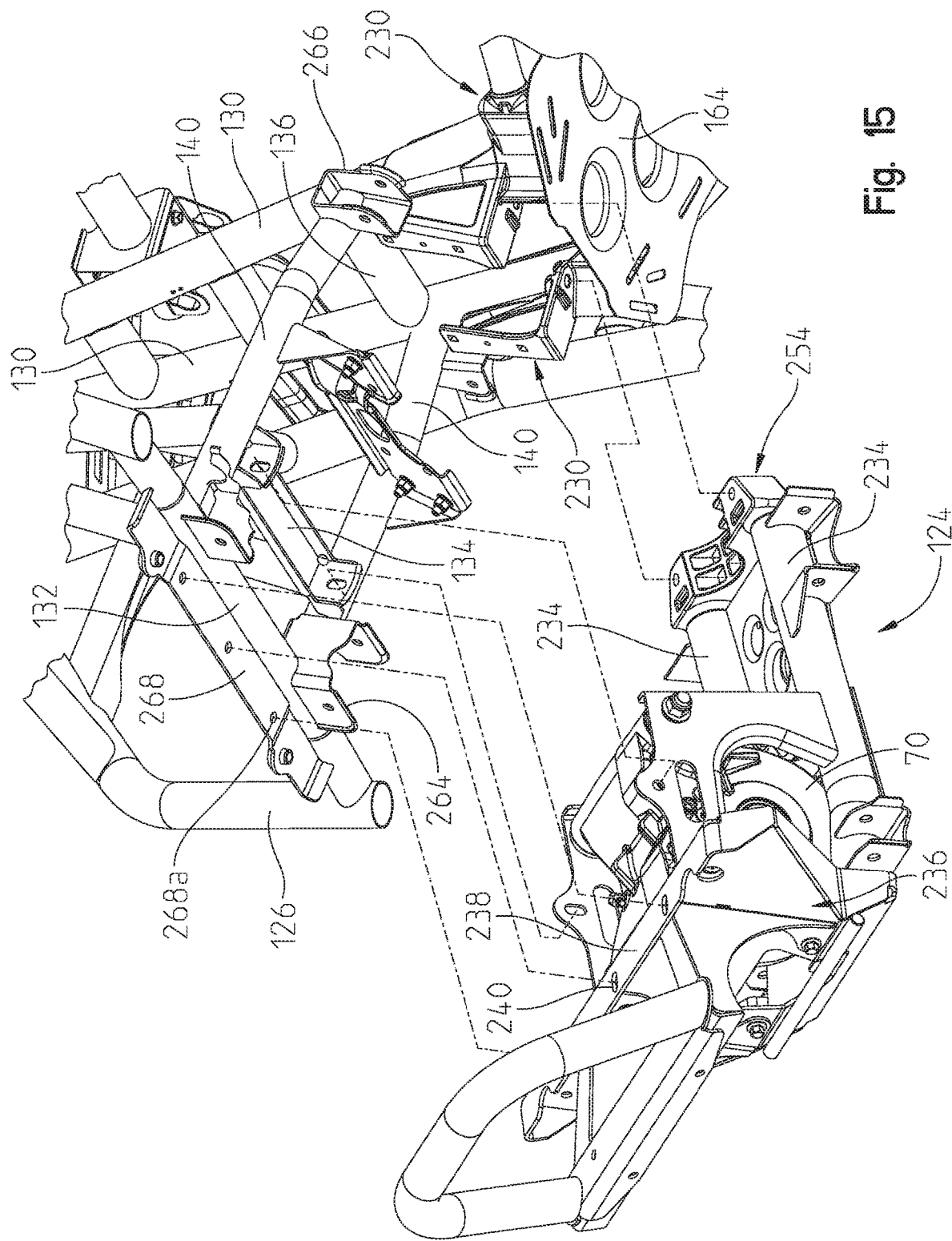
FIG. 15 is a partially exploded view of the front removable frame portion of FIG. 14.
Figure 16:
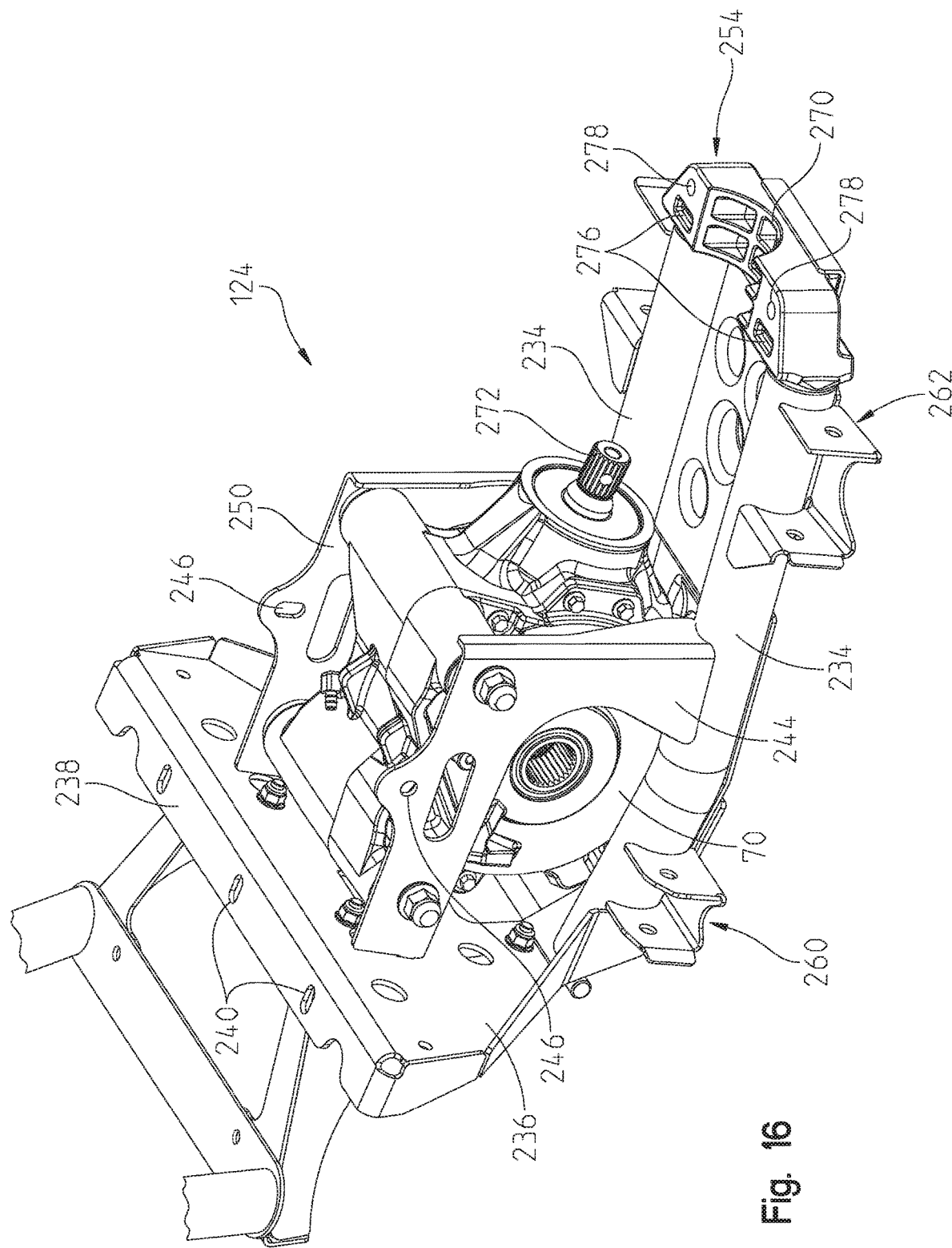
FIG. 16 is a rear left perspective view of the front removable frame portion of FIG. 15.

With reference now to FIGS. 14-18, a first embodiment of the removable front frame portion 124 will be described. As shown in FIG. 14, a coupler 230 is provided which couples to frame tubes 108, 109 and 130 and which provides an interface to the removable frame portion 124 as described herein. With reference to FIGS. 15 and 16, the removable frame portion 124 includes longitudinal tube portions 234 which couple to a front plate 236. Plate 236 includes an upper bracket portion 238 having apertures at 240. An L-shaped bracket arm 244 is coupled between tubes 234 and plate 236. L-shaped bracket 244 includes an upper arm portion 250 providing a mount for differential 70. A rear coupler 254 is provided which is complementary with couplers 230 and is coupled to frame tubes 234. Coupler 254 can be a cast metallic member such as aluminum and could be attached to tubes 234 by way of fasteners, industrial adhesives and/or welding.

As shown best in FIG. 16, mounting brackets 260 and 262 are coupled directly to frame tubes 234 for mounting of the lower A-arms of the front suspension 40. Brackets 264 and 266 (FIG. 15) are coupled to frame tubes 140 for mounting the upper A-arms of the front suspension. Fixed front frame portion 122 includes a mounting bracket 268 (FIG. 15) having mounting apertures at 268a.

Figure 17:
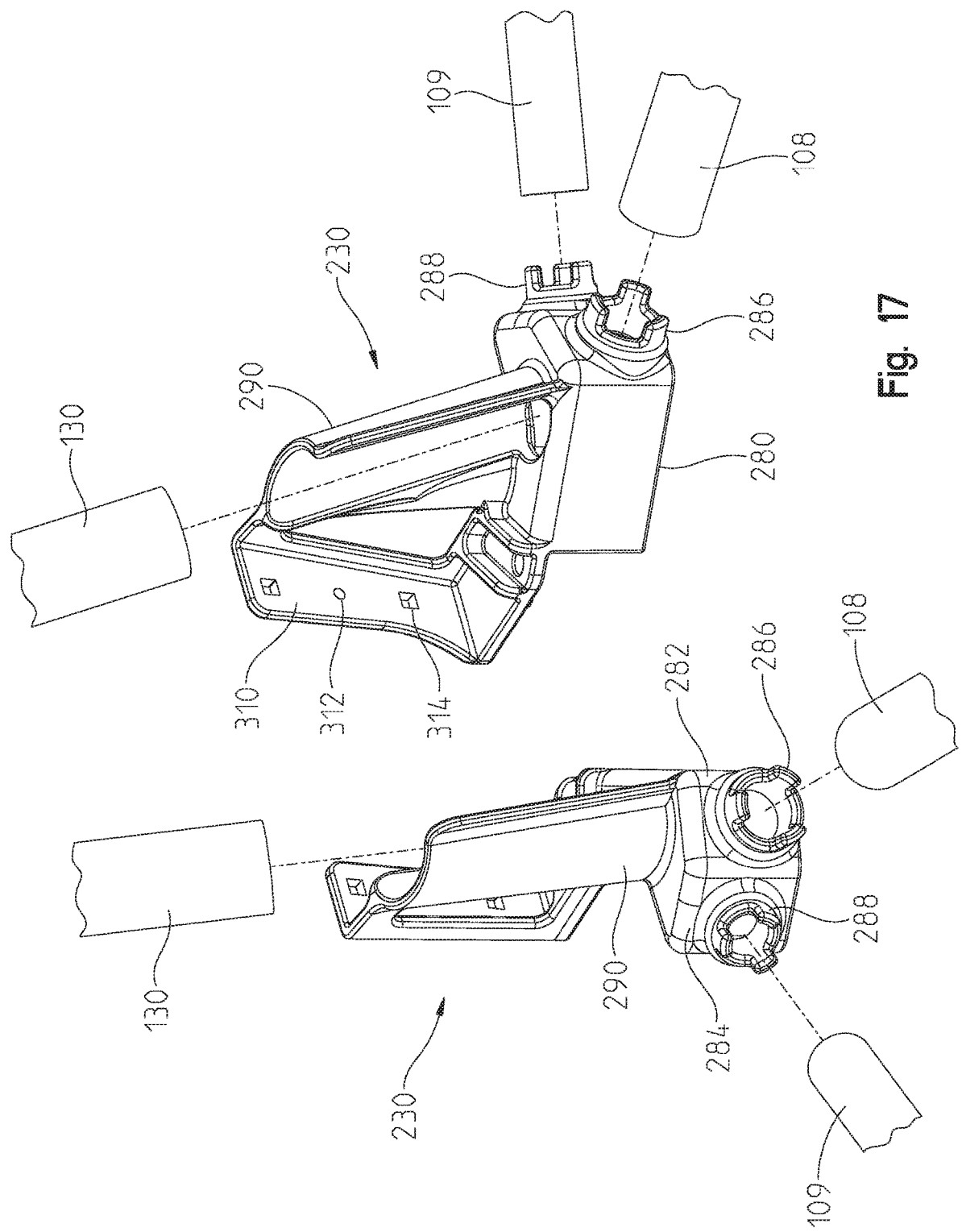
FIG. 17 shows a right rear perspective view of the right and left couplers of FIG. 15.
Figure 18:
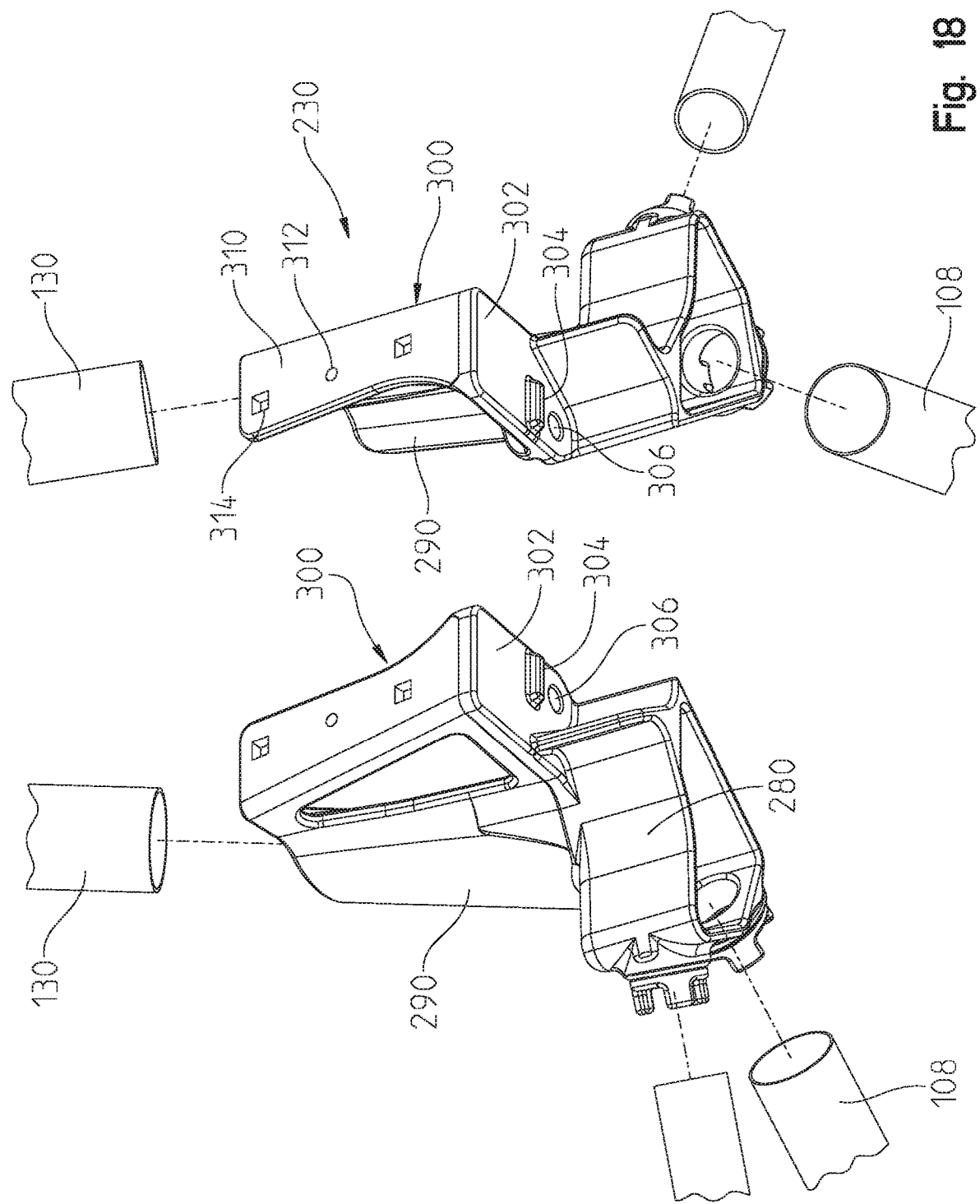
FIG. 18 shows a right front perspective view of the couplers of FIG. 17.
Figure 19:
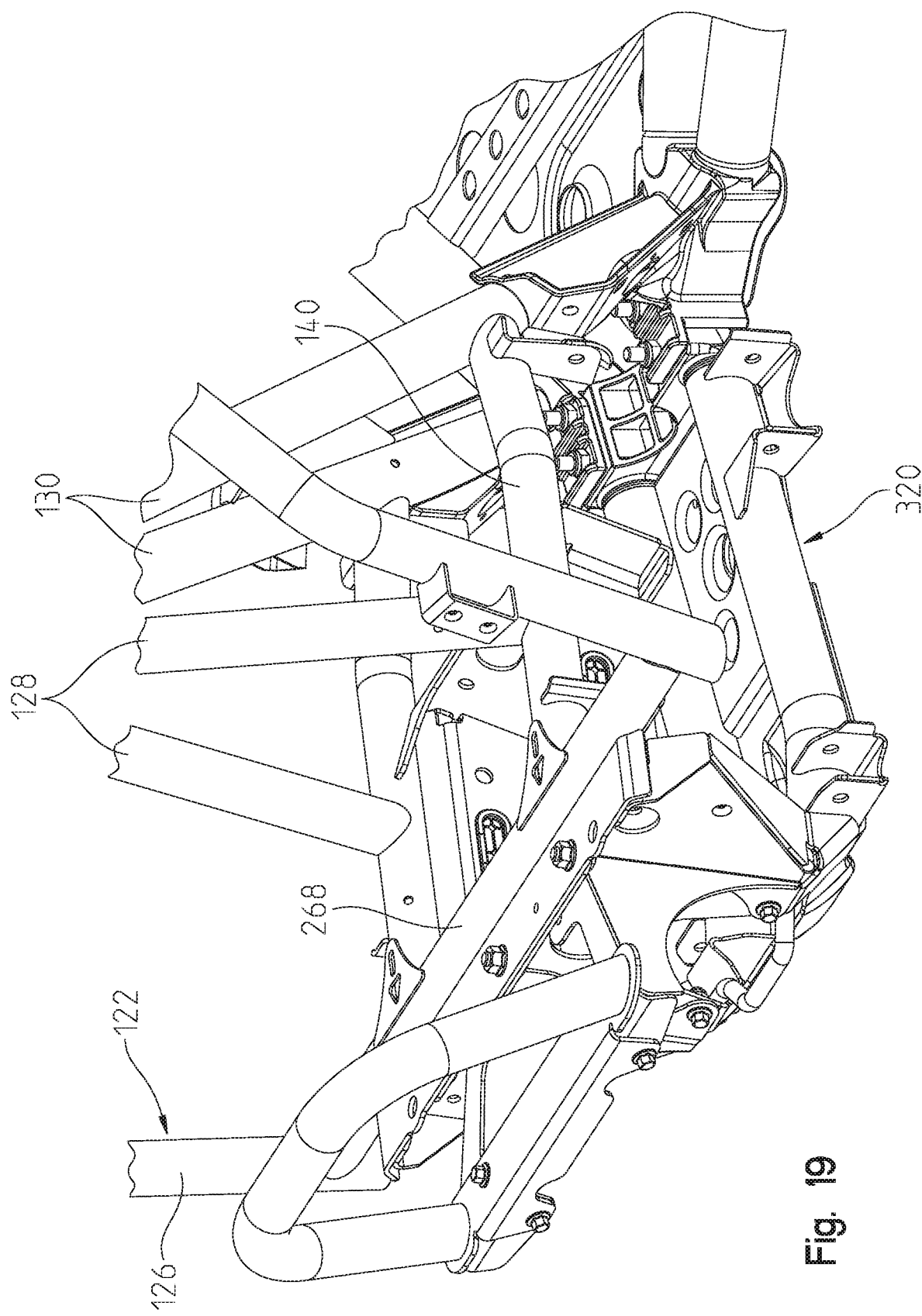
FIG. 19 shows another version of the front removable frame portion of FIG. 14.
Figure 20:
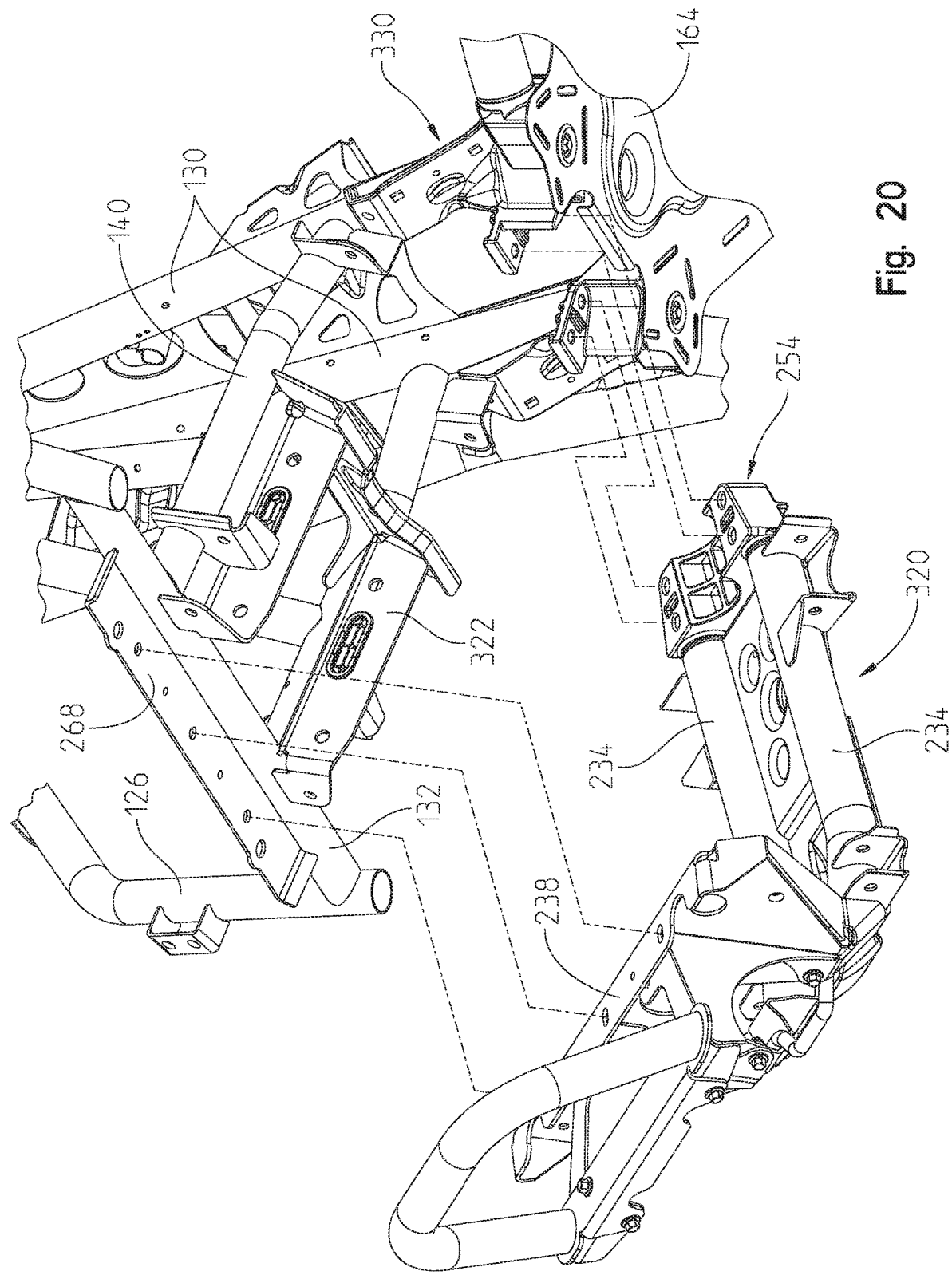
FIG. 20 is a front left perspective view of the front removable frame portion exploded away from the main frame portion.
Figure 21:
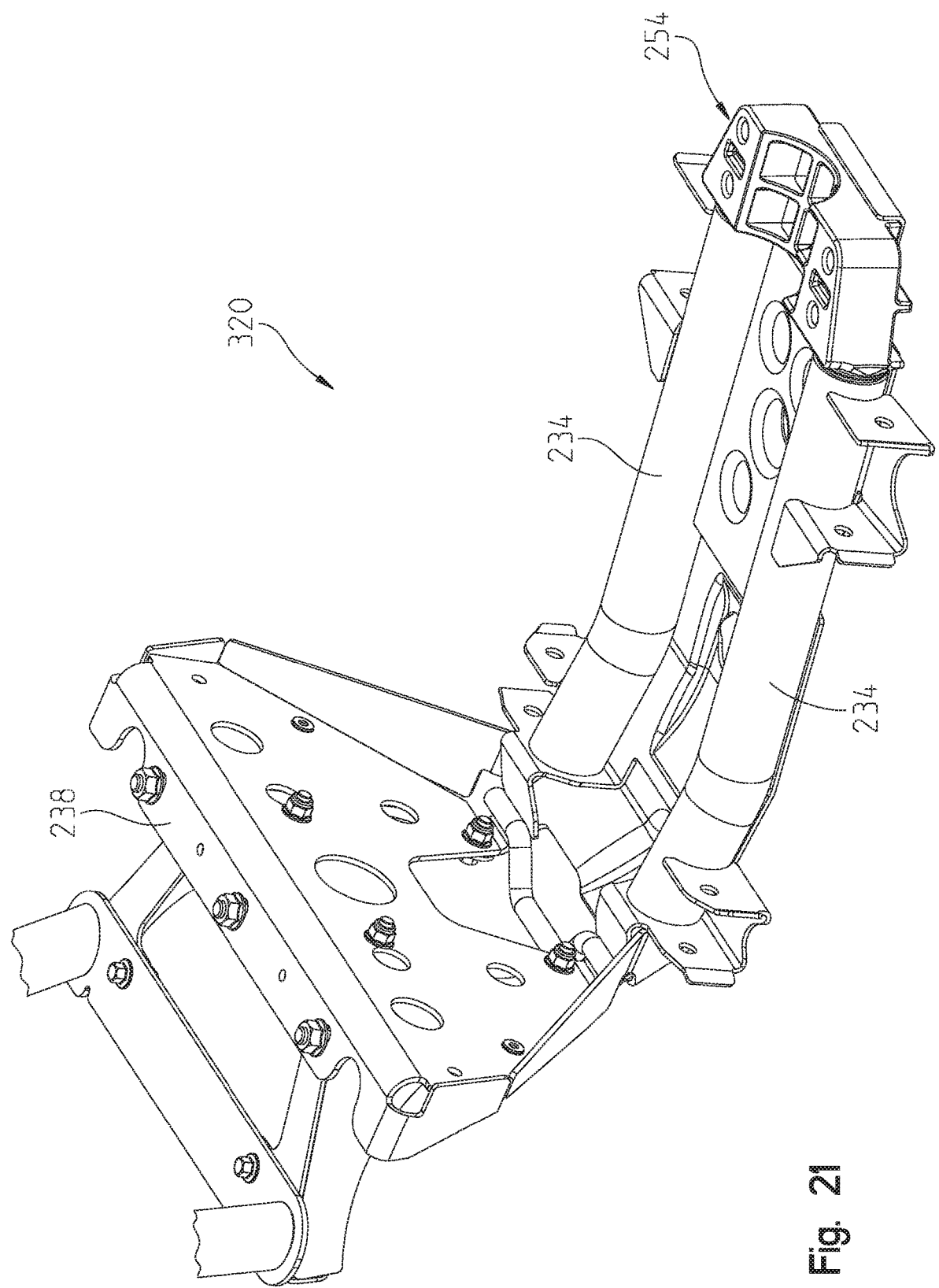
FIG. 21 is a left rear perspective view of the front removable frame portion of FIG. 19.

With reference now to FIGS. 16-18, couplers 230 and 254 will be described in greater detail. As shown best in FIG. 16, coupler 254 includes a semi-circular opening 270 providing clearance for a drive shaft that couples to shaft 272 of differential 70. Coupler 254 also includes indents 276 and apertures at 278.

As shown in FIGS. 17 and 18, couplers 230 include a base portion 280 each having faces 282 and 284, each providing a set of coupling pegs 286, 288 respectively, arranged in a circular pattern. Each set of the coupling pegs 286, 288 are sized to be received in the inside diameter of tubes 109, 108 respectively, whereby the tubes are fastened to couplers 230. Couplers 230 further include a semi-circular upstanding coupler portion 290 which couples to frame tubes 130. Tubes 108, 109 and 130 could be held in place by additional fasteners or could be welded or held in place by industrial adhesives. L-shaped arms 300 also extend upwardly from body portion 280 and include horizontally extending walls 302 having pegs 304 and apertures 306. It should be appreciated that pegs 304 correspond with indents 276 of coupler 254 and that apertures 306 align with apertures 278 when couplers 230, 254 are properly aligned. As shown best in FIG. 18, couplers 230 further include forwardly facing walls 310 having a through hole 312 and square apertures 314.

With reference now to FIGS. 19-23, an alternate removable front frame portion 320 will be described in greater detail. As shown, removable front frame portion 320 is similar to removable front frame portion 124 with the exception that L-shaped brackets 244 are not included. Rather, brackets 322 for mounting the differential are coupled to frame tubes 132 and 140, as in this embodiment, the differential 70 is not removed with the removable front frame portion 320. Couplers 330 couple to frame tubes 108, 109 and 130 in a similar manner as described above.

Figure 22:
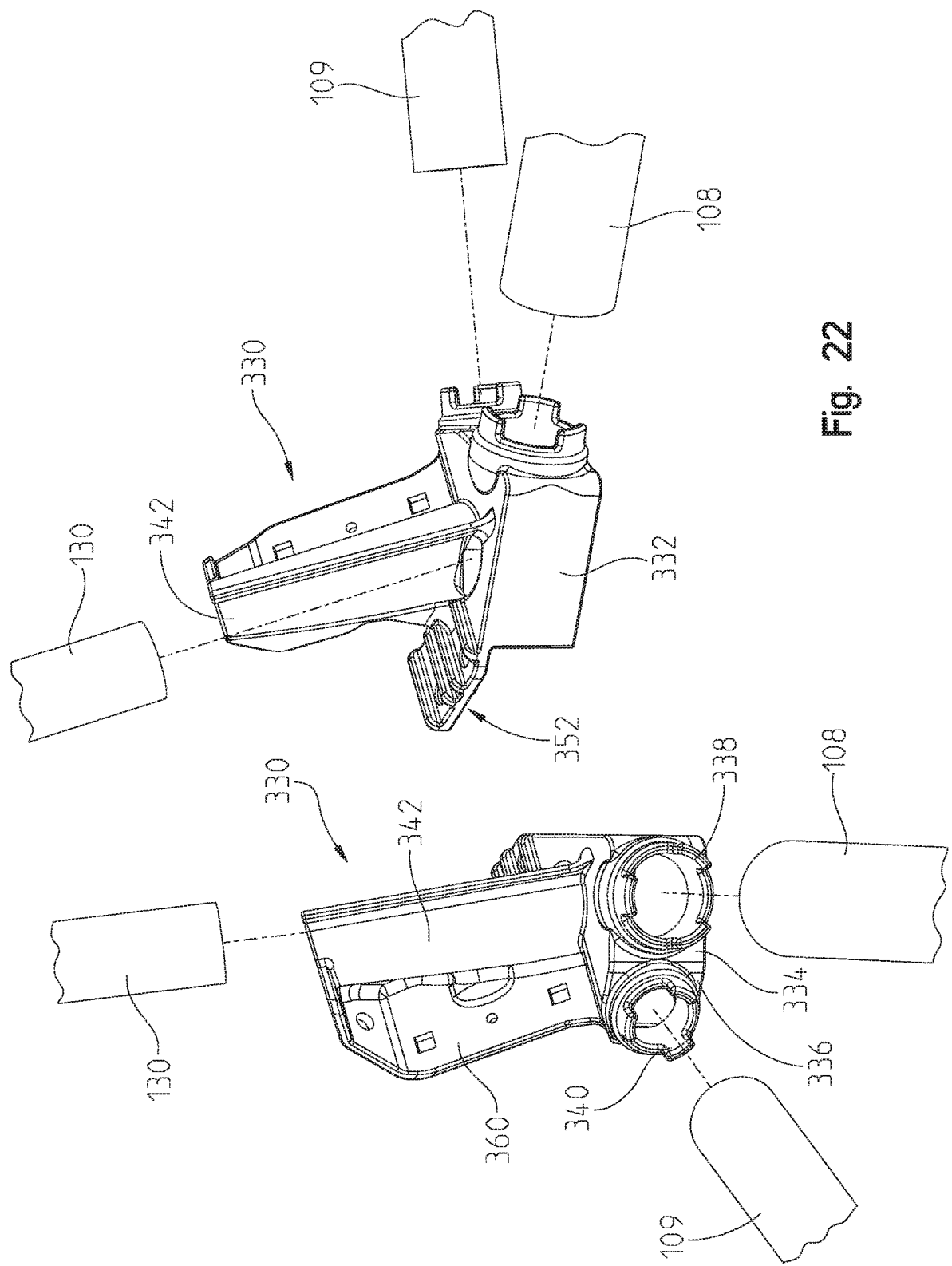
FIG. 22 is a rear left perspective view of the couplers shown in FIG. 20.
Figure 23:
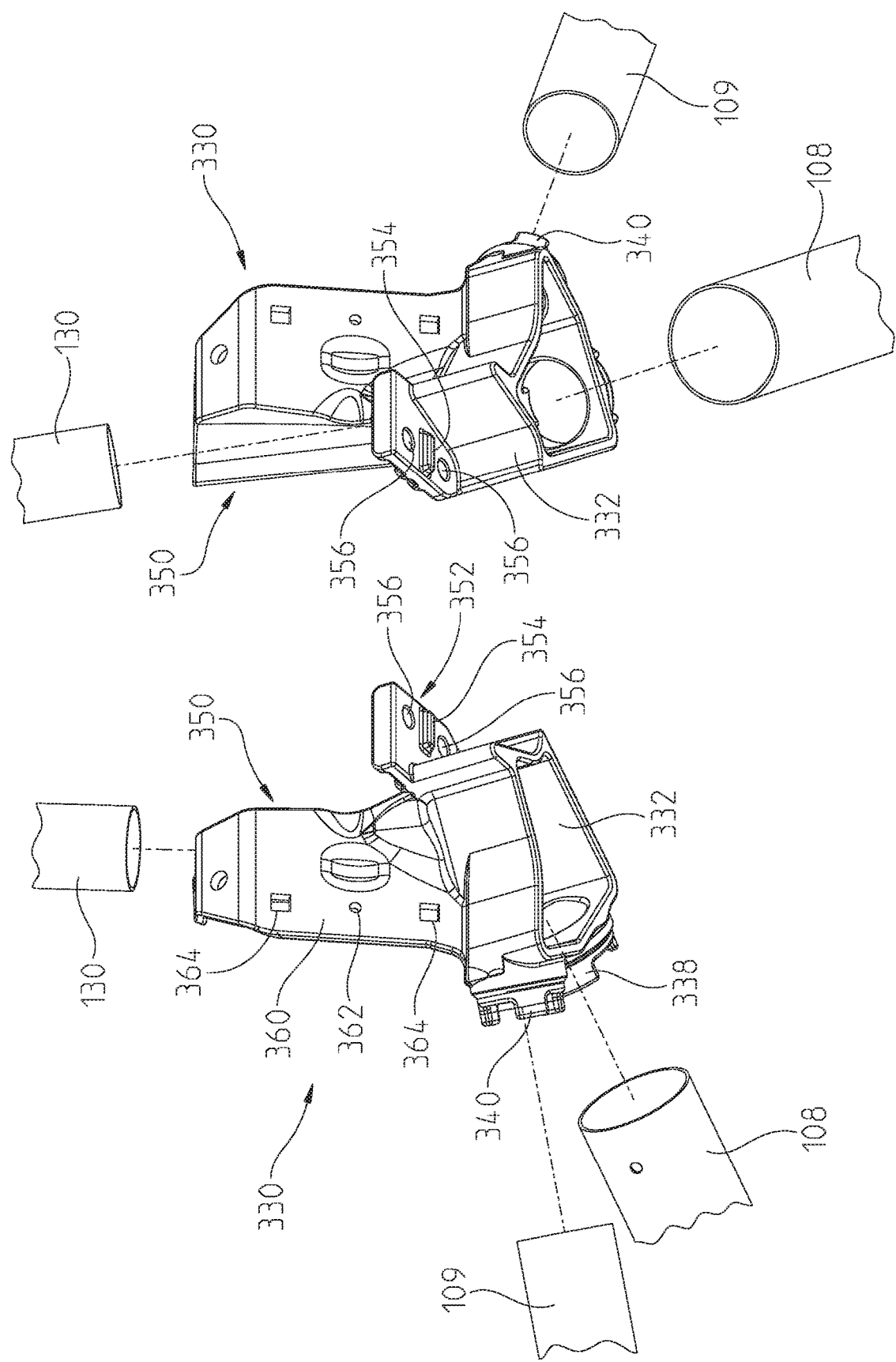
FIG. 23 is a front right perspective view of the couplers of FIG. 22.

As shown in FIGS. 22 and 23, couplers 330 include a base portion 332 each having faces 334 and 336, each providing a set of coupling pegs 338, 340 respectively. Each set of the coupling pegs 338, 340 are arranged in a circular pattern and sized to be received in the inside diameter of tubes 109, 108 respectively, whereby the tubes 109, 108 are fastened to couplers 330. Couplers 330 further include a semi-circular upstanding coupler portion 342 which couple to frame tubes 130. Tubes 108, 109 and 130 could be held in place by additional fasteners or could be welded or held in place by industrial adhesives. L-shaped arms 350 also extend upwardly from body portion 332 and include horizontally extending walls 352 having pegs 354 and apertures 356 (FIG. 23). It should be appreciated that pegs 354 correspond with indents 276 of coupler 254 and that apertures 356 align with apertures 278 when couplers 230, 254 are properly aligned. As shown best in FIG. 22, couplers 230 further include forwardly facing walls 360 having a through hole 362 and square apertures 364.

Figure 24:
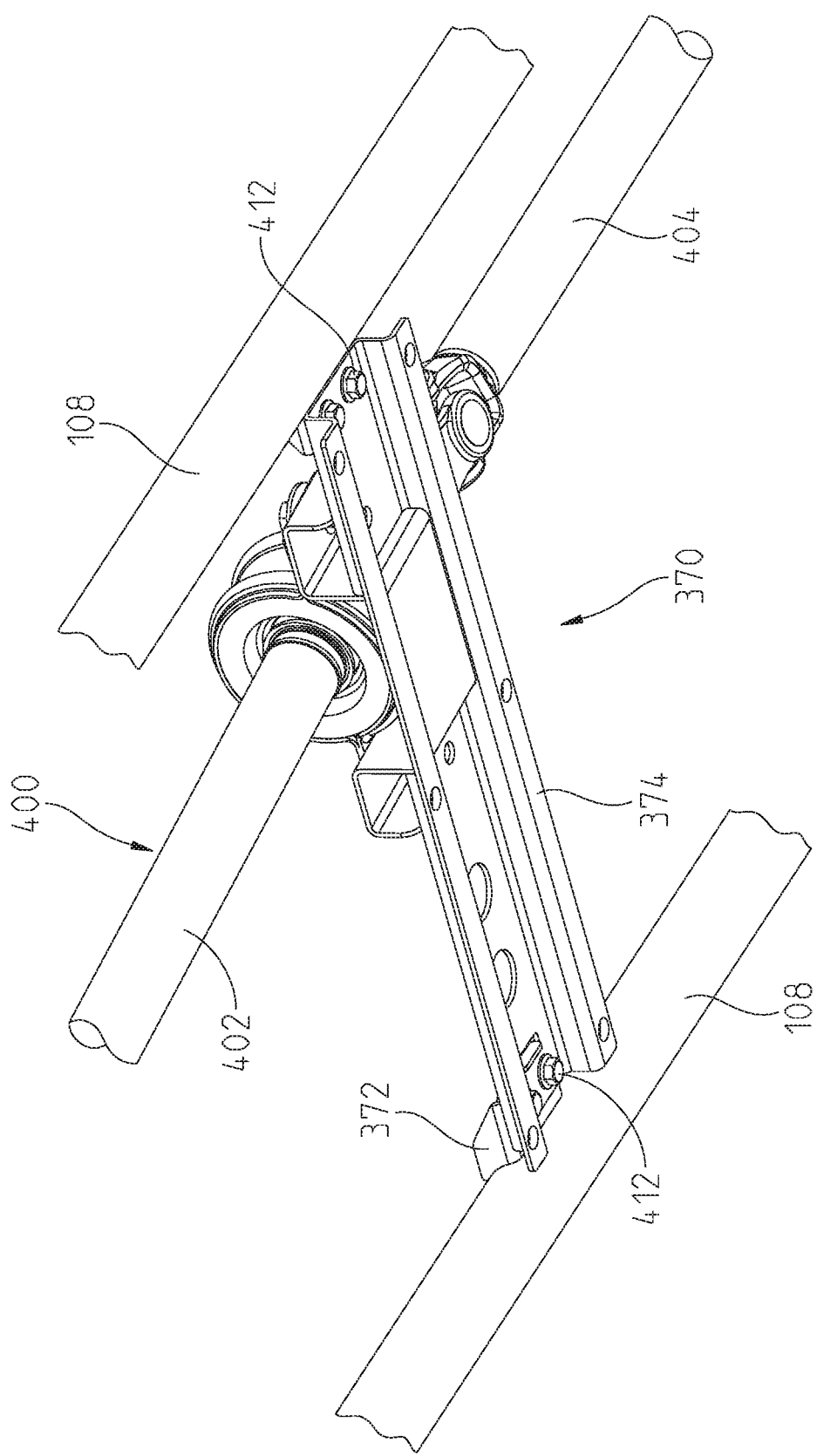
FIG. 24 shows a lower left perspective view of the drive shaft support.
Figure 25:
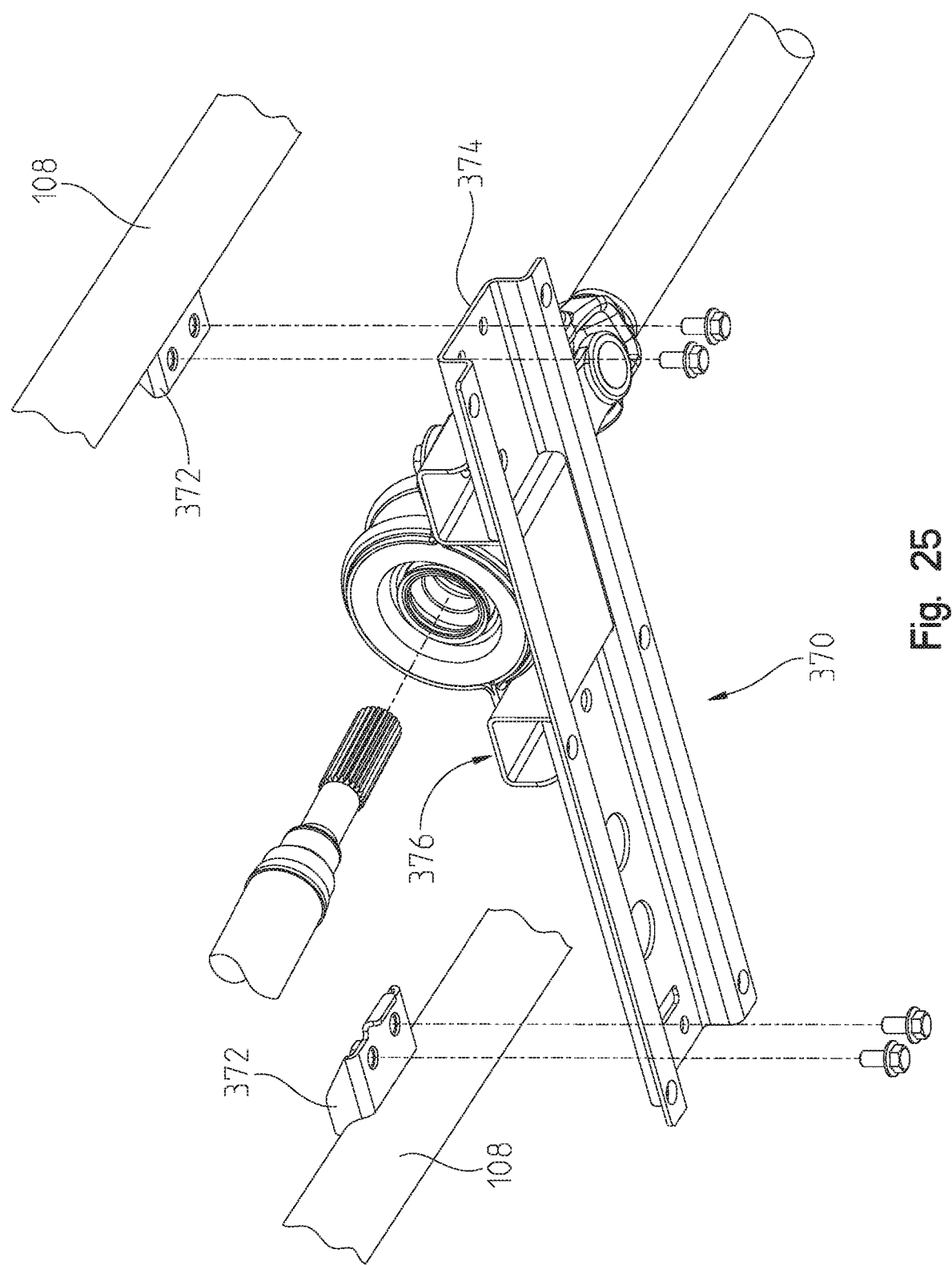
FIG. 25 shows a partially exploded view of FIG. 24.
Figure 26:
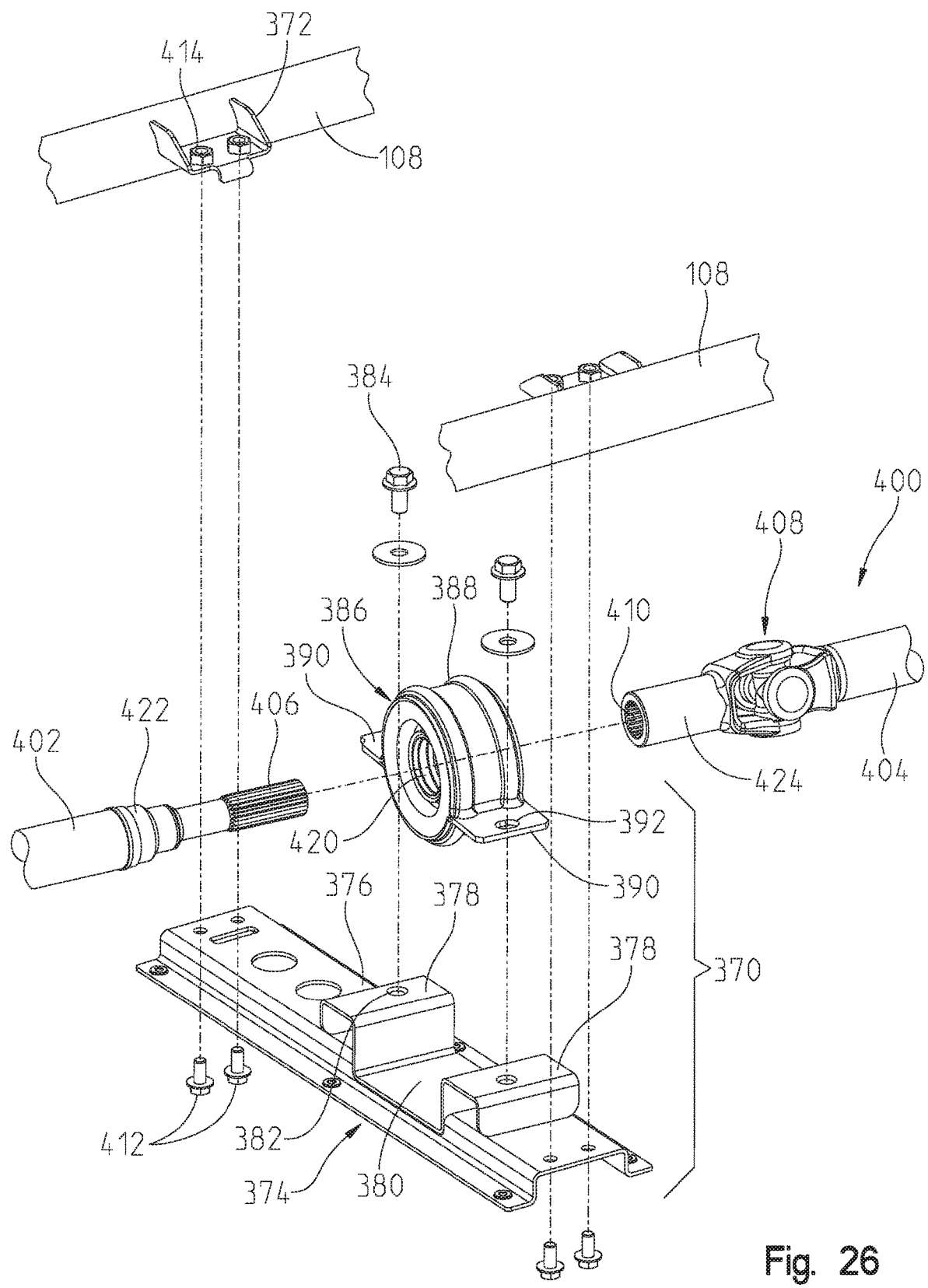
FIG. 26 shows the bearing of FIG. 25 exploded away from the support.

With reference now to FIGS. 24-26, a removable bearing assembly 370 will now be described. As shown best in FIG. 24, removable bearing assembly 370 is shown attached and spanning the longitudinal portions 108 of frame tubes 102 (FIG. 11). As shown, frame tubes 108 include brackets 372 for coupling bearing assembly 370 to frame tubes 108. Removable bearing assembly 370 includes a channel-shaped support 374 having a bracket 376 mounted thereto. As shown best in FIG. 26, bracket 376 includes upper support walls 378 and a recessed wall at 380. Threaded openings are provided at 382 which receive fasteners 384.

Figure 7:
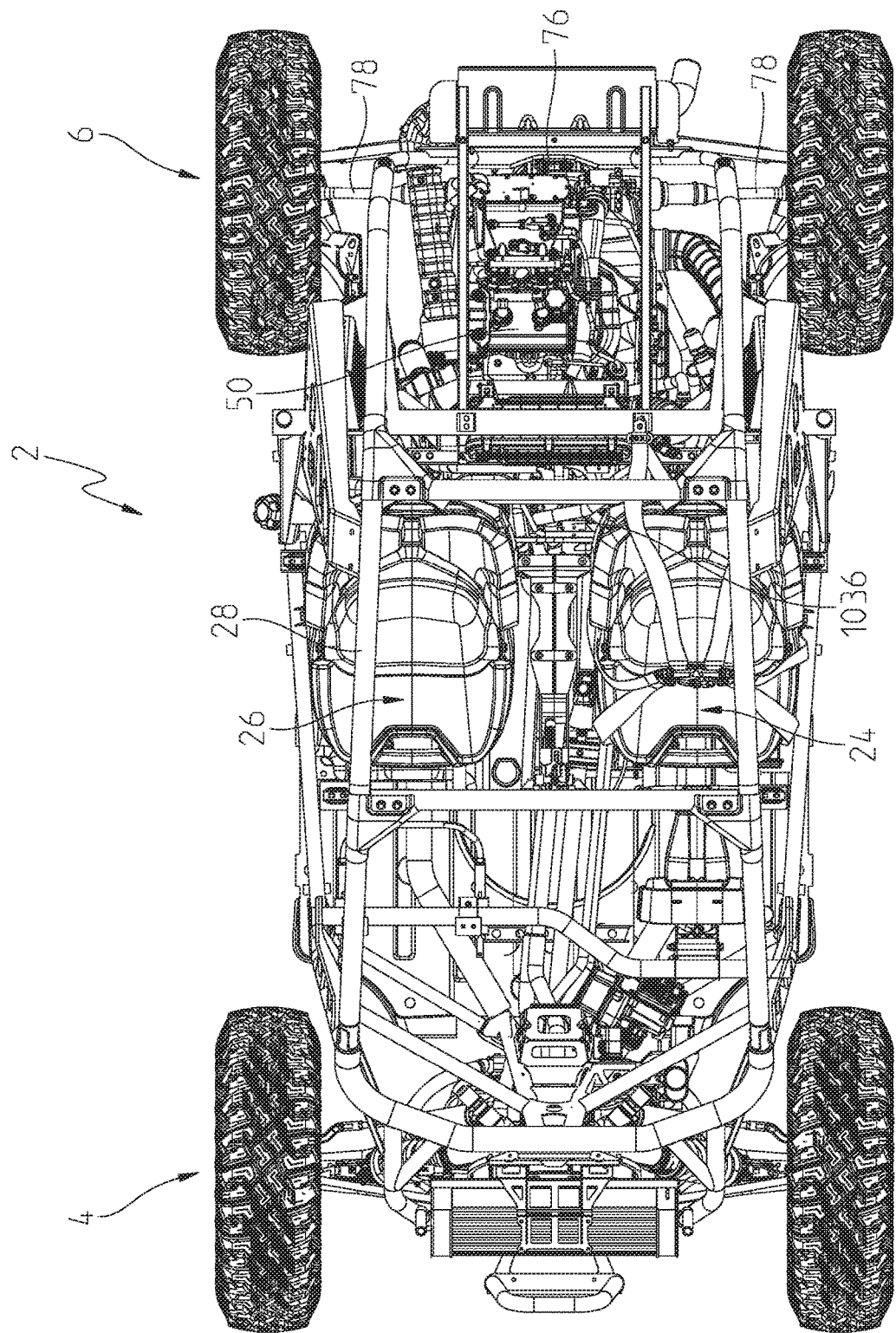
FIG. 7 is a top view of the vehicle of FIG. 1.
Figure 8:
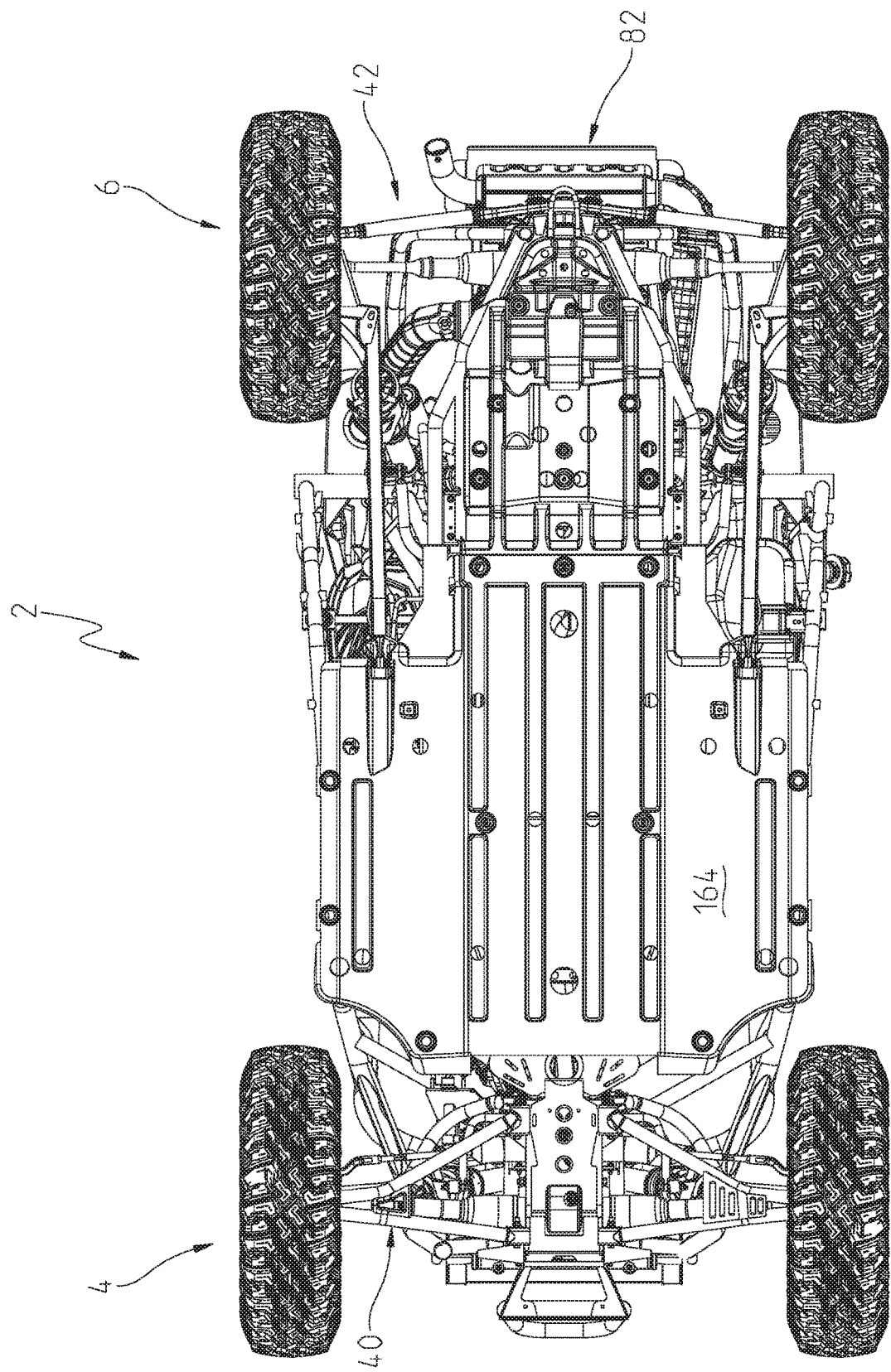
FIG. 8 is a bottom view of the vehicle of FIG. 1.
Figure 9:
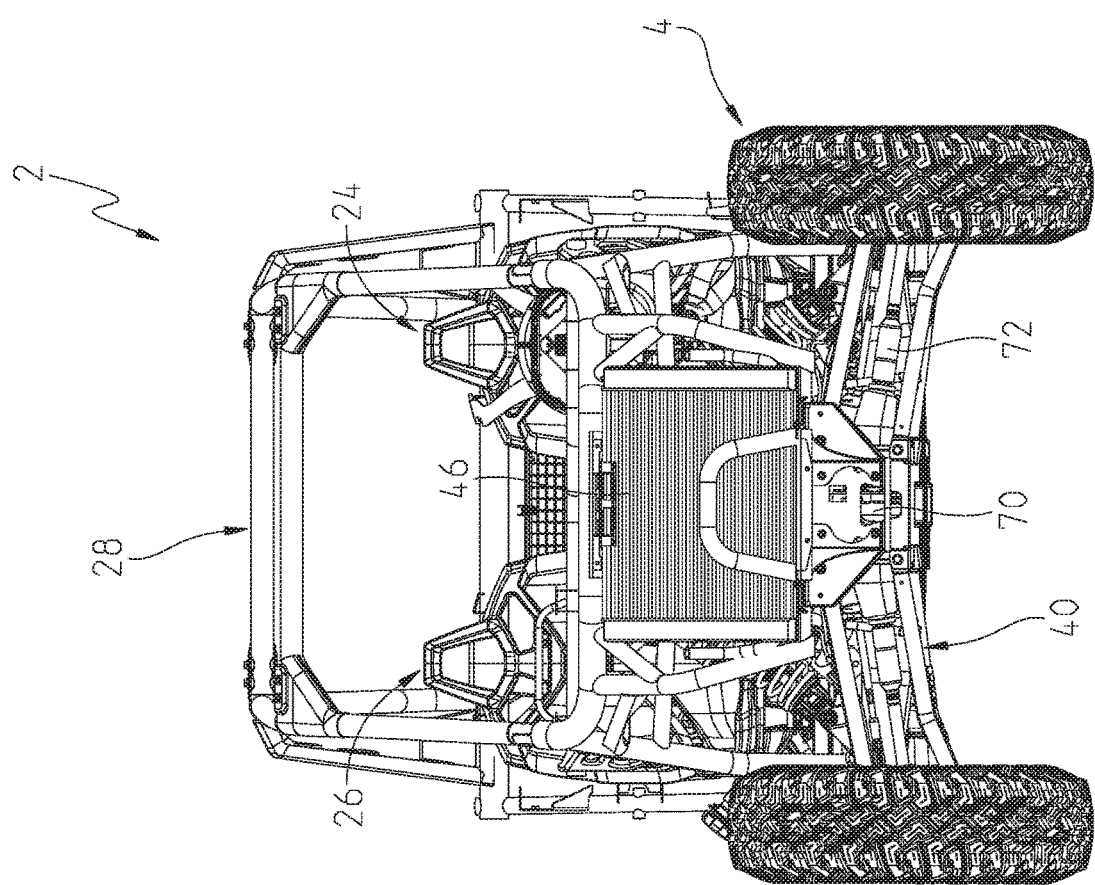
FIG. 9 is a front view of the vehicle of FIG. 1.
Figure 10:
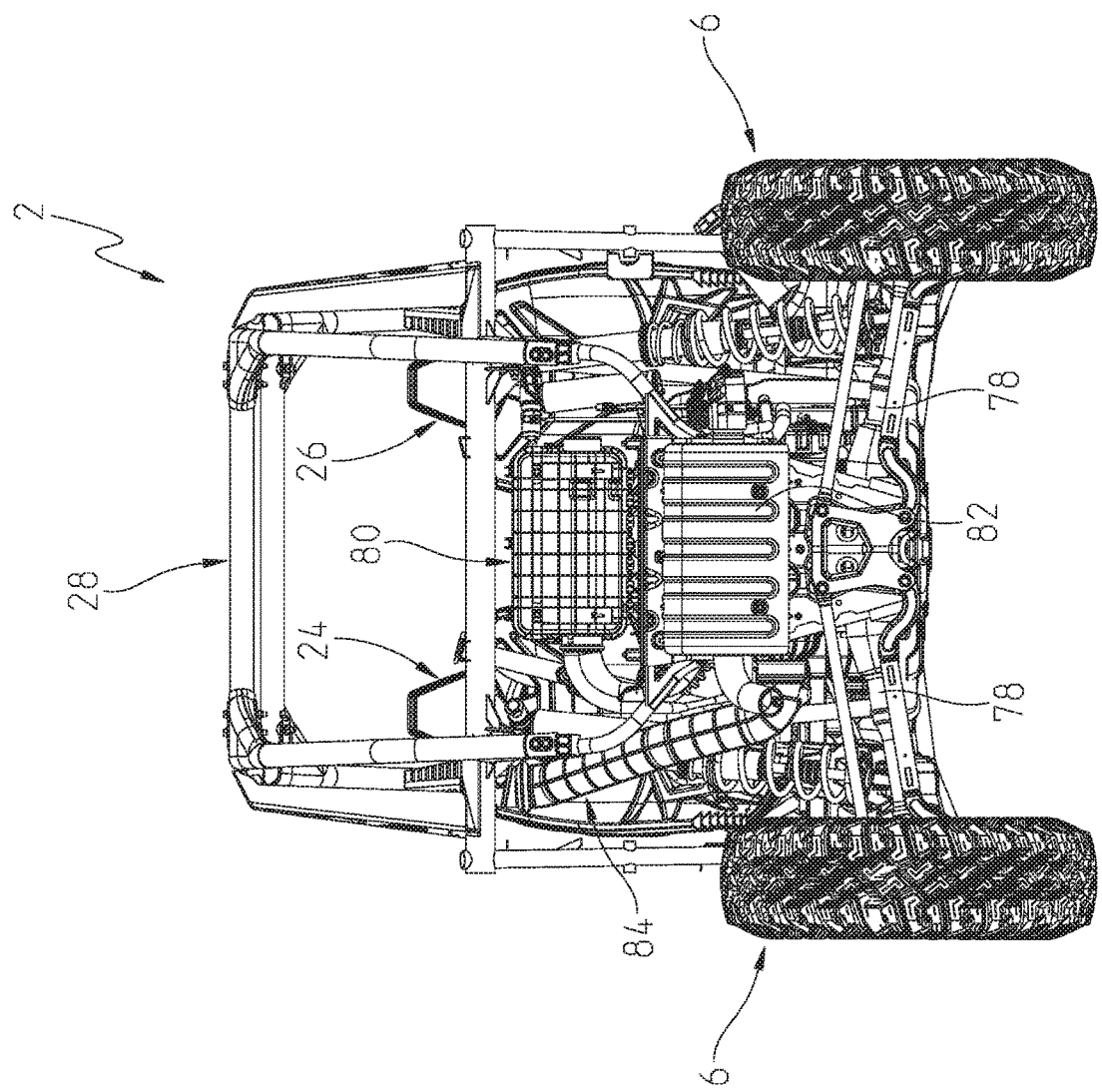
FIG. 10 is a rear view of the vehicle of FIG. 1.

A bearing 386 is provided having an outer frame portion 388 with flanges at 390 having mounting apertures 392. As shown, drive shaft 400 includes a front drive shaft portion 402 and a rear drive shaft portion 404, where front drive shaft 402 includes splined outer shaft 406 and where rear shaft 404 includes a universal joint 408 having an internal spline at 410. It should be appreciated that front shaft portion 402 extends forwardly to couple with front differential 70 (FIG. 14) and where rear drive shaft portion 404 extends rearwardly and couples with transmission 56 (FIG. 7). As shown best in FIG. 26, bearing 386 includes an inner rotatable bearing 420, such that when in the fully assembled position of FIG. 24, surface 422 of front drive shaft portion 402 and surface 424 of rear drive shaft portion 404 engage bearing portion 420, with the splined shaft 406 fully inserted into the splined coupling 410.

Thus, when in the fully assembled position of FIG. 24, and when removal of the drive shaft is necessary for service purposes, the belly pan 164 (FIG. 8) is removed which provides access to the removable bearing assembly 370. Removal of fasteners 412 from their corresponding fasteners 414 on bracket 372 allows channel 374 to drop downwardly, such that the splined shaft 406 and splined coupling 410 disengage, allowing for removal of both drive shaft portions 402, 404.

Figure 27:
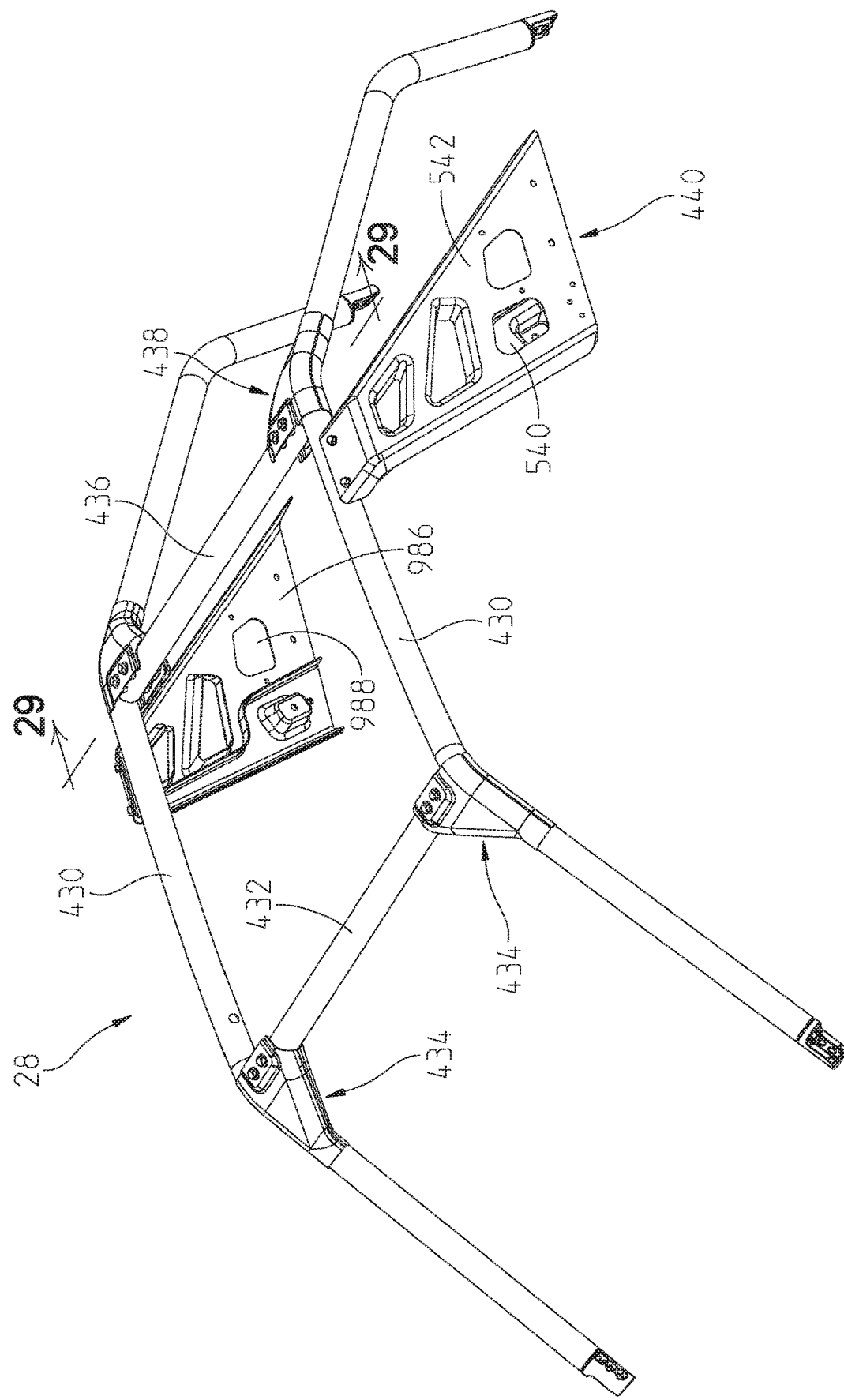
FIG. 27 is a front left perspective view of a first embodiment of cab frame.
Figure 28:
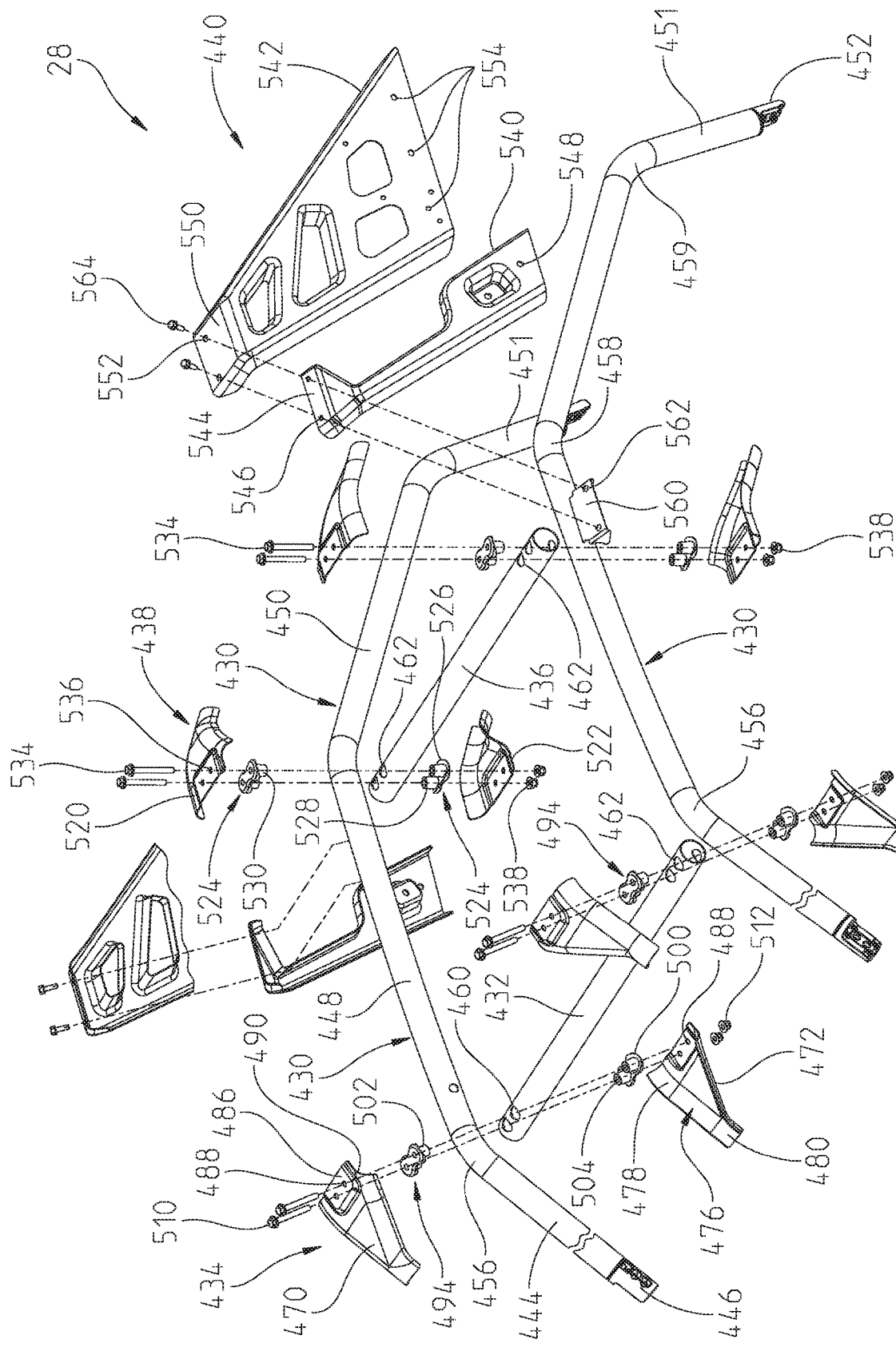
FIG. 28 is an exploded view of the cab view of FIG. 27.
Figure 29:
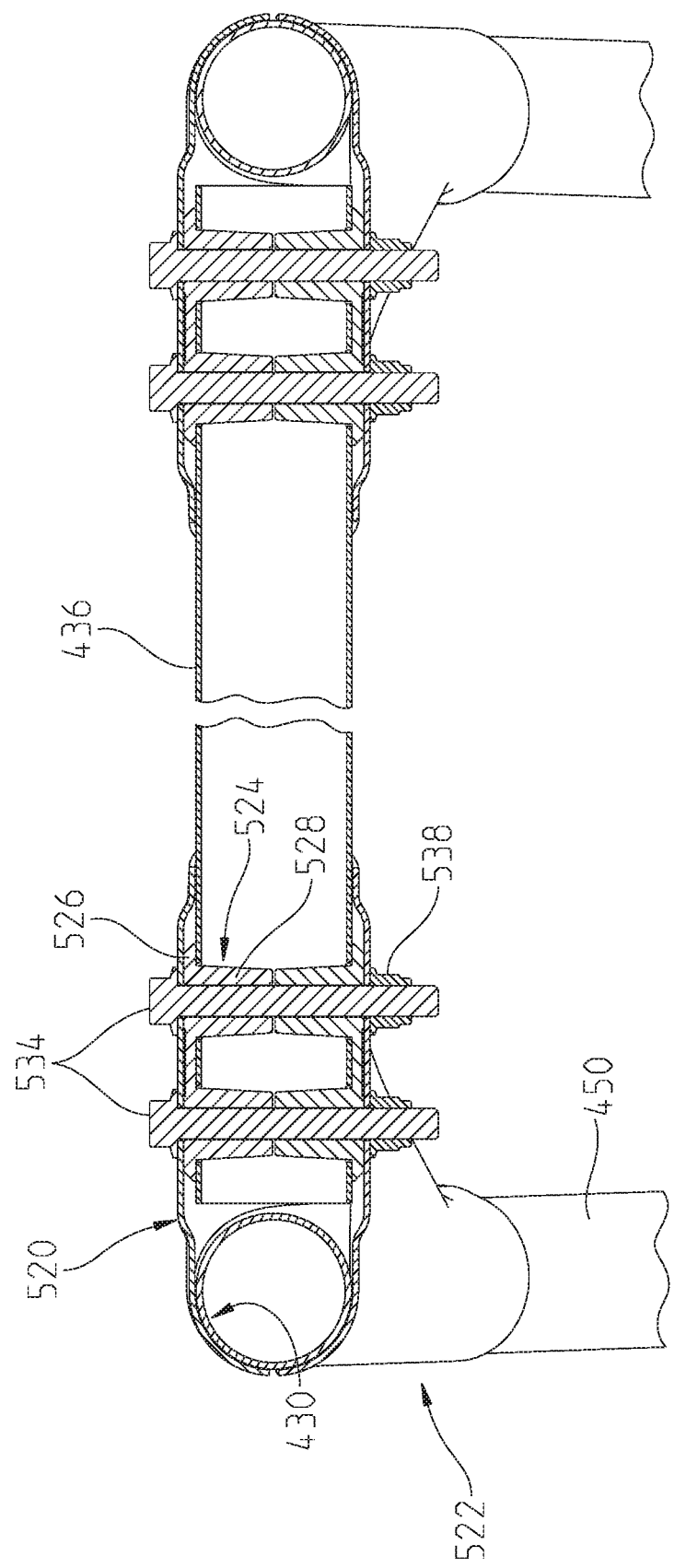
FIG. 29 is a cross sectional view through lines 29-29 of FIG. 27.

With reference now to FIGS. 27-29, cab frame 28 will be described in greater detail. As shown, cab frame 28 generally includes frame tubes 430, cross tubes 432, clamp assemblies 434, cross tube 436, clamp assemblies 438 and pillar portions 440. As shown best in FIG. 28, frame tubes 430 are shown including a front portion 444 having a coupler at 446, a central portion 448 and a rear portion at 450, including a downwardly extending portion 451 having couplers at 452. Each of the front 444, center 448, rear 450 and downwardly extending 451 sections are separated by an angled portion at 456, 458 and 459. Cross tubes 432 and 436 include apertures at 460 and 462.

Clamp assembly 434 further includes upper and lower clamp halves 470 and 472, where each clamp halve includes a channel 476 having a radiused portion 478 and a generally straight section at 480. The radiused section 478 positions on the underside of angled portion 456, and the straight portion 480 receives tube portion 444. The upper clamp portion 470 is a mere image of clamp portion 472 to receive an upper portion of the radiused section 456 and front section 444. Clamp portion 470 further includes an embossed section at 486 having apertures at 488. An arcuate corner at 490 is provided which matches the radius of the cross tube 432. While upper and lower clamp halves 470 and 472 are shown exploded away from frame tubes 430, it should be understood that they are welded together.

Inserts 494 are provided for insertion through an upper section and lower section of apertures 460, where each insert includes a head portion 500 with tubular sections at 502 and with apertures 504 extending through the insert 494. Thus, inserts 494 are positioned in apertures 460 with the head portion 500 positioned on the outside of cross tube 432 and with the tubular portions 504 extending into the apertures 460. Clamp halves 470, 472 are then positioned over the tubes 430 with apertures 488 in alignment with apertures 504, whereupon fasteners 510 may be received through apertures 488 and to receive fasteners 512 at the opposite end thereof.

Cross tube 436 is coupled to frame tubes 430 in a substantially identical manner as described above with respect to cross tube 432, where clamps 438 include clamp halves 520, 522, and inserts 524 include a head portion 526, tubular portions 528 and apertures 530 extending therethrough. Tubular portions 528 of inserts 524 are positioned into apertures 462 of cross tube 436, whereupon clamp halves 520 and 522 may be positioned above and below frame tubes 430 and cross tube 436. Fasteners 534 may be positioned through apertures 536 of clamp halve 438 to receive fasteners 538 after fasteners 534 pass through clamp halve 522. The stack up of the inserts 524 against each other within the cross tube 436 is shown in FIG. 29, whereby the inserts 524 are shown positioned through cross tube 436, such that the inserts abut each other and prevent the crushing of cross tube 436. Meanwhile, clamp halves 520 and 522 are shown positioned over inserts 524 with fasteners 534, 538 retaining the clamp halves 520, 522 and frame tubes 430 and cross tube 436 together. It should also be appreciated that the cross sectional view through cross tube 432 will look substantially identical to the cross section of FIG. 29, with the exception of the direction of front section 444 of tubes 430.

Pillar 440 is shown best in FIG. 28 as including an inner pillar portion 540 and an outer pillar portion 542. As shown, inner pillar portion 540 includes an upper flange portion at 544 having apertures 546. Inner pillar portion 540 also includes a lower aperture at 548. Outer pillar portion 542 also includes an upper flange portion 550 with apertures at 552 and lower apertures at 554. Inner and outer pillar portions 540, 542 align with each other as shown in FIG. 27, such that apertures 546 and 552 are aligned. This also aligns aperture 548 with the left-most aperture 554. A bracket 560 (FIG. 28) is coupled to each side of frame tubes 430 whereby fasteners 564 are receivable through apertures 552, 546 and 562. It should also be appreciated that fasteners (not shown) are receivable through apertures 554 of outer pillar portion 542 and received through apertures 192 (FIG. 12) for coupling with fasteners 194. This couples the pillar portions 540 and 542 to the frame tubes 430 and to the frame bracket 190 (FIG. 12).

It should be appreciated from the above description that the frame tubes 430 are continuous one-piece members with bends at 456, 458 and 459 to define the frame tubes as shown in FIG. 28. Also, the inner and outer pillar portions 540, 542 could be stamped and formed metallic members or could be a cast material such as a cast aluminum.

Figure 30:
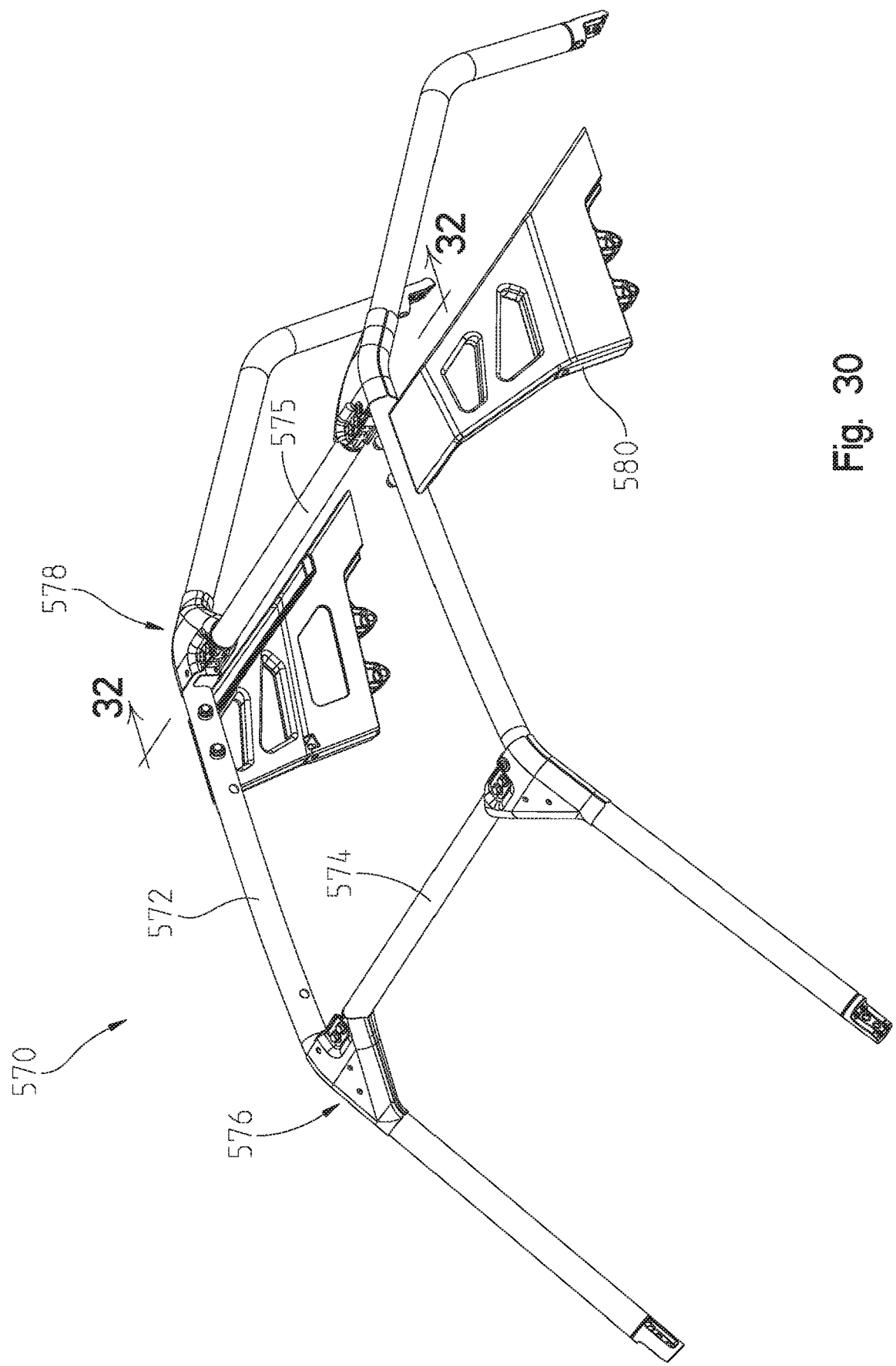
FIG. 30 is a second embodiment of cab frame.
Figure 31:
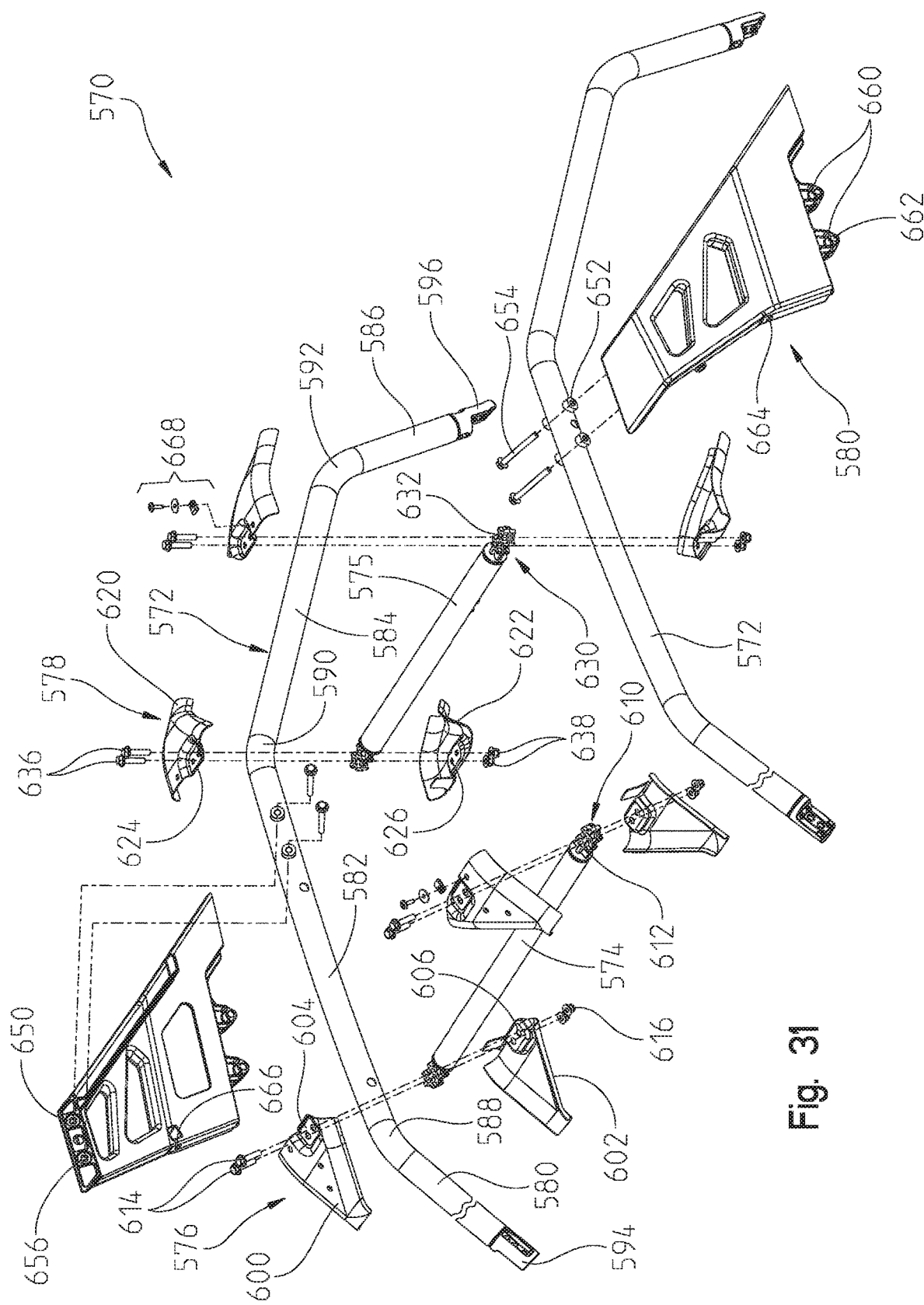
FIG. 31 is an exploded view of the cab frame of FIG. 30.
Figure 32:
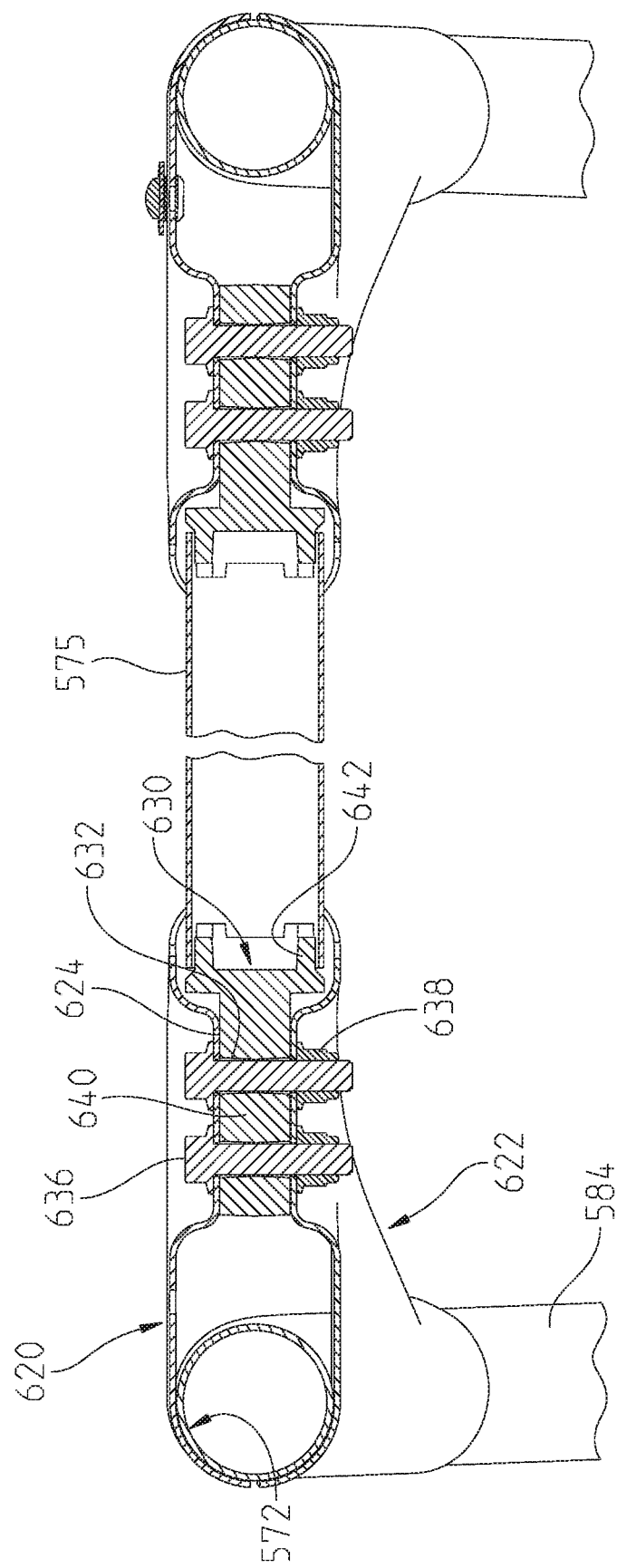
FIG. 32 is a cross sectional view through lines 32-32 of FIG. 30.

With reference now to FIGS. 30-32 an alternate cab frame is shown at 570 which can be used in the place of cab frame 28 as previously described with reference to FIGS. 27-29. Cab frame 570 generally includes longitudinal tubes 572, cross braces 574, 575, front clamps 576, rear clamps 578 and pillar members 580. As shown in FIG. 31, tubes 572 include forward portions 580, center portions 582, rear portion 584 and angled portion 586. A bent portion 588 is positioned between tube portions 580 and 582; a bent portion 590 is positioned between tube portions 582 and 584; and a bent portion 592 is positioned between tube portions 584 and 586. A coupler 594 extends from tube portion 580 and a coupler 596 extends from tube portion 586.

Clamp members 576 are similar to clamp members 434 and include clamp halves 600, 602. Clamp halves 600 and 602 are identical to clamps 470, 472 with the exception that clamps 600, 602 include an embossed section at 604 including apertures at 606. Cross tube 574 includes an insert at 610 having apertures at 612. Clamp halves 600, 602 clamp to tubes 572 by way of fasteners 614 positioned through apertures 606, 612 and receiving fasteners 616. While upper and lower clamp halves 600 and 602 are shown exploded away from frame tubes 572, it should be understood that they are welded together.

Clamps 578 include clamp halves 620, 622 and substantially similar to clamp halves 600, 602 having embossed sections 624 and apertures at 626. Inserts 630 are identical to inserts 610 and have apertures at 632. In a like manner, clamps 578 include fasteners 636, 638 to join the tubes 572 and cross tube 575 together in the configuration of FIG. 30. As shown in the cross sectional view of FIG. 32, inserts 630 include a body portion 640 for receipt of embossed sections 624. A reduced diameter portion 642 is positioned within cross tube 575 and can be held in place by such known techniques as fasteners, welding or industrial adhesives.

With reference now to FIG. 31, pillar 580 will be described in greater detail. As shown, pillar portion 580 is a substantially triangular configuration having an inner surface with substantially cylindrical insets at 650 profiled to receive embossed sections 652 on tube members 572. Fasteners 654 are received through embossed members 652 and are received in threadable openings 656. A lower end of pillar member 580 includes extensions 660 having apertures 662 which align with apertures 192 (FIG. 12) for coupling of pillar portion 580 to bracket portion 186. Pillar portion 580 includes a forwardly facing aperture 664 having a threaded lug 666 in alignment with aperture 664. Aperture 664 could be used for mounting a retractor in the event a 3-point harness is desired as opposed to the 6-point shoulder harness 30 (FIG. 5). Fastener assembly 668 could be provided for accessory mounting directly to the cab frame 570.

Figure 32A:
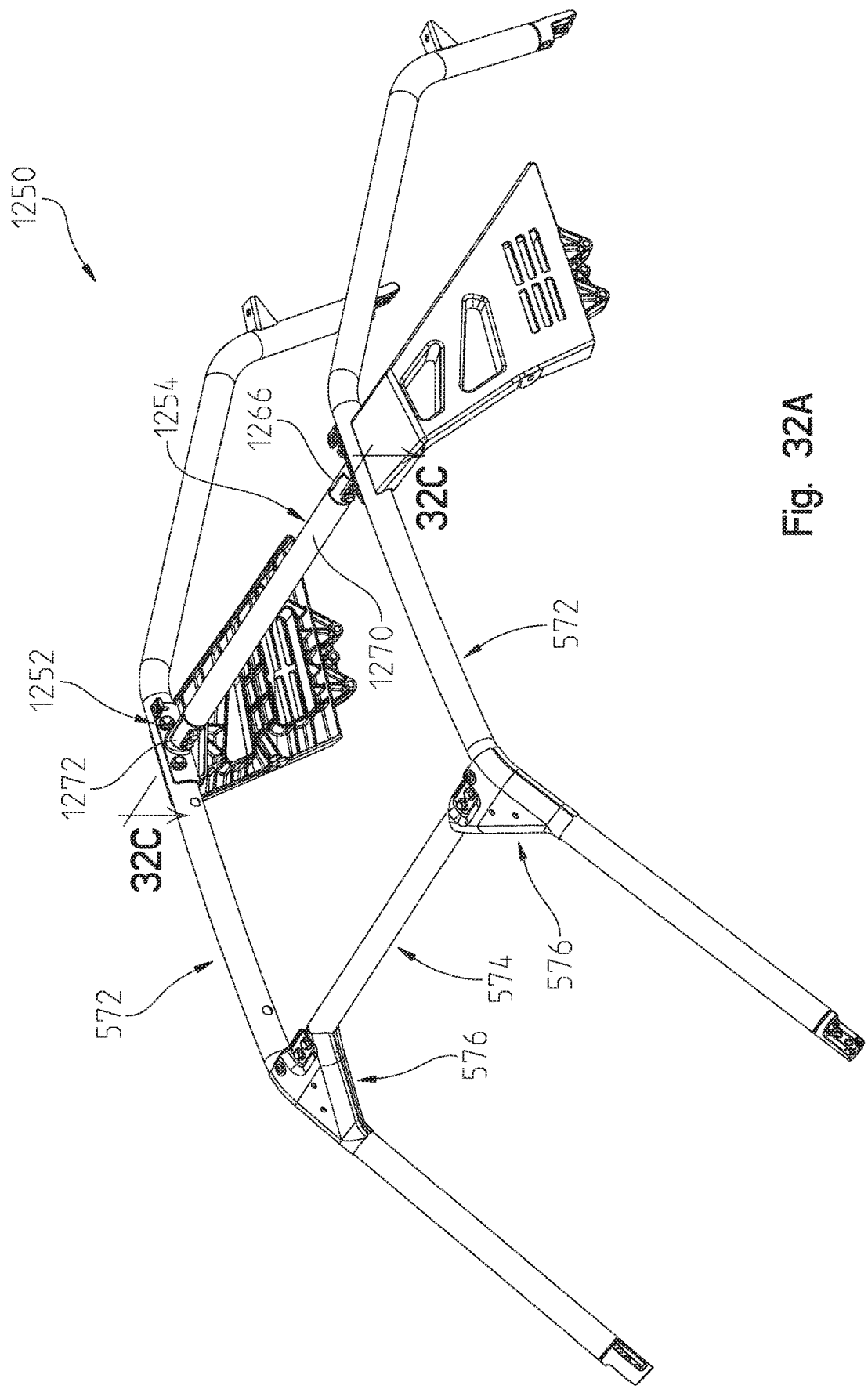
FIG. 32A is a third embodiment of cab frame.
Figure 32B:
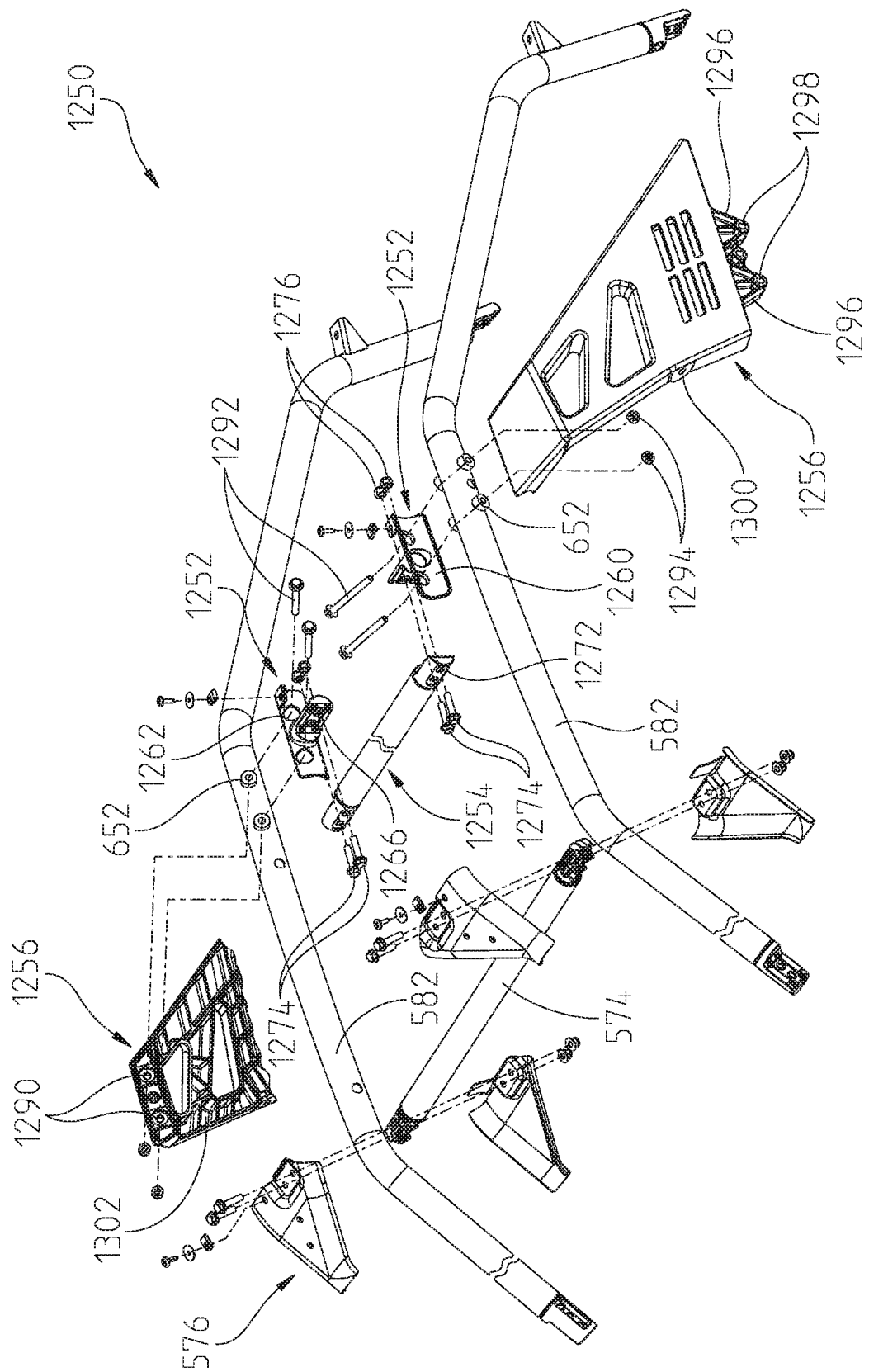
FIG. 32B is an exploded view of the cab frame of FIG. 32A.
Figure 32C:
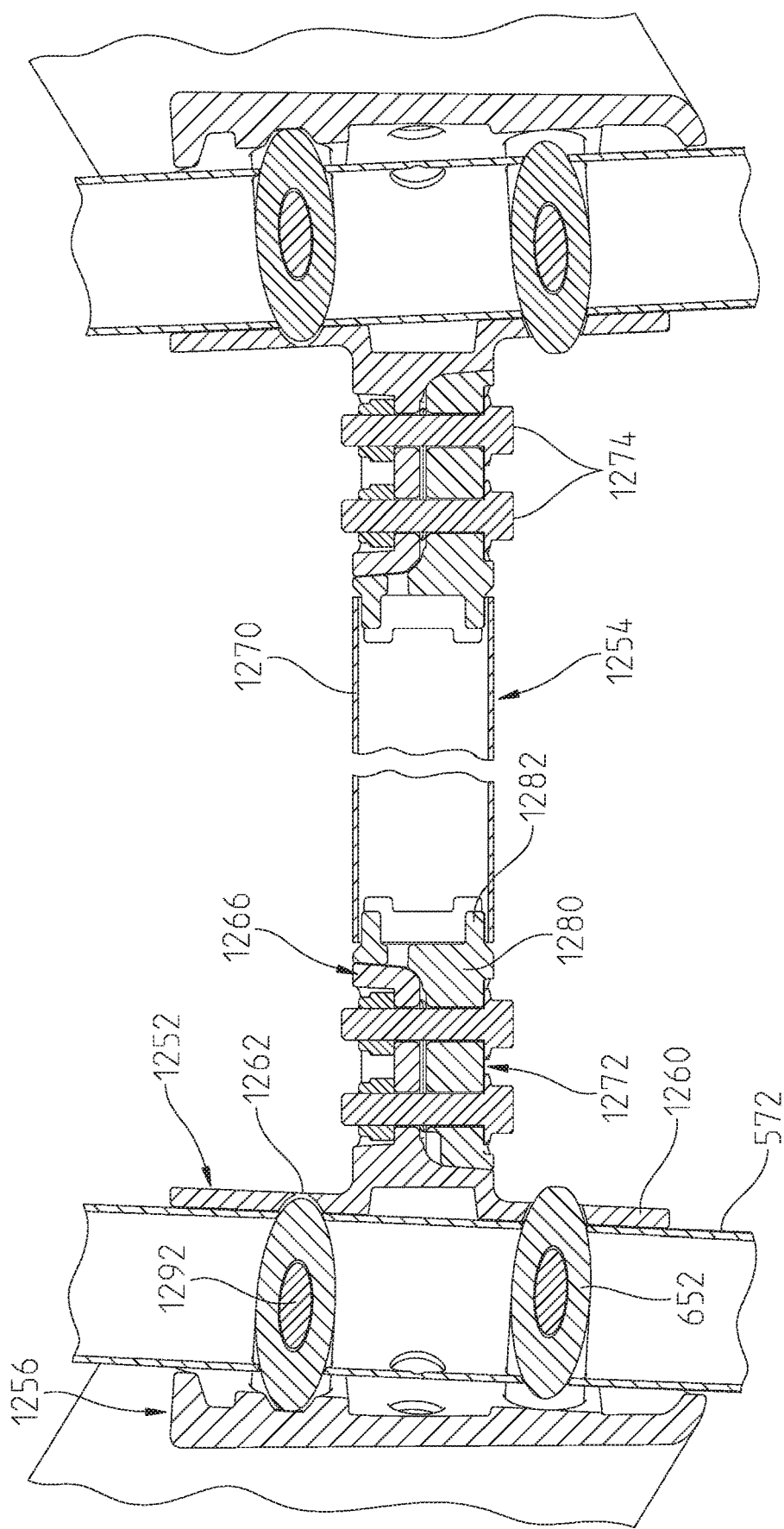
FIG. 32C is a cross sectional view through lines 32C-32C of FIG. 32A.

With reference now to FIGS. 32A-32C, another embodiment of cab frame is shown at 1250 which can be used in the place of cab frame 28 or 570 as previously described with reference to FIGS. 27-32. Cab frame 1250 is similar to cab frame 570 and includes like longitudinal tubes 572, cross brace 574, and front clamps 576. The rear clamps 1252, rear cross brace 1254 and pillar members 1256 are different and will be described herein.

As shown best in FIG. 32B, rear clamps 1252 include a partially cylindrical member 1260 having apertures at 1262, which as shown are complementary with embossed sections 652 so as to receive embossed sections 652 therein. Rear clamps are either welded over embossed sections or are held in place with industrial adhesive or other known fastening techniques. Rear clamps 1252 further include integrated couplers 1266 which are substantially similar in configuration as couplers 594, 596. Cross tube 1254 includes a tube 1270 having couplers 1272 at each end thereof which are complementary with couplers 1266. Fasteners 1274, 1276 attach the couplers 1266, 1272 together, and resultantly couple cross brace 1254 to longitudinal tubes 582. As shown in the cross sectional view of FIG. 32C, inserts 1272 include a body portion 1280 and a reduced diameter portion 1282 positioned within cross tube 1270 and can be held in place by such known techniques as fasteners, welding or industrial adhesives. It should also be understood that front cross brace 574 could be constructed such as rear brace 1254, together with rear clamps 1252.

With reference again to FIG. 32B, pillar portion 1256 will be described in greater detail. As shown, pillar portion 1256 is similar to pillar portion 580 and includes a substantially triangular configuration having an inner surface with substantially cylindrical insets at 1290 profiled to receive embossed sections 652 on tube members 572. Fasteners 1292 are received through embossed members 652 and are received into threadable fasteners 1294. A lower end of pillar member 1256 includes extensions 1296 having apertures 1298 which align with apertures 192 (FIG. 12) for coupling of pillar portion 580 to bracket portion 186.

With reference still to FIG. 32B, pillar portion 1256 includes a forwardly facing aperture 1300 having a threaded lug 1302 in alignment with aperture 1300. Aperture 1300 could be used for mounting a retractor in the event a 3-point harness is desired as opposed to the 6-point shoulder harness 30 (FIG. 5). As in the case of pillar portion 580, pillar portion 1256 could be a forging or casting, such as aluminum or other strength metal.

Figure 35:
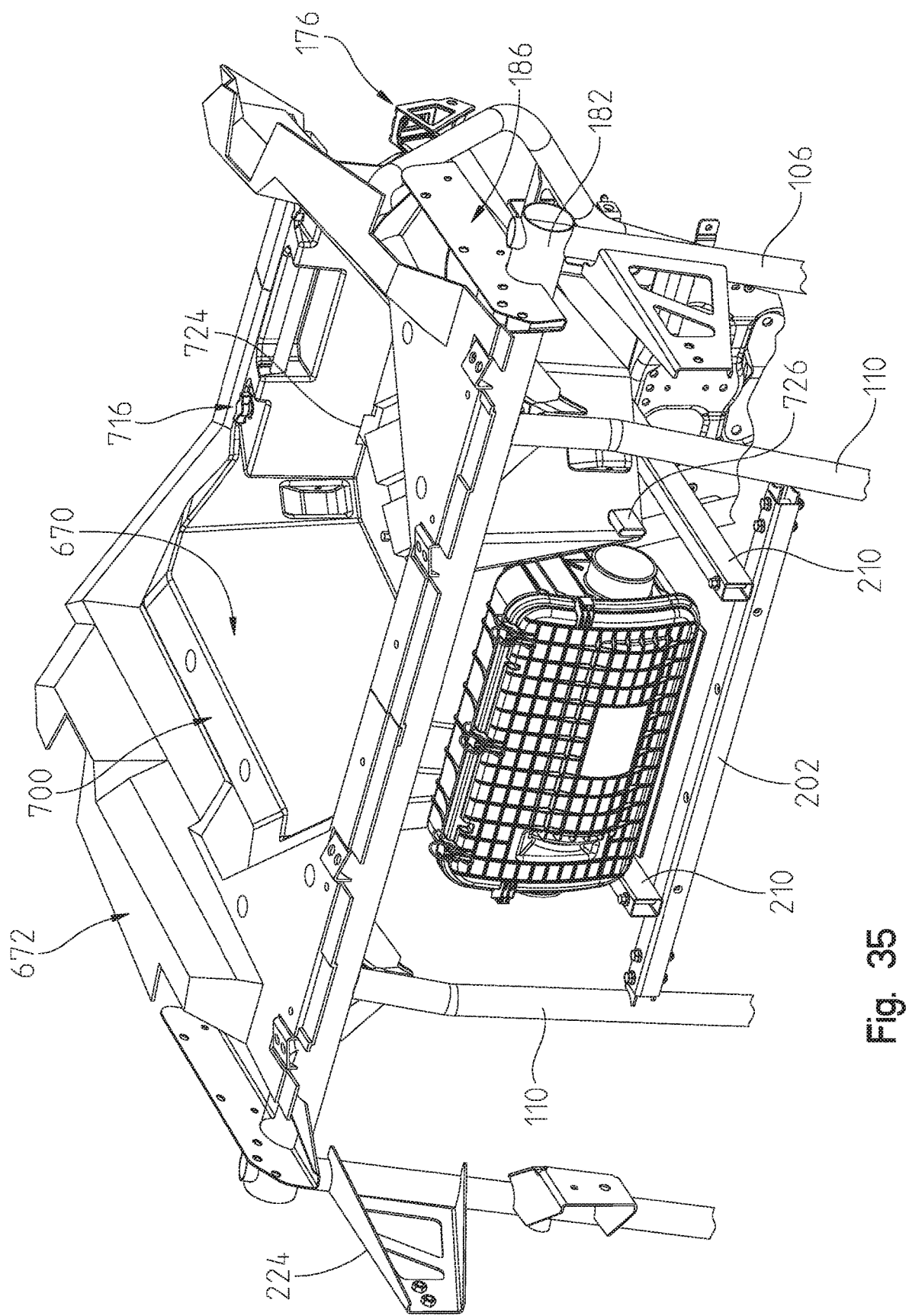
FIG. 35 is a front left perspective view of the utility bed of FIG. 33.

With reference to FIGS. 33-37, a rear utility bed 670 of the present invention will now be described. Utility bed 670 is positioned within a rear body portion 672, such that utility bed 670 is defined as a removable tub which can be inserted and removed from the vehicle when desired by the operator. As shown best in FIG. 34, the body portion 672 includes an upper platform portion 674 having an opening 676 therethrough formed by an upper perimeter wall 678 defined by a front portion 678a, angled portion 678b, side portion 678c, rear angled portion 678d and end portion 678e. Body portion 672 is supported by the cross tube 182 of the frame, as best shown in FIG. 35.

Figure 36:
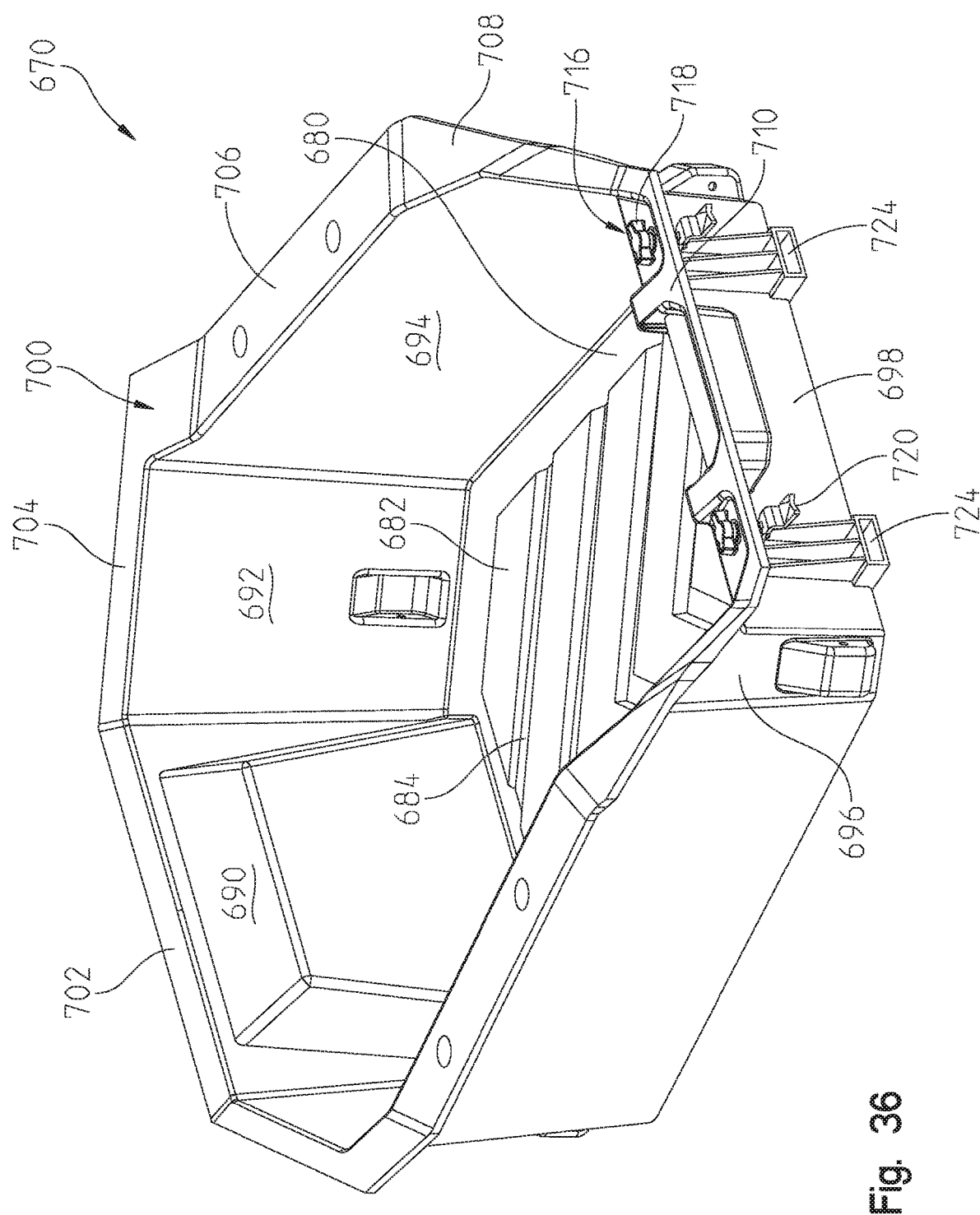
FIG. 36 is a rear left perspective view of the removable tub which forms the utility bed.
Figure 37:
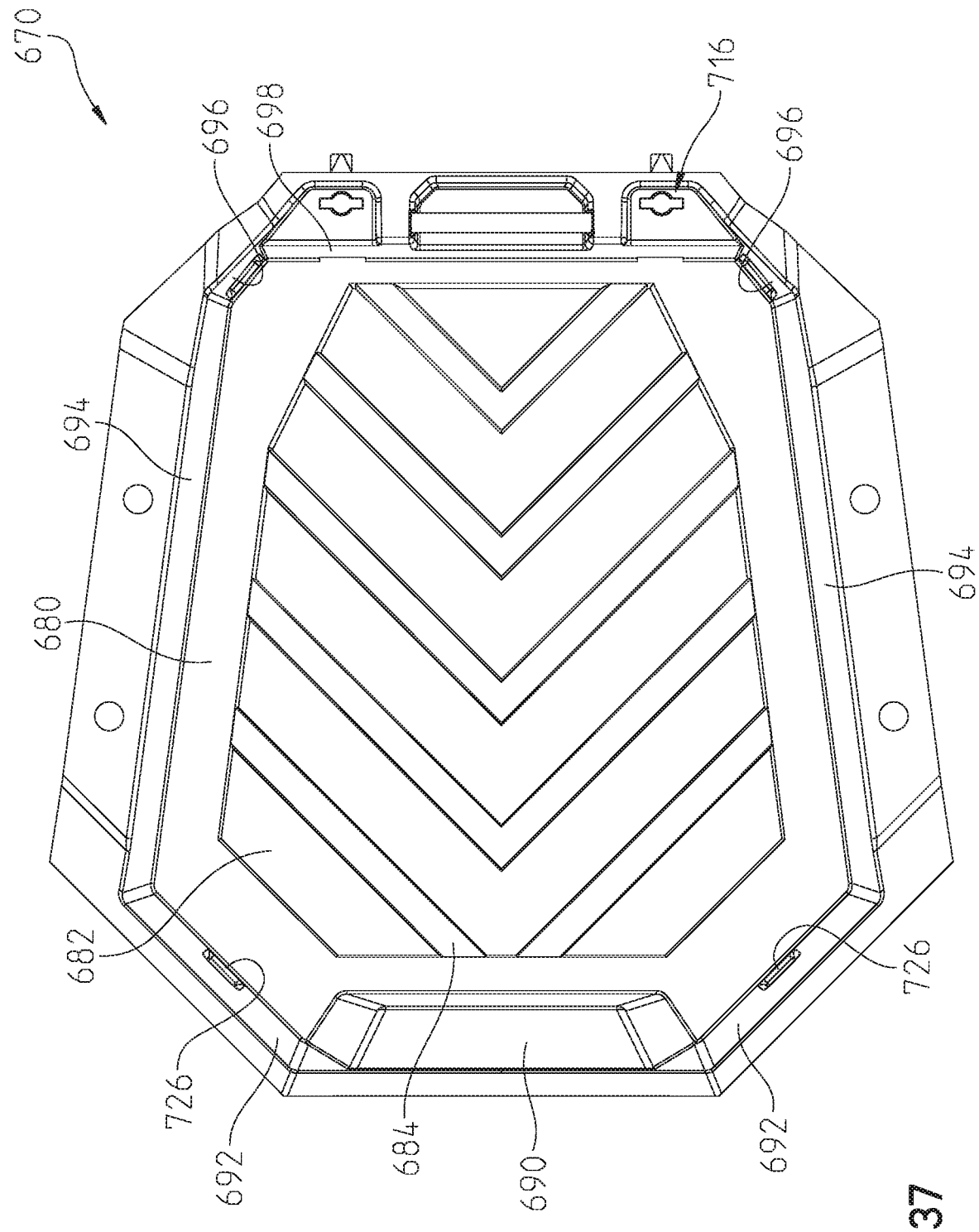
FIG. 37 is a top view of the removable tub portion shown in FIG. 36.
Figure 38:
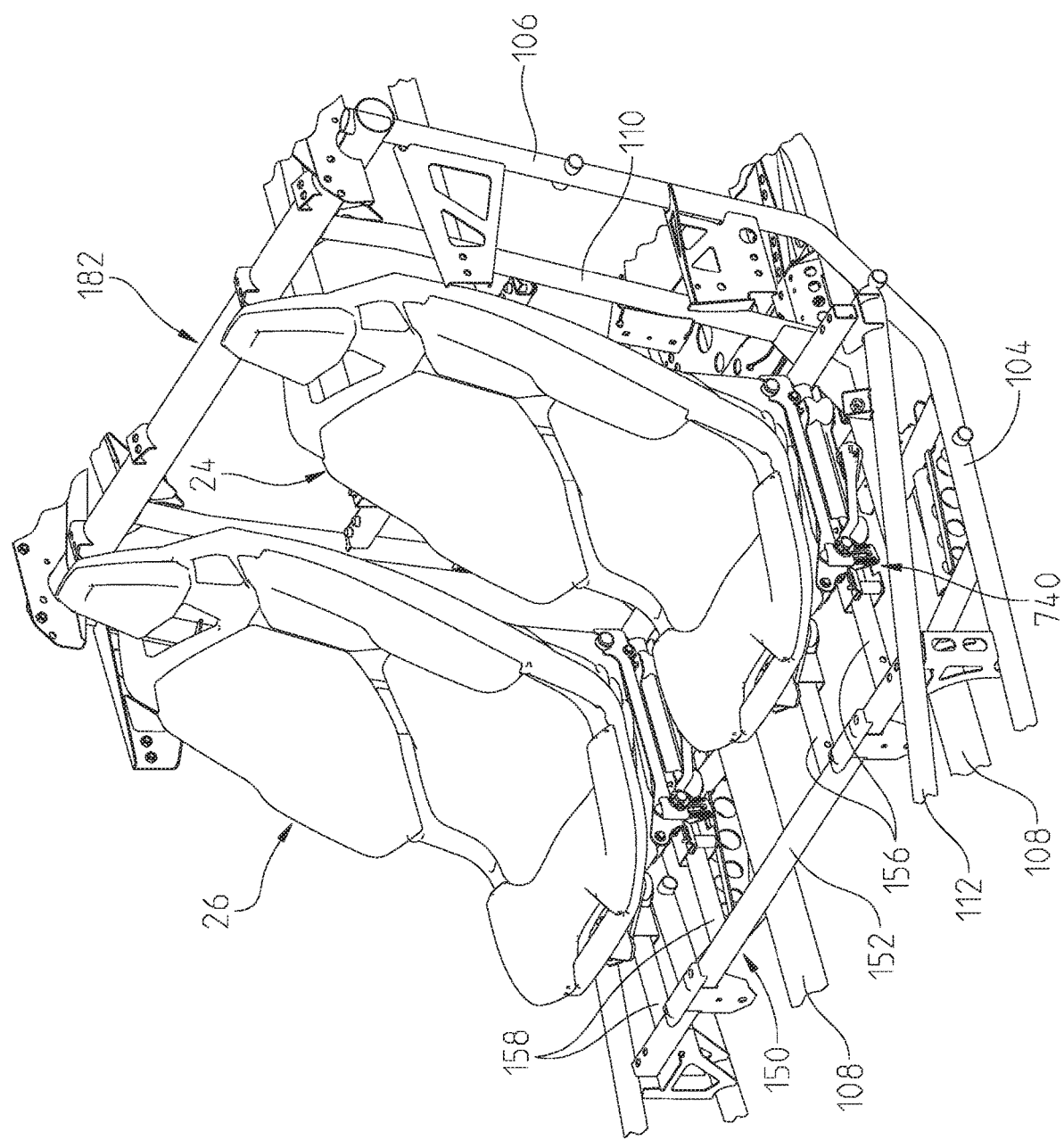
FIG. 38 is a front left perspective view of the side-by-side seats positioned in the frame.
Figure 39:
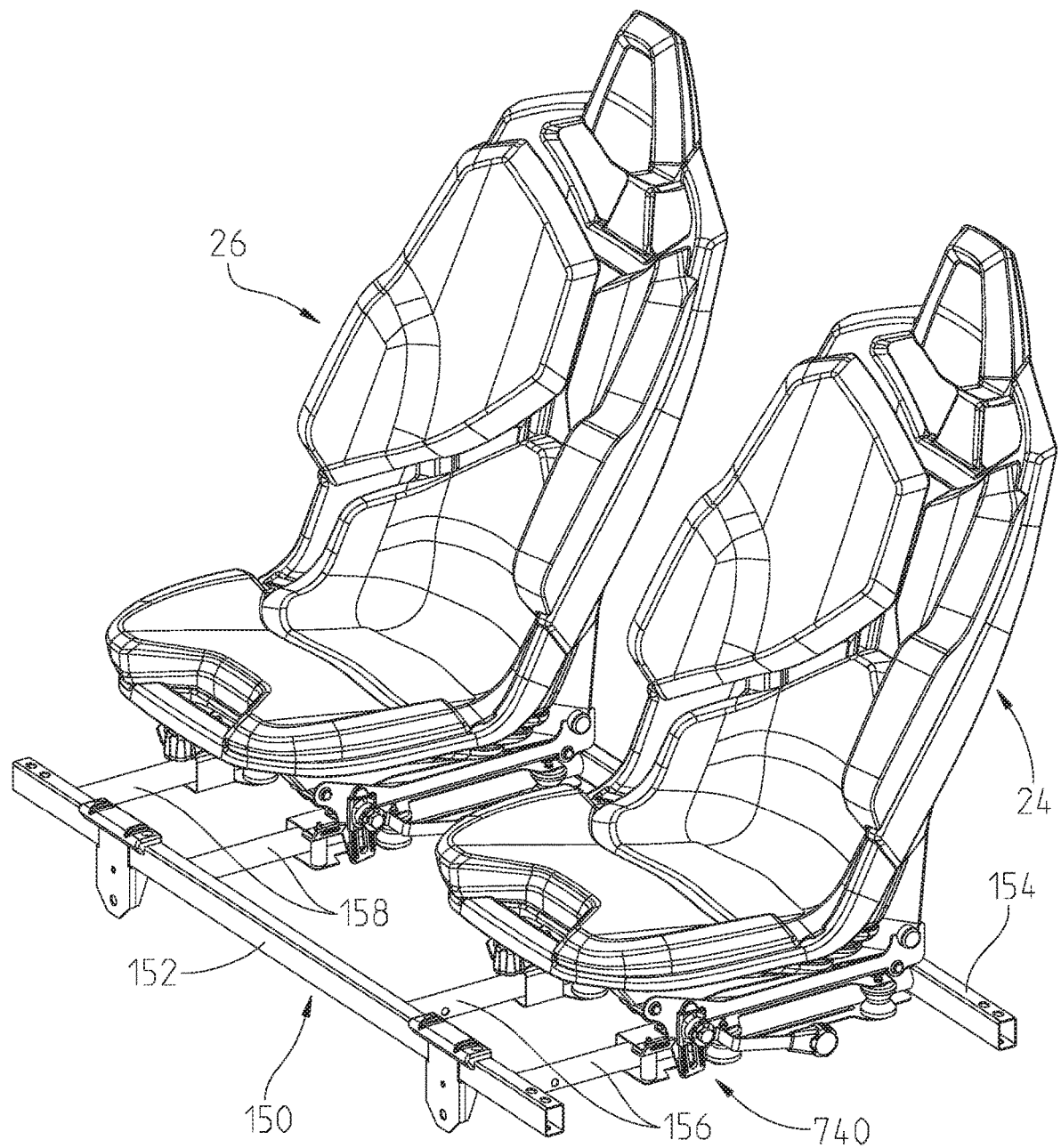
FIG. 39 is a front left perspective view of the seat and seat frame assembly.
Figure 40:
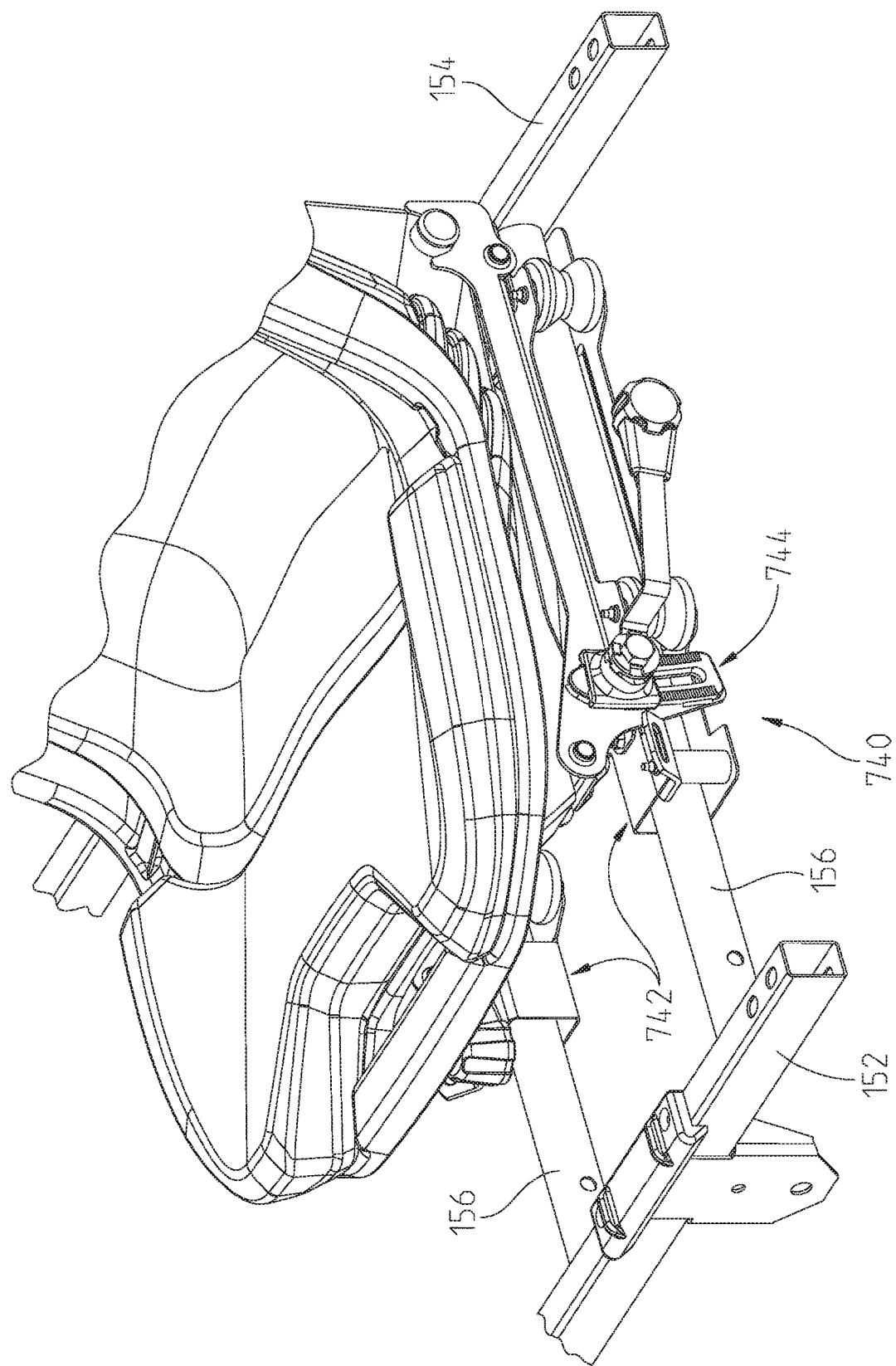
FIG. 40 is an enlarged front left perspective view of the driver's seat and the longitudinal adjustment mechanism.

As shown in FIGS. 36 and 37, removable tub 670 includes a floor portion 680 which forms a perimeter around the inside of removable tub 670, as best shown in FIG. 37. A raised portion 682 is defined with a pattern of channel sections 684 which in this embodiment extend in V-shaped channels angled rearwardly. Removable tub 670 includes a front wall 690, angled front walls 692, side walls 694, angled rear walls 696 and a rear wall 698. As shown best in FIG. 36, removable tub 670 also includes an upper perimeter wall 700 having a front lip at 702, angled side lips 704, side lips 706, rear angled lips 708 and rear lip at 710. It should be appreciated that the removable tub 670 is slidably received in the opening 676 (FIG. 34) of the rear body portion 672 and that the perimeter wall 700 of the removable tub is supported by the perimeter wall 678 and longitudinal frame tubes 210 (FIGS. 13 and 35). The removable tub 670 can be latched in place by way of quarter turn locking members 716 having handles 718, rotating latch members 720.

The removable tub 670 has defined drain holes, namely two drain holes 724 at the rear thereof (FIGS. 35 and 36) and two at the front thereof at 726 (FIGS. 35 and 37), such that the channel 680 feeds into the openings 724, 726 for drainage. It should also be noted that the drain holes 724, 726 are positioned such that the location of the water draining downwardly does not contact any hot surfaces or items of the vehicle that could be damaged by the water, such as electrical controls of the vehicle.

Figure 33:
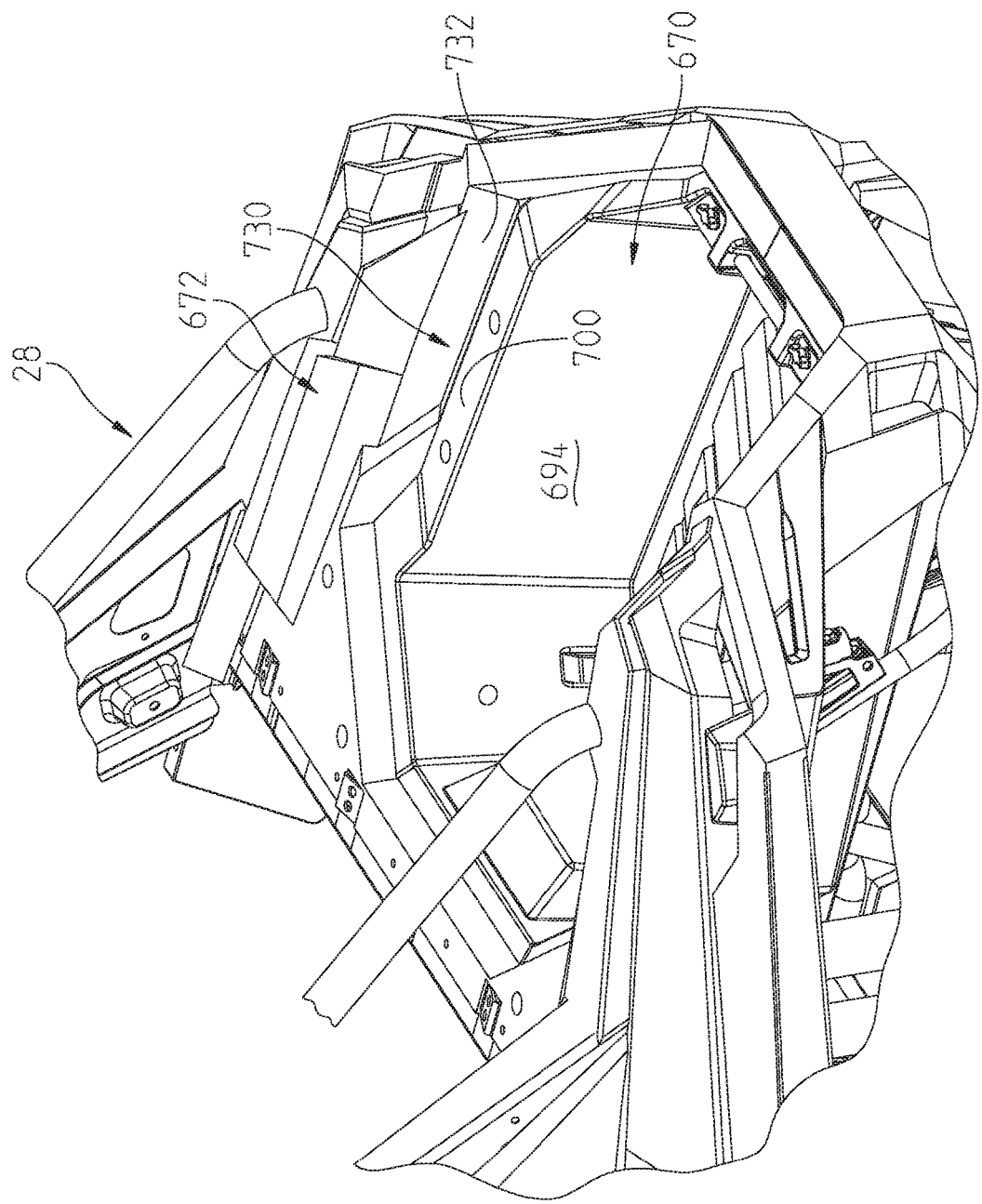
FIG. 33 is a rear left perspective view of the utility bed of the present vehicle.
Figure 34:
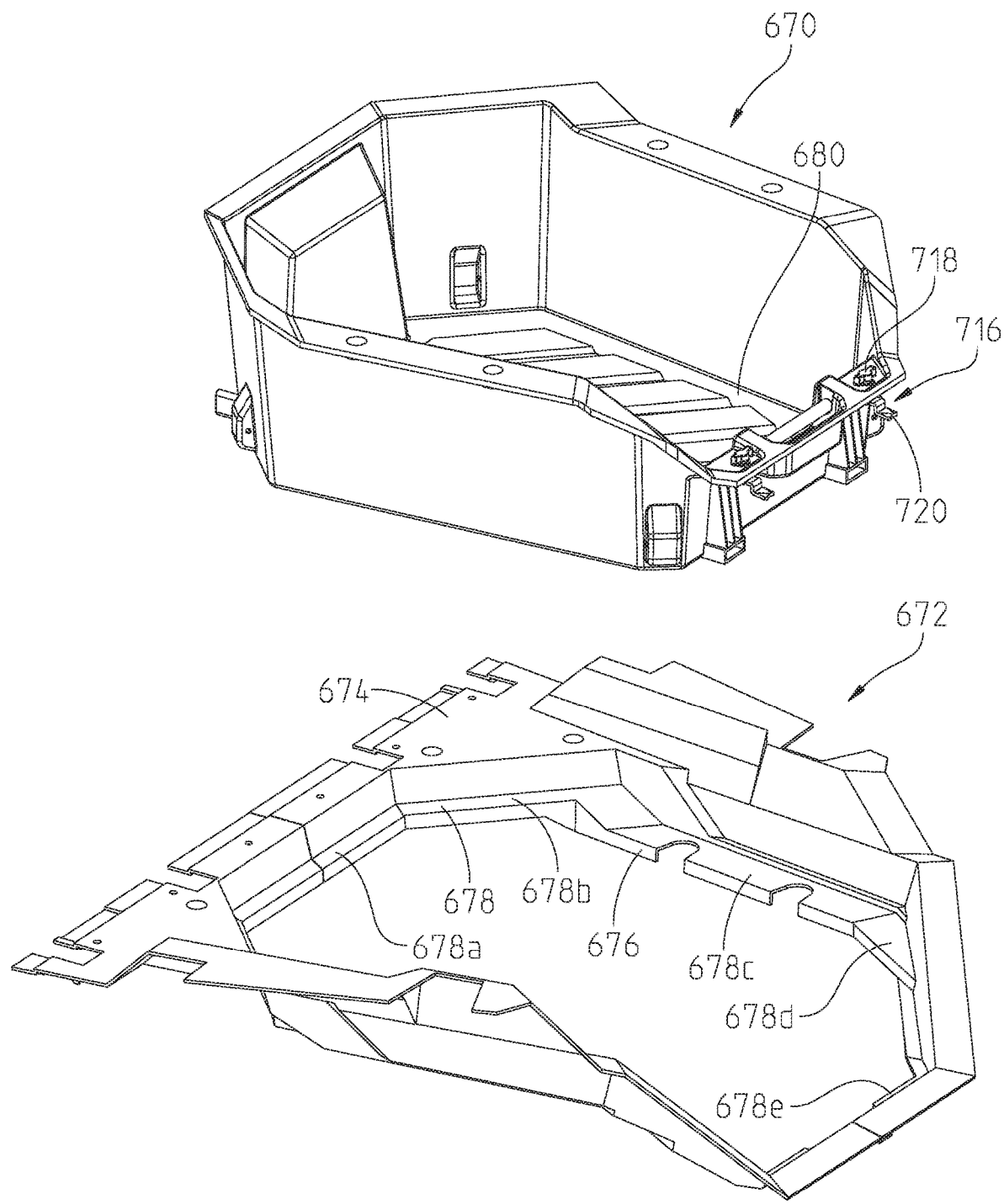
FIG. 34 is a rear left perspective view of the removable tub exploded away from the rear body portion.

Finally and with respect to FIG. 33, the combination of the tub portion 670 and the rear body portion 672, define a stepped area 730 by way of the combination of the perimeter wall 700 and an inner wall 732. The stepped are 730 is defined such that a distance between opposing walls 732 of the rear body portion 672 is greater than a diameter of one or both of the wheels 4, 6; and such that a distance between opposing walls 694 of the tub portion 670 is less than a diameter of one or both of the wheels 4, 6. This allows for the storage of a spare wheel on the stepped area 730.

With reference now to FIGS. 38-45, a seating adjustment mechanism 740 will be described. As previously described, the driver's seat 24 and passenger seat 26 are coupled to a seat frame 150. As described herein, seat adjustment mechanism 740 couples the seats 24, 26 to the seat frame 150, while allowing them to move in a fore-and-aft direction, as well as to tilt. As shown best in FIG. 40, the seat adjustment mechanism 740 comprises a longitudinally movable track system 742 and a seat mount 744 coupled to the track system 742. As described herein, the longitudinally movable track system 742 moves along the pairs of tubes 156 and 158.

Figure 43:
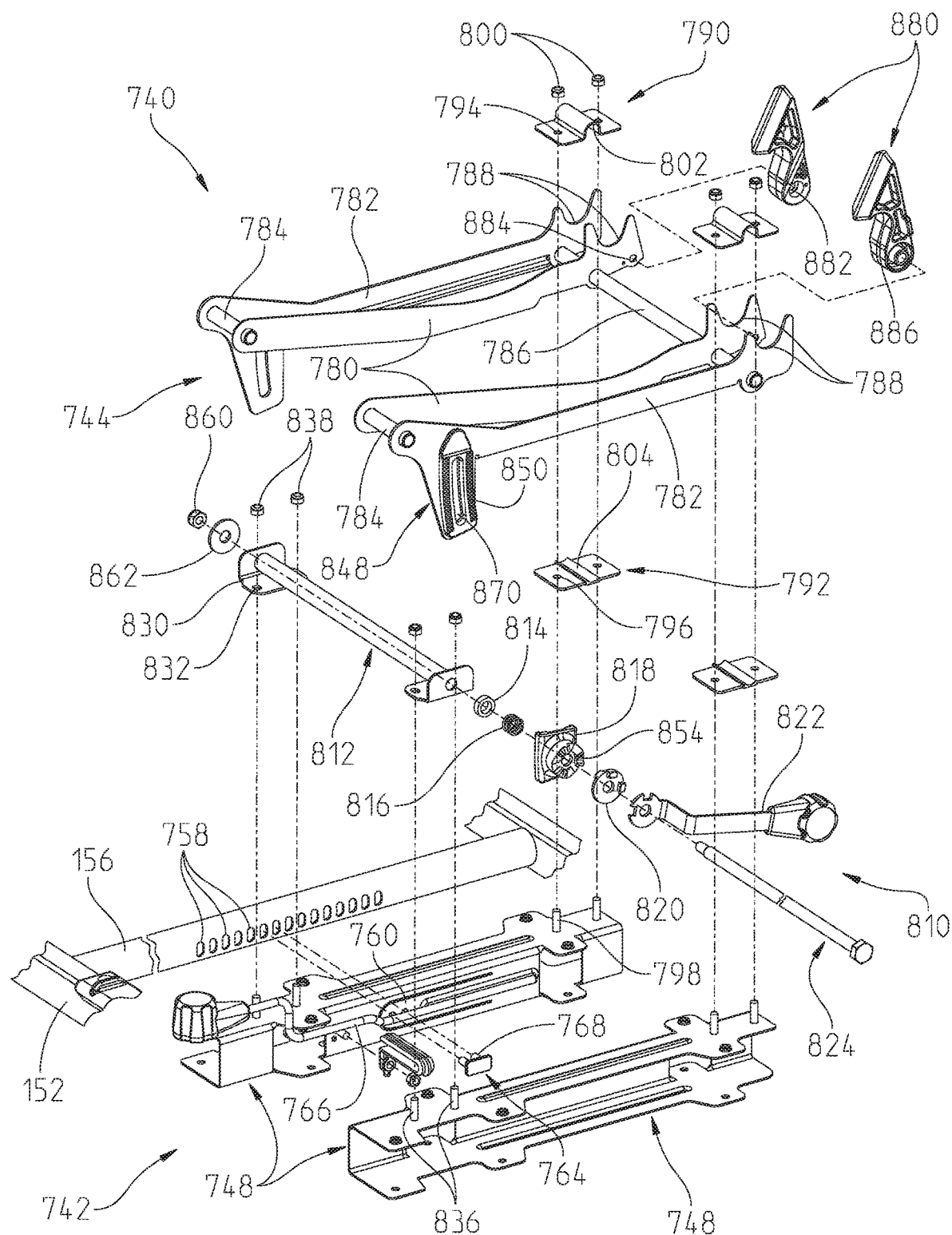
FIG. 43 shows the seat adjustment mechanism in an exploded view.
Figure 44:
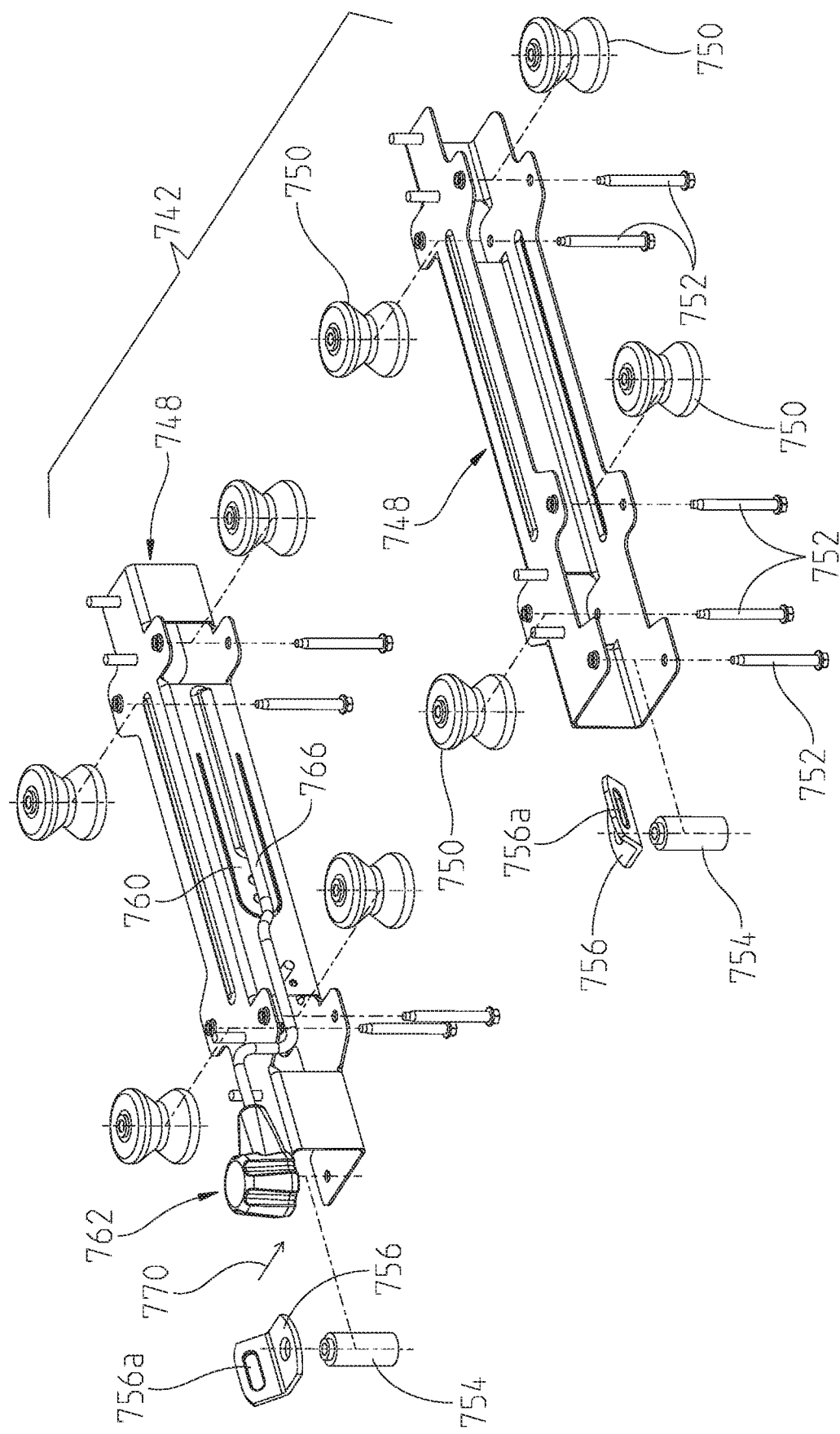
FIG. 44 shows an exploded view of the track mechanism of FIG. 43.

With reference now to FIGS. 43 and 44, the track system 742 includes two channels 748 which are virtually identical and include rollers 750 (FIG. 44, as shown four rollers 750 per track) which are held in channels 748 by way of fasteners 752. As shown in FIG. 44, the tracks are shown disposed without the longitudinal tubes 156, but it should be appreciated that the longitudinal tubes 156 would be positioned within the channels 748 and intermediate the pairs of rollers 750, such that channel 748 would move fore-and-aft under the cooperation of rollers 750 on either side of tubes 156. In addition to the fasteners 752, and as best shown in FIG. 44, each channel 748 includes a post 754 which provides a spacer between the plates of the channel 748 and which receives one of the fasteners 752 therethrough to attach a bracket 756 having an elongate aperture at 756a, as will be described further herein.

As shown best in FIG. 43, one of the longitudinal tubes 156 includes a plurality of longitudinally spaced openings 758 for locking the channels 748 in various longitudinal positions. As shown best in FIG. 44, one of the channels has a cutaway portion at 760 coupled to an actuator 762, and a locator 764 (FIG. 43) is positioned between a rod 766 and the cutaway 760, where pegs 768 can align with the spaced openings 758. Thus, when actuator 762 is moved in the direction of arrow 770 in FIG. 44, rod 766 moves pegs 768 away from openings 758, whereupon the channels 748 may move along the longitudinal tubes 156 under the cooperation of rollers 750. As the cutaway 760 acts as a spring, release of the actuator 762 moves the pegs back to its original position and into alignment with two of the openings at 750 to lock the seat in a longitudinal position. The steady state position of the pegs 768 is in a locking position within two selected openings 758. Although the locator 764 is shown with two pegs any number may be used.

With reference again to FIG. 43, the tilt mechanism 744 includes inner frame members 780 and outer frame members 782, where each pair of frame members 780 and 782 are coupled at a front end thereof by pegs 784 and at a rear thereof by way of a spaced rod 786. The inner and outer frame members include U-shaped openings at 788 as described herein. Tilt mechanism 744 is coupled to channels 748 by way of upper and lower hinge pairs 790, 792 whereby the hinge pairs reside between the frame members 780, 782 on each side and apertures 794 and 796 align with threaded posts 798. Fasteners 800 can then be positioned over upper hinge 790 to couple the hinge pairs 790, 792 to the channels 748. Each of the hinge pairs 790, 792 includes an arcuate configuration at 802 and 804 allowing the rotation of the rod 786 relative to the hinge pairs 790, 792. This allows the pair of frame members 780, 782 to rotate or tilt relative to the channels 748. This also allows the tilt mechanism 744 to move with the longitudinal movement of the track member 742 along longitudinal tubes 156.

The tilt mechanism also includes a locking device to hold the seats 24, 26 in various tilt positions. This locking device is generally shown at 810 (FIG. 43) to include a spacer rod 812, a bearing 814, a compression spring 816, a lock device 818, a rotatory cam 820, an actuator 822 and an elongate fastener 824. Spacer rod 812 is coupled to channels 748 by way of flanges 830 coupled to a top of each channel whereby apertures 832 are positioned over threaded members 836 and fasteners 838 couple the spacer rod 812 to the channel members. As shown in FIG. 43, outer frame member 782 includes an extending portion 848 having serrated teeth at 850. Coupler 818 includes complementary serrated teeth on an inside surface thereof and a rotary cam face 854 on an outer surface thereof, that is complementary with rotary cam 820. The extension portion 848 is positioned between bearing 814 and spring 816, such that compression spring 816 presses coupler 818 outwardly under spring pressure when rotary cam 820 is not engaged.

Actuator 822 is coupled to the assembly 810 by positioning fastener 824 through the end of the actuator 822, through rotatory cam 820, through coupler 818, through compression spring 816, through extension member 848, through bearing 814 and through tube 812. Fasteners 860, 862 couple the assembly 810 together. Thus, when actuator member 822 is rotated, the rotary cam releases the compression against the extension 848 and the tilt mechanism 744 may rotate between extreme contact positions with slot 870 of extension 848 and the fastener 824. When the user positions the seat in the proper tilt position, actuator 822 is activated to provide contact between the rotary cams bringing the coupler 818 and the serrated teeth into contact to lock the seat into position.

Figure 41:
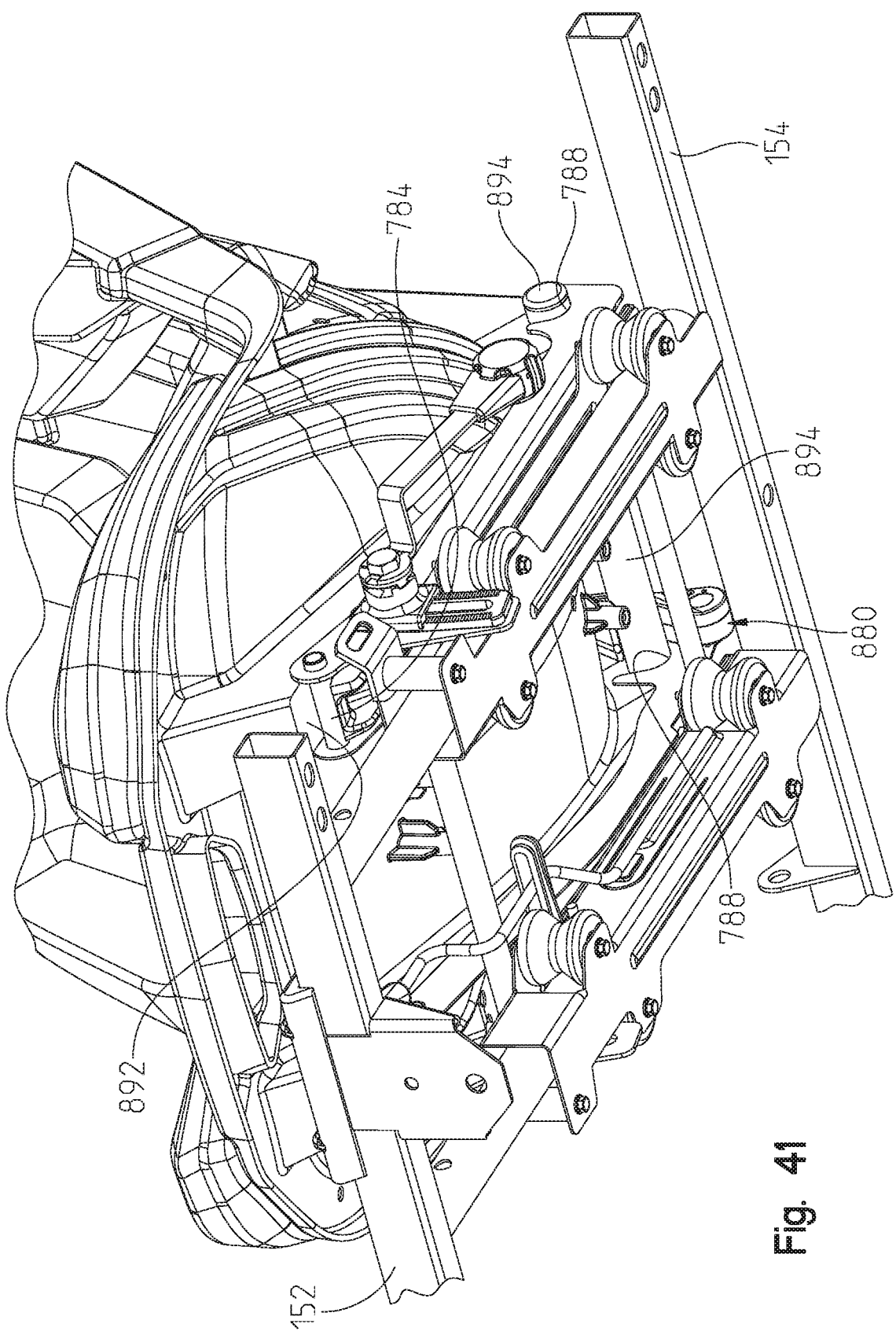
FIG. 41 is an underside perspective view of the seat of FIG. 40.
Figure 42:
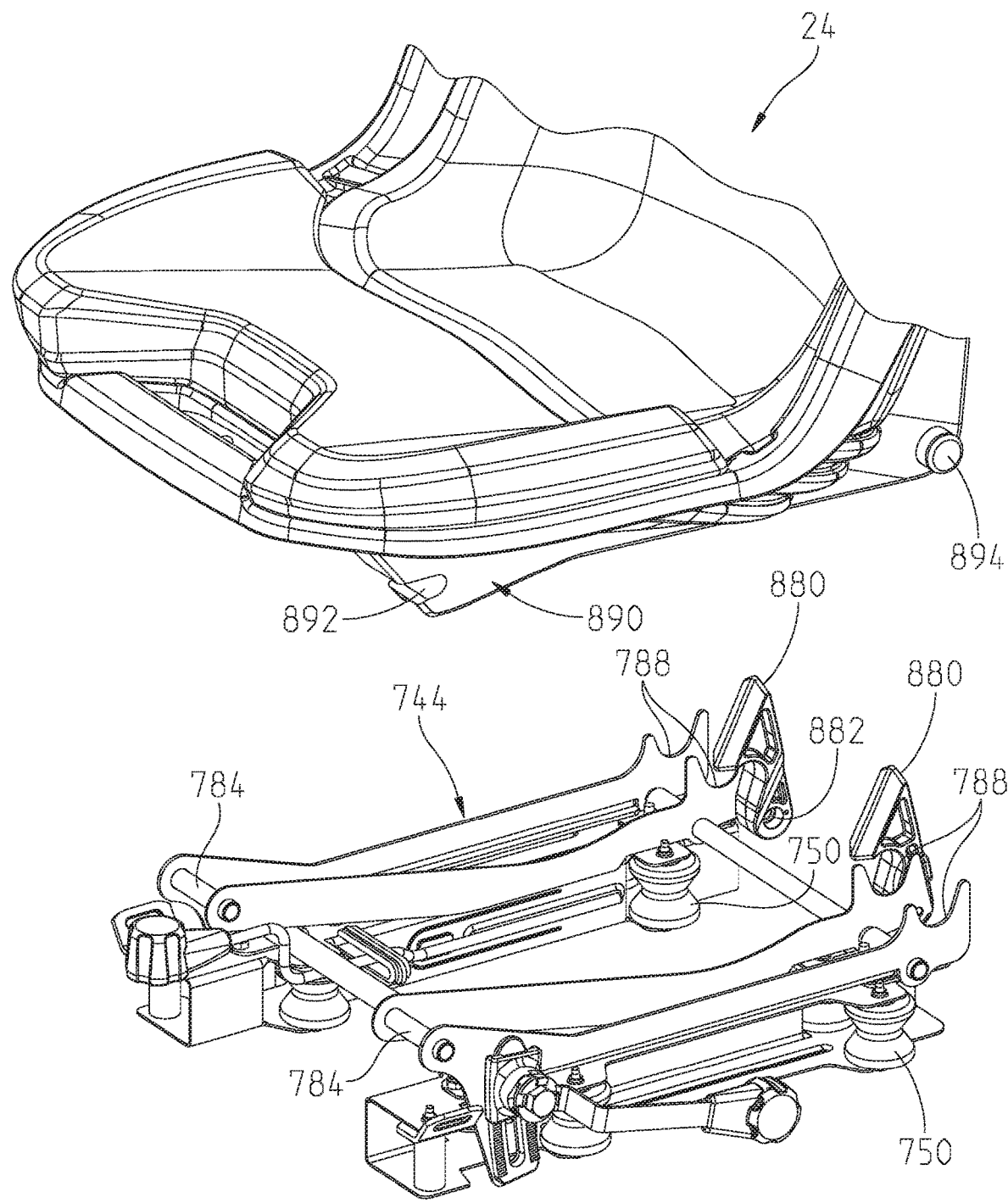
FIG. 42 shows the driver's seat exploded away from the seat adjustment mechanism.

As shown in FIGS. 41-43, the seat 24 may also be locked to the tilt mechanism 744. A shown, tilt mechanism 744 includes two latches 880 (FIG. 42) having apertures 882 coupled to openings 884 (FIG. 43) of frame members 780. Each of the latches includes a latch clasp at 886, as described herein. As shown in FIG. 42, seat 24 includes a seat base 890 having slotted openings at 892 and a locking rod at 894. As shown best in FIG. 41, locking rod 894 extends across and under the seat base 890. To attach seat 24, the two slots 892 may be positioned over the tubes 784 and the seat may be rotated downwardly such that rod 894 is latched into place with the clasps 886 over a top of the rod 894, and with the rod positioned in a saddled fashion in the openings 788, as shown in FIG. 41.

Figure 45:
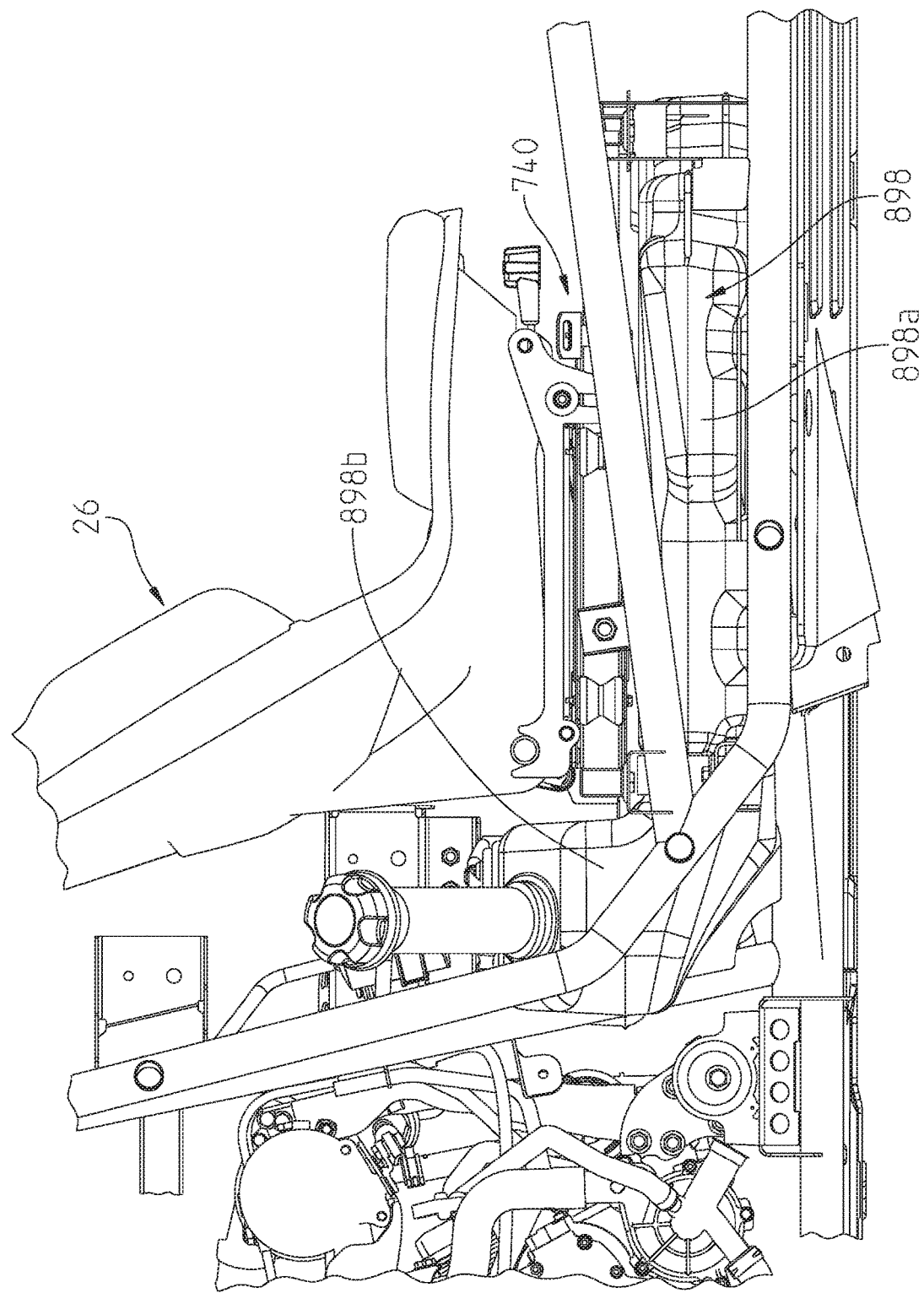
FIG. 45 is a right side view of the assembly shown in FIG. 39.

As shown in FIG. 45, a side view of the vehicle shows that the seat adjustment mechanism 740 has achieved both a tilt and longitudinal movement of seats 24 and 26 with little vertical movement upwardly, advantageously maintaining the center of gravity as low as possible in the vehicle, as the rider's weight in positioned in the seat. This is due to the construction of the tilt mechanism being integrated into the track system, as well as the rollers 750 being positioned along sides of the longitudinal tubes 156. FIG. 45 also provides a view of the fuel tank 898 which has a portion 898a below the seat 26 and a portion 898b rearward of the seat.

Figure 47:
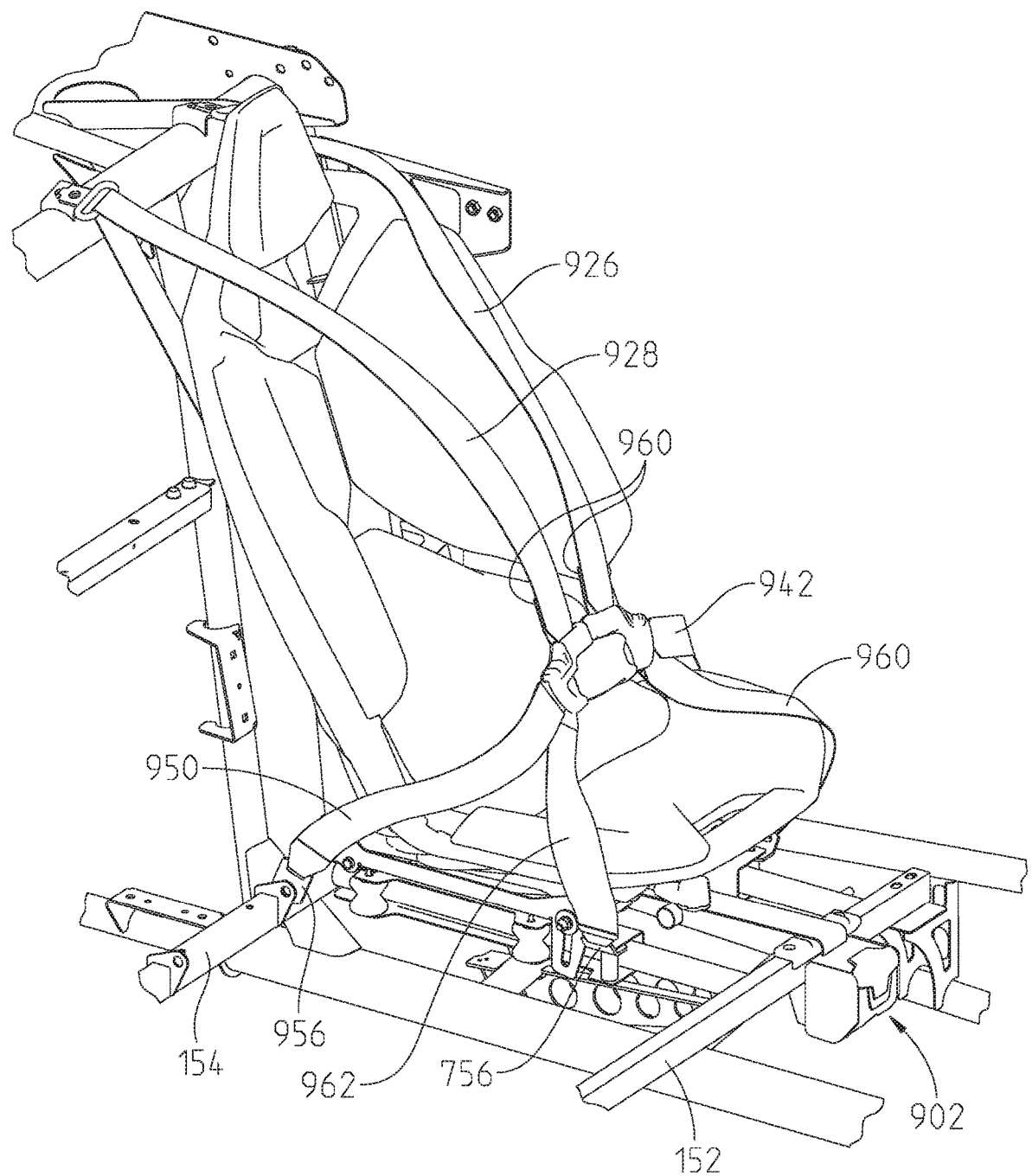
FIG. 47 shows a right front perspective view of the shoulder harness of FIG. 46.
Figure 48:
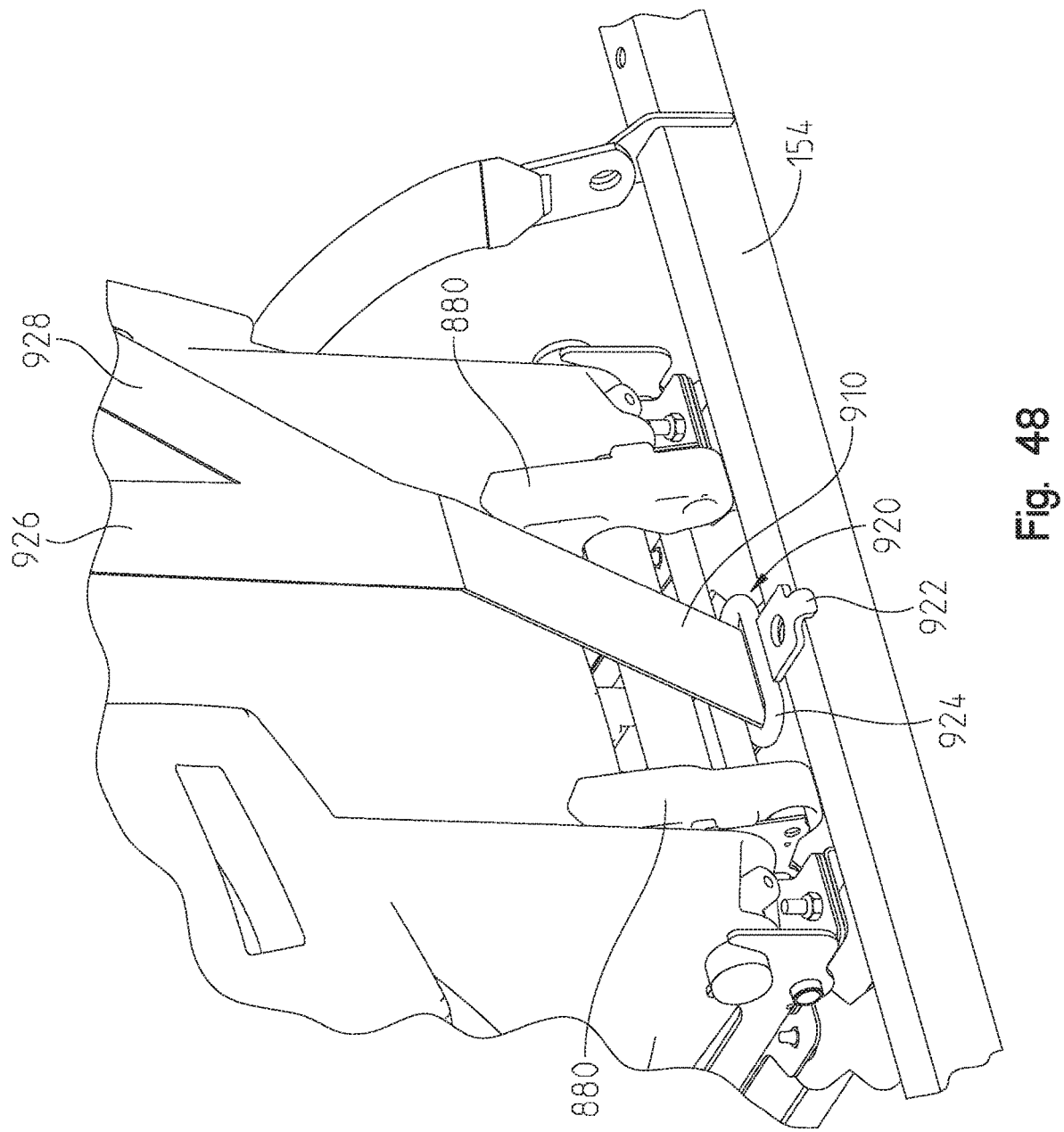
FIG. 48 shows a rear left perspective view of the strap extending around the back of the driver's seat back.
Figure 49:
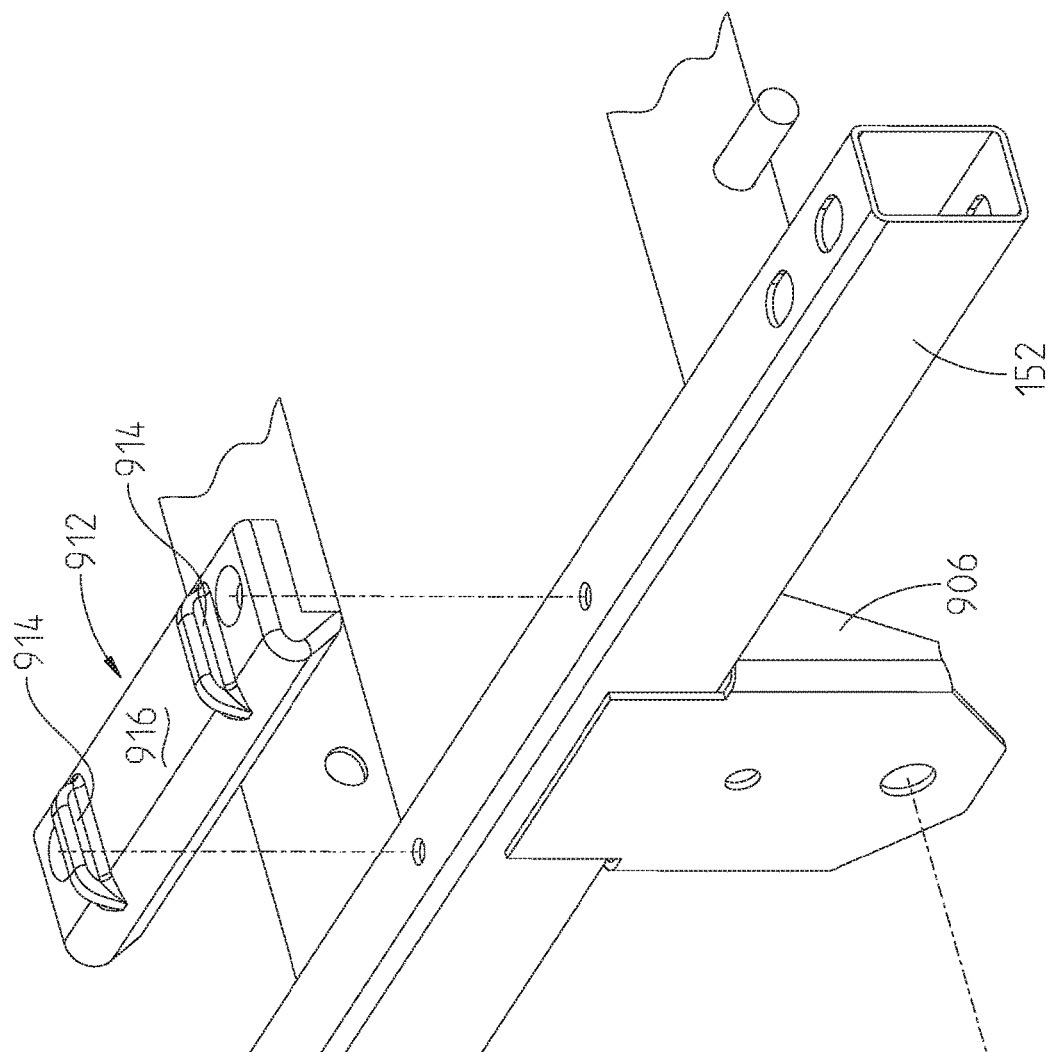
FIG. 49 is a front left perspective view of the retractor mechanism exploded away from the seat frame.

With reference now to FIGS. 46-49, the shoulder harness 30 for the passengers will be described. As shown best in FIG. 46, harness 30 is generally shown as a belt system 900 and including a single retractor 902 coupled to cross tube 152. As shown, the retractor 902 is coupled to the harness belt 900 which overlaps seat 24, as described herein. With reference now to FIG. 49, cross tube 152 includes a bracket 906 coupled thereto, whereby retractor 902 can be coupled to bracket 906 which positions retractor forward of, and below, the seat 24. This provides the weight of the retractor 902 at a position low in the vehicle to lower the center of gravity of the overall vehicle 2. The retractor includes a single belt 910 which feeds rearwardly over a belt guide 912 (FIG. 49) which is also coupled to cross tube 152. Belt guide 912 includes guide walls 914 defining a belt passageway at 916 over which the belt 910 may move in a fore-and-aft direction.

As shown in FIG. 48, a strap loop is provided at 920 having a retainer 922 coupled to cross tube 152 which is rearward of the seat 24. Strap loop 920 further includes a loop ring 924 through which belt 910 is fed. Belt 910 extends upwardly forming a Y-configuration having two belt portions extending upwardly over the seat, namely belt portions 926 and 928. As shown best in FIG. 46, belts 926 and 928 extend upwardly through another set of loops 930 coupled to cross tube 182, where loops 930 are identical to loops 920 to guide the belts 926 and 928 over left and right shoulders of the driver, respectively.

Figure 46:
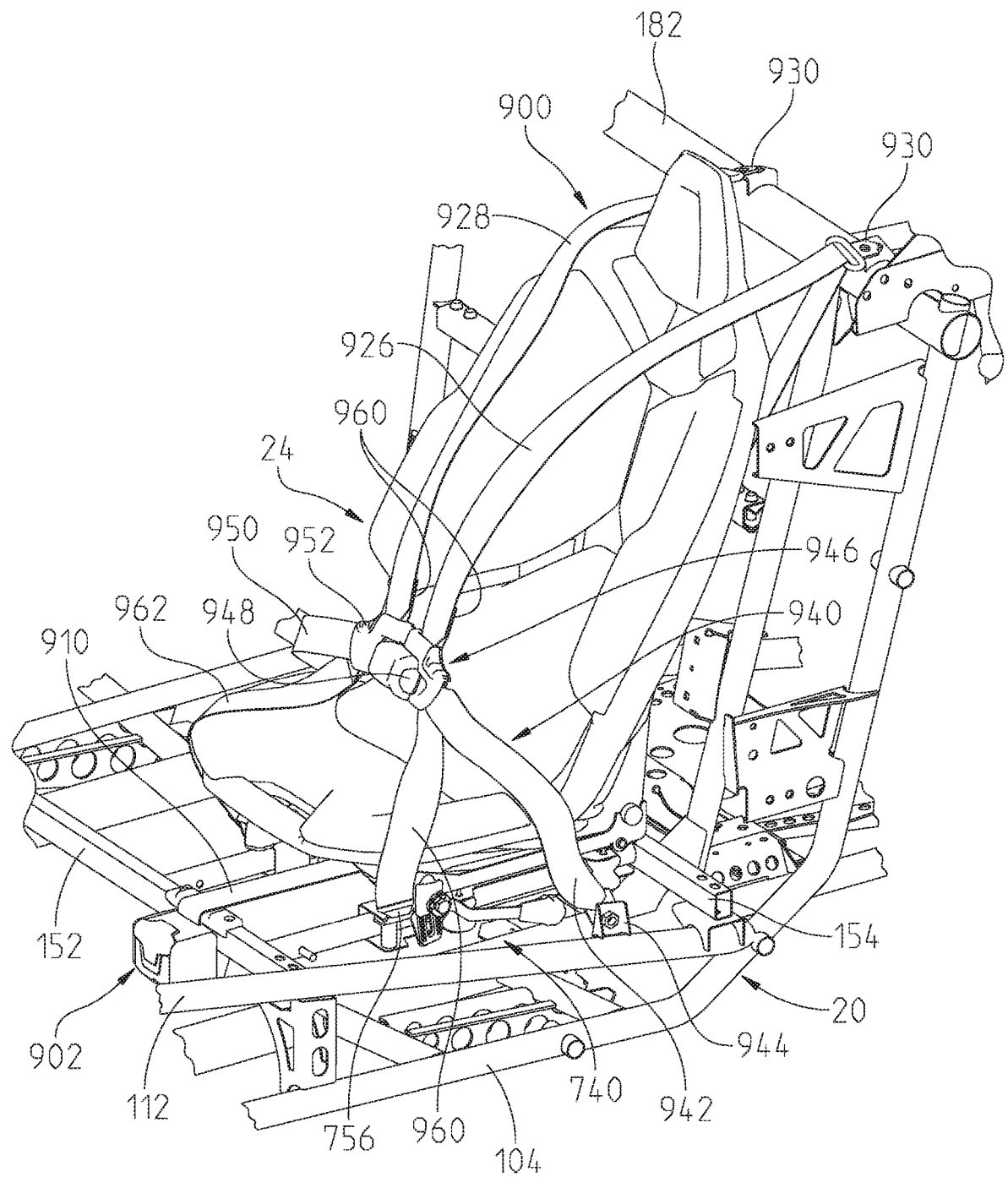
FIG. 46 shows a front left perspective view of the shoulder harness on the driver's seat.

With reference still to FIG. 46, harness 30 further includes a lap belt 940 including belt portion 942 coupled at one end to a bracket 944 attached to frame tube 112, and at the other end, to a buckle 946 having a release button 948. An opposite lap belt 950 includes a tongue 952 which may couple with buckle 946 to hold the lap belts 942, 950 in a connected condition. As shown best in FIG. 47, lap belt portion 950 couples at the opposite end to a clasp 956 attached to cross tube 152. As shown in both FIGS. 46 and 47, belt portions 926 and 928 include connecting portions 960 to couple the belt portions 926 and 928 to buckle 946 and tongue 952 respectively. The lower end of belt system 900 includes belt portions 960 and 962 which individually couple to the brackets 756 (FIGS. 46 and 47). As belts 926 and 928 are directly coupled to the retractor 902, and where the ends of belt portions 960 and 962 are coupled to the seat attachment mechanism 740, the belts 926 and 928 are self-adjusting with the movement of the seat either in the fore-or-aft direction. As the lap belts 942, 950 are coupled directly to the frame at 944 and 956 (FIGS. 46 and 47), these belts may need to be readjusted for various fore-and-aft positions. It is anticipated that all or some of the belts would include tightening mechanisms to tighten or loosen the belts.

By providing the single retractor and the Y-loop at the rear of the seat, the harness 30 has several advantages. As mentioned above, the placement of the retractor 902 at a position low in the vehicle lowers the center of gravity, but at the same time the low mounting point reduces lockups of the retractor. However, this also assures that both shoulder harnesses lock together due to the Y-loop. This design also eliminates retractors normally positioned high and above the seat increasing rearward visibility for the passengers. Also by positioning the retractor in front of the seat, this allows a substantial length of the belt 910 (between the retractor and the Y-loop) allowing for significant variance in possible operator size and adjustability. Alternatively, the retractor 902 could be positioned under the seat.

Figure 50:
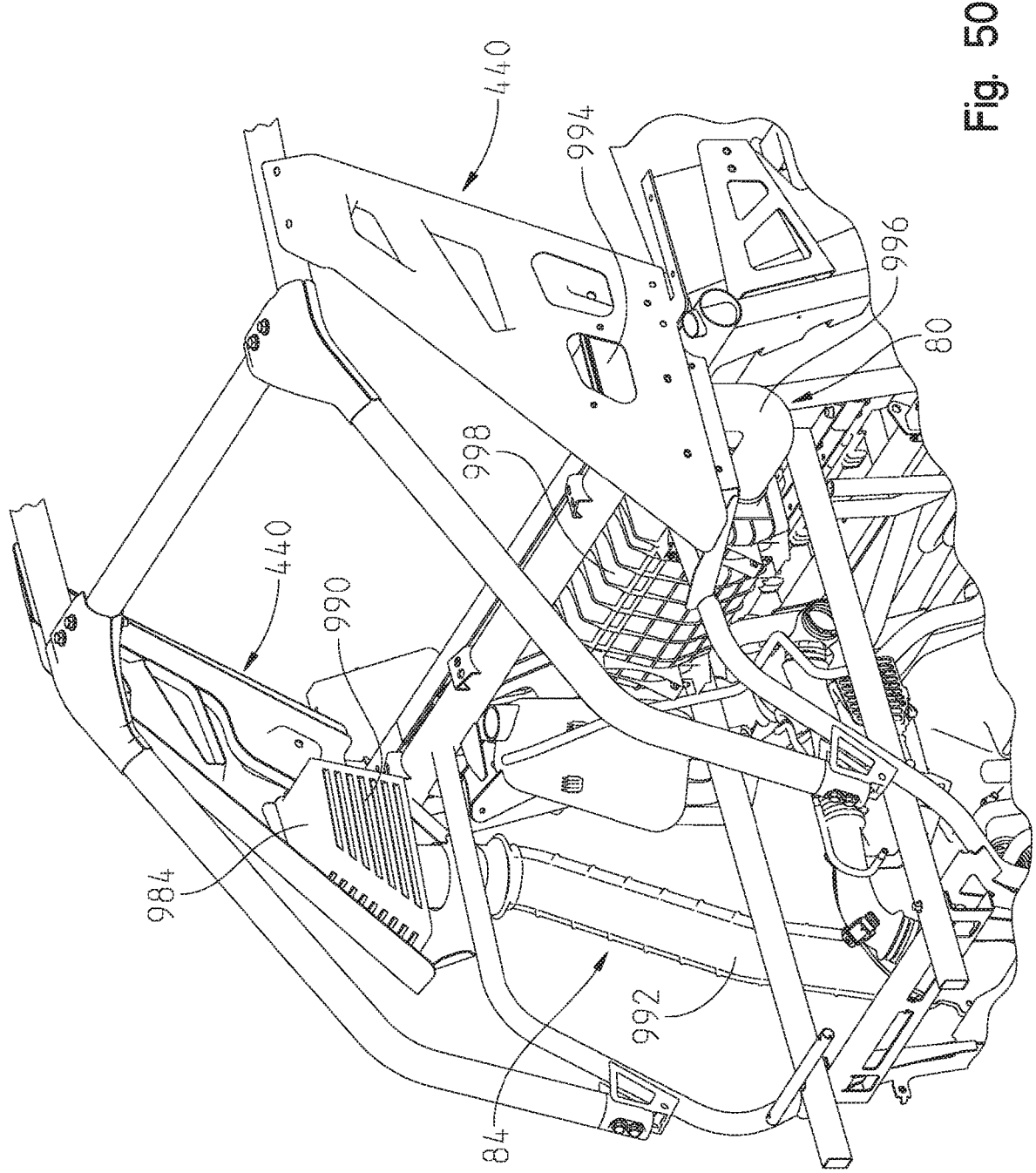
FIG. 50 shows a rear right perspective view of the air system of the present vehicle.
Figure 51:
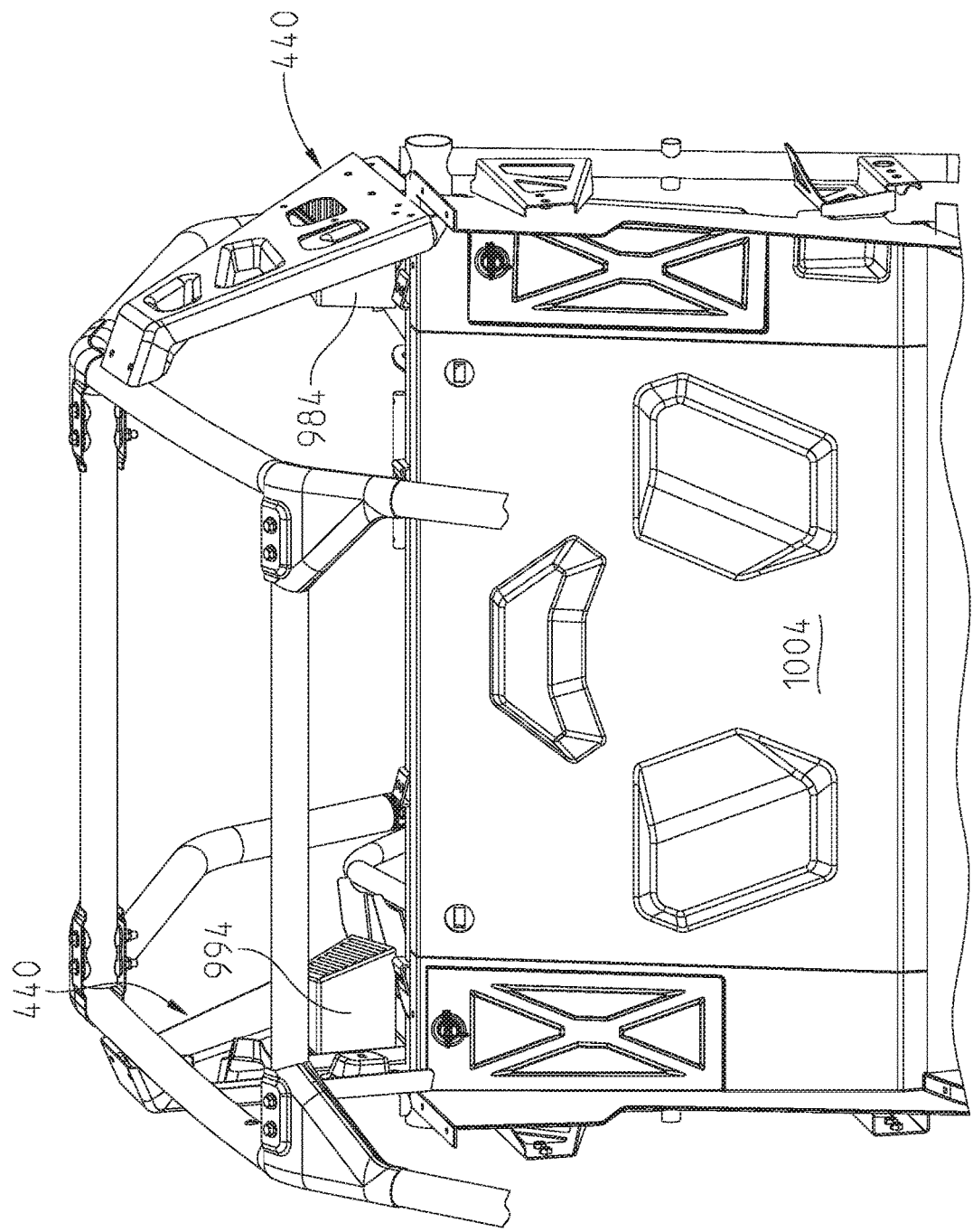
FIG. 51 shows a front left perspective view of the protective panel located behind the side-by-side seats.

With reference now to FIGS. 50-52, the air intake system of the vehicle will be described. As shown best in FIG. 50, an air intake system of the vehicle includes air intake 84 for cooling of the CVT 52 and an air intake system 80 as air intake to the engine. As shown, air intake system 84 includes an intake bezel 984 which can be directly coupled to the pillar portions 440 in a trapezoidal area 986 (see FIG. 27) of the pillar portion 440, where aperture 988 allows air into the bezel 984. Air is also drawn through louvers 990 and into bezel 984. Air extends through bezel 984 and into duct 992 which is coupled directly to the CVT 52 for drawing air into the CVT 52 for cooling purposes.

In a similar manner, a bezel 994 is provided on the passenger side pillar portion 440 which couples to a duct 996 which is an intake to air filter 998 (FIG. 52) which exits to duct 1000 having an outlet 1002 for intake to the engine. Air filter 998 is positioned directly behind the seats 24, 26 such that the removal of a protective panel 1004 which provides easy access to the air filter 998 as shown best in FIG. 52.

Figure 53:
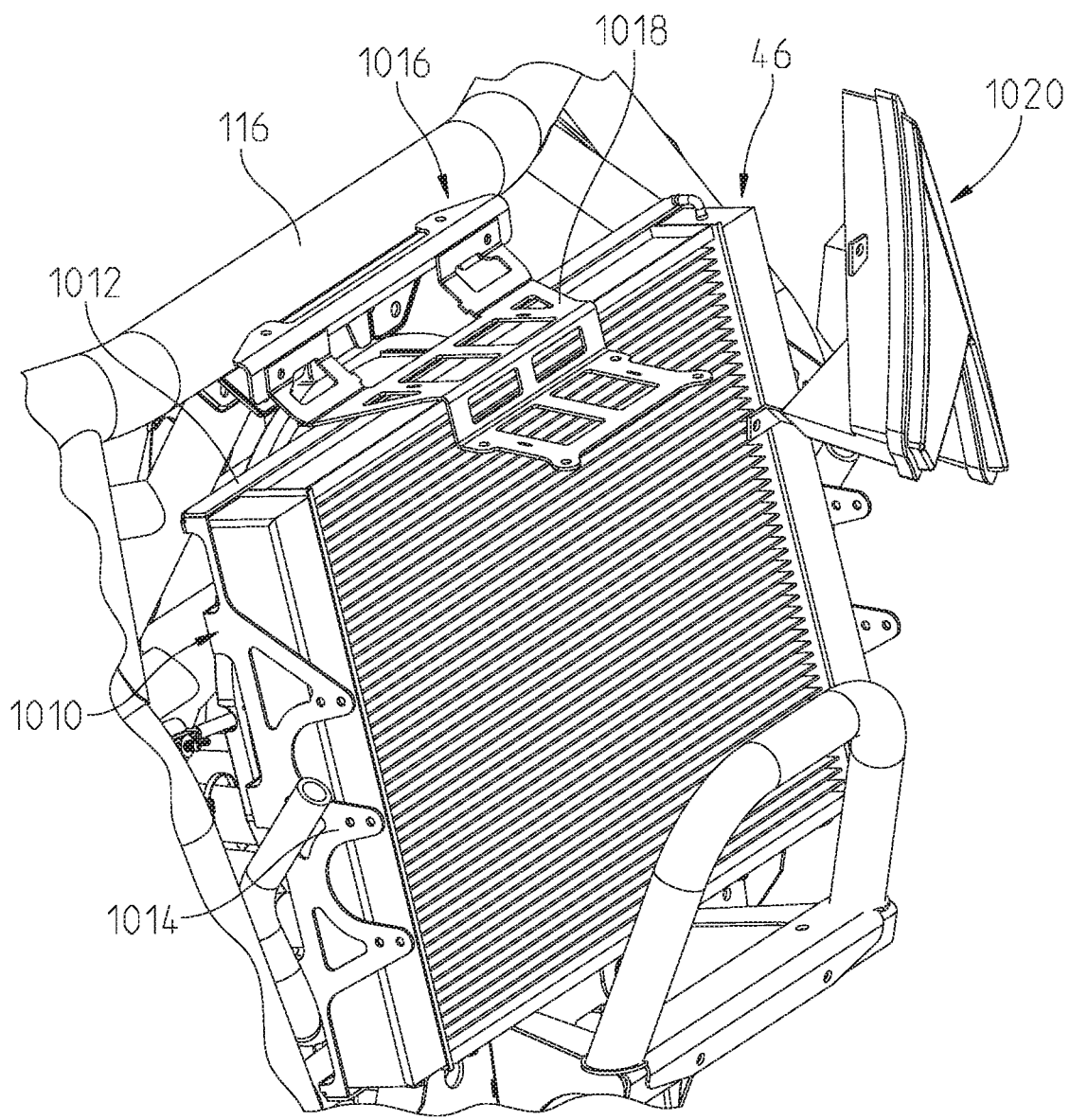
FIG. 53 is a front right perspective view showing the radiator assembly and left headlight positioned adjacent to the radiator.
Figure 54:
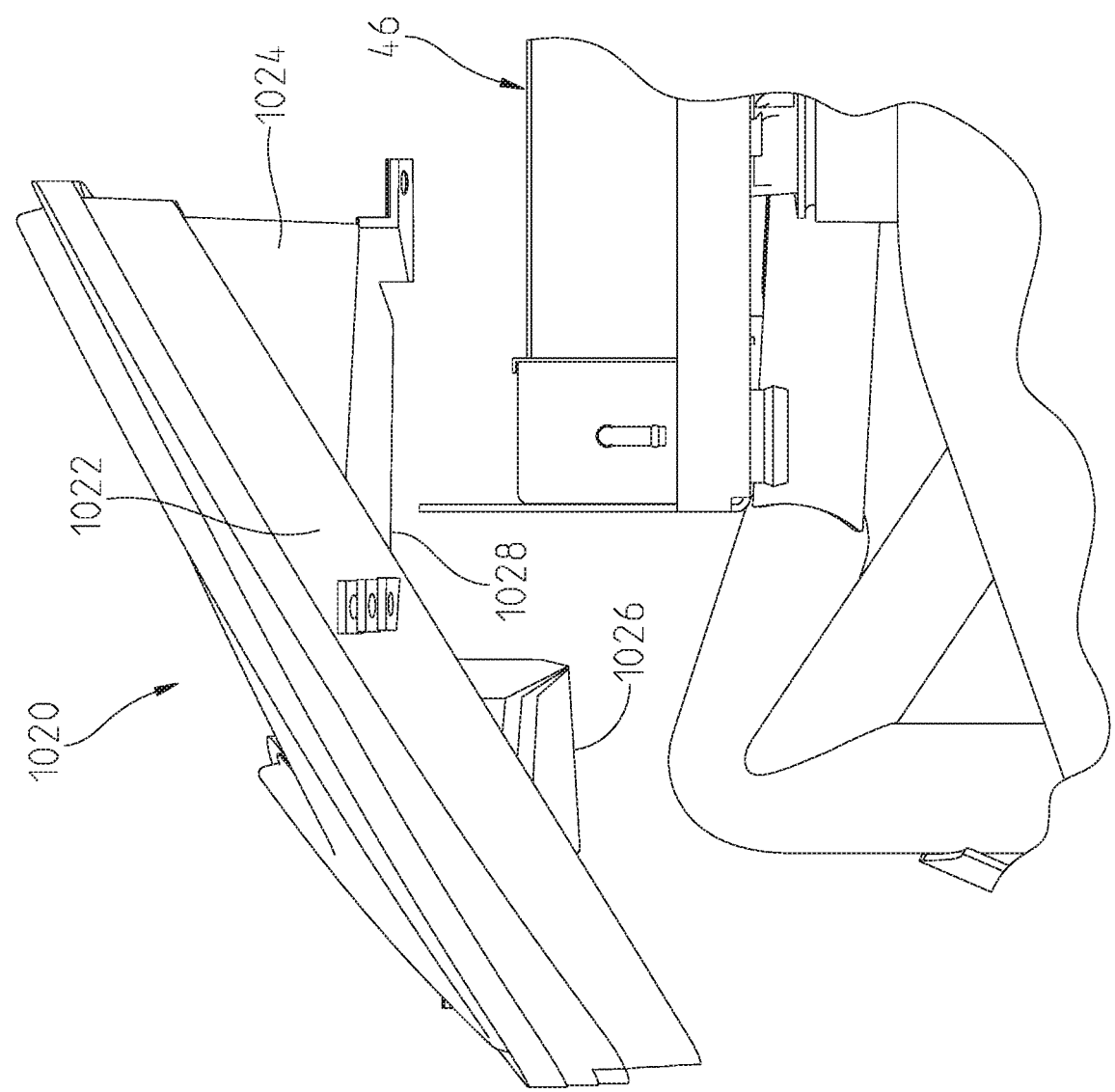
FIG. 54 is a top view showing the left headlight positioned adjacent to the radiator.

With reference now to FIGS. 53 and 54, the packaging of the headlights relative to the radiator will be described. As shown in FIG. 53, radiator 46 is coupled to the frame by way of a radiator frame 1010 having a box shaped enclosure at 1012 to encompass the radiator 46 and side arms at 1014. A top bracket 1016 is provided coupled to U-shaped support 116 having a bracket 1018 conforming to a top of the radiator 46. A headlight 1020 is positioned adjacent to the radiator where the light has a diagonally shaped body portion 1022 (FIG. 54) and the electronics of the headlight defines a staggered or notched design having a rear body portion 1024 and 1026 defining a notched portion at 1028. As shown, radiator 46 is positioned in the notched portion 1028 such that the rear portion 1026 and the remainder of the headlight 1020 extends rearwardly of the radiator 46, such that a rearward most point of the headlight 1020 is rearward of a forward most point of the radiator 46. This design maximizes the location of the radiator and resultantly, the approach angle at the front of the vehicle.

Figure 55:
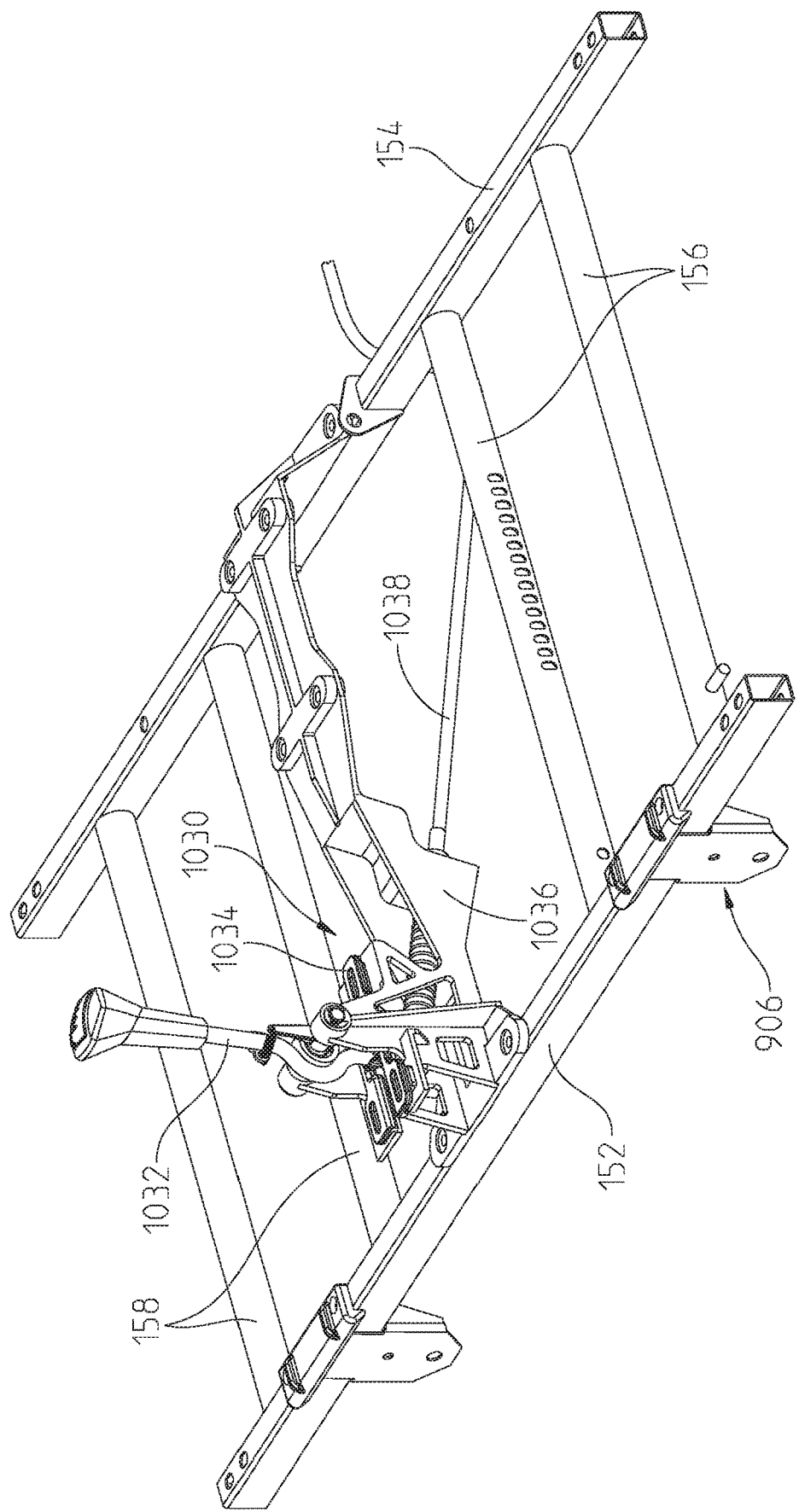
FIG. 55 shows a left front perspective view of the shifter mechanism.
Figure 56:
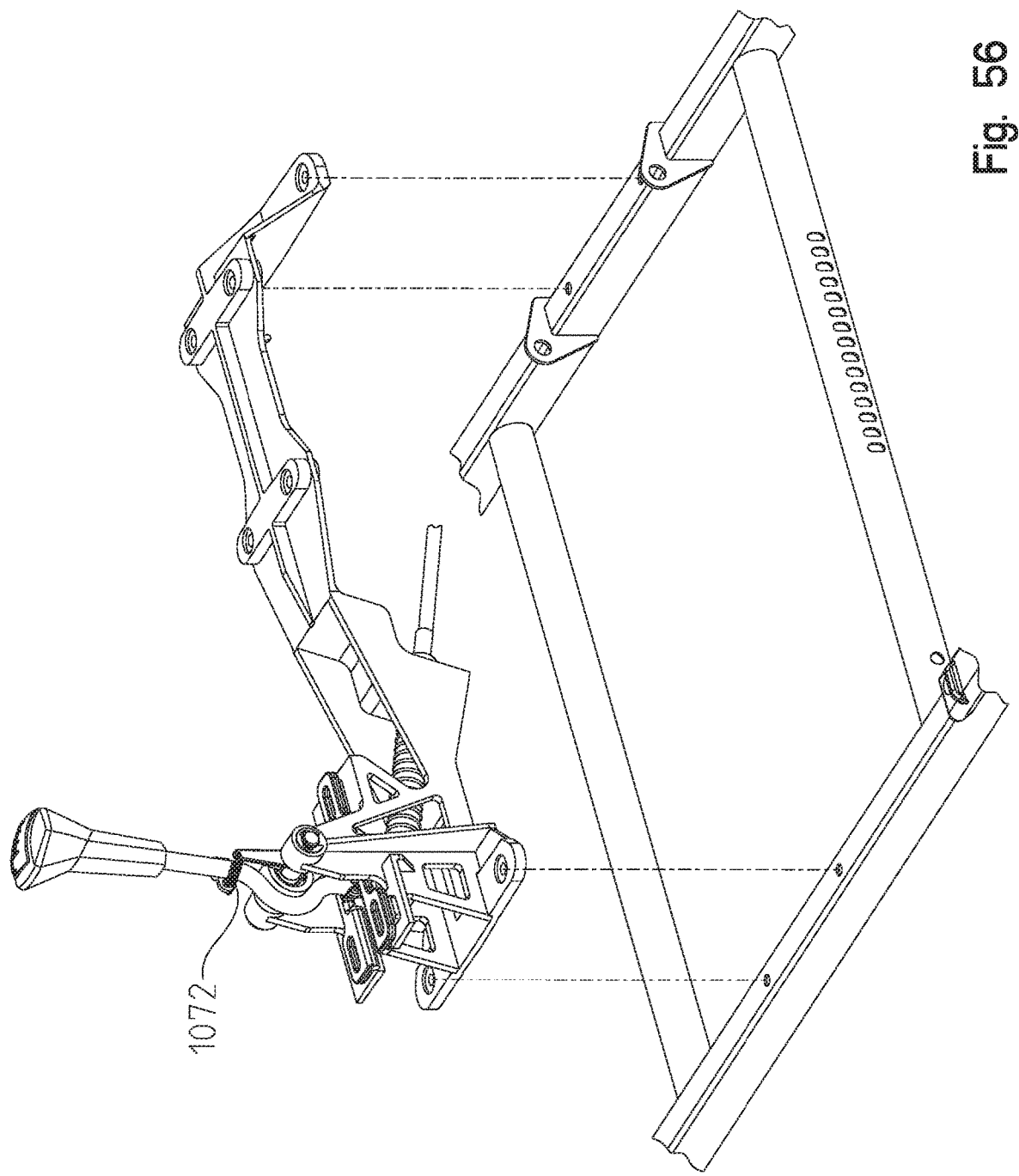
FIG. 56 shows the shifter mechanism exploded away from the seat frame and assembly.
Figure 57:
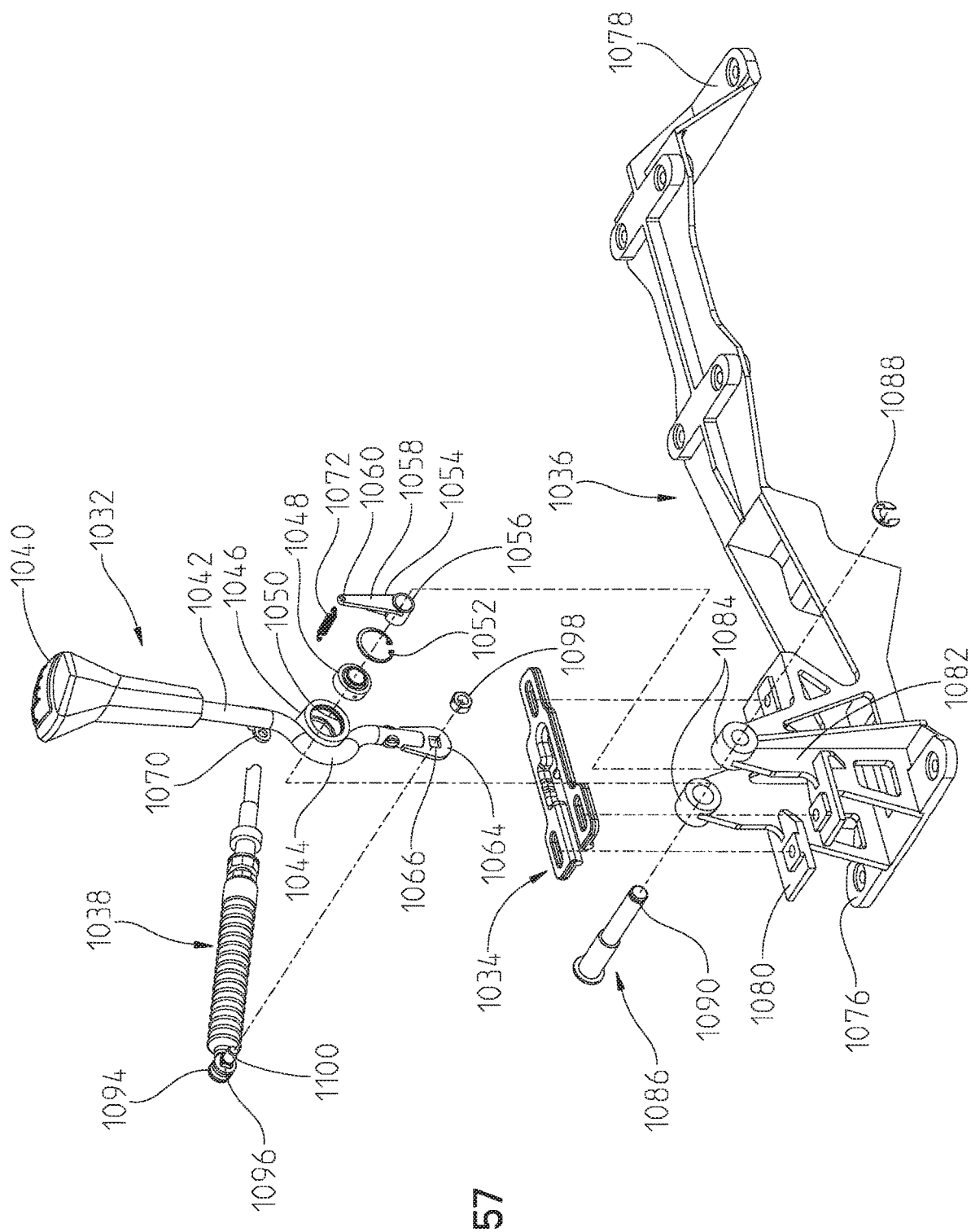
FIG. 57 shows an exploded view of the shifter assembly.

With reference now to FIGS. 55-57, a shifter mechanism 1030 will be described in greater detail. As shown, shift mechanism 1030 generally includes a shift lever 1032, gate 1034, shift housing 1036 and actuator 1038. As shown, shifter assembly 1030 is coupled between front and rear frame tubes 152, 154 and intermediate seats 24, 26. With reference now to FIG. 57, shift lever 1032 includes a shift handle 1040 coupled to a shift rod 1042. Lever shaft 1042 includes a radiused portion 1044 including a bearing carrier at 1046. A ball joint bearing 1048 is positioned within an inner diameter 1050 of bearing carrier 1046 and is held in place by snap ring 1052. A spring retainer 1054 is provided having a lower cylindrical portion 1056 and an upper arm 1058 having a spring retaining aperture at 1060. Shift rod 1042 also includes a lower flange at 1064 having a square opening at 1066. In the embodiment shown, bearing 1048 is a ball joint bearing and spring retainer 1054 rotates with the shift lever 1042. Finally, shift rod 1042 includes an eyelet at 1070, and a spring 1072 is positioned between the eyelet 1070 and the aperture 1060 of spring retainer 1050. Tension spring 1072 biases the shift lever towards the driver within the gate 1034.

Shifter housing 1036 includes a lower flange at 1076 for mounting to front cross tube 152 and a rear flange 1078 for mounting to rear cross tube 154. A gate support platform 1080 is provided which is flanked by upstanding walls 1082 having cylindrical supports 1084 which act as a trunnion for supporting shift lever assembly 1032. Namely, a shaft 1086 extends through cylindrical members 1084 through bearing 1048, through cylindrical portion 1056 of spring retainer 1054. A snap ring 1088 which couples to a groove 1090 in shaft 1086 retains the shaft 1086 and the shift assembly 1032 to the cylindrical members 1084. The actuator 1038 includes a front head 1094 having a square shouldered fastener at 1096 which cooperates with square opening 1066 and a fastener 1098 is coupled to threaded end 1100 to fix the actuator 1038 to the shift assembly 1032.

Figure 58:
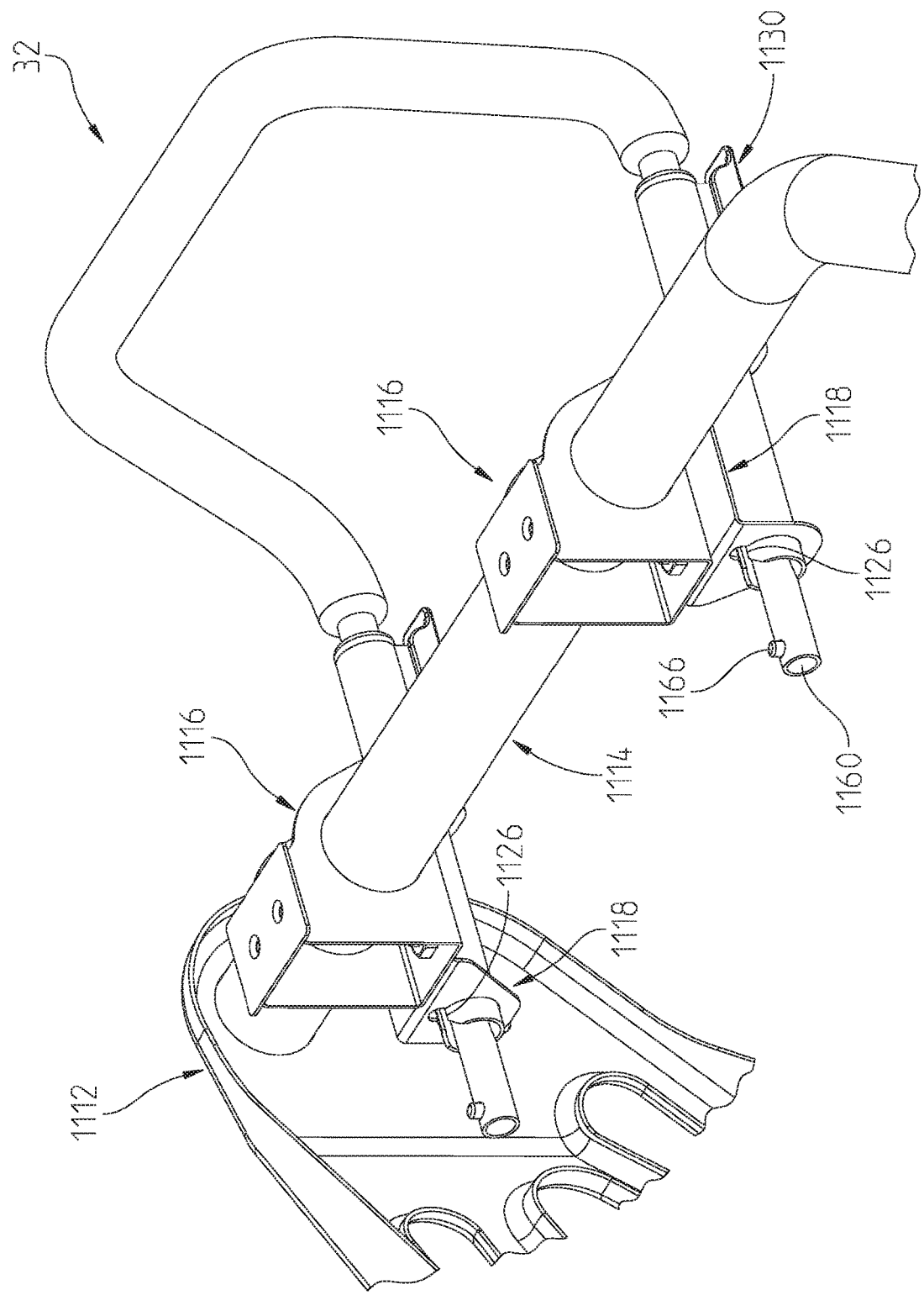
FIG. 58 shows a left front perspective view of the passenger grab bar assembly.
Figure 59:
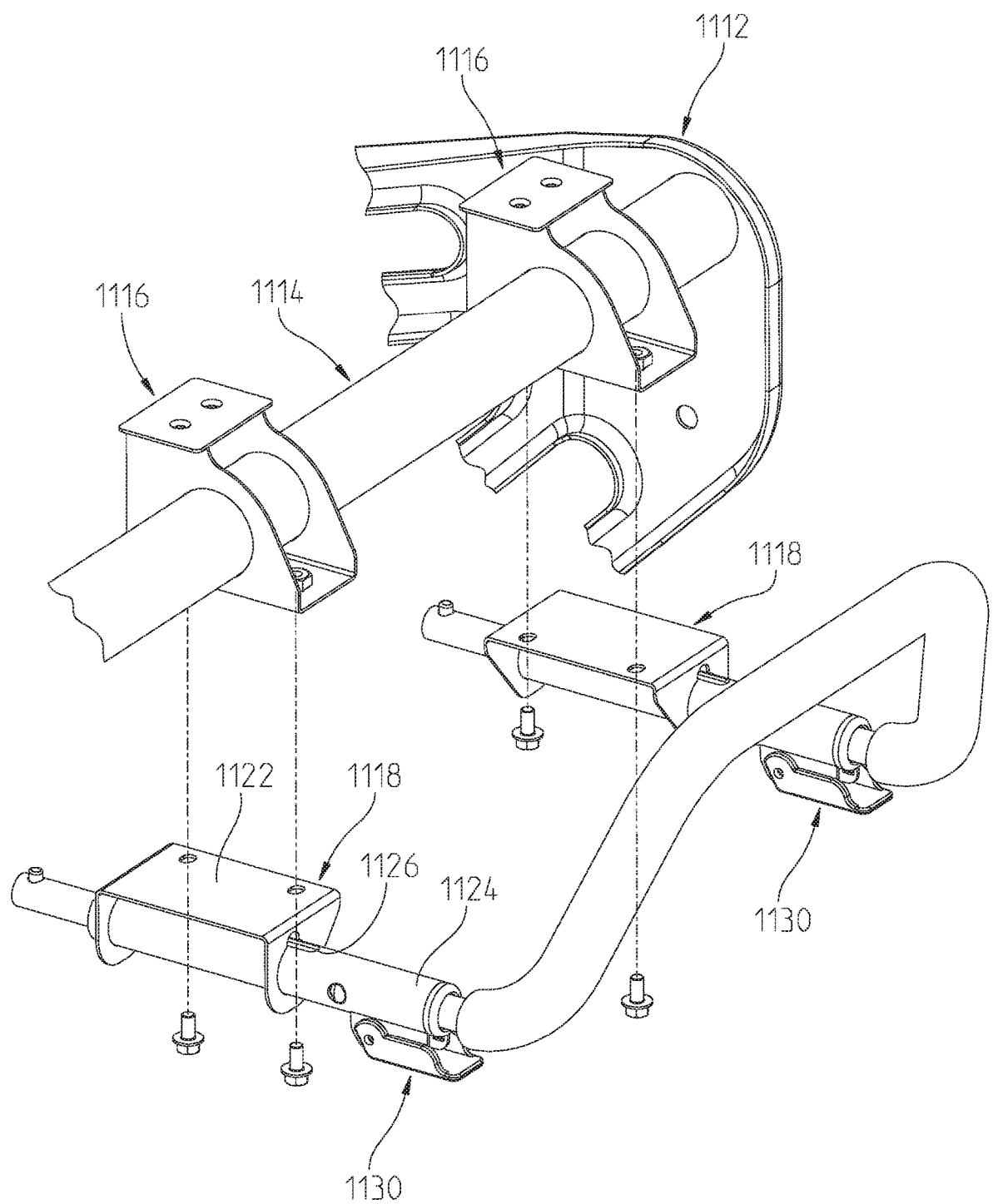
FIG. 59 shows an exploded grab bar mechanism of FIG. 58.
Figure 60:
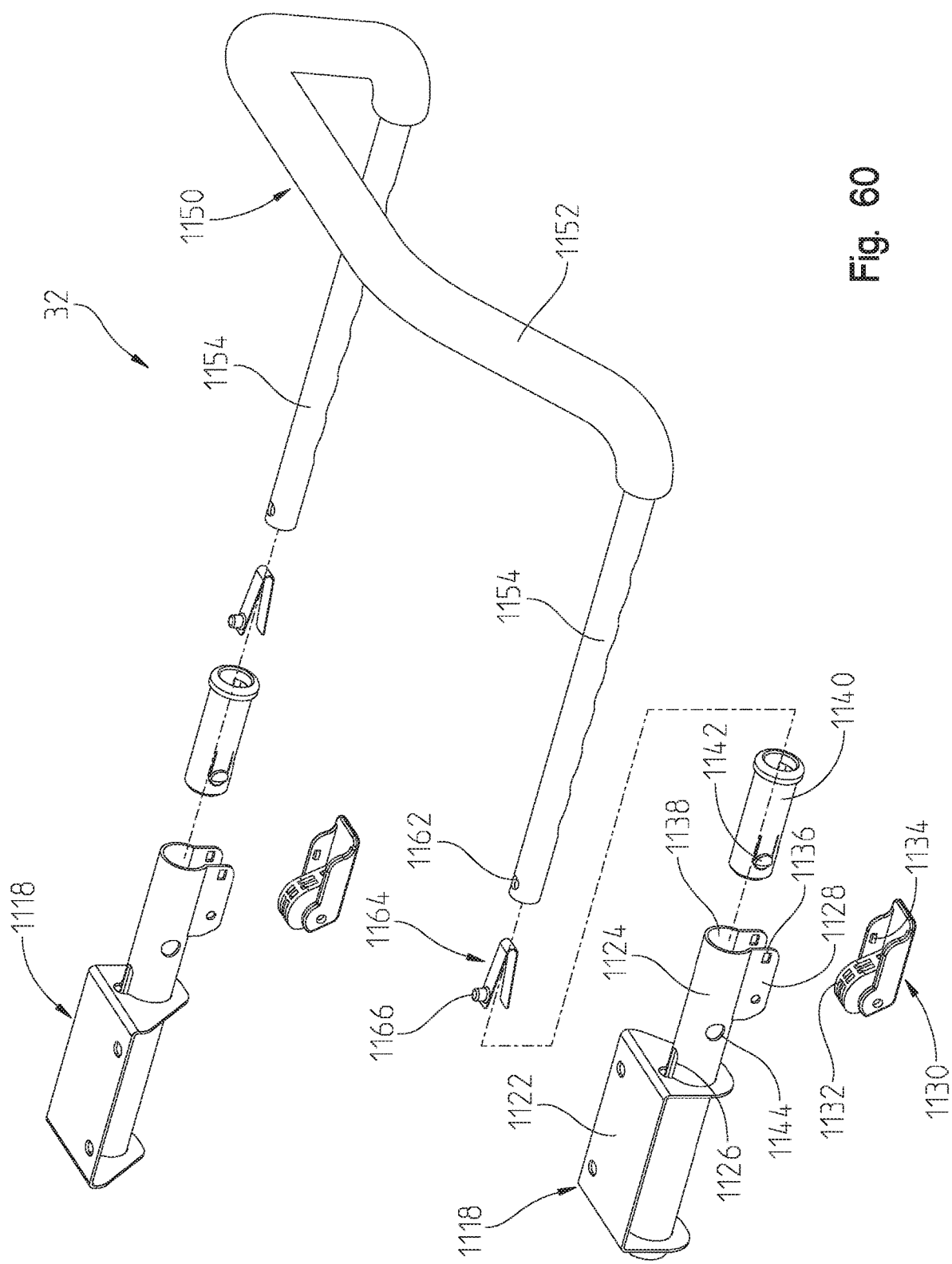
FIG. 60 shows a left rear exploded view of the grab bar mechanism of FIG. 59.
Figure 61:
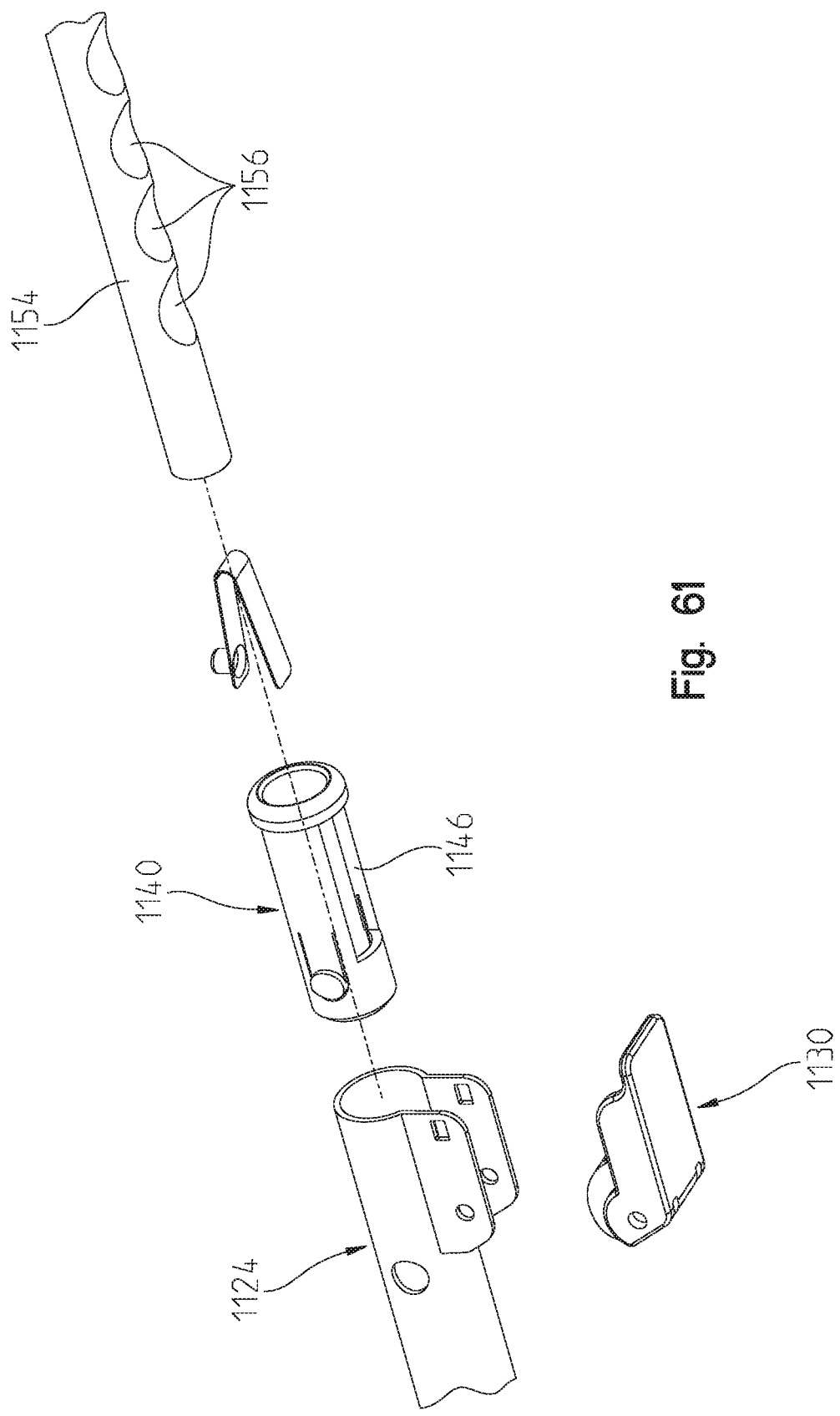
FIG. 61 shows an underside perspective view of the grab bar locking mechanism.

With reference now to FIGS. 58-61, the passenger grab bar 32 will be described in greater detail. With reference first to FIG. 11, the frame includes a driver side bolster plate 1110, and a passenger side bolster plate 1112 which couples a cross tube 1114 thereto. Bolster plate 1112 is a stamped component which allows a lightweight solution and a custom shape offering rigidity. Alternatively, bolster plate 1112 could be a casting. As shown in FIG. 58, brackets 1116 are coupled to the cross tube 1114 and lower brackets 1118 are coupled to brackets 1116. As shown in FIGS. 59 and 60, brackets 1118 include a flange portion 1122 and a tubular receiver 1124. Tubular receiver 1124 includes a slotted opening 1126 which extends to a front end of receiver 1124 (FIG. 58). Receiver 1124 further includes lower flanges 1128 (FIG. 60) which receive a rotary cam 1130 having an over center cam portion 1132. A detent 1134 is provided in rotary cam 1130 which cooperates with detent opening 1136. A sleeve 1140 is provided which is received in opening 1138 and has tab locks 1142 which cooperate with apertures 1144 of sleeve 1124. Sleeve 1140 has an opening 1146 (FIG. 61) at an underside thereof which receives the cam lock, as described further herein.

The grab handle 1150 of the assembly includes a U-shaped hand grip 1152 which may be covered with a grip portion, such as a thermos-plastic rubber or foam member, and two elongate attachment rods 1154. As shown best in FIG. 61, a lower side of attachment rods 1154 includes scalloped detents 1156. A free end of each of the rods 1154 includes an opening 1160 (FIG. 58) with an aperture 1162 (FIG. 60) adjacent a free end of the rods 1154. A leaf spring 1164 includes a guide tab 1166 positioned on one of the legs of the leaf spring 1164 and when positioned within opening 1160 of rod 1154, guide tab 1166 protrudes through aperture 1162, as best shown in FIG. 58.

Thus, when rods 1154 are inserted through sleeve 1140 and into tube 1124, the guide tab 1166 is positioned in the guide slot 1126 and when the rods 1154 are moved to the fully inserted position, guide tabs 1166 protrude beyond the slot 1126, as shown in FIG. 58. The grab bar 1150 however, may be moved to multiple other positions closer to the seat of passenger by rotating the cam locks 1130 downwardly, disengaging the rotary cam 1132 from the scalloped portions 1156, and aligning a new scalloped portion 1156 with the rotary cam over center cam 1132 and moving the rotary cams 1130 back to the locked position shown in FIG. 58.

Figure 62:
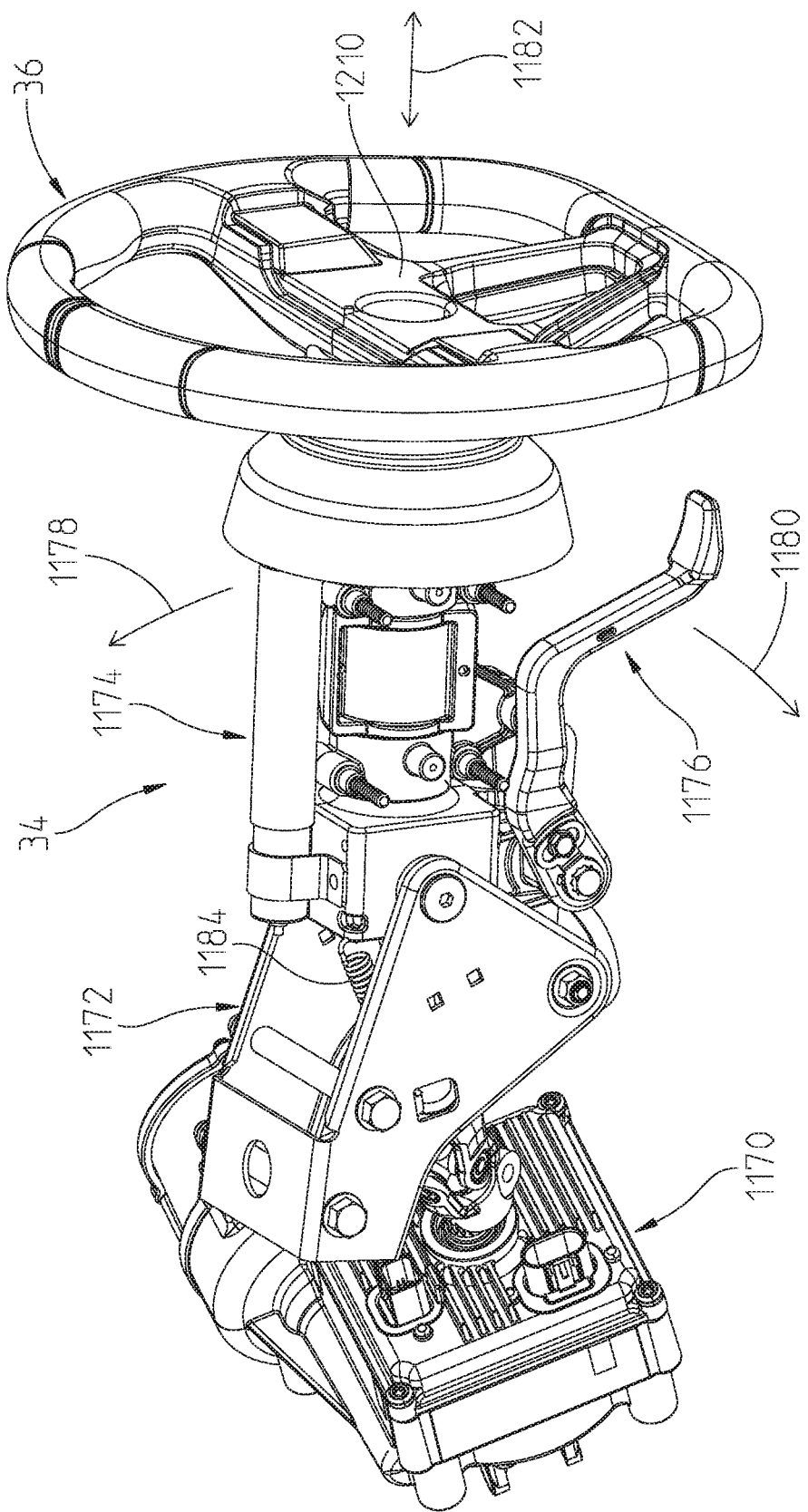
FIG. 62 shows a left rear perspective view of the a steering mechanism for the vehicle.
Figure 63:
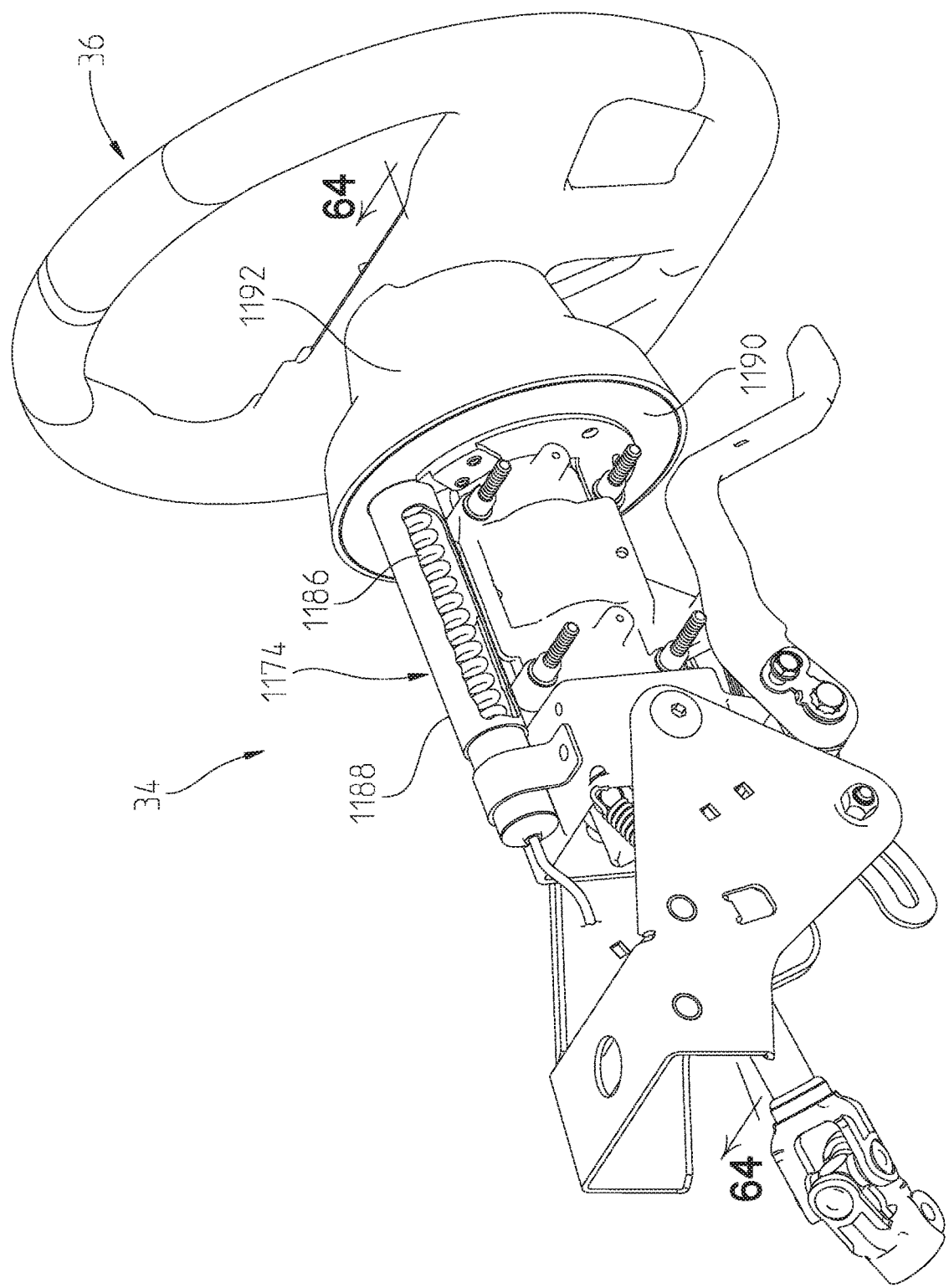
FIG. 63 is a left front perspective view of the steering mechanism of FIG. 62, with the wiring housing partially fragmented.

As shown in FIG. 62, steering assembly 34 is shown with steering wheel 36. Steering assembly generally includes a power steering motor 1170, a frame portion 1172, a wiring housing 1174, and a disengagement lever 1176. Disengagement of the lever 1176 allows the frame 1172 to tilt up and down according to the arrow directions 1178 and 1180. The steering wheel 36 is also longitudinally movable in the directions of arrow 1182. Spring 1184 provides a biasing force in the position of arrow 1178.

Figure 64:
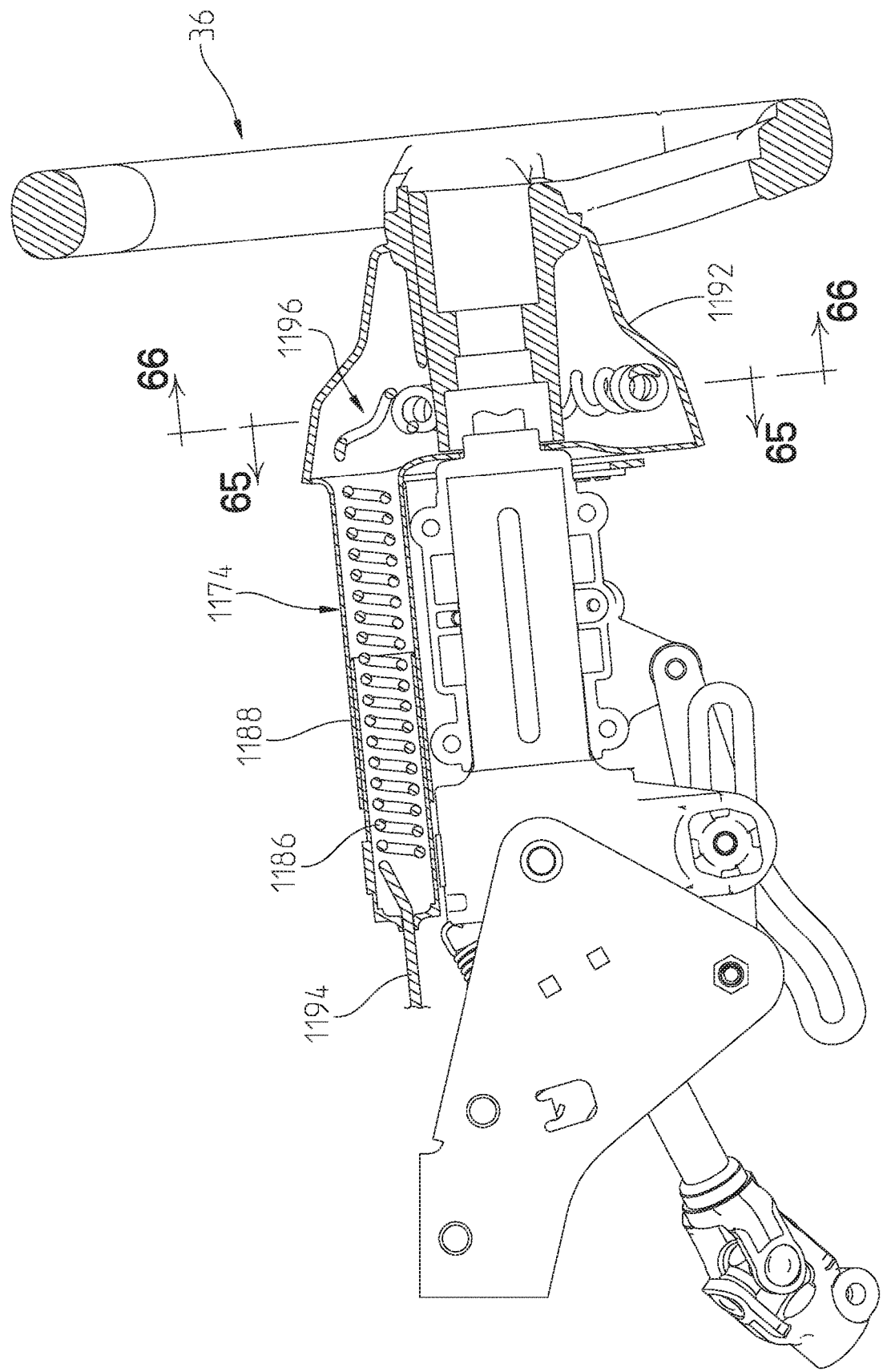
FIG. 64 is a cross-sectional view through lines 64-64 of FIG. 63.

As shown in FIGS. 63-66, the steering assembly has been modified to allow power to interface to the front of the steering wheel for such items as control features, yet allow the steering wheel to rotate, without the use of a clock spring. As shown best in FIG. 63, the steering assembly 34 is shown with the wiring housing 1174 partially broken away to show the internal electrical cord 1186. Housing 1174 includes a tubular portion 1188 and a plate portion 1190. A cap 1192 is positioned over the plate portion 1190. As shown in FIG. 64, the cord 1186 has a portion 1194 extending from the housing 1174 and a portion 1196 which extends under the cap 1192.

Figure 65:
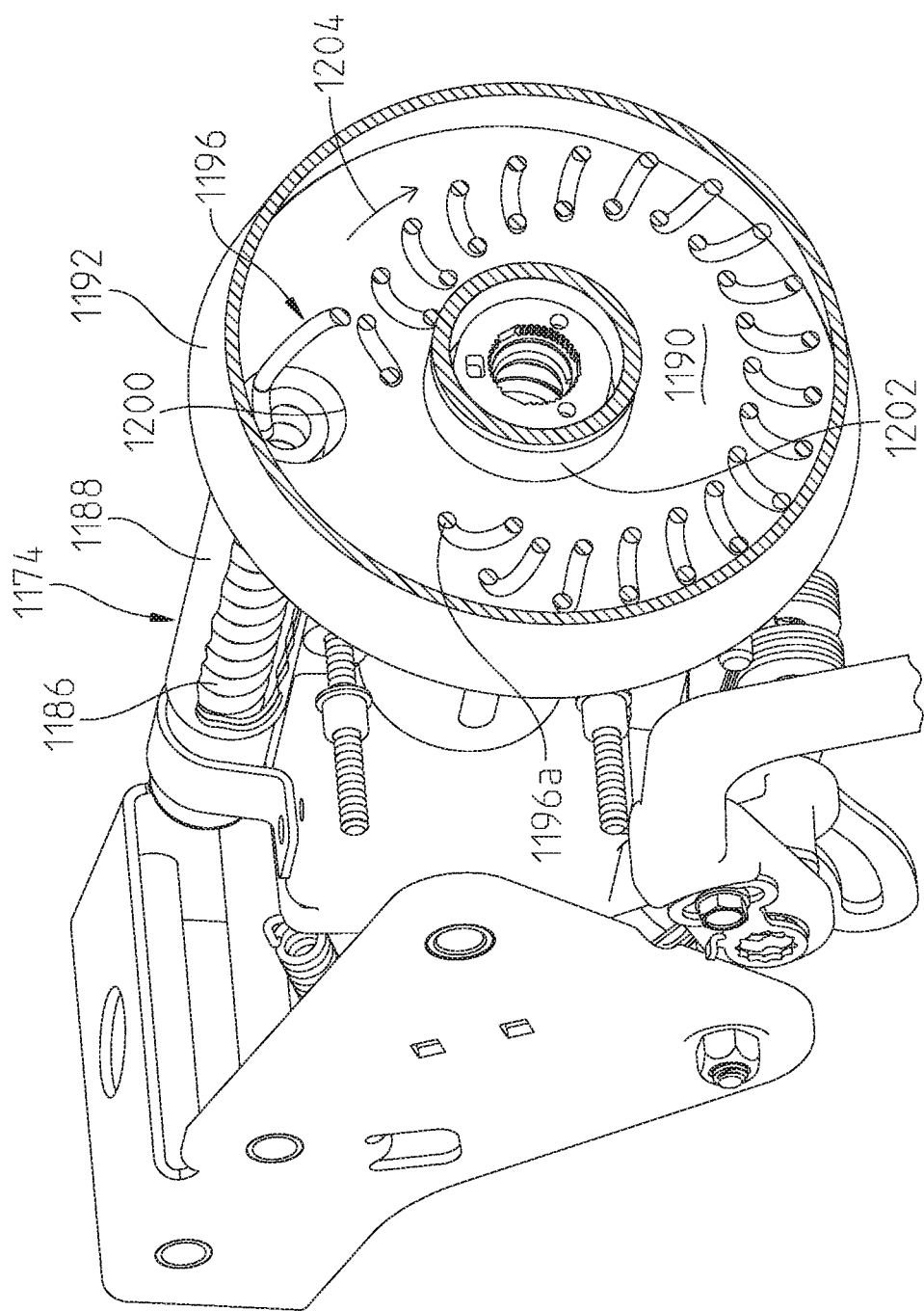
FIG. 65 is a cross-sectional view through lines 65-65 of FIG. 63.
Figure 66:
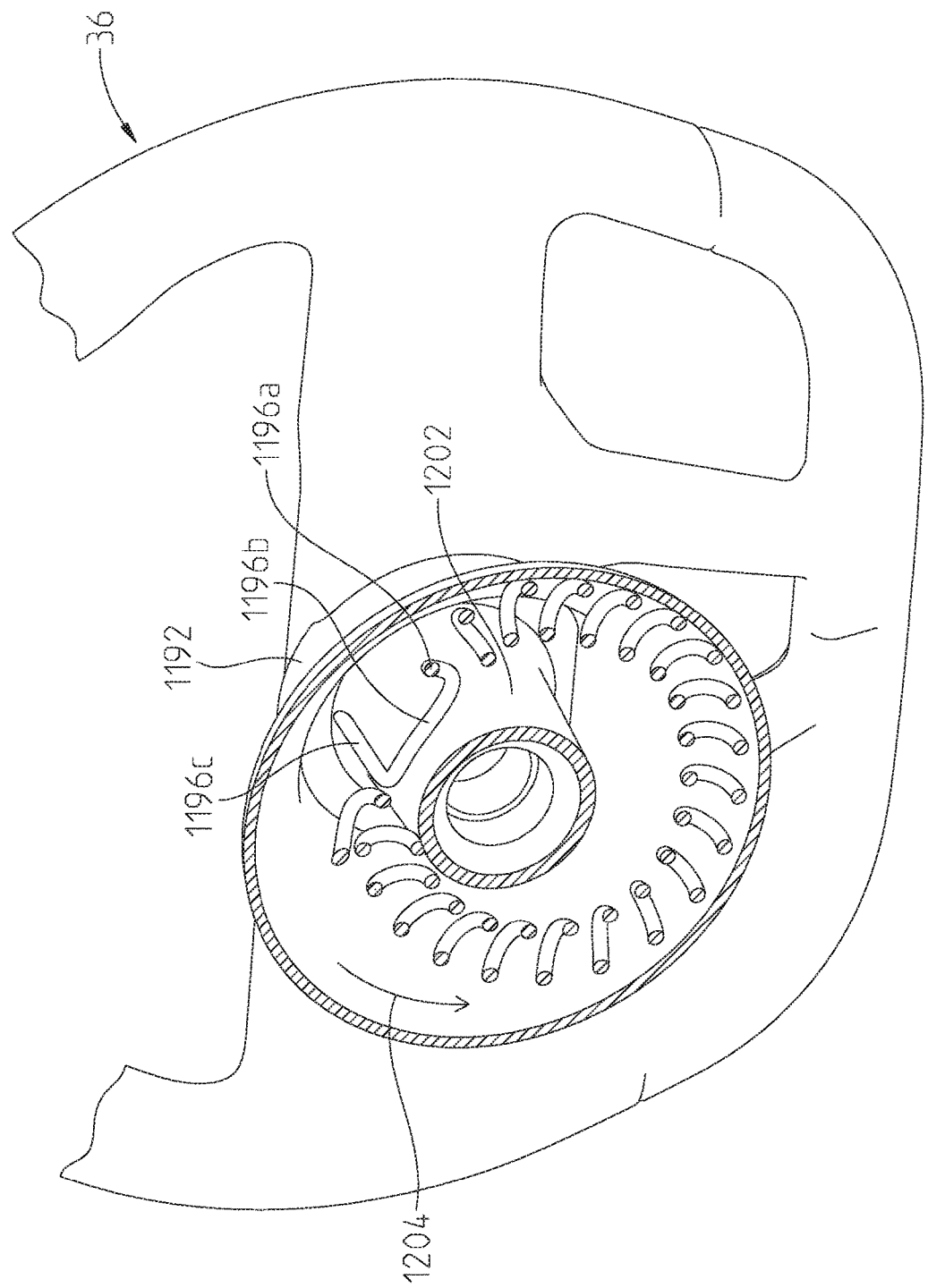
FIG. 66 is a cross-sectional view through lines 66-66 of FIG. 63.

With reference now to FIGS. 65 and 66, the cord portion 1196 will be described in greater detail. As shown, the cord 1186 extends through an opening 1200 defined at the intersection of the tubular portion 1188 and the plate portion 1190. The cord portion 1196 extends around the steering column 1202 and is wrapped in the direction of arrow 1204. The cord is wrapped to a position 1196a, where it extends laterally at 1196b, and then forms a portion 1196 which extends rearwardly and interfaces the front portion 1210 of the steering wheel 36. In this way, a robust yet sealed connection is provided which improves over the clock-spring style connections used in prior vehicles. This design has proven effective in the environment intended for the vehicle described herein, where dust and dirt may be present.

Figure 67:
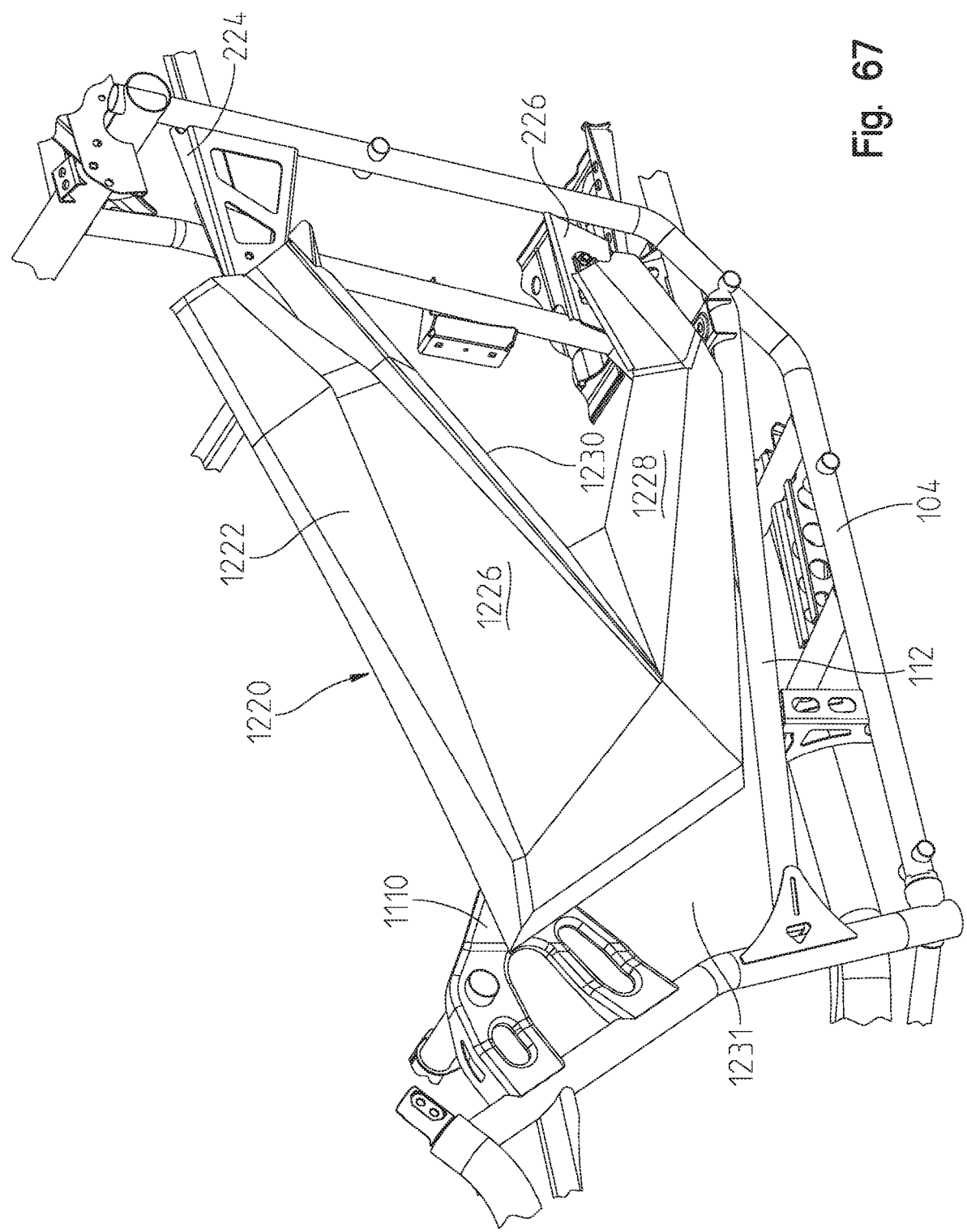
FIG. 67 shows a left front perspective view of the driver's side door.
Figure 68:
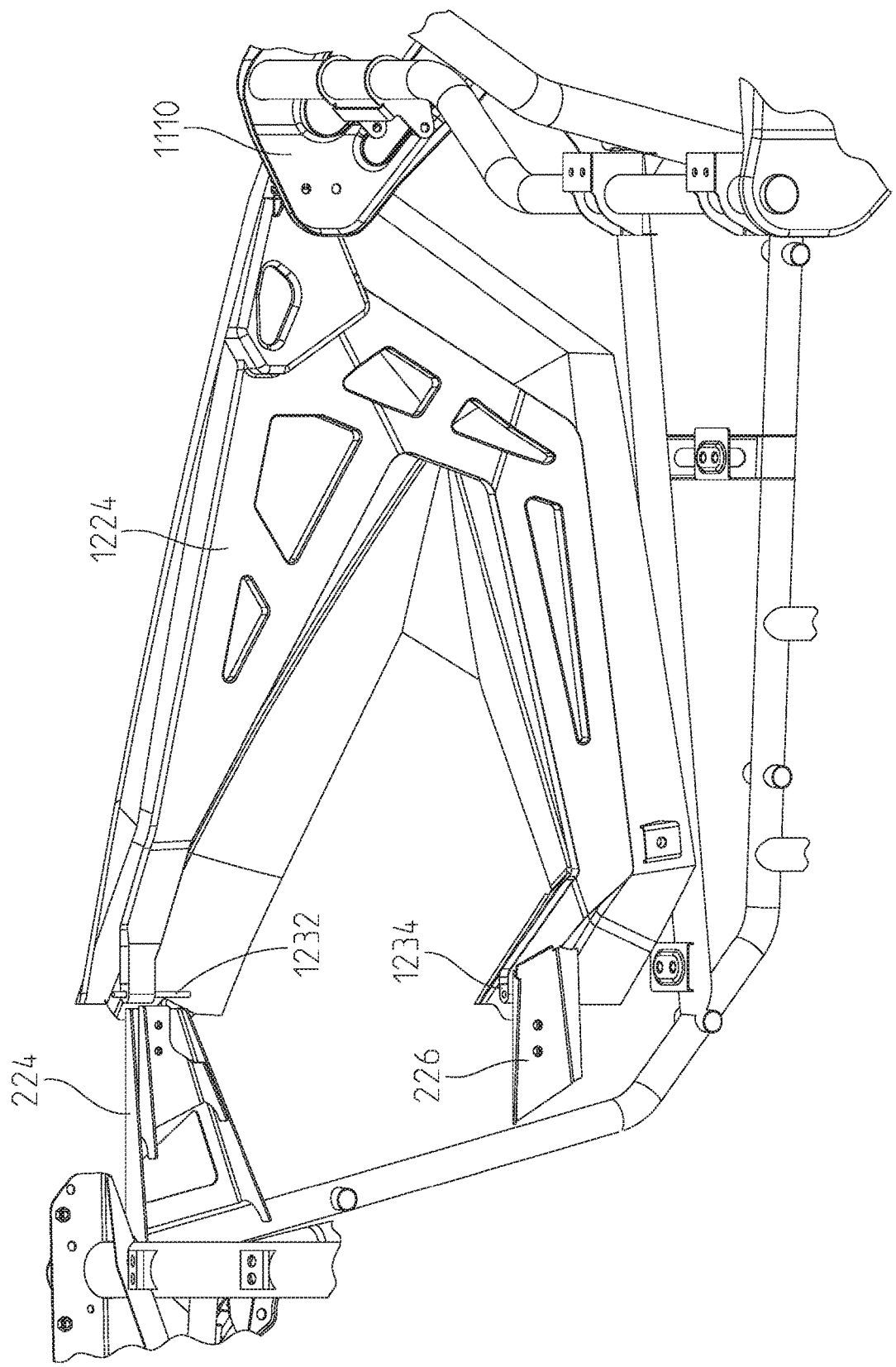
FIG. 68 shows an inside perspective view of the driver's side door of FIG. 67.

With reference now to FIGS. 67 and 68, a door assembly 1220 of the vehicle is shown, including a body portion 1222 and an inner frame portion 1224 (FIG. 68). Body portion 1222 is generally V-shaped, including an upper leg 1226 and a lower leg 1228 defining an opening 1230 therethrough allowing escape of the air in the cabin to move outwardly and to create an air flow therethrough. Opening 1231 at the front end thereof also provides an area for air to escape from the cabin. Frame 1224 is hingedly coupled to the frame brackets 224 and 226 at a rear side of the door 1220 and is latched to the bolster plate 1110. Thus, the door swings outwardly about hinges 1232, 1234 but latches at the front end thereof.

With reference now to FIGS. 69-72, an alternate steering assembly will be described which is an alternative to that which is shown in FIGS. 62-66. Steering assembly 1350 is shown with steering wheel 1352. Steering assembly 1350 generally includes a power steering motor 1170 (FIG. 62), a frame portion 1354, a wiring housing 1356, and a disengagement lever 1358. The steering wheel 1352 is also longitudinally movable in the directions of arrow 1364. Springs 1370 provides a biasing force in the position of arrow 1360.

Figure 69:
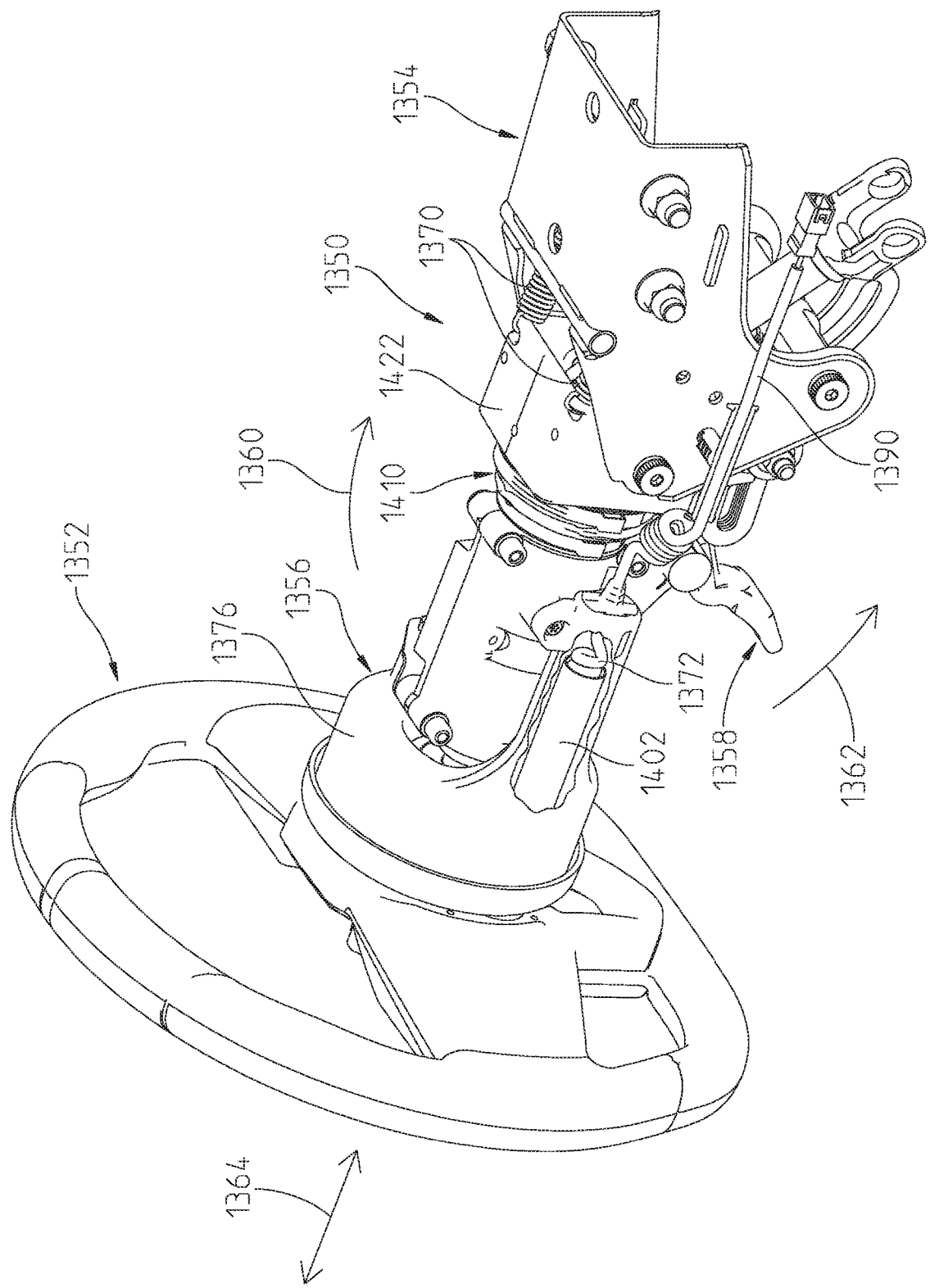
FIG. 69 is a right rear perspective view which is an alternative to the steering mechanism shown in FIG. 62.
Figure 70:
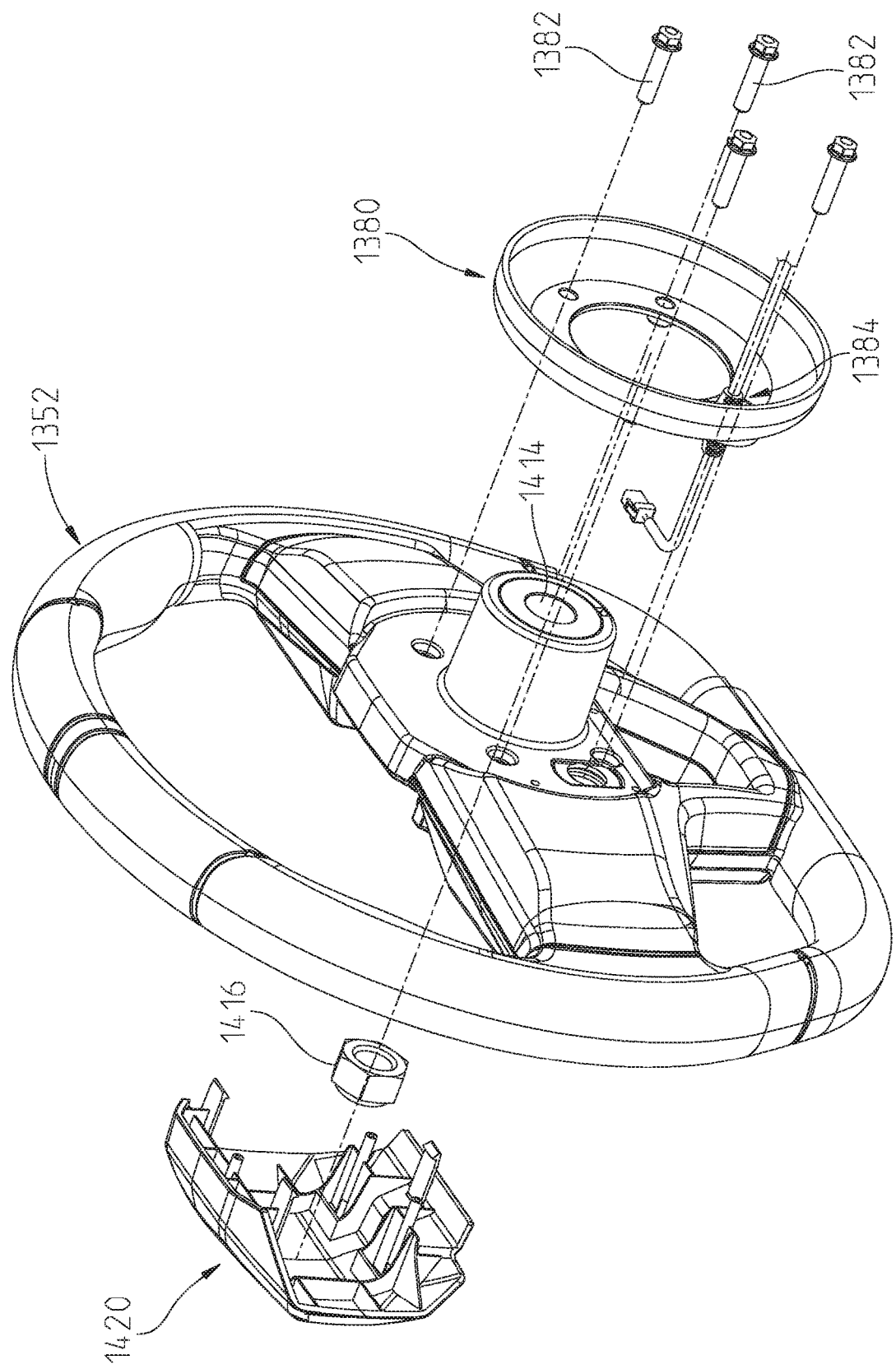
FIG. 70 is a rear right perspective view of the steering wheel shown in FIG. 69, partially exploded.
Figure 71:
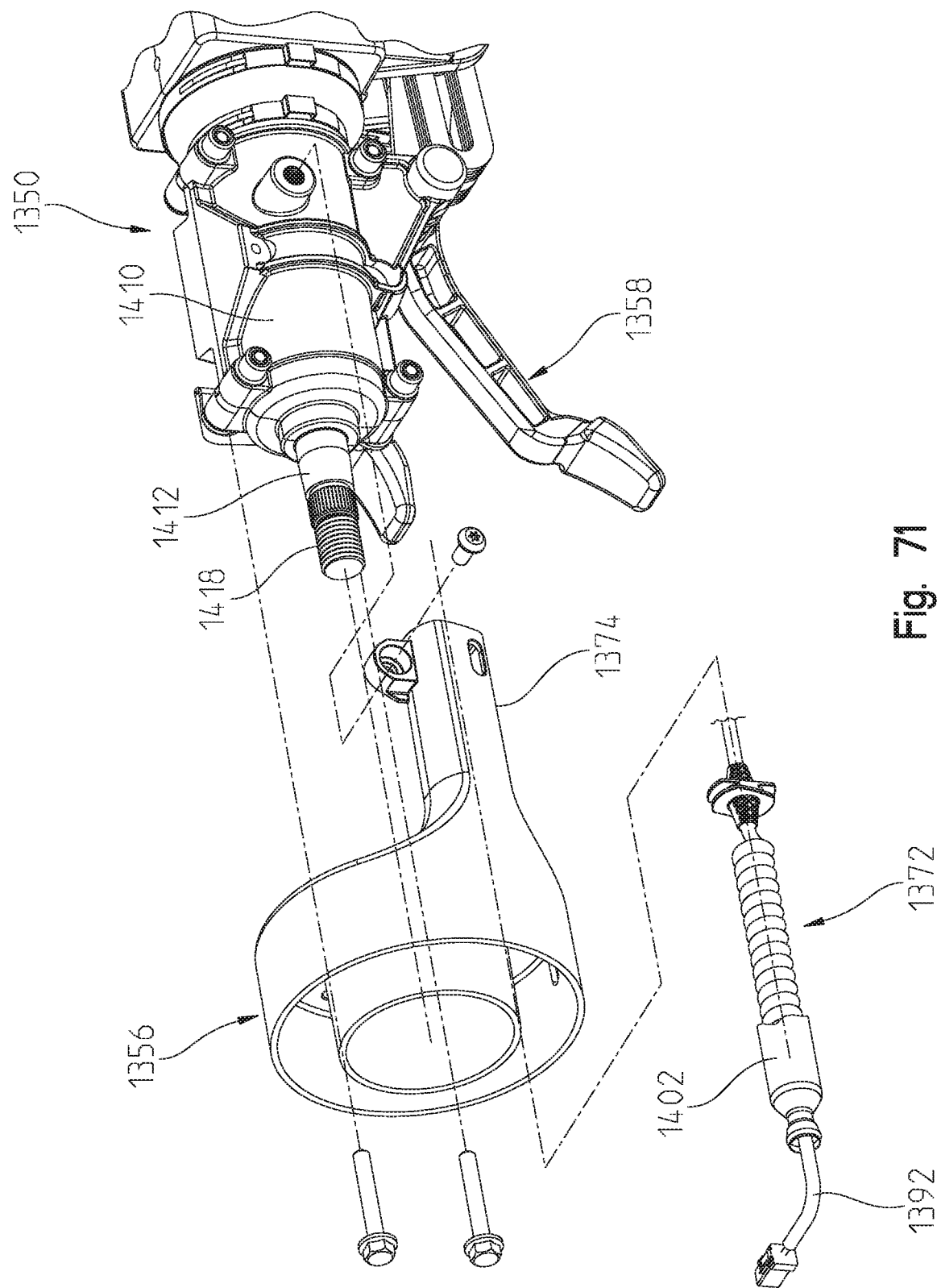
FIG. 71 is a right front perspective view of the steering mechanism of FIG. 69 partially exploded, without the steering wheel.
Figure 72:
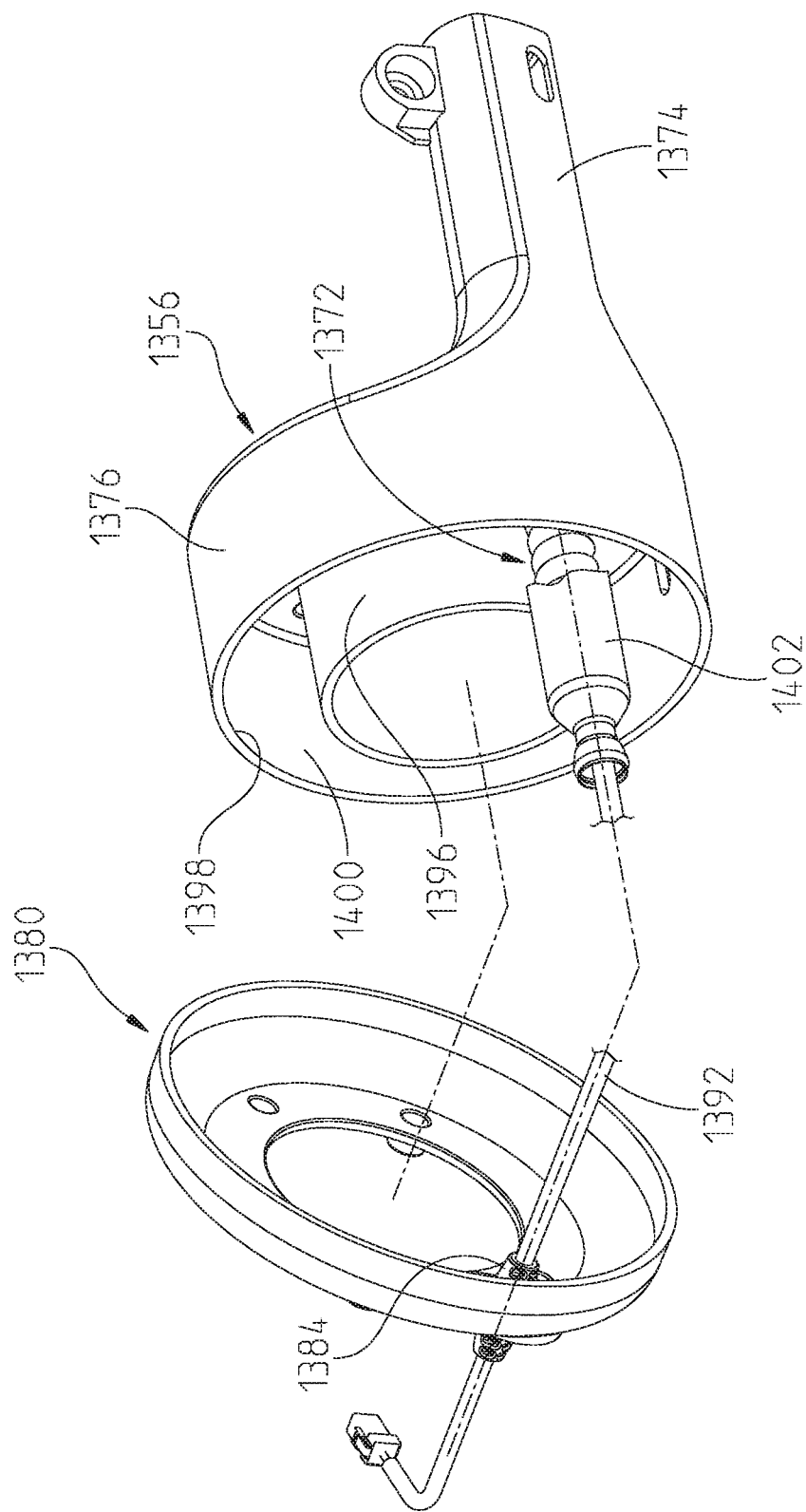
FIG. 72 is a partially exploded view of the wiring housing of the steering mechanism of FIG. 69.

As shown in FIGS. 69-72, the steering assembly has been modified to allow power to interface to the front of the steering wheel 1352 for such items as control features, yet allow the steering wheel to rotate, without the use of a clock spring. As shown best in FIG. 69, the steering assembly 1350 is shown with the wiring housing 1356 partially broken away to show the internal electrical cord 1372. Housing 1356 includes a tubular portion 1374 in which the cord 1372 extends. A cap portion 1376 of the wiring housing 1356 is positioned adjacent to the steering wheel 1352. As shown in FIGS. 70 and 72, a cup portion 1380 is coupled to the backside of the steering wheel 1352 by way of fasteners 1382. The cup portion 1380 includes a wiring outlet 1384 extending from a backside through to the frontside of the cup portion 1380. As shown in FIGS. 69 and 70, the cord 1372 has a portion 1390 extending from the housing 1356 and a portion 1392 which extends under the cap portion 1376 and then protrudes though the wiring outlet 1384.

With reference now to FIG. 72, the cord 1372 will be described in greater detail. As shown, the cord 1372 extends through the tubular portion 1374 and into the cap portion 1376. The wiring housing 1356 includes an inner diameter wall 1396 which together with an inner diameter 1398 of cap portion 1376, defines an annular opening 1400. Thus when steering wheel 1352 turns, cup portion 1380 turns with the steering wheel 1352 and the cord 1372 is wrapped around the inner diameter wall 1396 and moves within the annular opening 1400. The cord 1372 can expand and contract due to its coiled configuration and may be covered by a sleeve 1402 for sealing purposes. As the tubular portion 1374 is positioned along the side of the steering column, a gauge may be positioned on the cap portion and be movable therewith. Alternatively, the gauge may be positioned on the top of the steering column.

As shown best in FIGS. 69 and 71, steering assembly 1350 includes a housing 1410 from which steering post 1412 extends. Steering post 1412 extends through the wiring housing 1356, though the cup portion 1380 and through an opening 1414 of the steering wheel 1352 (FIG. 70). A fastener 1416 couples with the threads 1418 (FIG. 71) on the steering post 1412. It should be understood that moving the lever 1358 allows the housing 1410 to rotate in the direction of arrows 1360, 1362 (FIG. 69) relative to frame portion 1354. This also allows the steering post 1412 to move longitudinally relative to the remainder of the steering assembly. A decorative cover portion 1420 can be coupled to the steering wheel 1352 to cover fastener 1416. In this way, a robust yet sealed connection is provided which improves over the clock-spring style connections used in prior vehicles. This design has proven effective in the environment intended for the vehicle described herein, where dust and dirt may be present. Also a gauge (see FIG. 3) can be mounted to an upper surface 1422 and tilt with the steering assembly 1350 but not telescope. This self adjusts the position of the gauge 1424 as the rider adjusts the tilt position of the steering assembly 1350.

Figure 73:
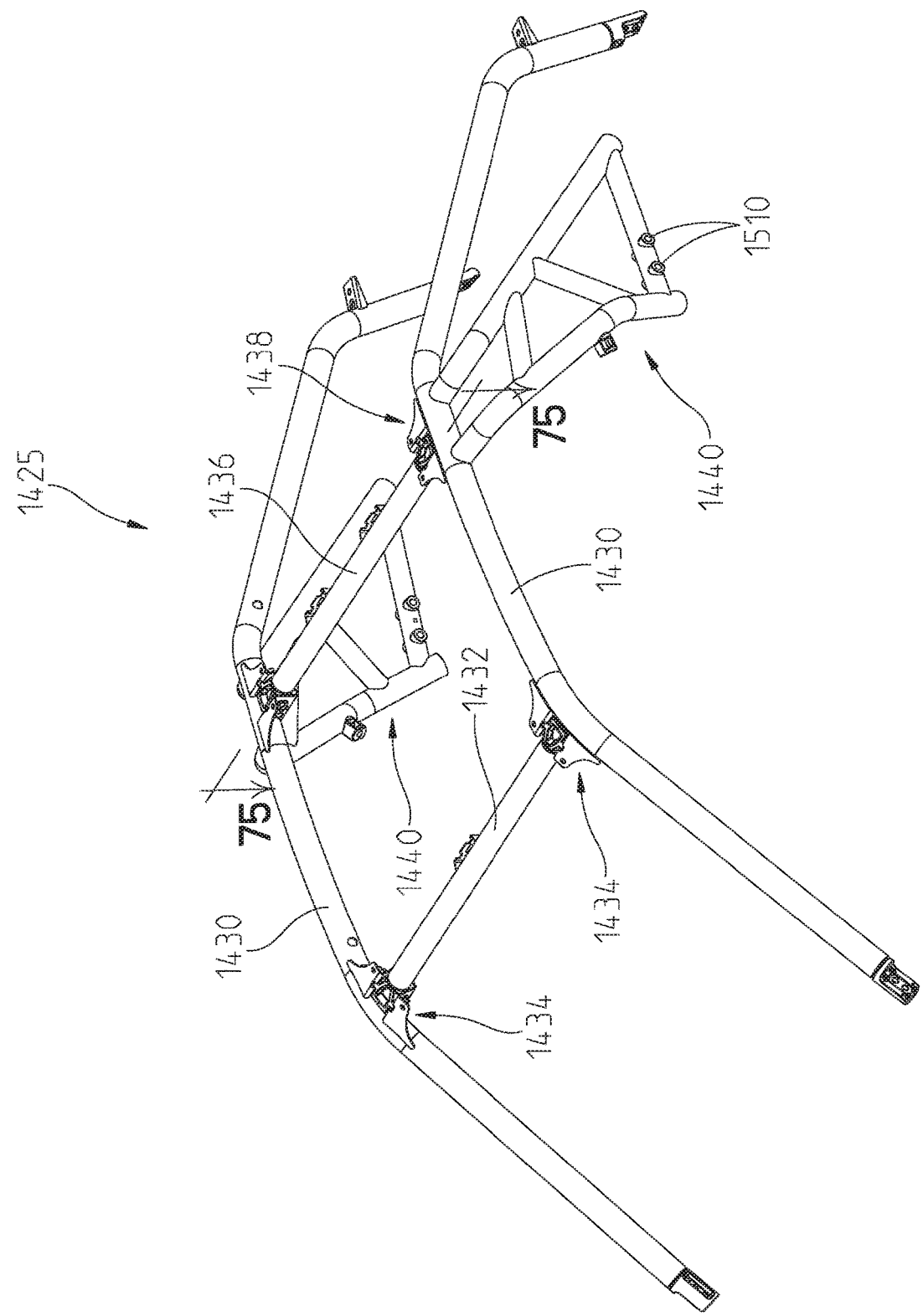
FIG. 73 shows an alternate cab frame for the vehicle which is an alternative to the cab frames shown in FIGS. 27-32c.
Figure 74:
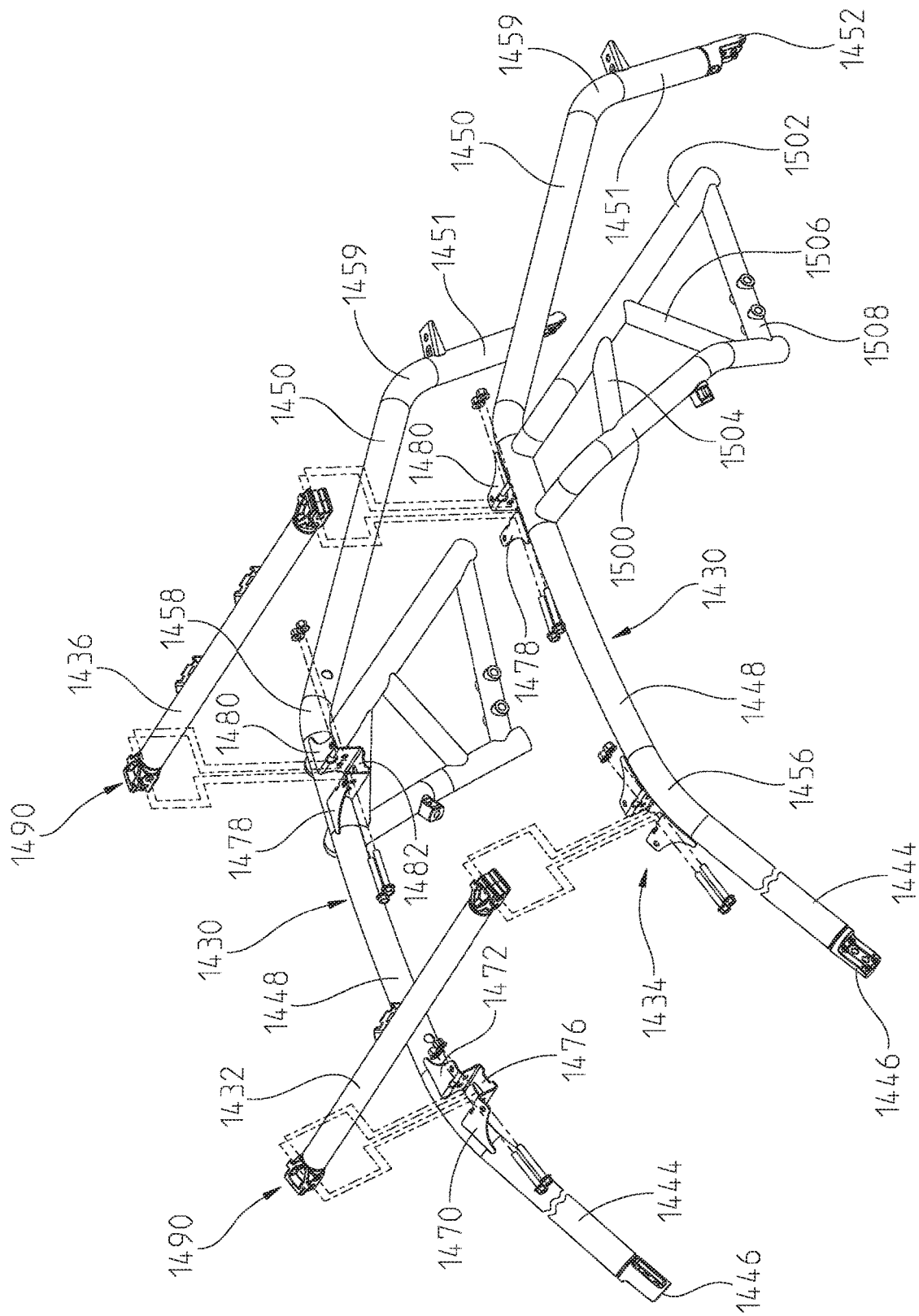
FIG. 74 is a partially exploded view of the cab frame of FIG. 73.
Figure 75:
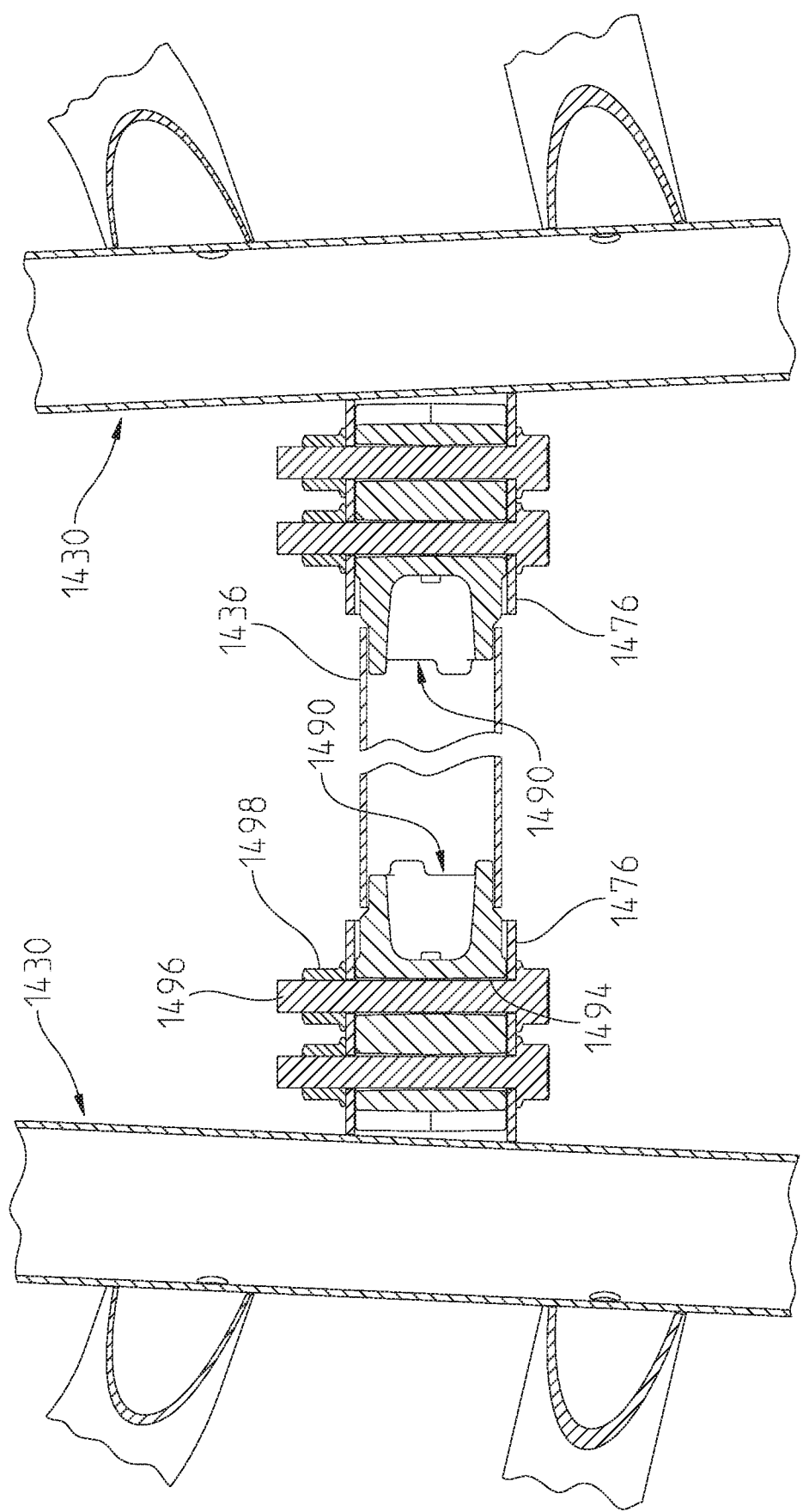
FIG. 75 is a cross sectional view through lines 75-75 of FIG. 73.

With reference now to FIGS. 73-75, cab frame 1425 will be described in greater detail. As shown, cab frame 1425 generally includes frame tubes 1430, cross tube 1432, bracket assemblies 1434, cross tube 1436, bracket assemblies 1438 and pillar portions 1440. As shown best in FIG. 74, frame tubes 1430 are shown including a front portion 1444 having a coupler at 1446, a central portion 1448 and a rear portion at 1450, including a downwardly extending portion 1451 having couplers at 1452. Each of the front 1444, center 1448, rear 1450 and downwardly extending 1451 sections are separated by an angled portion at 1456, 1458 and 1459.

Bracket assemblies 1434 includes flanges 1470 and 1472, where each flange is coupled to a channel 1476 for receiving the cross tube 1432. In a like manner, bracket assemblies 1438 includes flanges 1478 and 1480, where each flange is coupled to a channel 1482 for receiving the cross tube 1436. The cross tubes 1432 and 1436 include inserts 1490 coupled to ends of the tubes 1343 and 1436, and are received in the channels as shown best in FIG. 74. As shown best in FIG. 75, inserts 1490 include apertures 1494, for receiving fasteners 1496, which couple to counter fasteners 1498.

Pillar 1440 is shown best in FIG. 74 as including a front tube 1500 and a rear tube 1502 with connecting tubes 1504, 1506 and 1508. Lower couplings 1510 allow the cab frame 1425 to be coupled to the vehicle frame.

It should be appreciated from the above description that the frame tubes 1430 are continuous one-piece members with bends at 1456, 1458 and 1459. Also, the inserts 1490 could be a cast material such as a cast aluminum.

Figure 76:
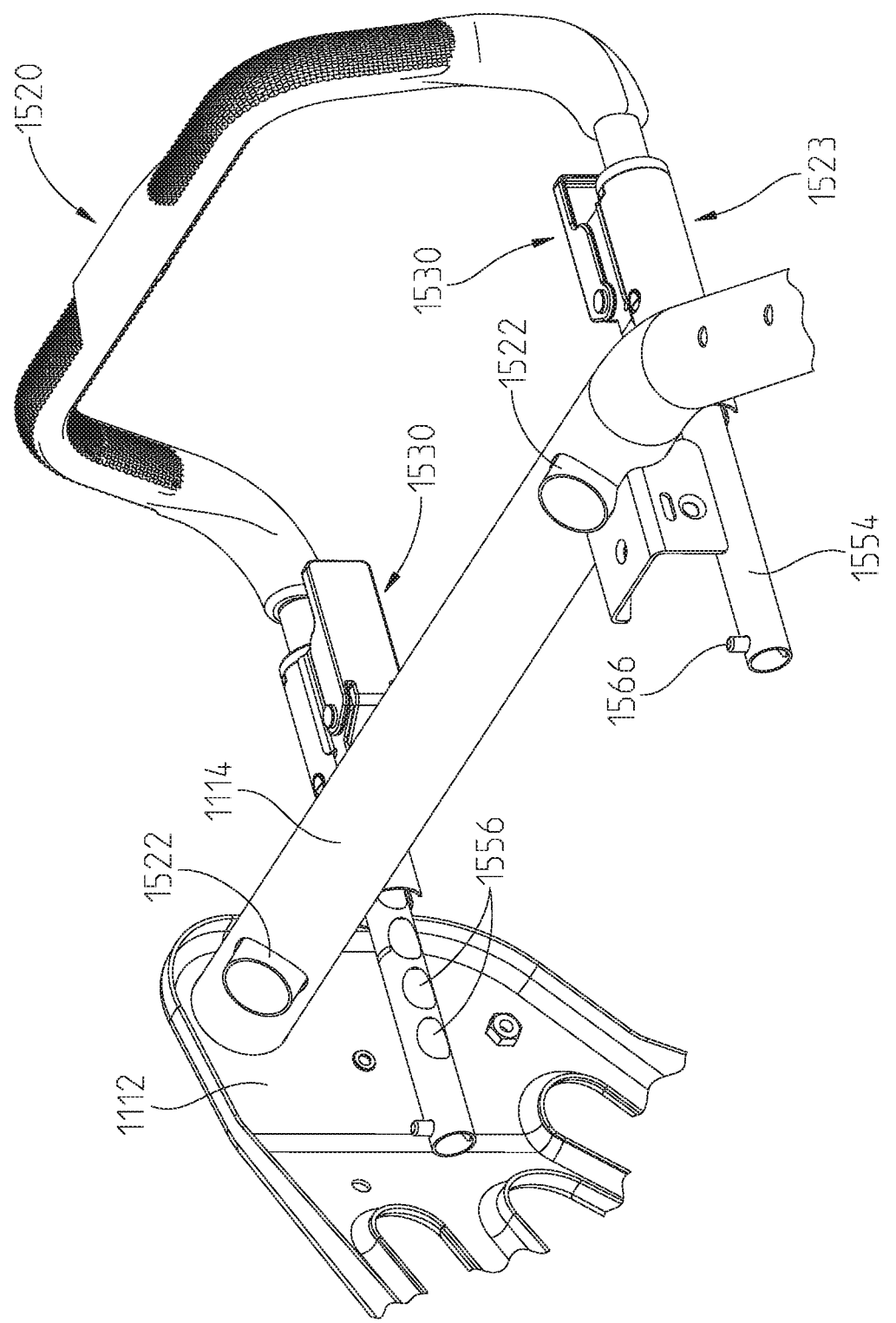
FIG. 76 is a front left perspective view of a passenger grab bar which is an alternative to the passenger grab bar shown in FIGS. 58-61.
Figure 77:
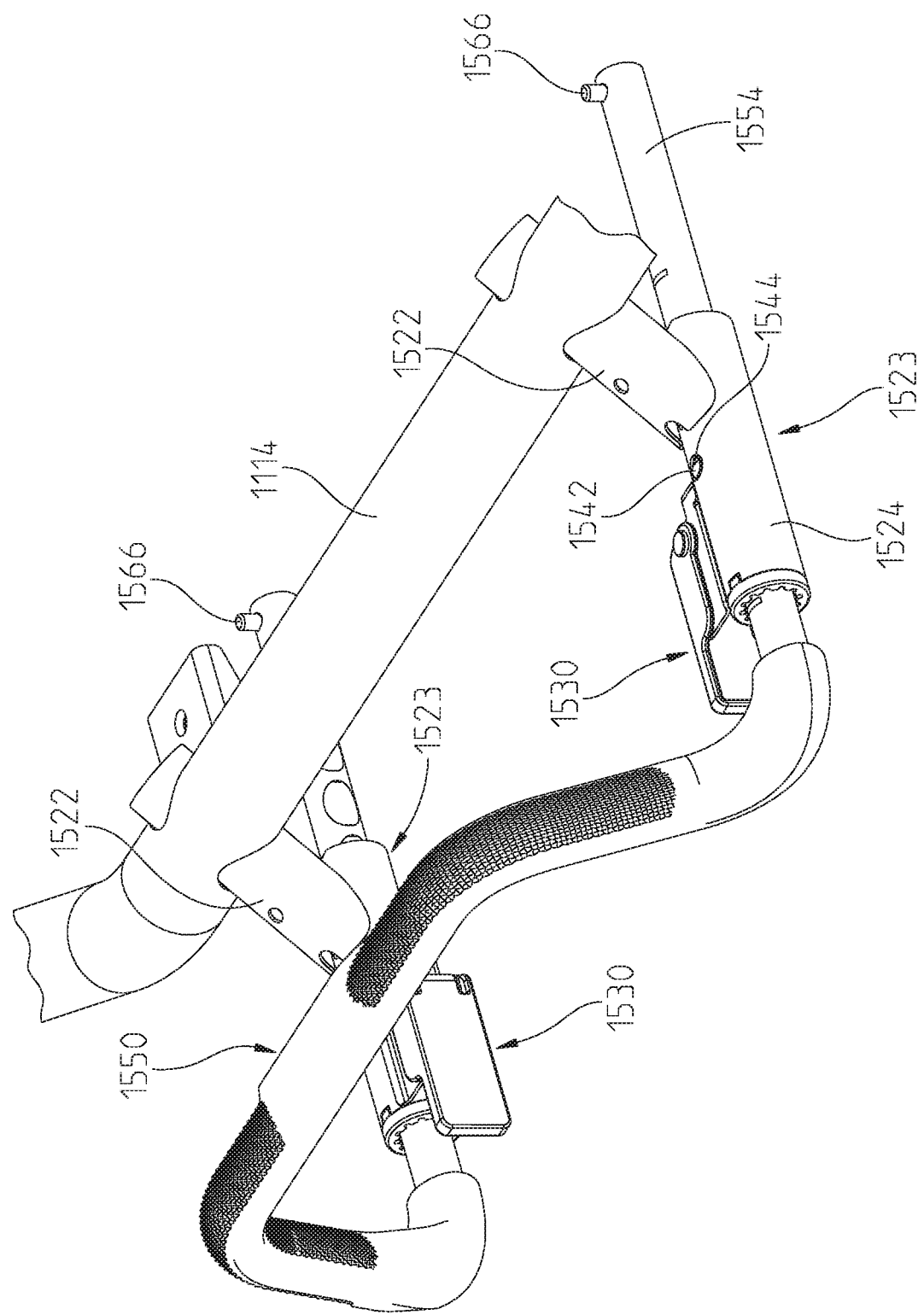
FIG. 77 shows a right rear perspective view of the passenger grab bar of FIG. 76.
Figure 78:
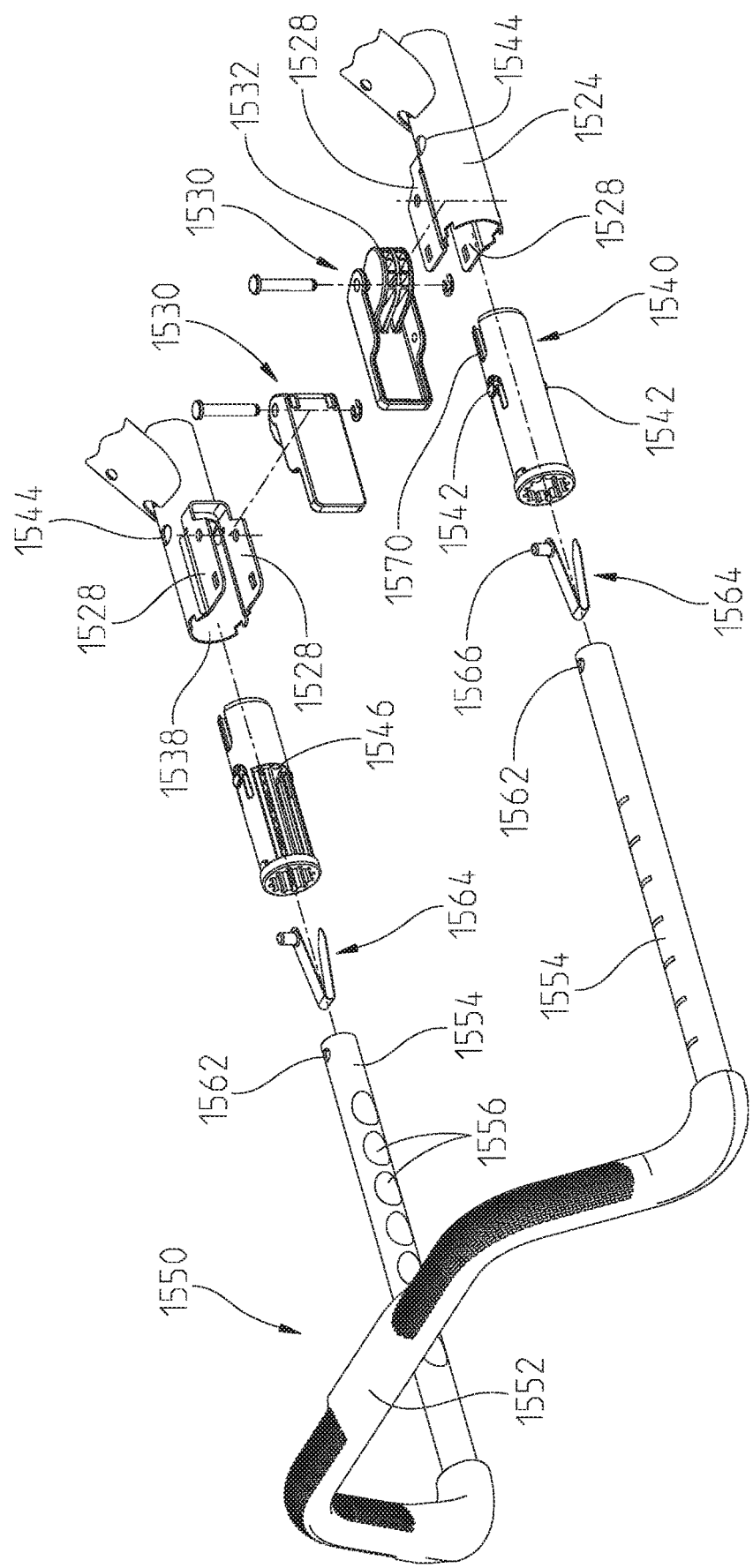
FIG. 78 is an exploded view of the passenger grab bar assembly of FIGS. 76 and 77.

With reference now to FIGS. 11 and 76-78, an alternate passenger grab bar 1520 will be described in greater detail. With reference first to FIG. 11, the frame includes a driver side bolster plate 1110, and a passenger side bolster plate 1112 which couples a cross tube 1114 thereto. Bolster plate 1112 is a stamped component which allows a lightweight solution and a custom shape offering rigidity. Alternatively, bolster plate 1112 could be a casting. As shown in FIGS. 76 and 77, tubes 1522 are coupled to the cross tube 1114 and to lower brackets 1523 are coupled to tubes 1522. As shown in FIG. 77, brackets 1523 include a tubular receiver 1524, where tubular receiver 1524 includes flanges 1528 (FIG. 78) which receive a rotary cam 1530 having an over center cam portion 1532. A sleeve 1540 is provided which is received in opening 1538 and has tab locks 1542 which cooperate with apertures 1544 of tubular receiver 1524. Sleeve 1540 has an opening 1546 (FIG. 78) at a side thereof which receives the cam lock 1530, as described further herein.

A grab handle 1550 of the assembly includes a U-shaped hand grip 1552 which may be covered with a grip portion, such as thermos-plastic rubber or a foam member, and two elongate attachment rods 1554. As shown best in FIG. 78, an inside of attachment rods 1554 includes scalloped detents 1556. A free end of each of the rods 1554 includes an aperture 1562. A leaf spring 1564 includes a guide tab 1566 positioned on one of the legs of the leaf spring 1564 and when positioned within open end of rod 1554, guide tab 1566 protrudes through aperture 1562.

Thus, when rods 1554 are inserted through sleeve 1540 and into tubular receiver 1524, the guide tab 1566 is positioned in a guide slot 1570 and when the rods 1554 are moved to the fully inserted position of FIG. 77, guide tabs 1566 protrude beyond the slot 1570, as shown in FIG. 77. The grab bar 1550 however, may be moved to multiple other positions closer to the seat of passenger by rotating the cam locks 1530 inwardly, disengaging the rotary cam 1532 from the scalloped portions 1556, and aligning a new scalloped portion 1556 with the rotary cam over center portion 1532 and moving the rotary cams 1530 back to the locked position. It should be understood that the guide tabs 1566 are positioned in the guide slot 1570 only when the grab bar 1550 is in the full rearward position, closest to the passenger, and forms a stop so that the grab bar cannot be pulled out of the chassis.

Figure 79:
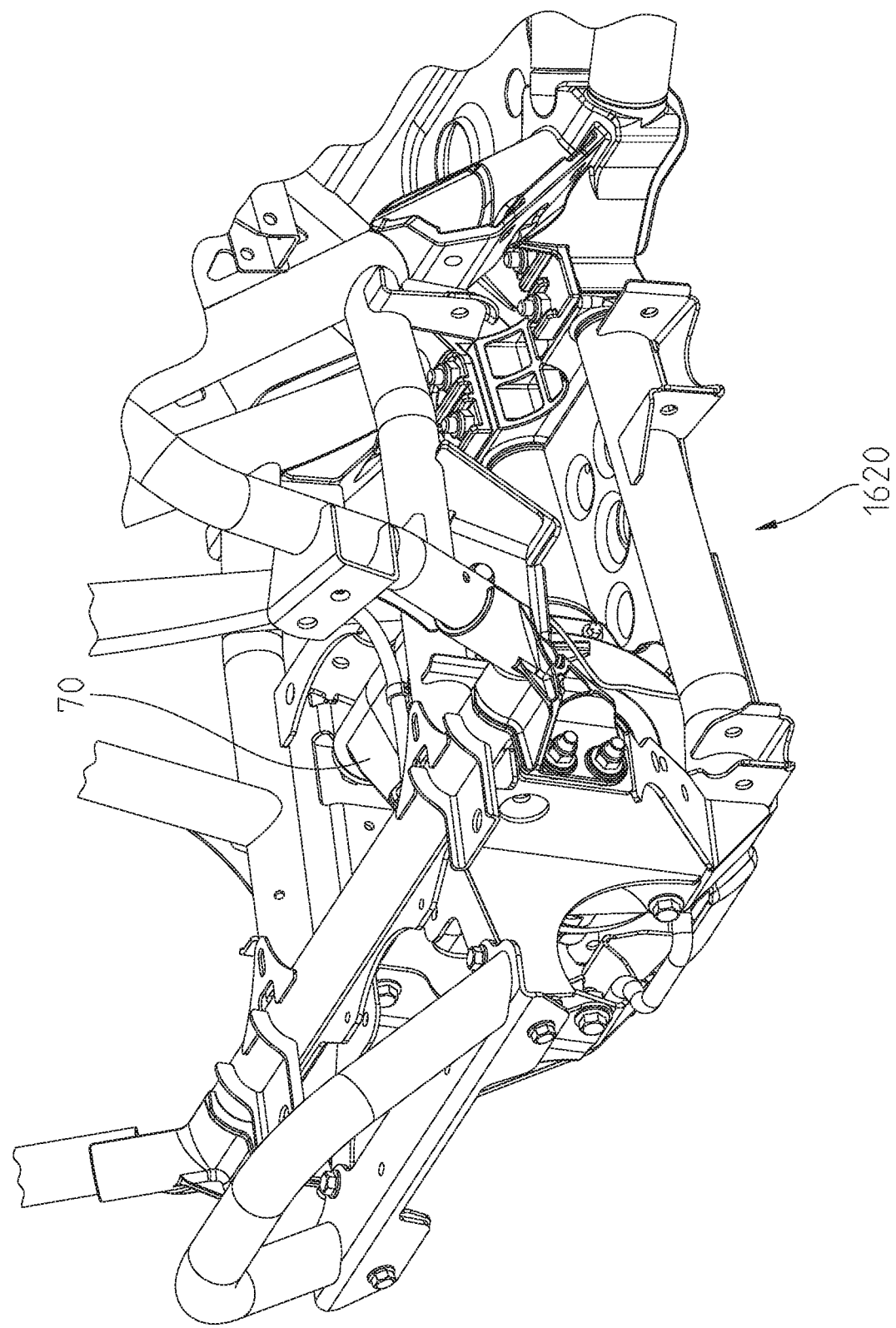
FIG. 79 is a front left perspective view of a removable frame assembly which is an alternative to the removable frame assembly shown in FIGS. 14-21.
Figure 80:
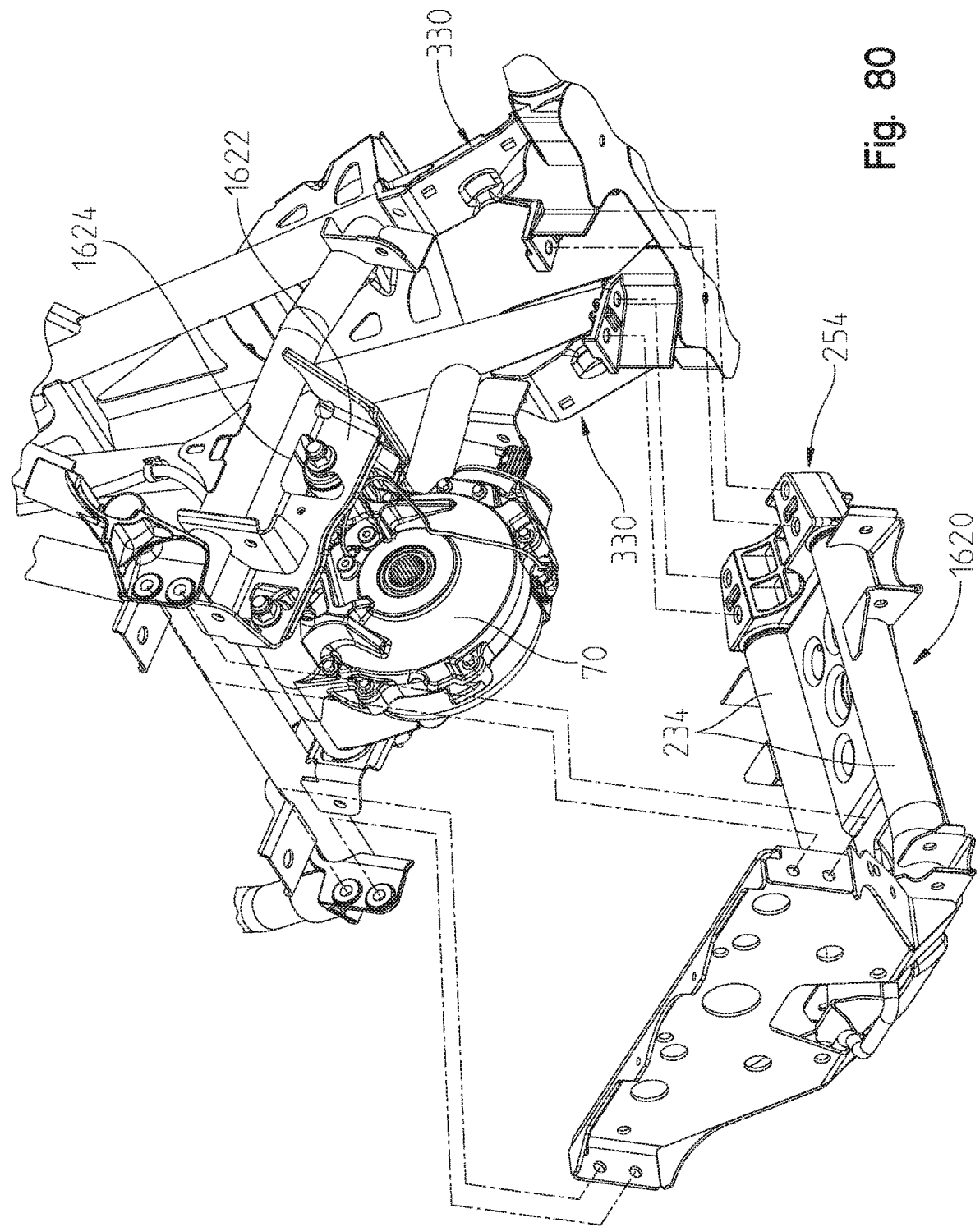
FIG. 80 shows a lower left perspective view of the frame of FIG. 79 with the removable frame portion shown exploded away from the remainder of the frame.

With reference now to FIGS. 79-80, an alternate removable front frame portion 1620 will be described in greater detail. As shown, removable front frame portion 1620 is similar to removable front frame portion 320 (FIG. 20) with the exception that brackets 1622 for mounting the differential include slotted openings 1624 which allows the front final drive 70 to be suspended from the brackets 1622. Removable portion 1620 also has frame tubes 234 having a coupler 254 which couples to the coupler 330 in a similar manner as described above.

Figure 81:
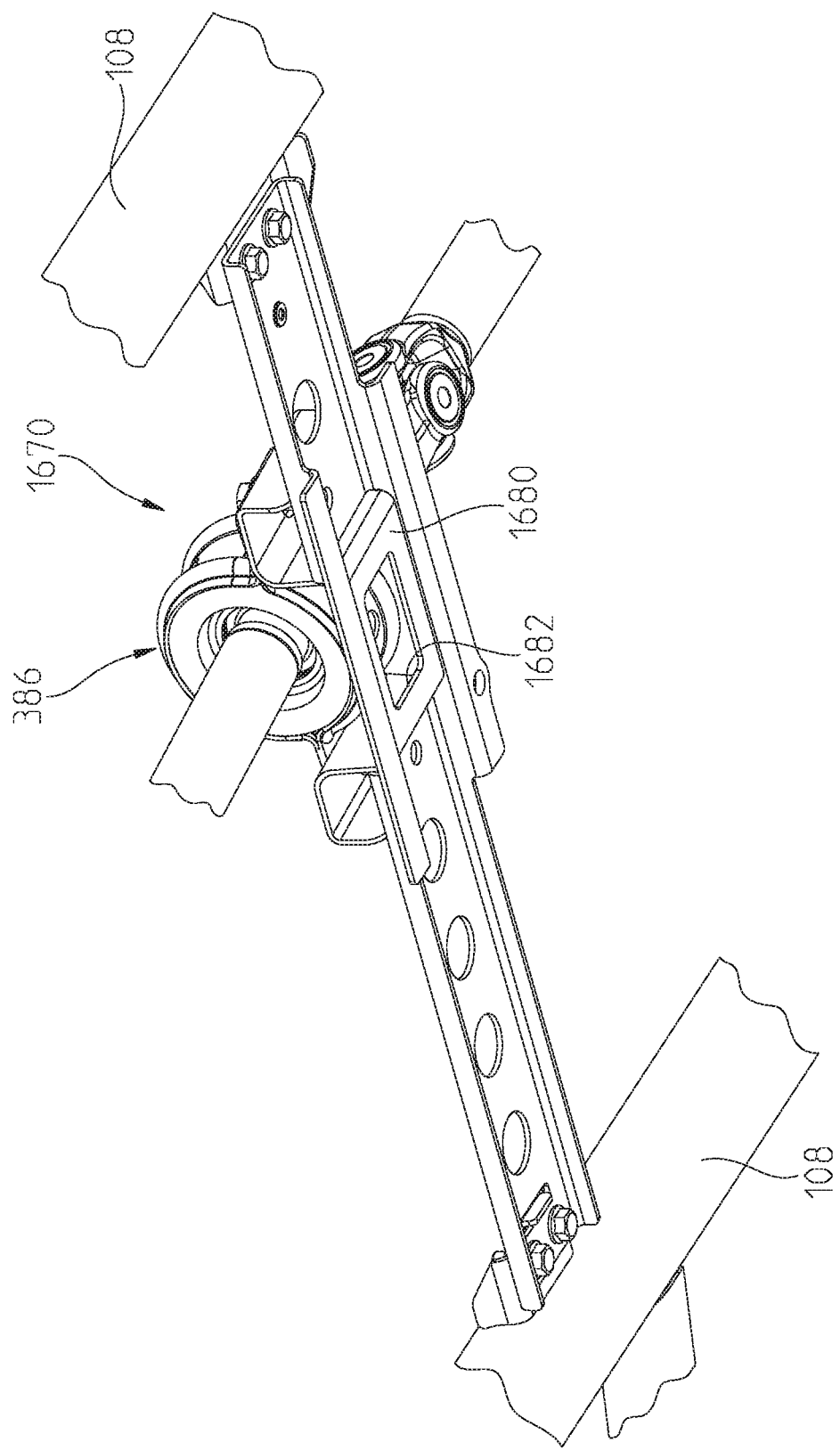
FIG. 81 shows a lower perspective view of the removable bearing which is an alternative to the bearing shown in FIGS. 24-26.
Figure 82:
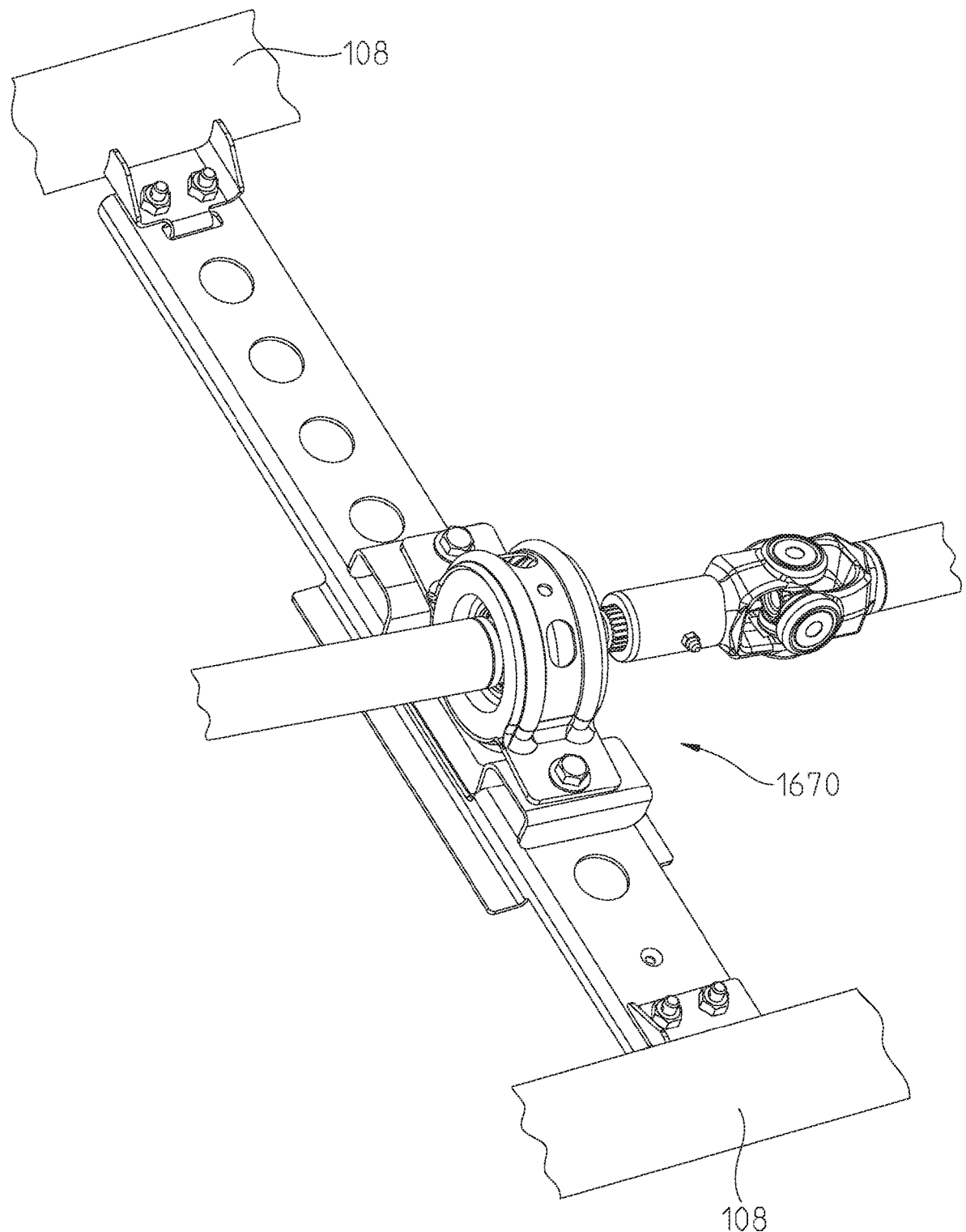
FIG. 82 is an upper left perspective view of the bearing assembly of FIG. 81.

With reference now to FIGS. 81-82, a removable bearing assembly 1670 will now be described. As shown, removable bearing assembly 1670 is shown attached and spanning the longitudinal portions 108. In this embodiment however, the recessed wall at 1680 has a window 1682, which provides direct access to bearing 386, whereas recessed wall 380 was solid (see FIG. 26). The removable bearing assembly 1670 is otherwise substantially identical to that shown and described in relation to FIGS. 24-26.

Figure 83:
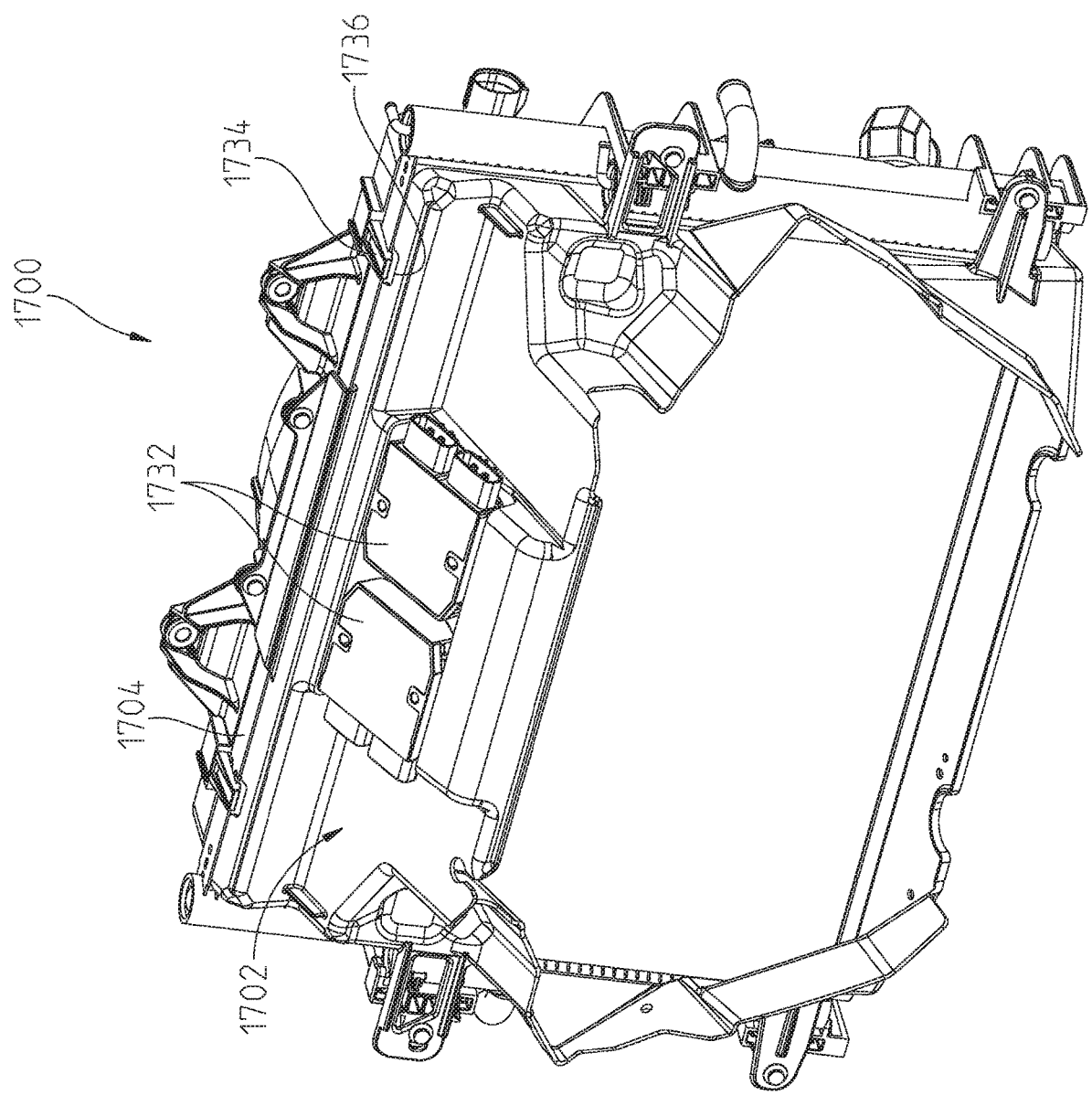
FIG. 83 shows a front left perspective view of the cooling assembly of the vehicle with the mounting location of the voltage regulators forward and above the radiator shroud.
Figure 84:
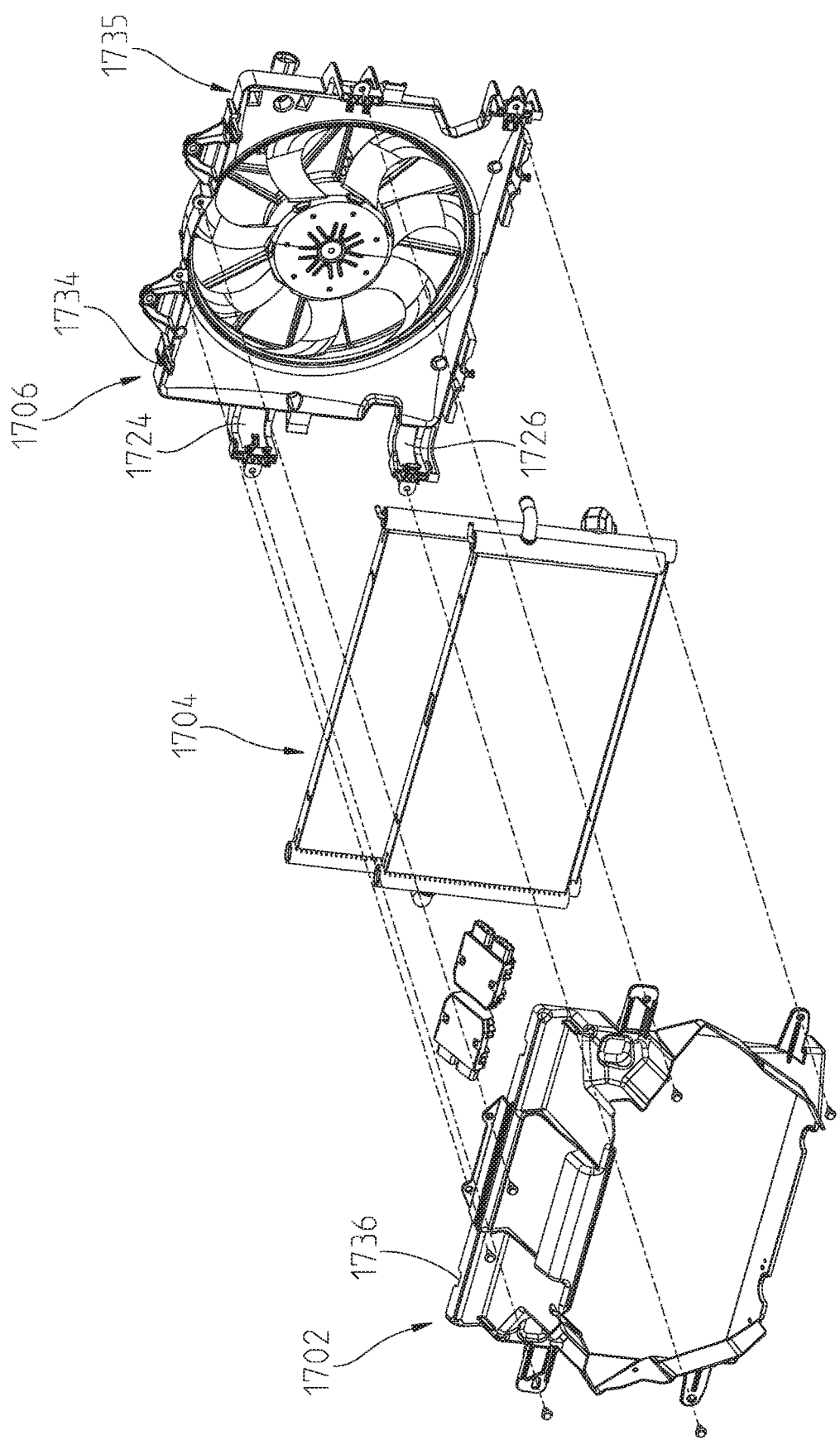
FIG. 84 shows an exploded view of the assembly shown in FIG. 83.
Figure 85:
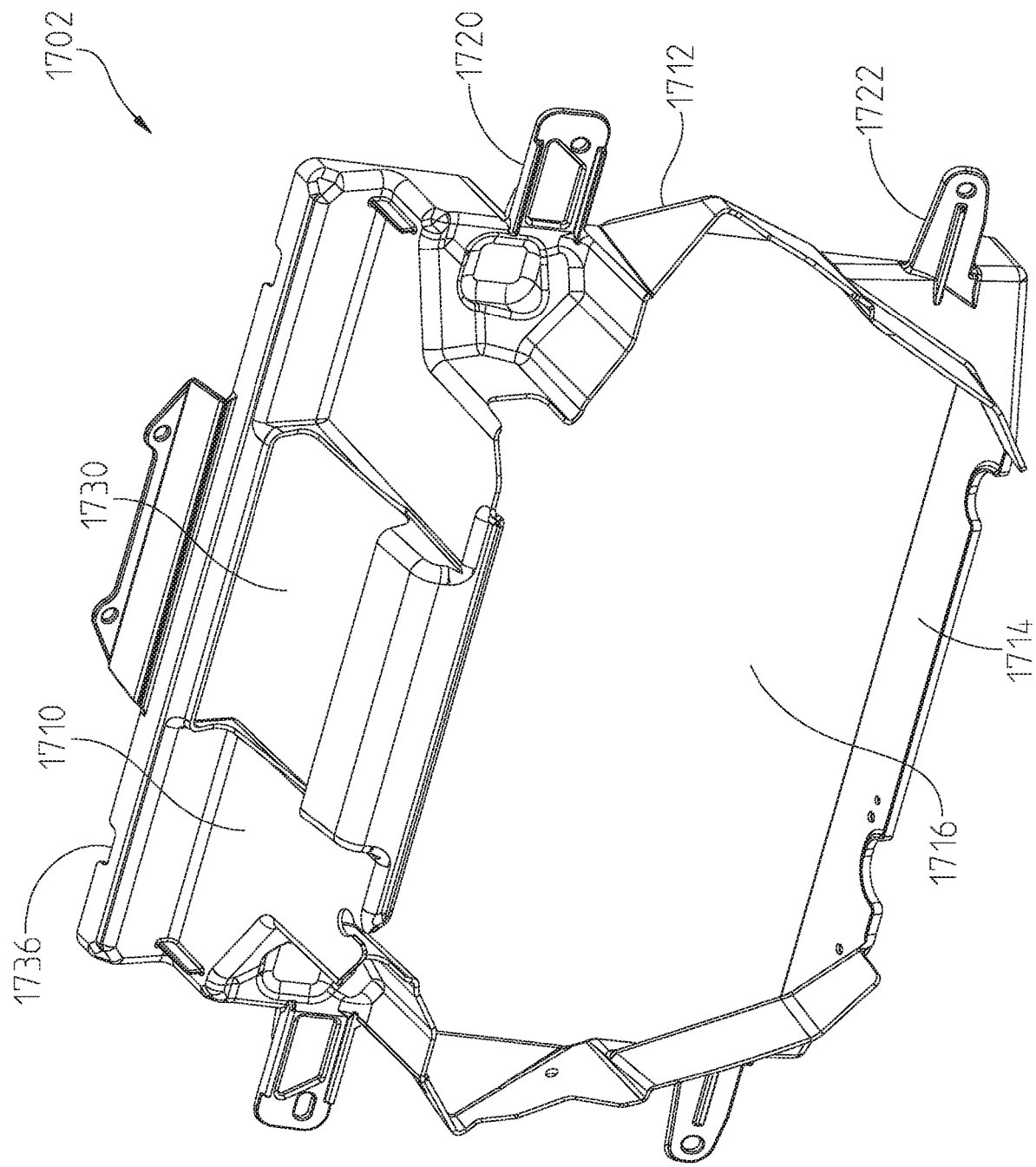
FIG. 85 shows a front left perspective view of the radiator shroud shown in FIG. 83.

With reference to FIGS. 83-85, a cooling system of the vehicle will be shown and described. As shown, cooling system is shown as 1700 which is generally comprised of a radiator shroud 1702, radiator 1704 and fan 1706. As shown best in FIG. 85, shroud 1702 is comprised of an upper wall at 1710, side walls at 1712 and a lower wall at 1714 where wall 1710-1714 define an opening 1716 which provides access for cooling air against radiator 1704. Side walls 1712 include flanges 1720 and 1722 for coupling with complimentary flanges 1724 and 1726 (FIG. 84) respectively. Upper wall 1710 includes a defined pocket at 1730 which as shown in FIG. 83, provides a mounting location for voltage regulators 1732. Voltage regulators are mounted to a bracket (not shown) which overlies the pocket 1730 and locates the voltage regulators in the pocket 1730 in the position shown in FIG. 83. As the shroud 1702 faces the front of the vehicle, air is moved into shroud 1702 across the radiator 1704 and through fan 1706. As voltage regulators 1732 sit in the direction of air flow, the air flow also cools the voltage regulators.

A shown in FIGS. 83 and 84, latches 1734 extend forwardly from fan housing 1735 and latch to radiator 1704 when in the position of FIG. 83. Shroud 1702 includes a notch 1736 for clearance which receives a leading edge of the latch 1734 as best shown in FIG. 83.

Figure 86:
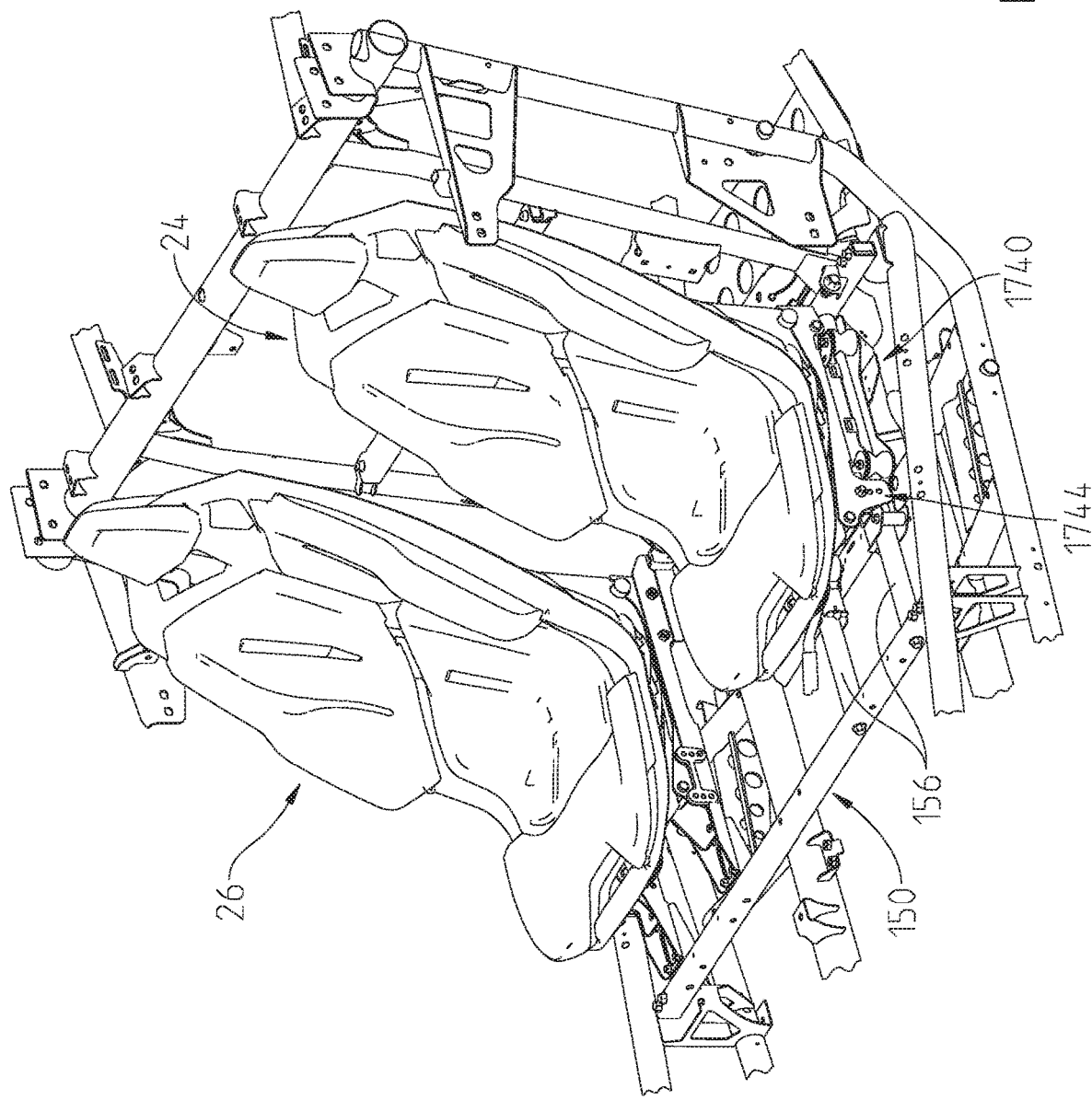
FIG. 86 shows a front left perspective view of the seating area which is an alternative to the seating area shown in distress in FIGS. 38-49.

With reference now to FIGS. 86-99, an alternate seating adjustment mechanism will be described which is an alternative to that shown in FIGS. 38-45. As shown, seating adjustment mechanism is shown as 1740 which allows the seat adjustment in both the for and at direction as well as the tilt direction. In the embodiment shown in FIG. 86, the for and at adjustment is substantially the same as that shown in FIGS. 38-45 and will therefore not be described in further detail with respect to FIG. 86. However, the tilt mechanism 1734 is somewhat different and will be described.

Figure 91:
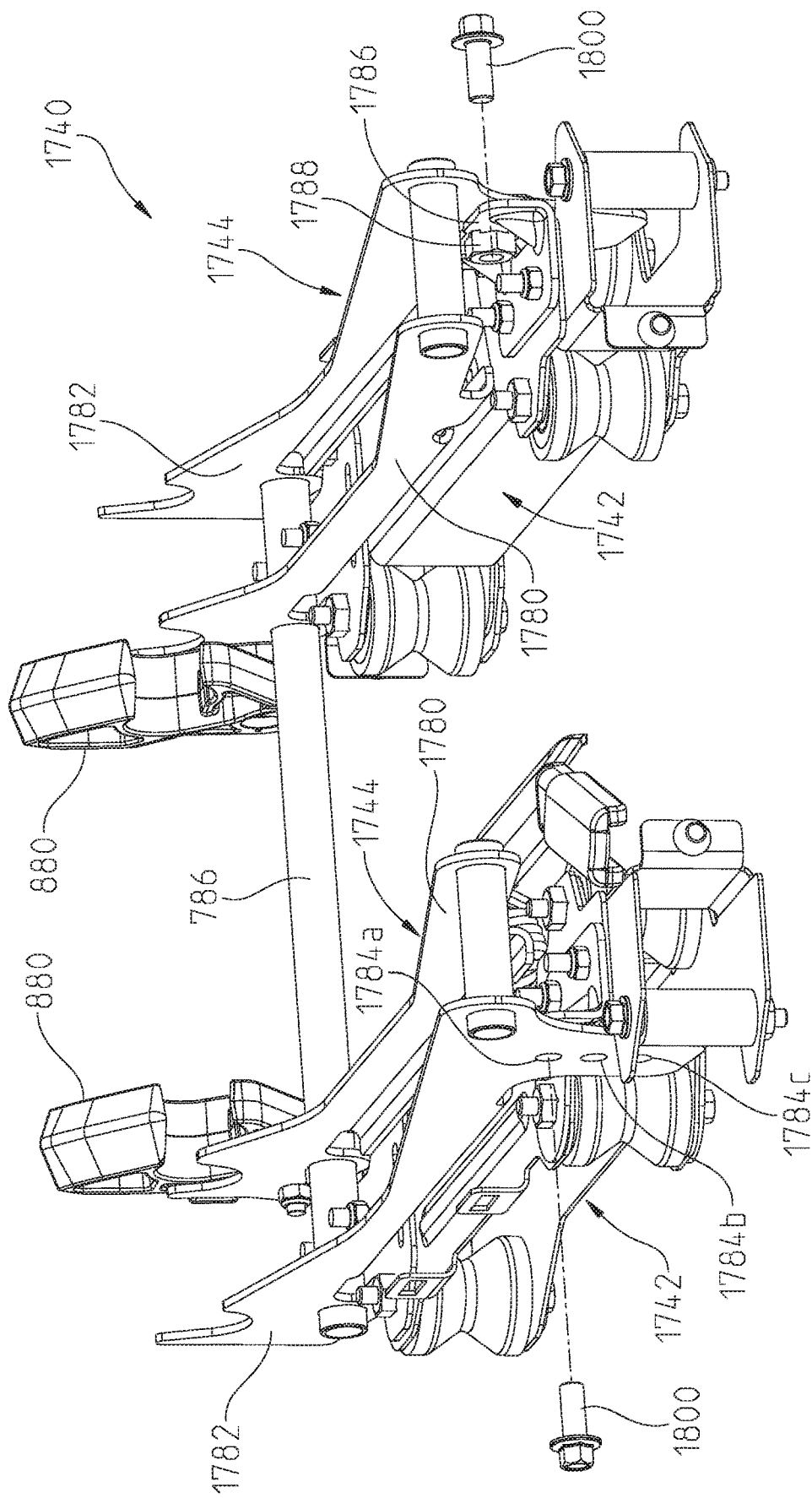
FIG. 91 shows a front right perspective view of the longitudinally movable track system of FIG. 86.

As shown best in FIG. 91, seat adjustment mechanism 1740 includes longitudinally movable track systems 1742 which are substantially similar to that shown in FIG. 43. The tilt mechanism 1744 includes inner frame members 1780 and outer frame members 1782 and in this configuration, allows only three discreet positions of tilt by way of apertures 1784a, 1784b and 1784c (FIG. 91). A bracket 1786 is coupled to the top of the longitudinally movable track systems 1742 to which a fastener 1788 is fixed. Fastener 1788 is internally threaded and can be aligned with any of the apertures 1784a, 1784b or 1784c by rotating the frame members 1780 and 1782. Fasteners 1800 are therefore provided which can be positioned into any of the apertures 1784a-1784c and be threadably engaged with fasteners 1788 to lock the frame members 1780 and 1782 in any one of the three tilt positions.

Figure 92:
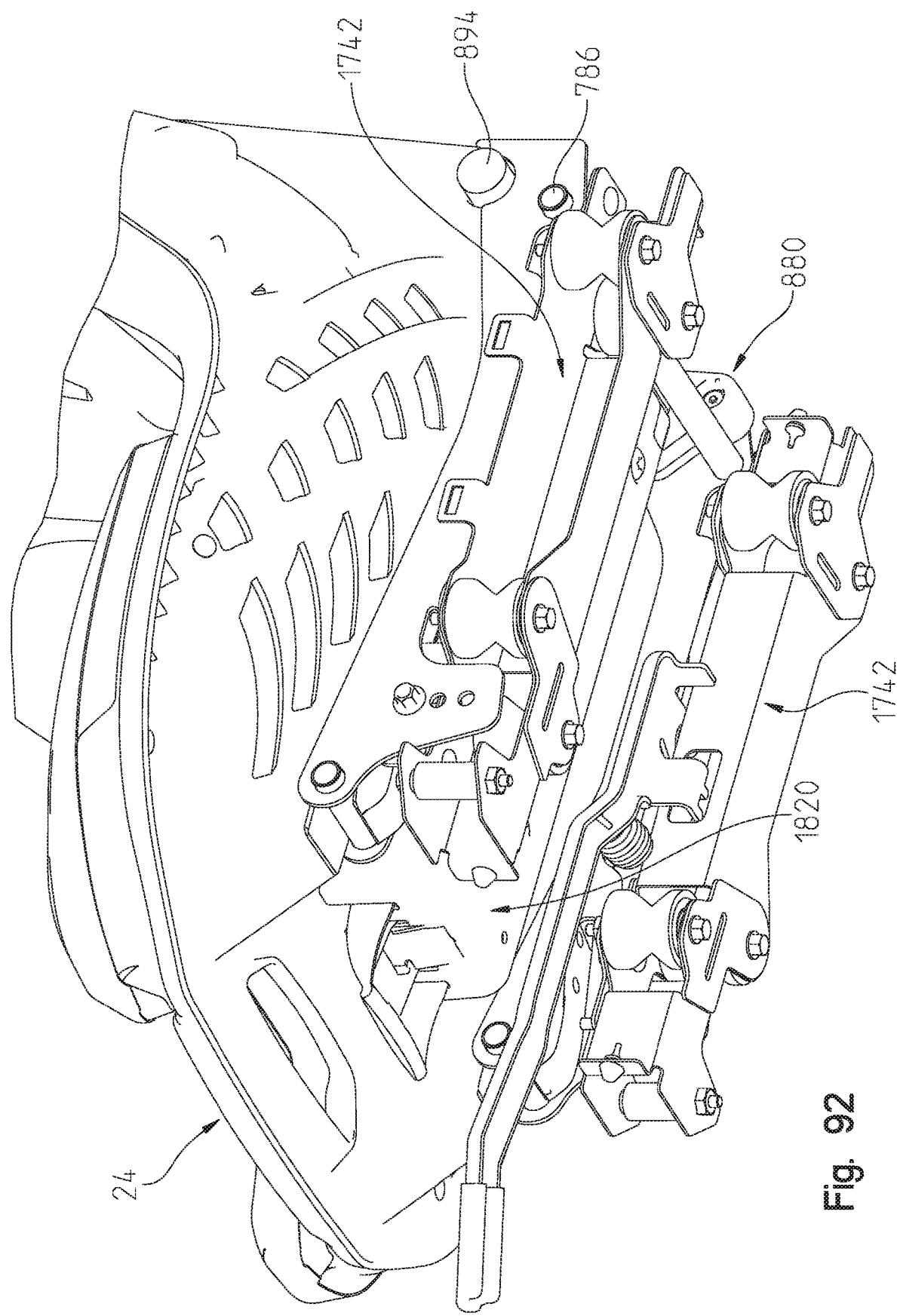
FIG. 92 shows an underside perspective view of the track system of FIG. 91 coupled to the bottom of the driver's seat.
Figure 93:
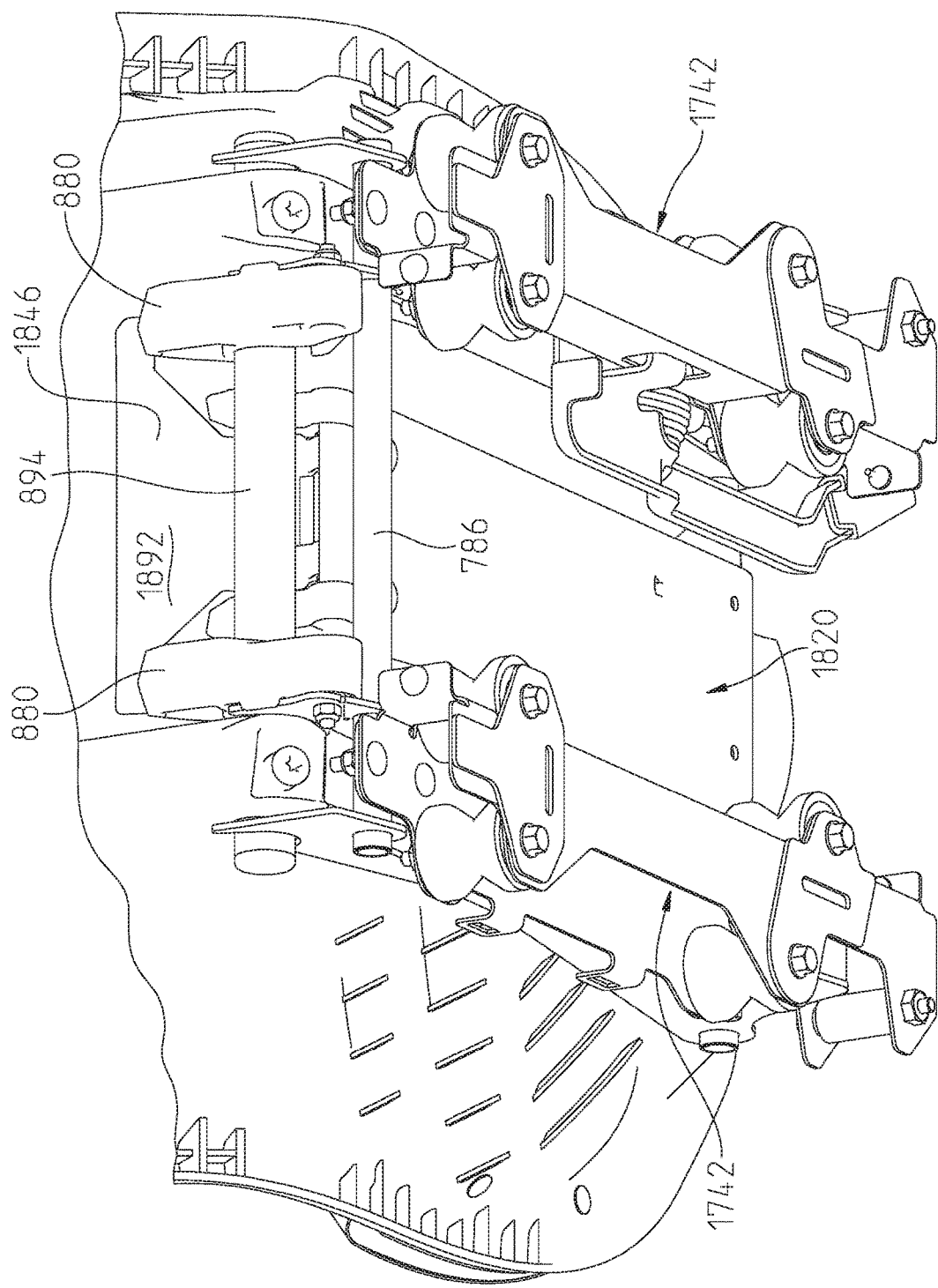
FIG. 93 is a front right perspective view of the track system and the seat of FIG. 92.
Figure 94:
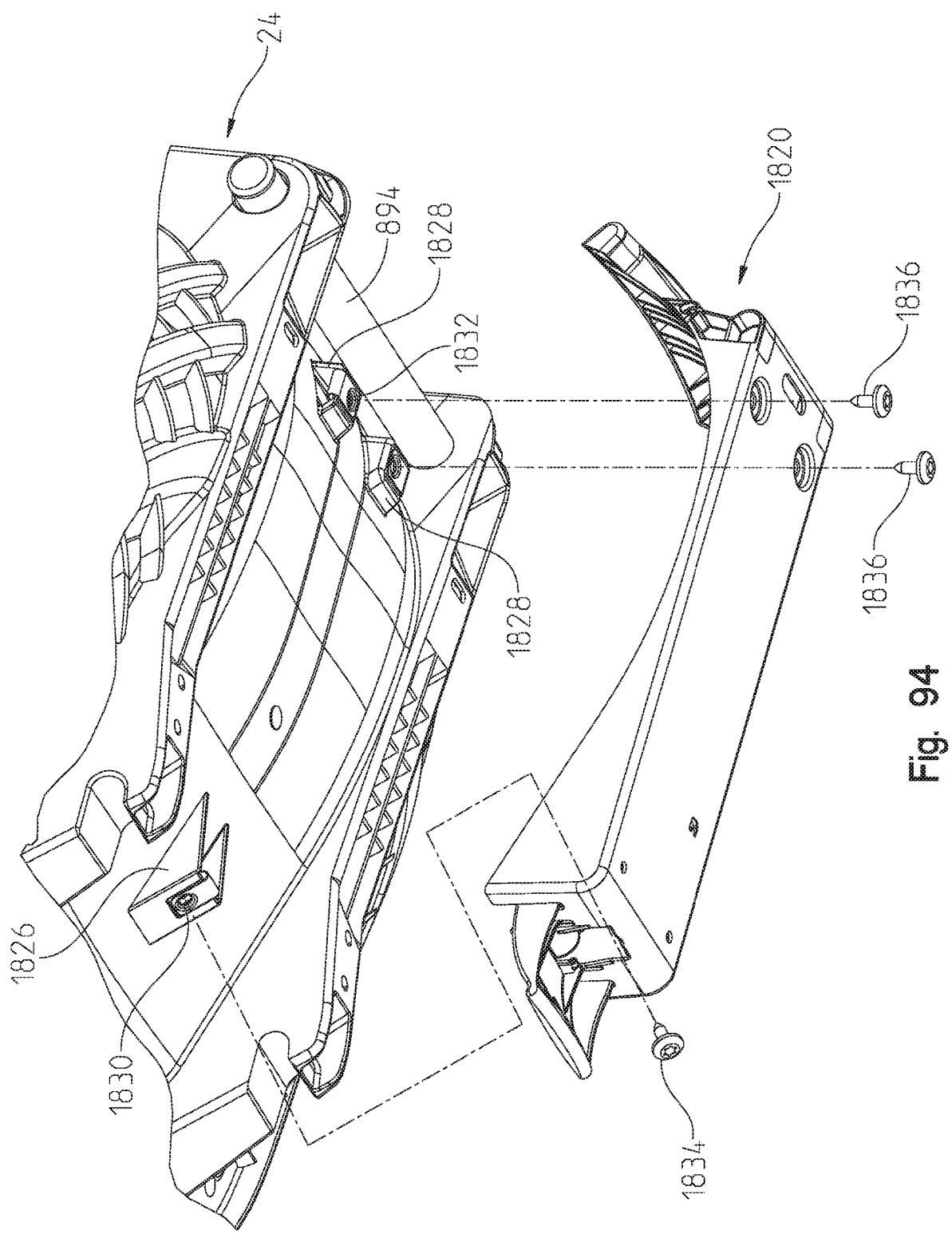
FIG. 94 shows an underside perspective view of the seat of FIG. 92 showing the release mechanism exploded away from the remainder of the seat.

In this embodiment, a release mechanism 1820 is also provided coupled to the bottom of the seat 24 as shown best in FIG. 92 which is positioned intermediate the longitudinally movable track members 1742. As will be described, release mechanism 1820 moves latches 880 rearwardly decoupling the latches 880 from locking rod 894. As shown best in FIG. 94, release mechanism 1820 is coupled to the bottom of the seat 24 whereby seat 24 includes a front boss 1826 and rear bosses 1828 where front boss 1826 includes a threaded opening 1830 and rear bosses 1828 include threaded openings 1832. Release mechanism 1820 is coupled to the bottom of the seat 24 by way of a front fastener 1834 which couples to threaded opening 1830 and fasteners 1836 which couple to threaded openings 1832.

Figure 95:
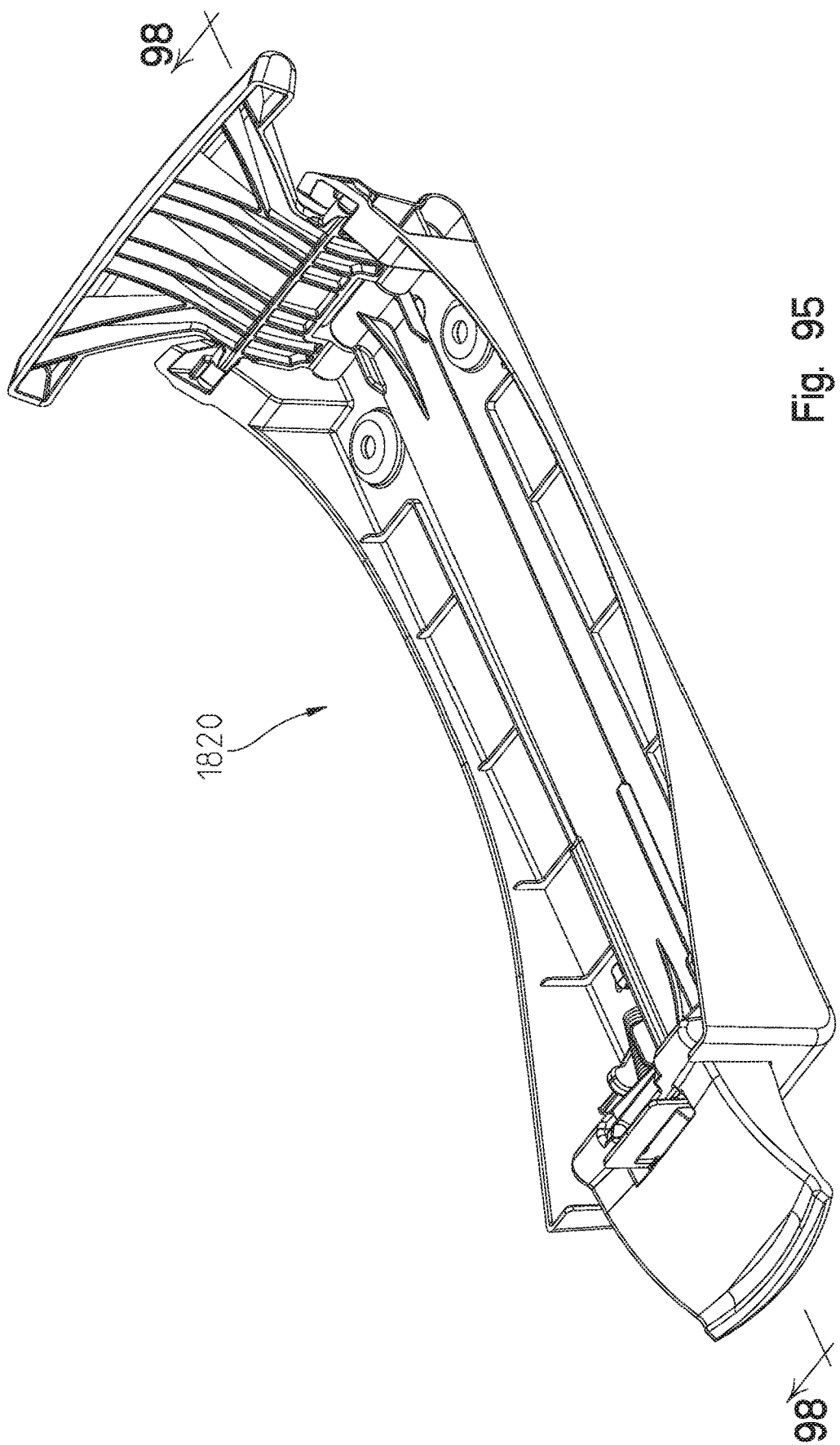
FIG. 95 shows a left front perspective view of the seat release mechanism shown in FIG. 94.
Figure 96:
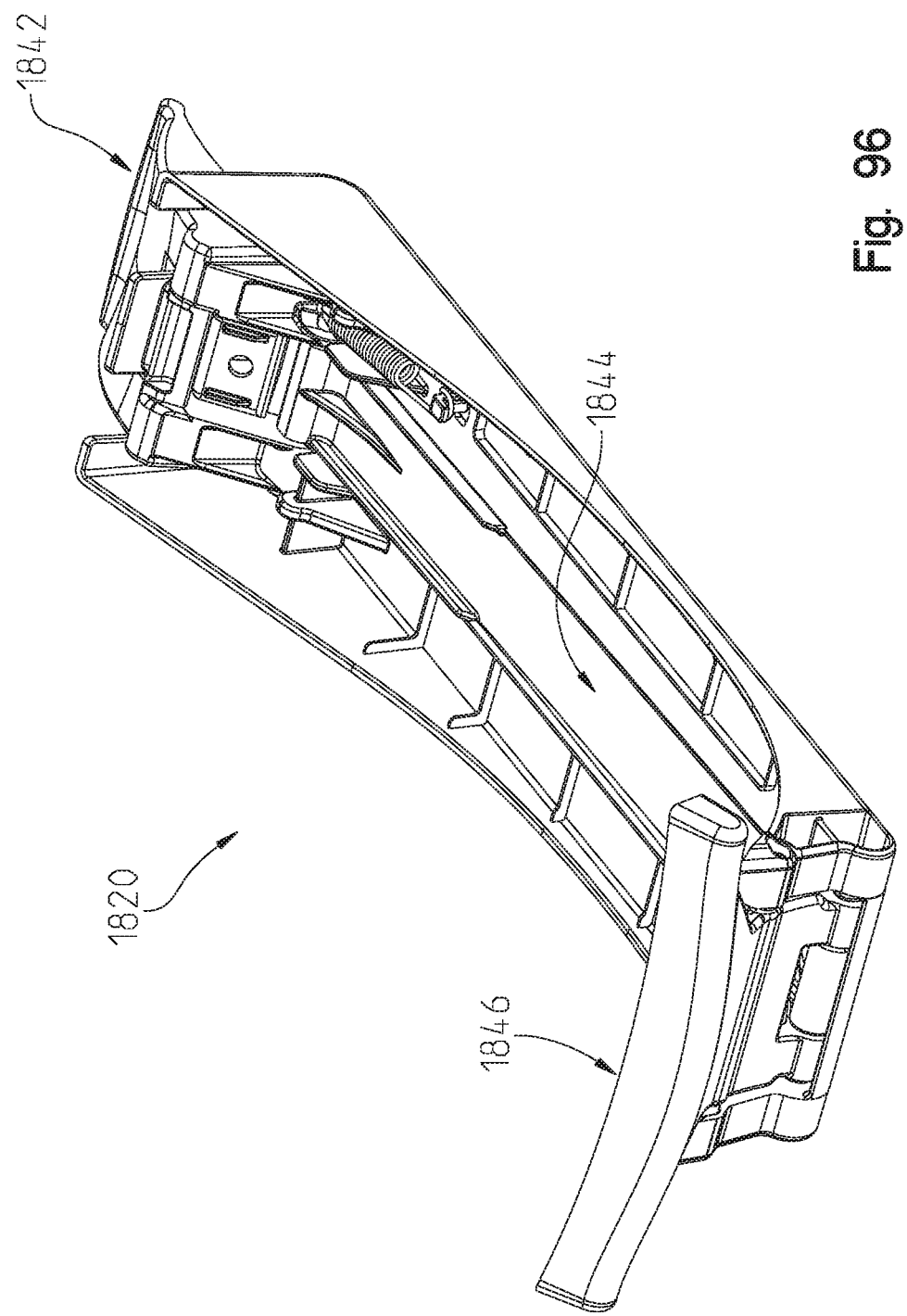
FIG. 96 shows a right rear perspective view of the seat release mechanism of FIG. 95.
Figure 97:
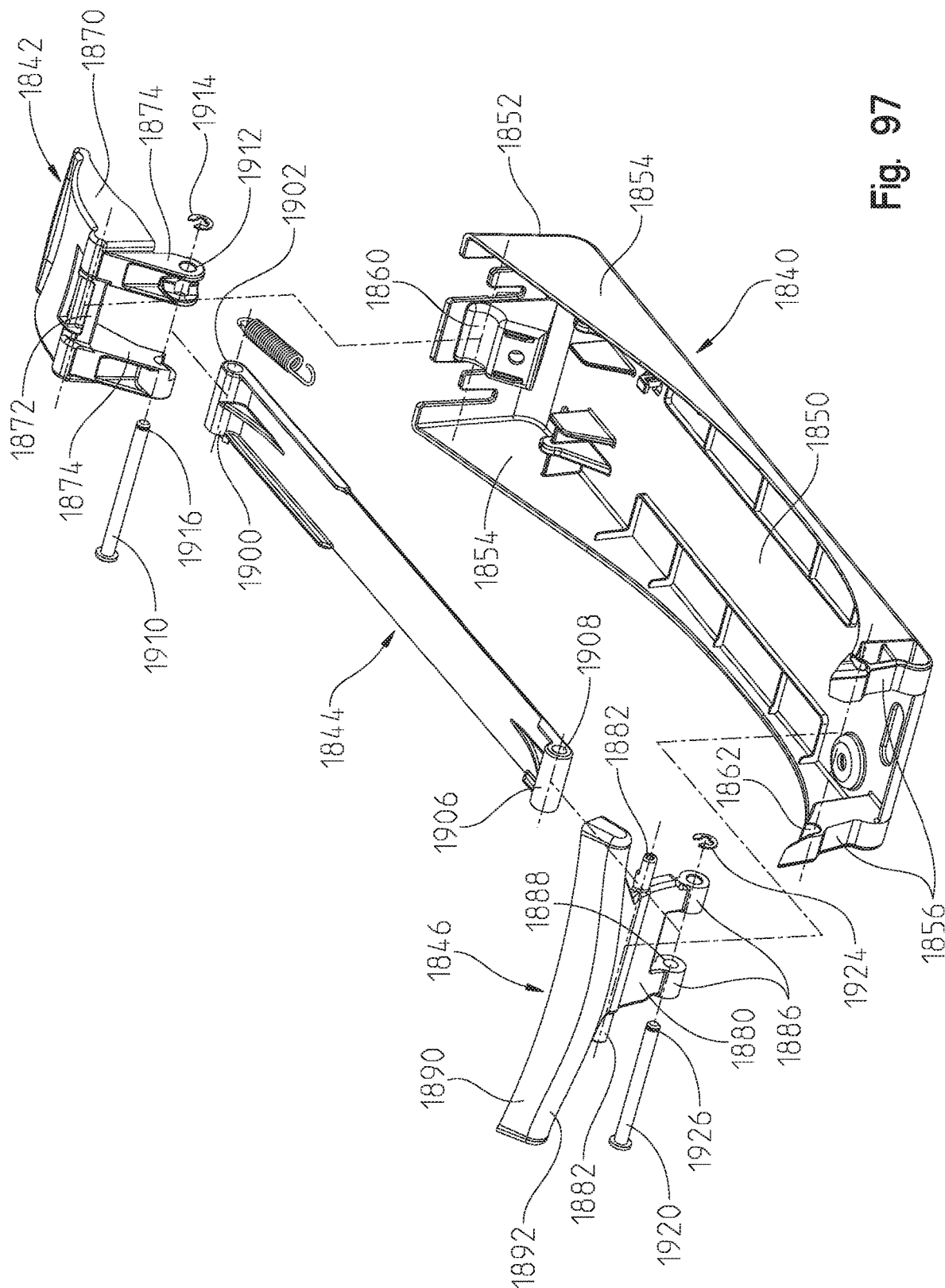
FIG. 97 shows a view similar to that of FIG. 96 showing the components of the release mechanism exploded.
Figure 100:
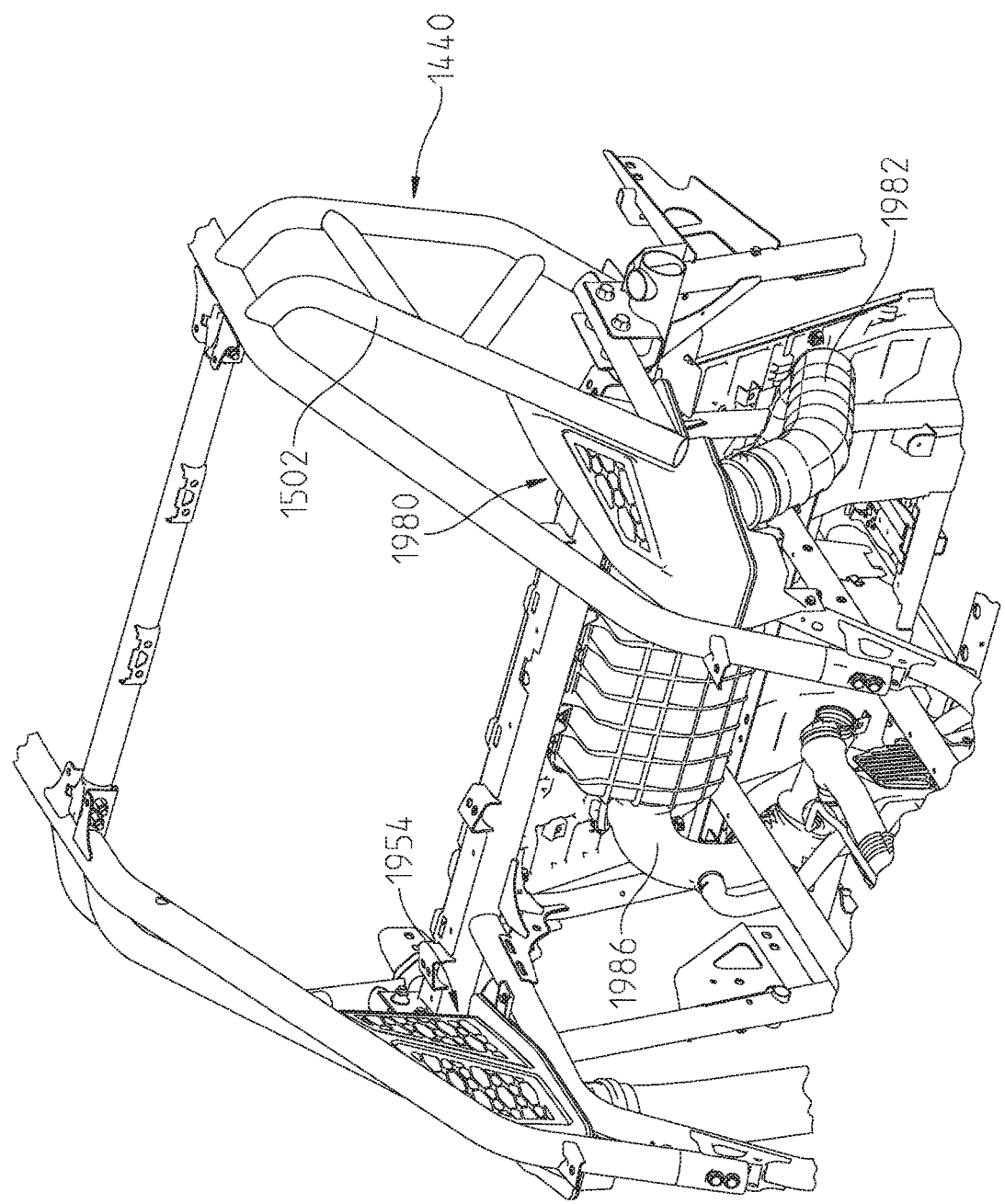
FIG. 100 shows a left front perspective view of an air intake system of the vehicle which is an alternative to that shown in FIGS. 50-52.
Figure 101:
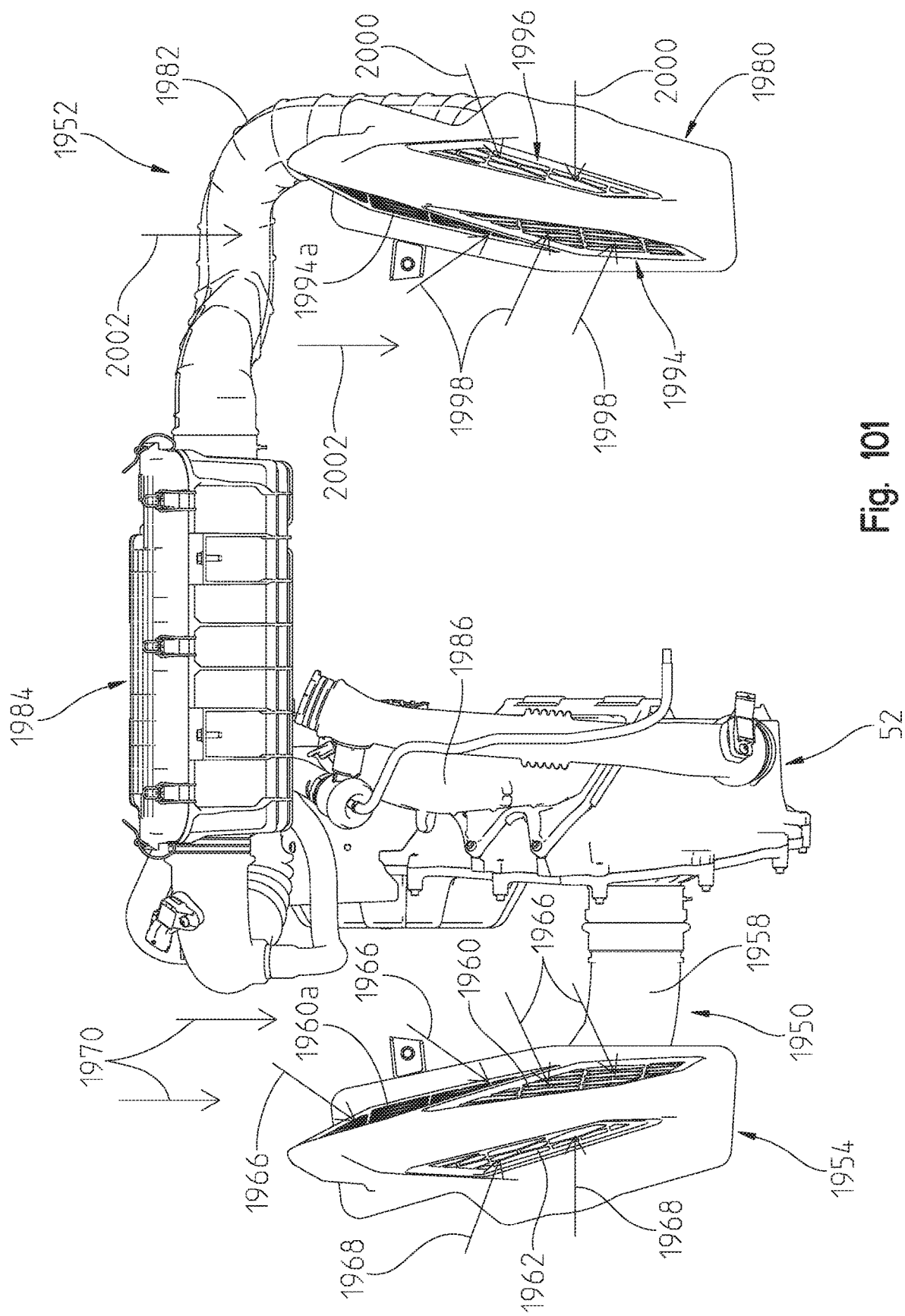
FIG. 101 is a rear perspective view of the air intake system of FIG. 100 with the vehicle frame removed.

With reference now to FIGS. 95-97, release mechanism 1820 will be described in greater detail. As shown, release mechanism 1820 generally includes a tray portion 1840, a release member 1842, a link 1844 and an actuator 1846. Tray portion 1840 includes a lower wall 1850, front end wall 1852, side walls 1854 and upright portions 1856 which extend from side walls 1854. Front wall 1852 defines an arcuate ledge at 1860, and upright portions 1856 define bearing portions 1862. Release portion 1842 includes a lever portion 1870 extending forwardly from a shaft portion 1872 and leg portions 1874 extend downwardly from shaft portion 1872. It should be appreciated that shaft portion 1872 cooperates with arcuate ledge 1860 and is rotatable therewith. Actuator 1846 includes a body portion 1880 having shaft portions 1882 extending outwardly therefrom and which are profiled to be rotatably received in bearing portions 1862. Leg portions 1886 extend downwardly from body portion 1880 and have apertures 1888 extending therethrough. An actuator portion 1890 extends upwardly from body portion 1880 and extends transversely of body portion including a contact surface at 1892.

Link portion 1844 includes a front coupling at 1900 having an aperture at 1902. A rear coupling 1906 has an aperture at 1908. A pin 1910 is receivable through apertures 1912 of arms 1874 and through aperture 1902 of coupling 1900. A circlip 1914 is received in a groove 1916 of pin 1910. A pin 1920 is receivable through apertures 1888 of actuator member 1846 and through apertures 1908 of link member 1844 where a circlip 1924 is receivable in a groove 1926 of pin 1920.

With reference now to FIGS. 98 and 99, when the lever portion 1842 is moved upwardly in the direction of arrow 1930 to the position shown in FIG. 99, link 1844 is moved in the direction of arrow 1932 which causes a counter rotation of actuator 1846 in the rotation of arrow 1934. This rotation causes contact surface 1892 to engage with latches 880 (FIG. 92) and rotating them to release from rod 894.

Figure 87:
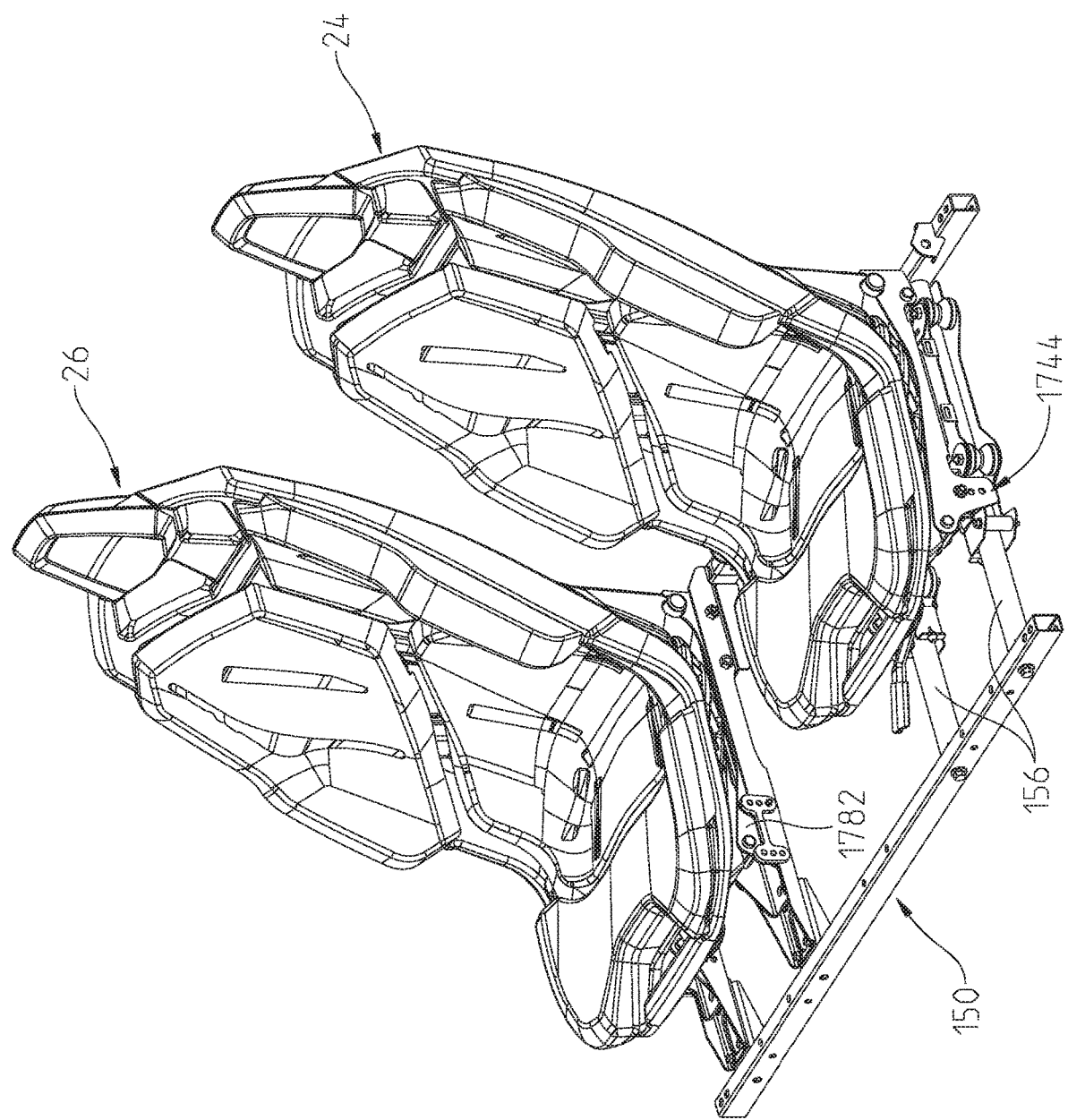
FIG. 87 is a view similar to that of FIG. 86 having removed the main vehicle frame.
Figure 88:
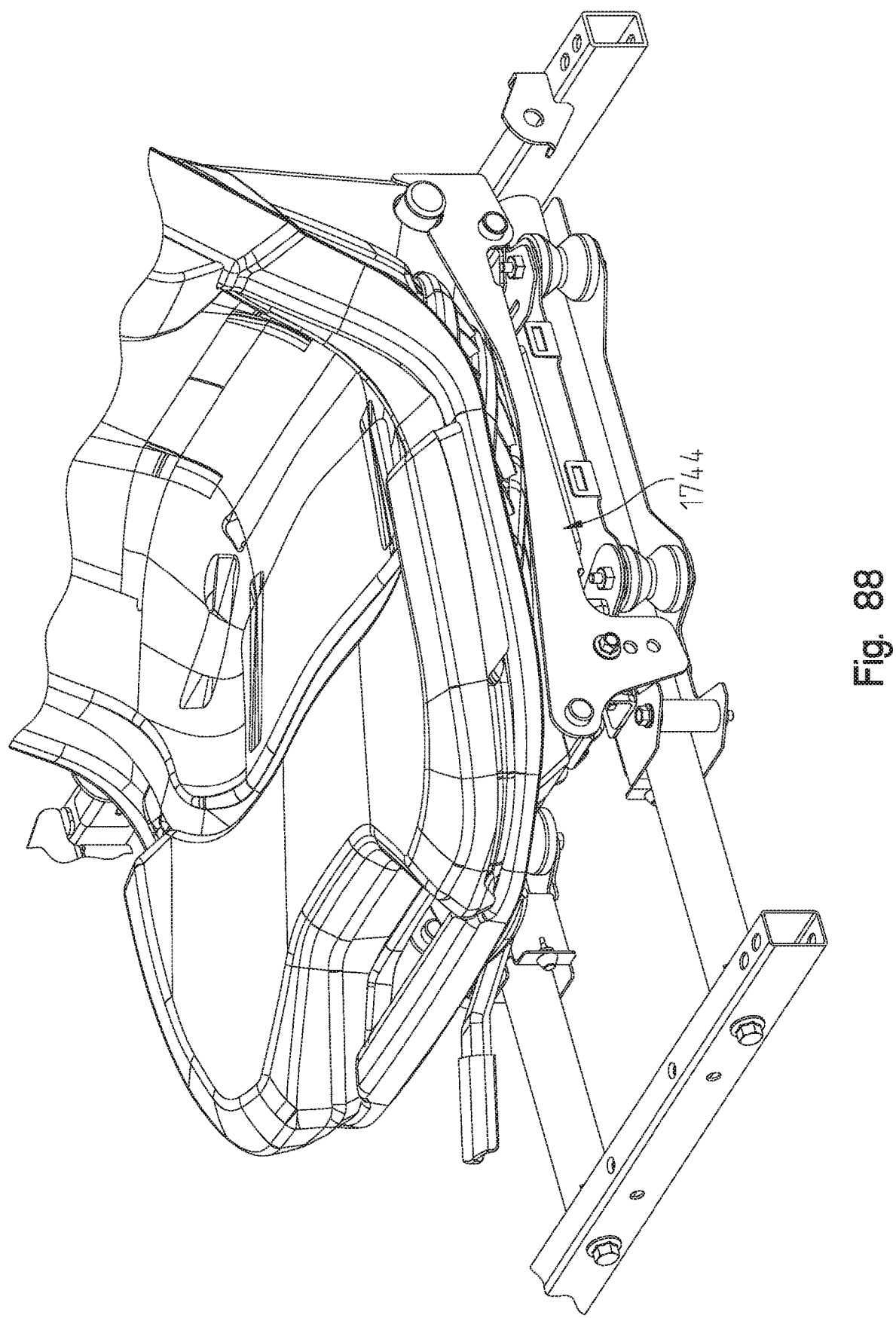
FIG. 88 is a view similar to that of FIG. 87 showing an enlarged view of the seat adjustment mechanism.
Figure 89:
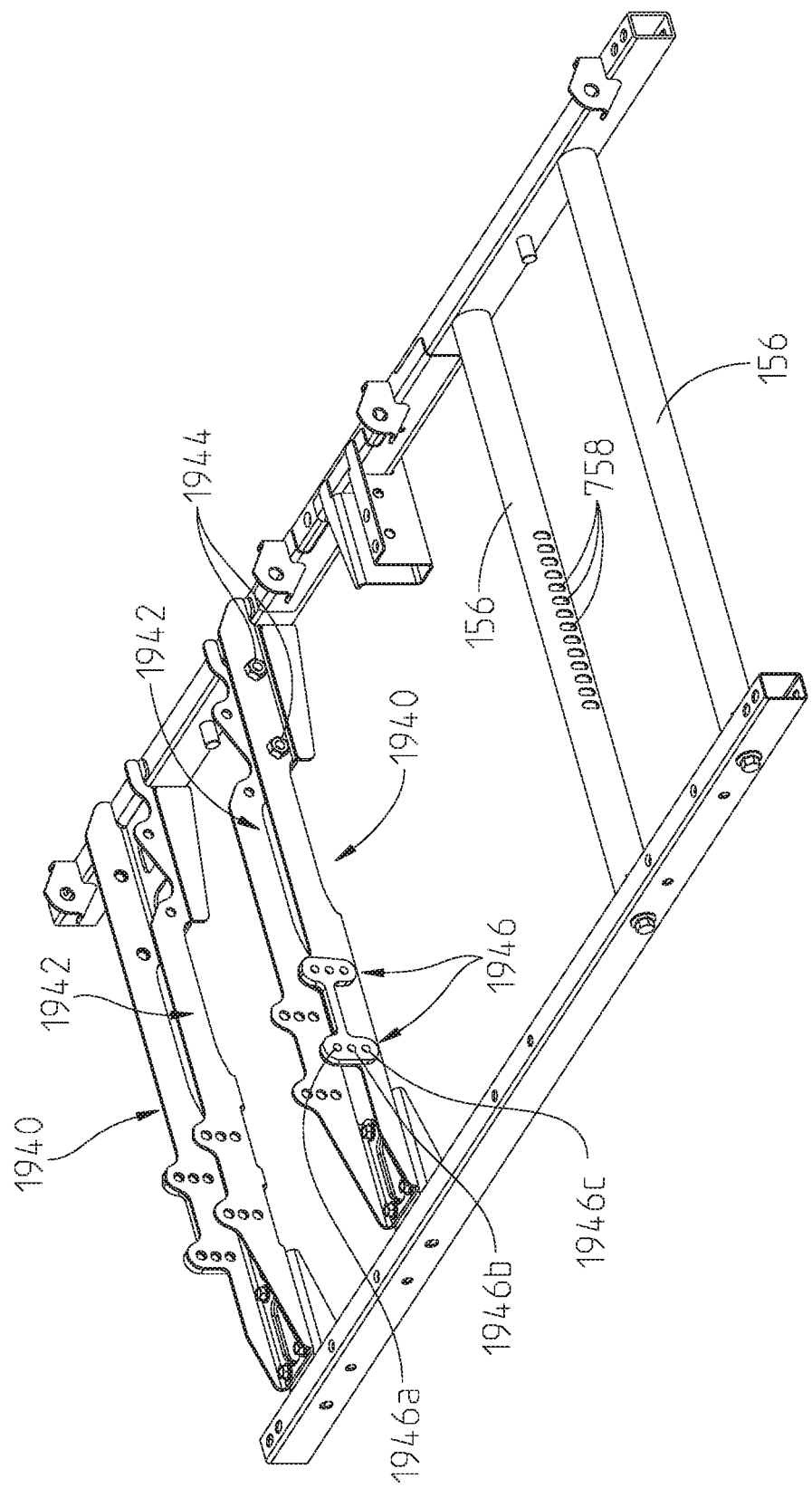
FIG. 89 shows a front left perspective view of the seat frame.
Figure 90:
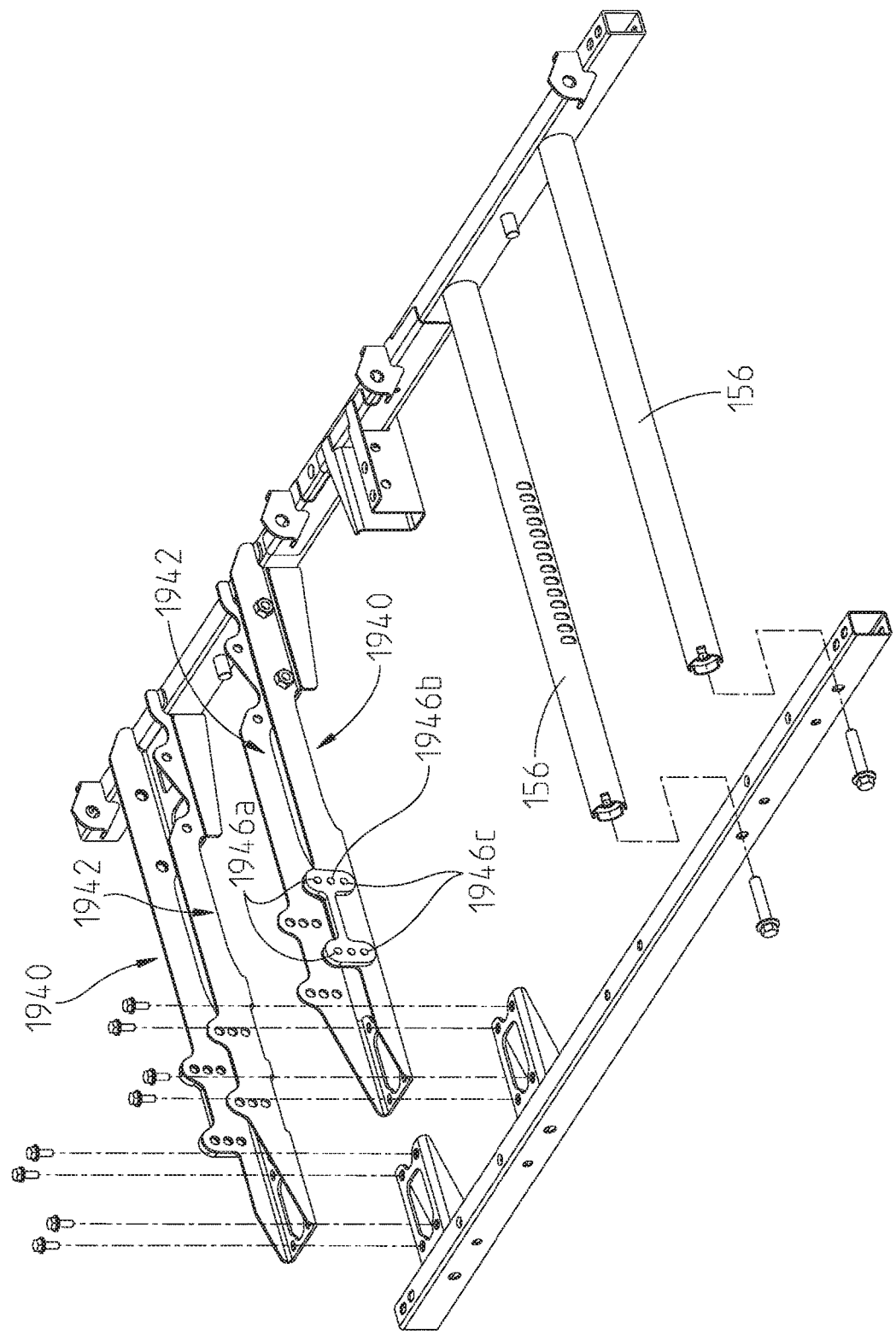
FIG. 90 is an exploded view of the seat frame of FIG. 89.

With reference now to FIGS. 87, 89 and 90, the movement of passenger seat 26 will be described in greater detail. With reference first to FIG. 87, passenger seat 26 does not have a longitudinally movable track system such as 1744 as in the driver's seat. Rather, the passenger seat has two longitudinally positions for the seat 26 but they are fixed positions as described herein. Also, the seat 26 has the same tilt positions as the driver's seat 24 as described herein.

As shown in FIGS. 89 and 90, the passenger seat does not include the longitudinal tubes 156 but rather has outer mounting rails 1940 and inner mounting rails 1942. Outer mounting rails 1940 include two longitudinally spaced apart fasteners 1944 coupled to the outside of the rails 1940 and outer rails also include two longitudinally spaced apart set of apertures at 1946 including pairs of threaded openings at 1946a, 1946b and 1946c. Thus to position the passenger seat 26 in the seat frame 150, the outer rail 1782 (FIG. 87) has an aperture alignable with one of the fasteners 1944 (FIG. 89) and includes a second aperture alignable with one of the apertures 1946a, 1946b or 1946c.

With reference now to FIGS. 100-105, an air intake system of the vehicle will be described. As shown best in FIGS. 100 and 101, an air intake system of the vehicle includes air intake 1950 for cooling of the CVT 52 and an air intake system 1952 as air intake to the engine. As shown, air intake system 1950 includes an intake bezel 1954 which can be directly coupled to the pillar portion 1440, where air is drawn through louvers 1960, 1960a and 1962 and into bezel 1954. Air travels through bezel 1954 and into duct 1958 which is coupled directly to the CVT for drawing air into the CVT for cooling purposes. As shown best in FIG. 101, bezel 1954 has an inner intake surface 1960 and an outer intake surface 1962, for receiving air therein in the direction of the arrows 1966 and 1968, respectively. Inner surface 1960 includes a portion 1960a, that slants at least partially outward such that air is received in the bezel 1954 when the air moves in the direction of arrows 1970.

Figure 103:
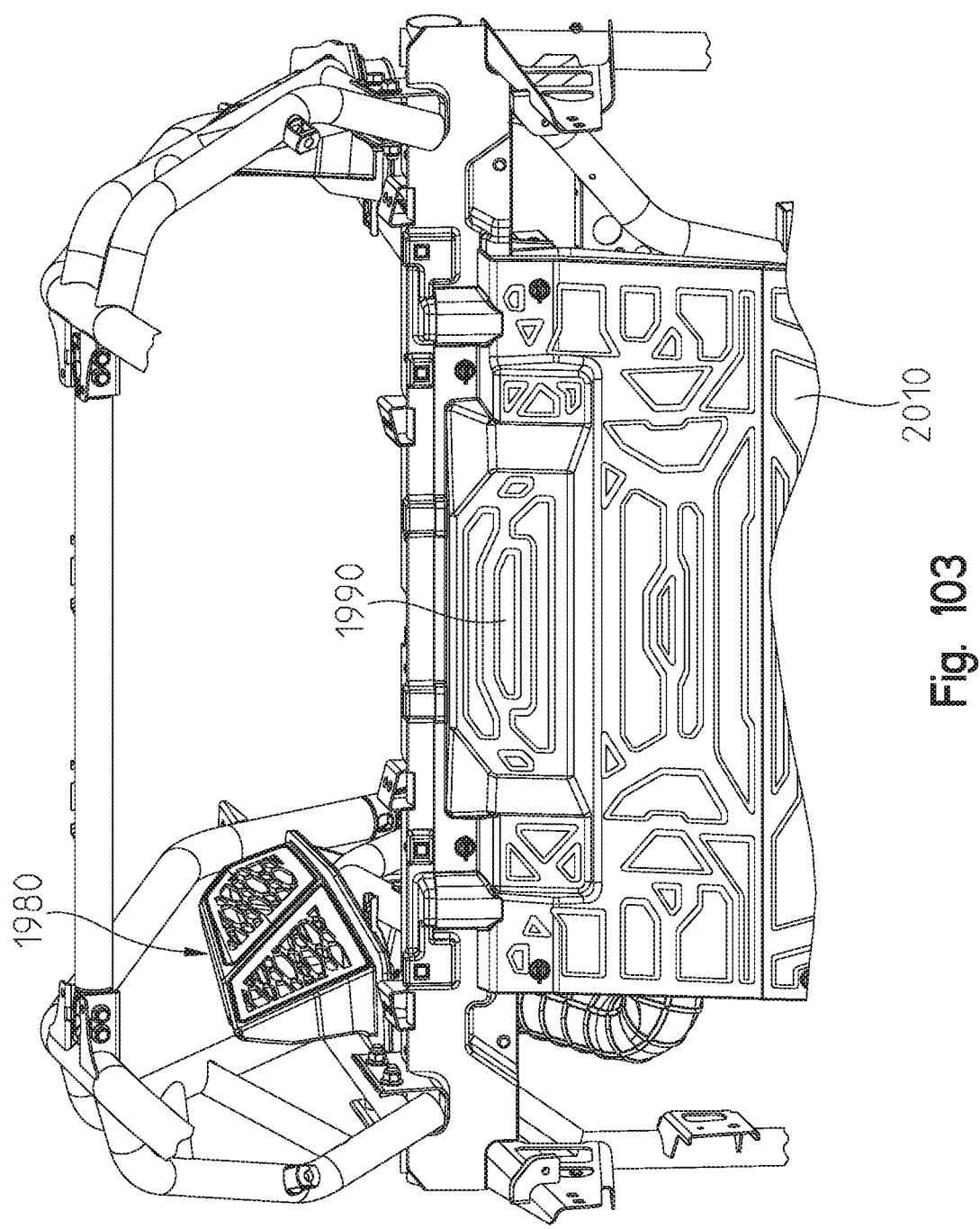
FIG. 103 is a view similar to that of FIG. 100 showing the removable panel of the vehicle positioned forward of the air intake system.
Figure 104:
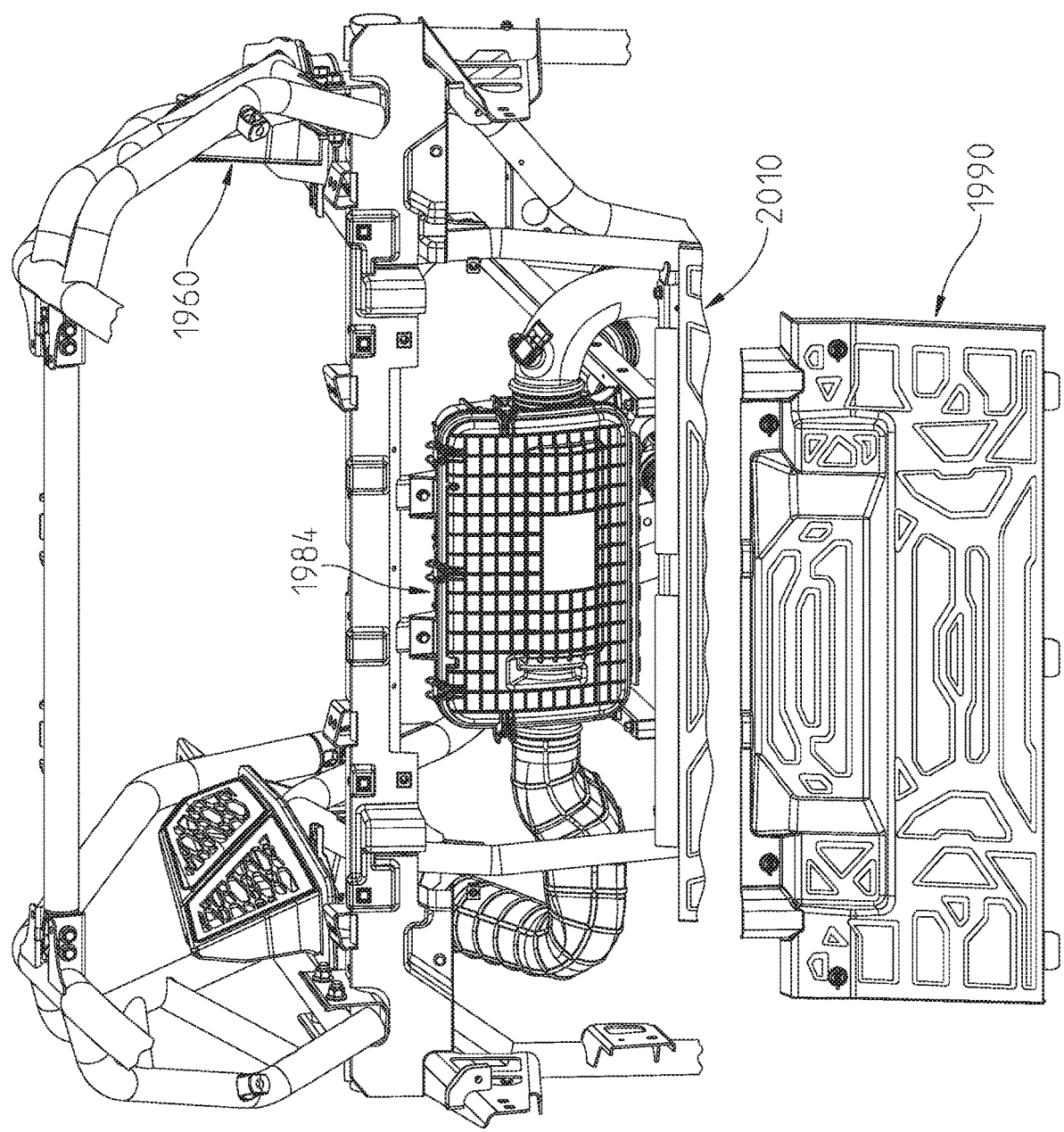
FIG. 104 is a view similar to that of FIG. 103 showing the upper portion of the panel removed.
Figure 105:
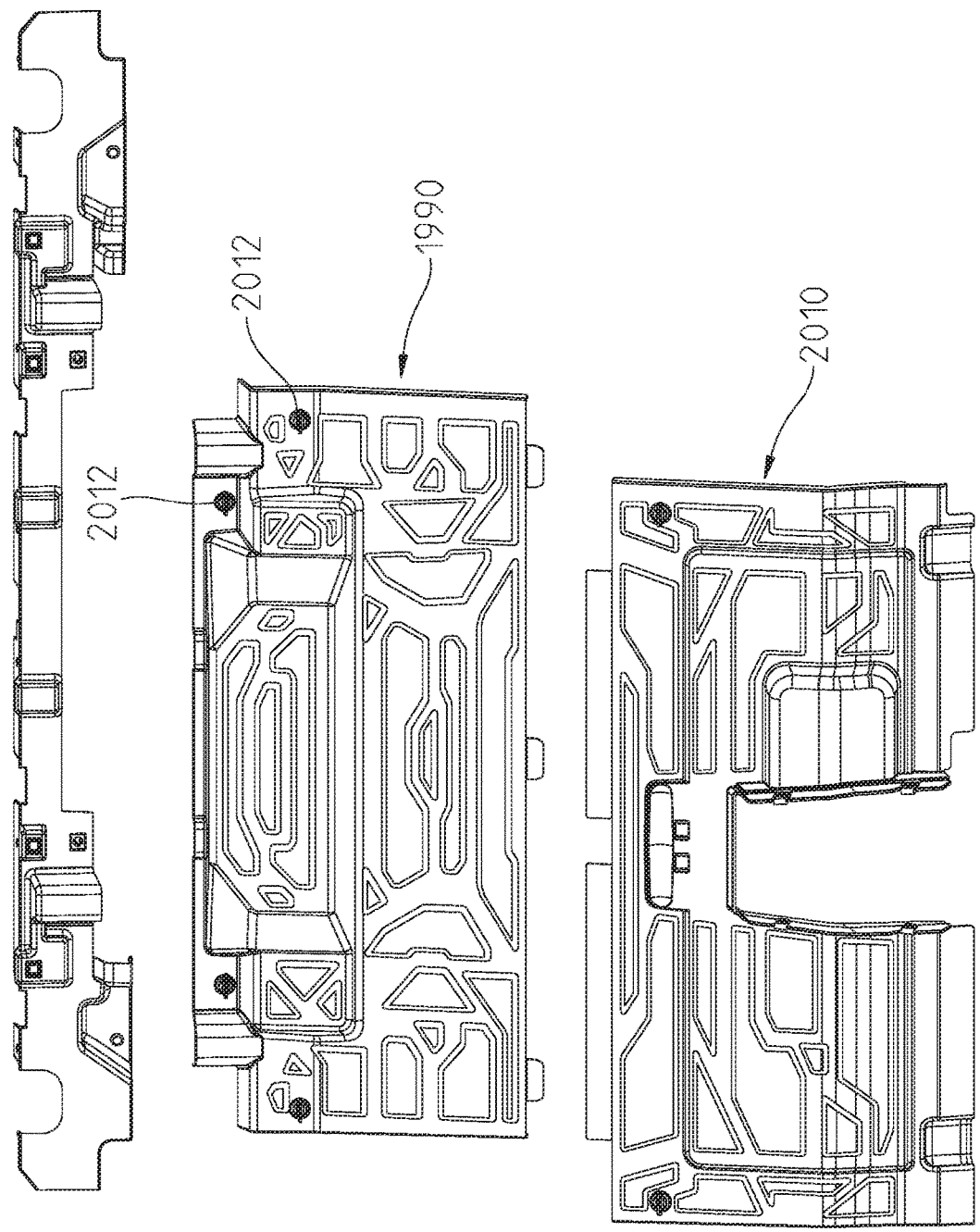
FIG. 105 shows an exploded view of the entire panel.

In a similar manner, a bezel 1980 is provided on the passenger side pillar portion 1440 which couples to a duct 1982 which is an intake to air filter 1984 (FIG. 101) which exits to duct 1986 having an outlet for intake to the engine. As shown in FIGS. 103-105, air filter 1984 is positioned directly behind the seats 24, 26 such that the removal of a protective panel 1990 which provides easy access to the air filter 1984 as shown best in FIG. 104. As shown best in FIG. 101, bezel 1980 has an inner intake surface 1994 and an outer intake surface 1996, for receiving air therein in the direction of the arrows 1998 and 2000. Inner surface 1994 includes a portion 1994a, that slants at least partially outward such that air is received in the bezel 1980 when the air moves in the direction of arrows 2002.

Figure 102:
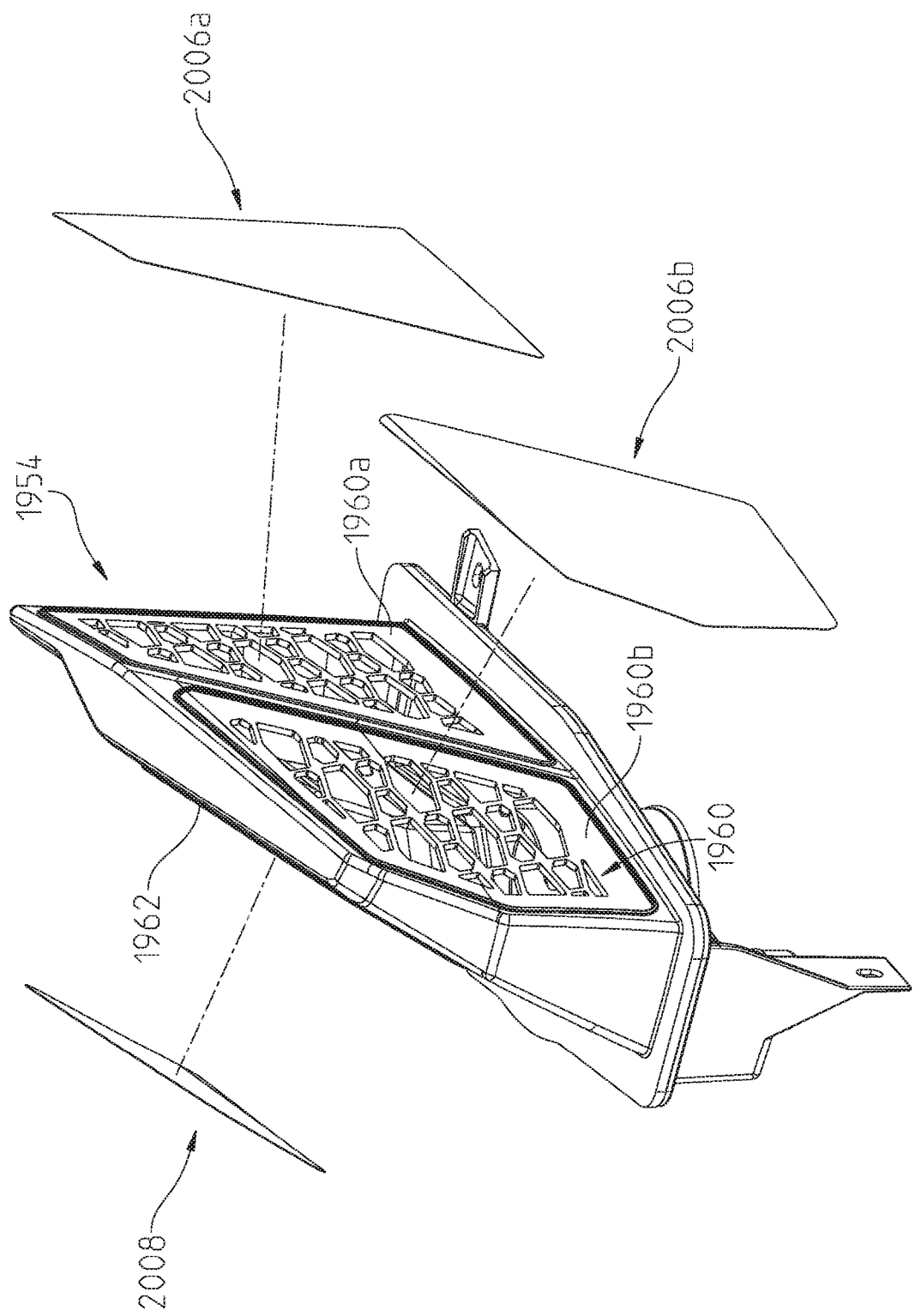
FIG. 102 shows an air intake vent of the air intake system of FIG. 100.

As shown in FIG. 102, debris screens 2006a and 2006b could be added to cover the inner surface portions 1960a and 1960b, while an outer debris screen 2008 could cover the outer surface 1962.

As shown in FIGS. 103-105, the removable panel is shown removed, accessing the air filter 1984, when removable panel 1990 is positioned above a lower panel portion 2010. Removable panel 1990 could have ¼ turn fasteners 2012 for easy removal and installation.

Figure 106:
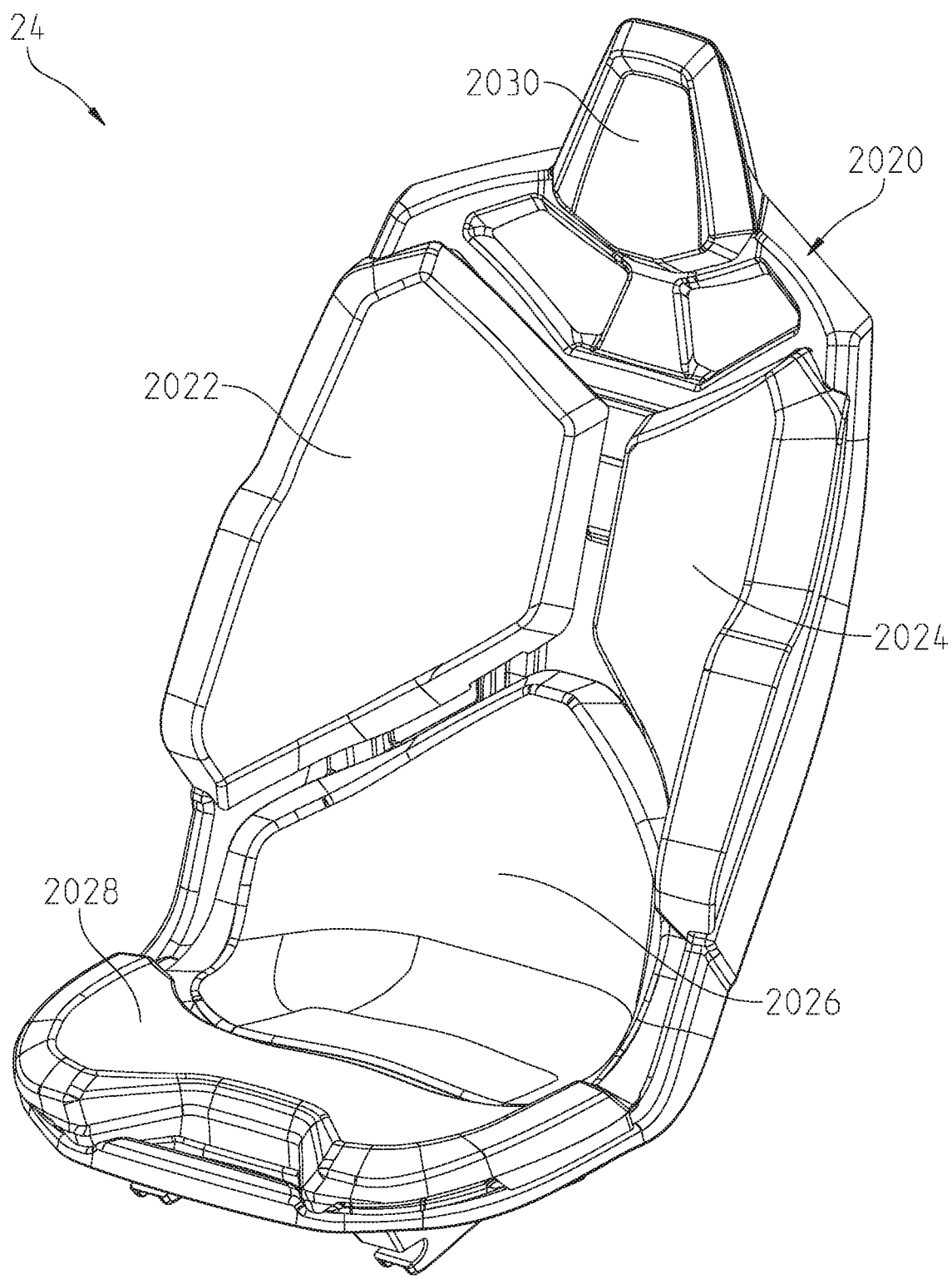
FIG. 106 shows a front left perspective view of a seat assembly.
Figure 107:
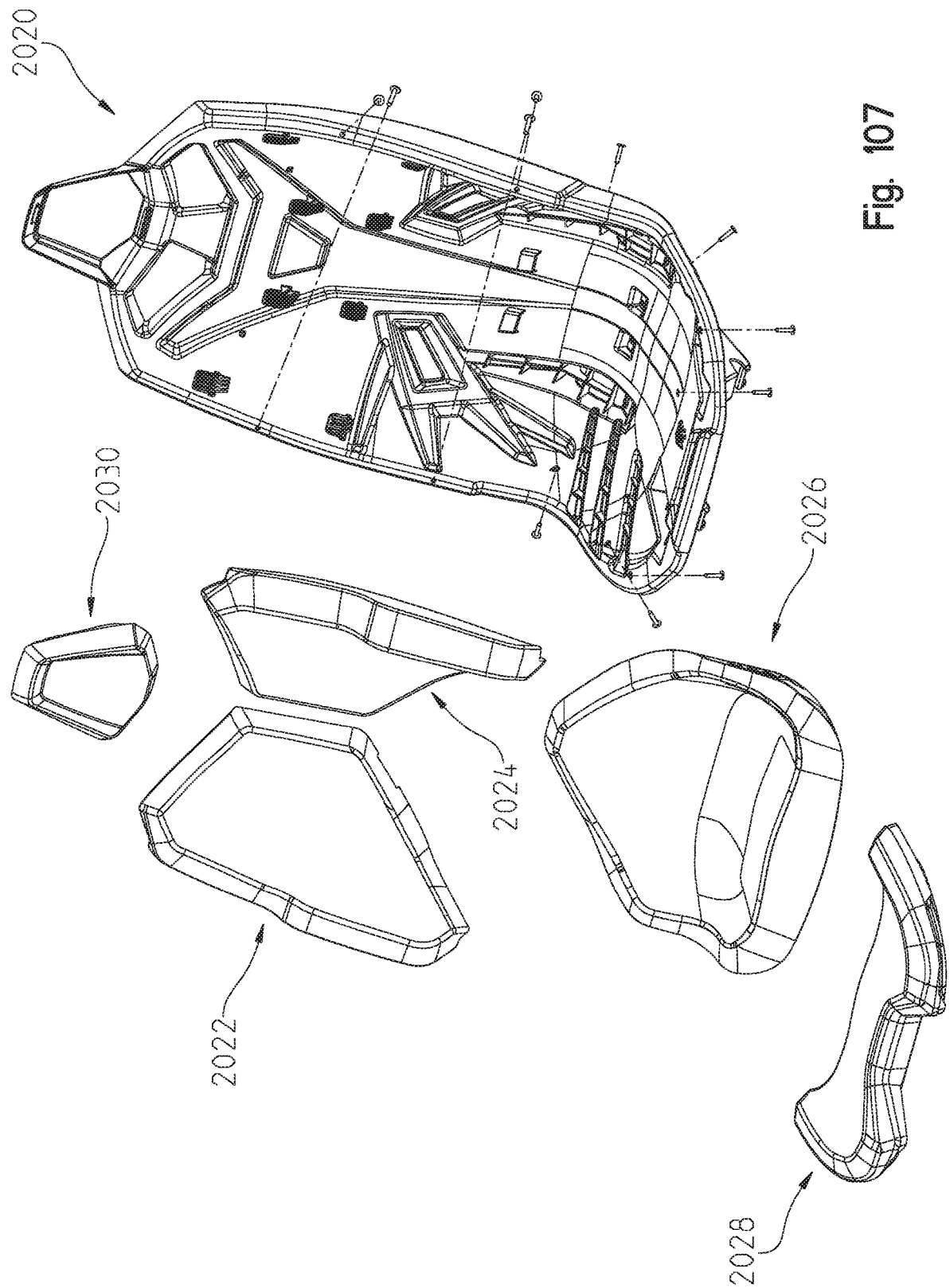
FIG. 107 is a view similar to that of FIG. 106 showing the cushion portions of the seat removed.
Figure 108:
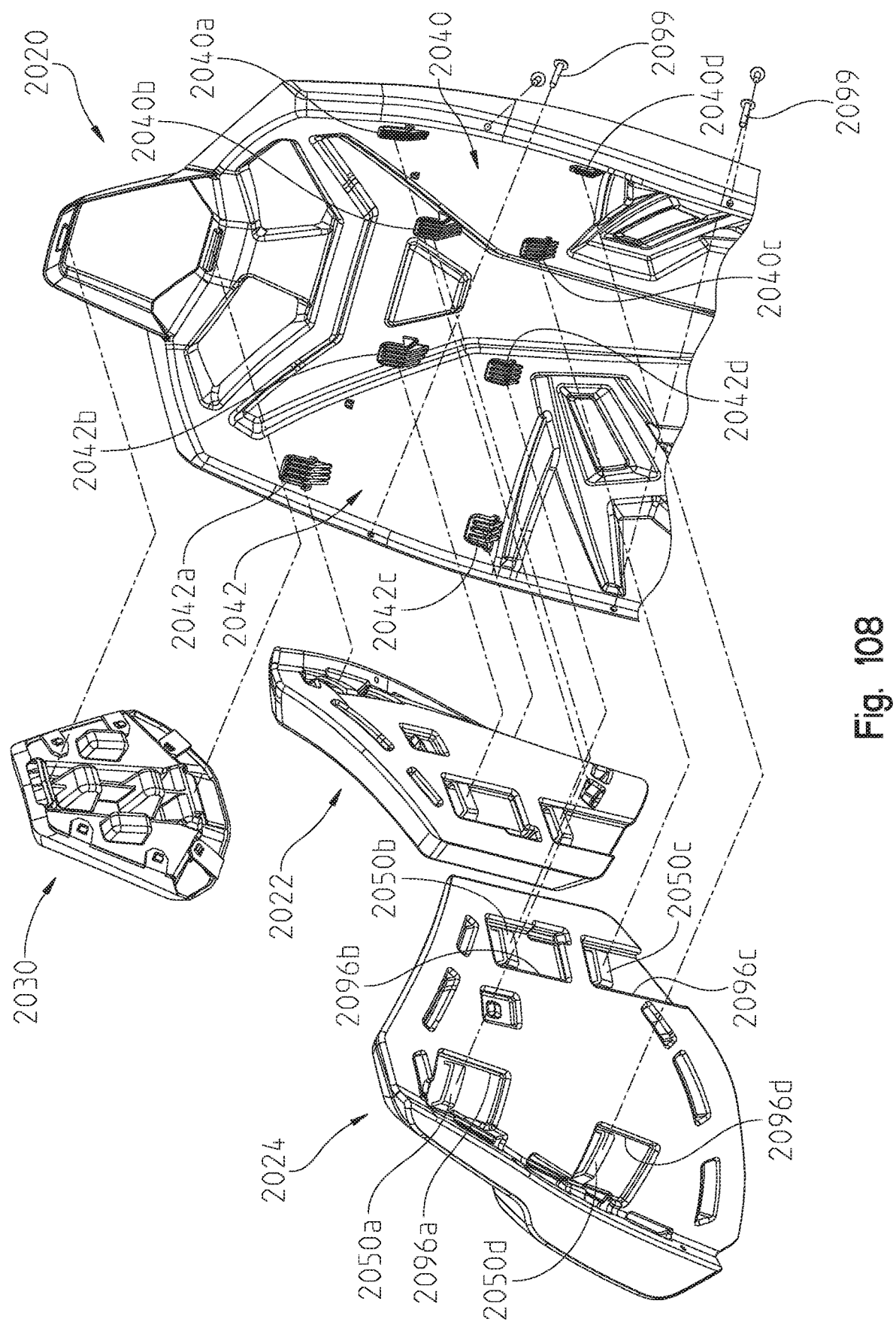
FIG. 108 is a view similar to that of FIG. 107 showing the backside of several of the cushions showing their latching features.

With reference now to FIGS. 106-111, the construction of seats 24, 26 will be described in greater detail. With reference first to FIG. 106, driver seat 24 will be described, and it should be understood that passenger seat 26 is substantially identical to the construction of driver seat 24. Driver seat 24 is comprised of a shell 2020 having individual pad portions attached thereto. Namely, a right shoulder blade portion 2022, left shoulder blade portion 2024, lumbar portion 2026 and seat bottom 2028 are coupled to the shell 2020. A head rest 2030 is also positioned above the shoulder blade portions 2022 and 2024. With reference now to FIG. 108, shell portion 2020 includes left-hand clips 2040 and right-hand clips 2042. More particularly, left-hand clips 2040 include clips 2040a, 2040b, 2040c and 2040d. At the same time, clips 2042 include clips 2042a, 2042b, 2042c and 2042d. Meanwhile, the backside of pad portion 2024 includes catches 2050a-2050d where each of the catches engages with complimentary hooks 2040a-2040d respectively.

Figure 109:
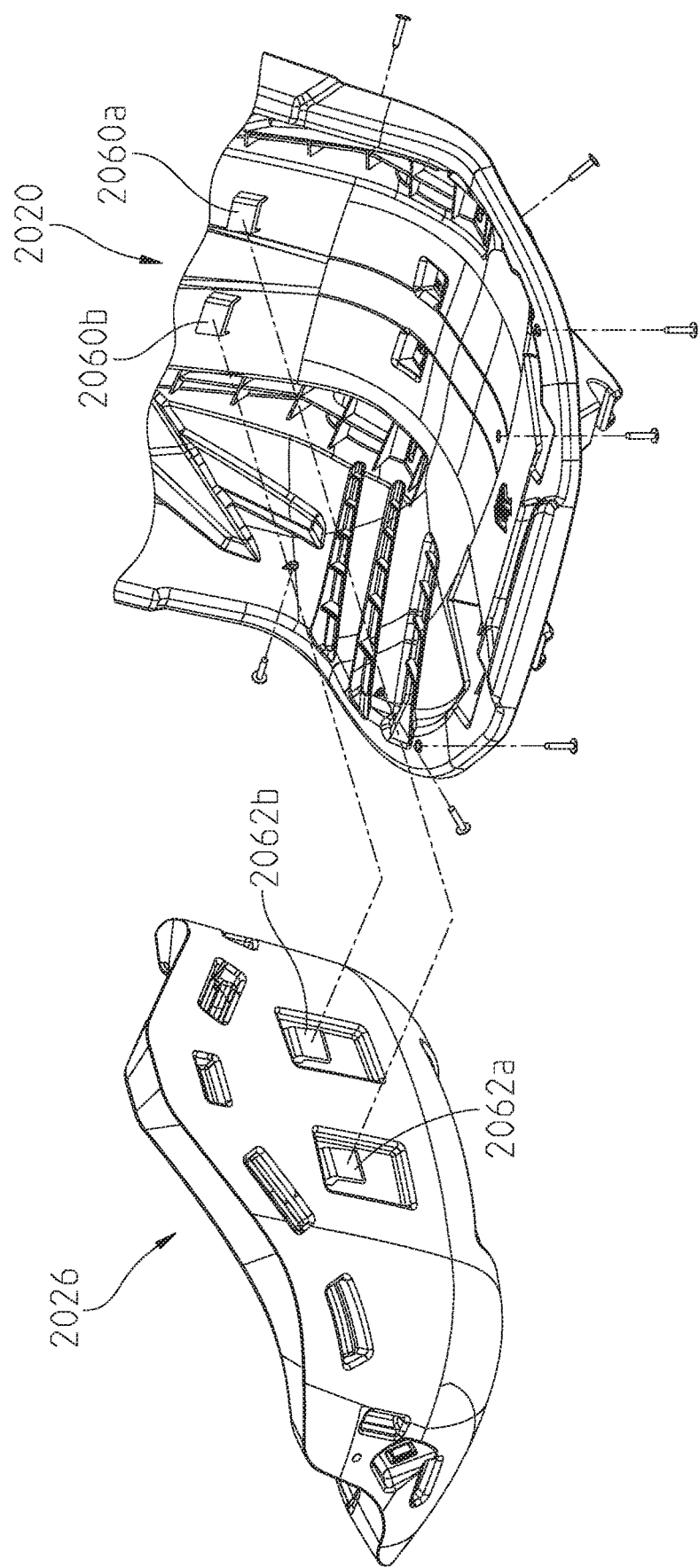
FIG. 109 is a view similar to that of FIG. 108 showing the bottom seat cushion.
Figure 110:
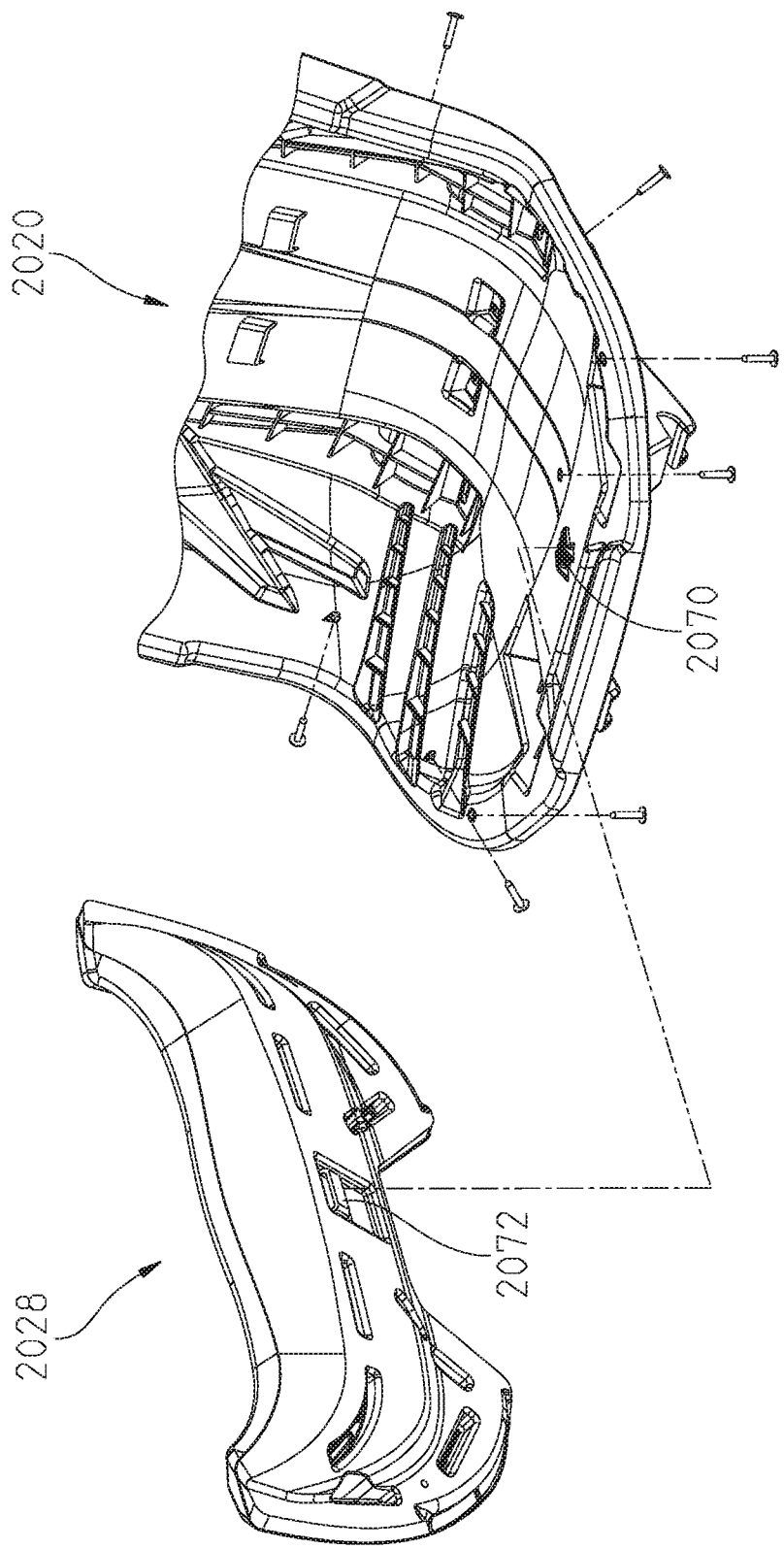
FIG. 110 is a view similar to that of FIG. 109 showing the front bottom portion.

With reference to FIG. 109, shell portion 2020 includes catches 2060a and 2060b which couple with hooks 2062a and 2062b respectively to retain the lumbar portion 2026 within shell 2020. As shown in FIG. 110, shell portion 2020 includes a hook 2070 which receives a catch 2072 on the lower side of seat bottom 2028.

Figure 111:
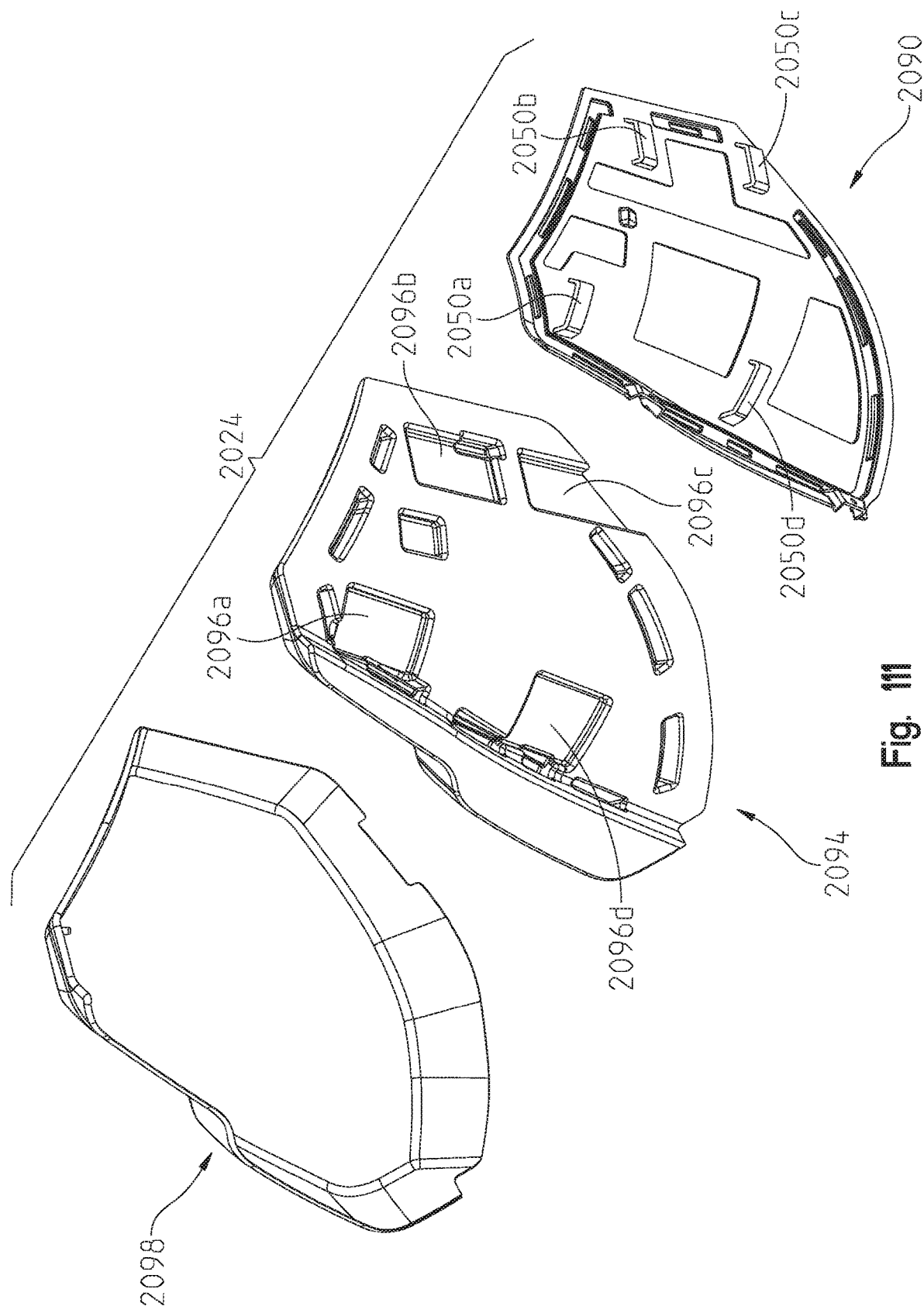
FIG. 111 shows an exploded view of the left shoulder blade pad.

With reference now to FIG. 111, the construction of the left shoulder blade portion 2024 is shown and is illustrative to the possible construction of all of the pad portions 2022-2030. As shown, an inner frame portion is shown at 2090 which carries the catches 2050a-2050d. The frame portion 2090 could be a composite of plastic type materials with metallic catches 2050a-2050d or could be comprised of materials such as aluminum. An outer shell portion 2094 is provided whereby windows 2096 are provided such that window 2096a allows catch 2050a to protrude therethrough, window 2096b allows catch 2050b to protrude therethrough, window 2096c allows catch 2050c to protrude therethrough and window 2096d allows catch 2050d to protrude therethrough. Meanwhile, pad portion 2098 may be coupled to the combination of members 2090, 2094 and provide the padding and/or cushion for seat 24. Rivets 2099 may also be added to increase the retention of pad portions 2022-2030.

Figure 112:
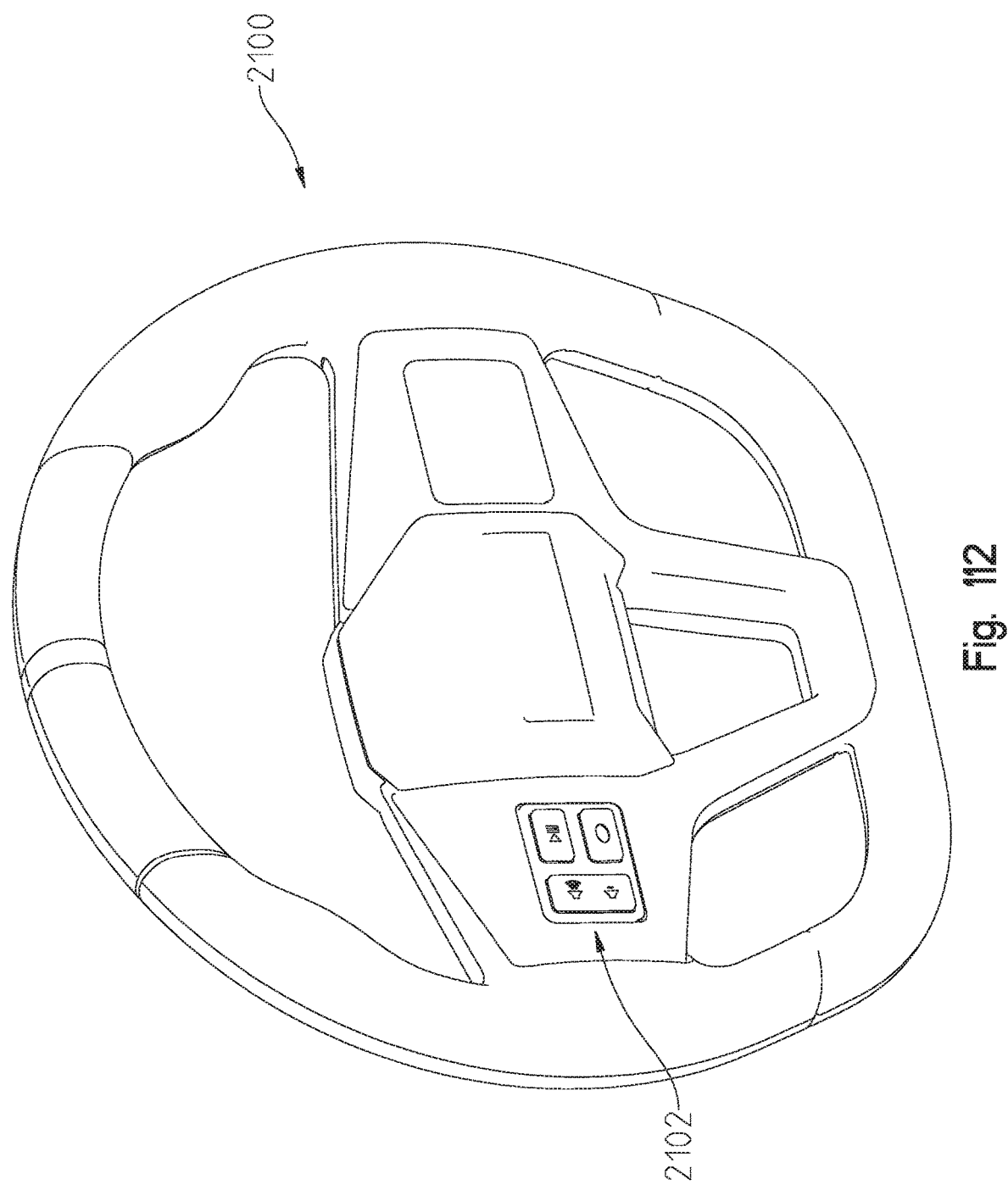
FIG. 112 shows a front perspective view of a steering wheel having modular switches.

With reference to FIG. 112, a steering wheel 2100 is shown with modular control buttons 2102 for adding and control of aftermarket parts. The buttons 2102 are not pre-wired to the wheel, but all wires go through one cord.

Figure 113:
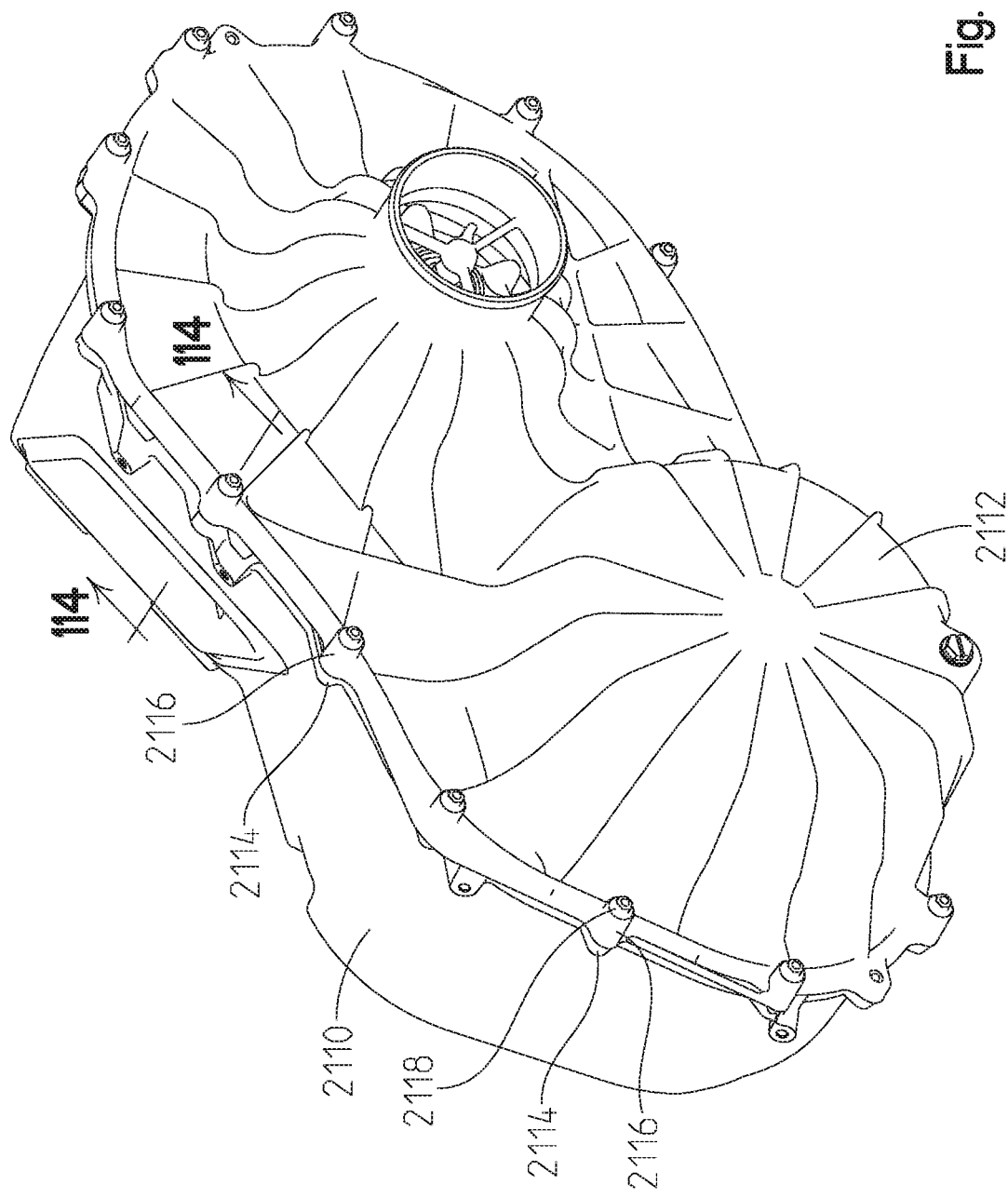
FIG. 113 shows a front perspective view of the continuously variable transmission (CVT) of the vehicle.
Figure 114:
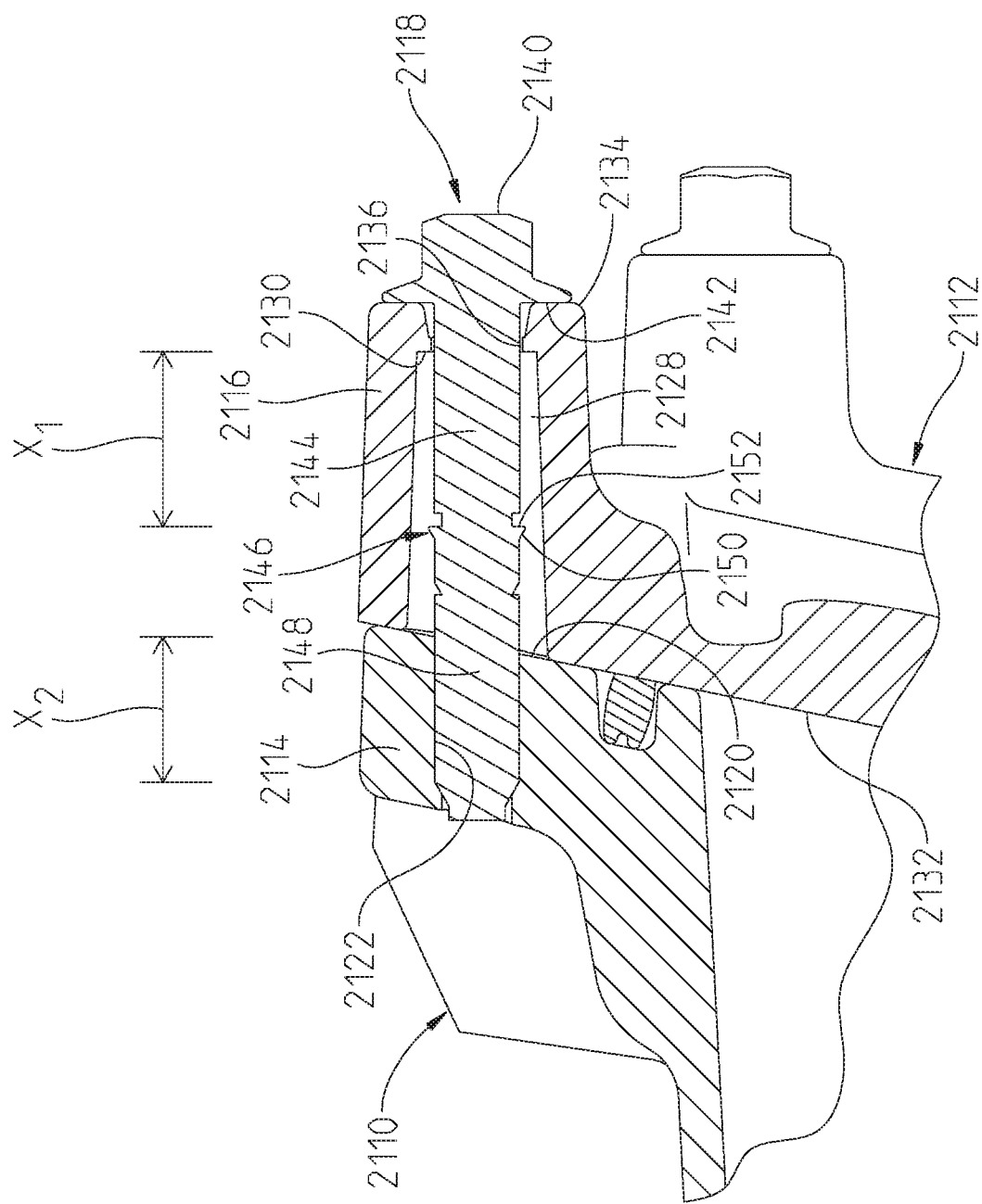
FIG. 114 shows a cross-sectional view through lines 114-114 of FIG. 113.

With reference now to FIGS. 113 and 114, the CVT 52 will be described. As shown, CVT 52 includes a CVT cover comprised of an inner cover 2110 and an outer cover 2112. The inner cover has a plurality of bosses at 2114 and the outer cover 2112 has a plurality of bosses at 2216. Fasteners 2118 couple the inner and outer covers 2110, 2112 at each of the pairs of bosses 2114, 2116, as more fully described with reference to FIG. 114. As shown in FIG. 114, boss 2114 has a mounting face 2120 though which a threaded aperture 2122 extends. Boss 2116 has an inner cavity 2128, an inner shoulder 2130, a mounting face 2132, an outer face 2134 and an aperture 2136. Fastener 2118 has a head portion 2140 having an inner shoulder 2142, a shank portion 2144, a barb 2146 and a threaded portion 2148. Barb 2146 has a leading edge 2150 and a rear shoulder 2152.

Barb 2146 is profiled to be received into aperture 2136 and into cavity 2128, but be retained in place once the barb 2146 gets beyond the aperture 2136, as the outer diameter of the barb 2146 is greater than the inner diameter of the aperture 2136. Thus, when the fastener is backed out (to the right as viewed in FIG. 114) shoulder 2152 will abut the inner shoulder 2130 of boss 2116. Furthermore, fastener is profiled such that it can be fully disengaged from the inner housing 2110, and remain coupled with the outer housing. This is due to the profile of the fastener in that, from the fully engaged position (the position shown in FIG. 114) the fastener can move a distance of $X_1$, that is, the distance between the shoulder 2152 and the inner shoulder 2130. The distance $X_1$ is greater than the distance ($X_2$) that the fastener 2118 needs to travel to be unthreaded from the threaded aperture 2122.

Thus, the design provides ease of maintenance as the fasteners 2118 always remain coupled to the outer housing 2112, even when they are disconnected from the inner housing 2110. When the outer cover 2112 needs to be reattached to the inner housing 2110, each fastener 2118 is already aligned with the corresponding boss 2116 and aperture 2122.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicle, comprising:
a frame;
front and rear wheels;
a powertrain drivingly coupled to the front and rear wheels;
a seating area comprising side by side seats;
a cab frame positioned over the seating area; and
a rear cargo portion comprising a rear body portion having an upper surface and a removable tub recessed in the rear body portion below the upper surface, wherein the removable tub can be removed from the rear body portion, the rear body portion including an opening therethrough within which the removable tub is positioned, and wherein the removable tub comprises a floor and drains fluidly coupled to the floor, and the floor is configured to direct a fluid within the removable tub towards the drains.

2. The vehicle of claim 1, wherein a top wall of the removable tub extends along a substantially horizontal plane and inner side walls of the rear body portion extend along a substantially vertical plane.

3. The vehicle of claim 2, wherein the rear body portion includes an inner wall substantially circumscribing the opening, whereby the top wall of the removable tub is supported by the inner wall.

4. The vehicle of claim 1, wherein the rear cargo portion includes a stepped portion, the stepped portion being formed from a first set of opposing walls, a second set of opposing walls positioned below the first set of opposing walls and a top wall extending between the first set of opposing walls and the second set of opposing walls, wherein the first set of opposing walls are spaced farther apart than the second set of opposing walls.

5. The vehicle of claim 4, wherein the cab frame is comprised of front frame tubes coupled to the frame at a position forward of the seating area and rear frame tubes coupled to the frame at a position rearward of the seating area, the removable tub is positioned between at least a portion of the rear frame tubes.

6. The vehicle of claim 1, wherein the floor defines troughs angled rearwardly relative to the seating area to direct the fluid within the removable tub towards the drains.

7. The vehicle of claim 6, wherein each of the troughs are V-shaped and comprises a rearwardly extending portions extending to an outer perimeter edges of the removable tub.

8. The vehicle of claim 7, wherein the outer perimeter edges of the removable tub include rearwardly extending channels which feed to a rear of the removable tub.

9. The vehicle of claim 8, wherein the drains fluidly communicate with the channels.

10. The vehicle of claim 6, wherein a top wall of the removable tub extends along a substantially horizontal plane and inner side walls of the rear body portion extend along a substantially vertical plane.

11. The vehicle of claim 10, wherein the rear body portion includes an opening through which the removable tub is positioned, and an inner wall substantially circumscribing the opening, whereby the top wall of the removable tub is supported by the inner wall.

12. A vehicle comprising:
a frame;
front and rear wheels;
a powertrain drivingly coupled to the front and rear wheels;
a seating area comprising side by side seats;
a cab frame positioned over the seating area; and
a rear body portion having an upper surface, forming an open-bottomed border, and comprising a utility bed recessed in the rear body portion below the upper surface, wherein the utility bed is defined as a removable tub, which can be removed from the rear body portion, the utility bed comprising drains, a top wall extending along a substantially horizontal plane, and a number of inner side walls extending along a substantially vertical plane, wherein the top wall is supported by the upper surface.

13. The vehicle of claim 12, wherein the utility bed further comprises a floor, wherein the drains are coupled to the floor and the floor is configured to direct a fluid within the utility bed towards the drains.

14. The vehicle of claim 13, wherein the floor defines troughs angled rearwardly relative to the utility bed to direct the fluid within the utility bed towards the drains.

15. The vehicle of claim 12, wherein the utility bed includes a stepped portion, the stepped portion extending from a first set of opposing walls of the rear body portion and being defined by a second set of opposing walls positioned below the first set of opposing walls and a top wall extending between the first set of opposing walls and the second set of opposing walls, wherein the first set of opposing walls are spaced farther apart than the second set of opposing walls.

16. The vehicle of claim 15, wherein the stepped portion is configured to support one of the front and rear wheels.

17. The vehicle of claim 12, wherein the drains are positioned within the utility bed to direct a fluid away from electrical components or hot surfaces of the vehicle.

18. A vehicle comprising:
a frame;
front and rear wheels;
a powertrain drivingly coupled to the front and rear wheels;
a seating area comprising side by side seats;
a cab frame positioned over the seating area; and
a rear cargo portion comprising a rear body portion having an upper surface and a removable tub, which can be removed from a through opening in the rear body portion, recessed in the rear body portion below the upper surface, and wherein the removable tub has drains and the rear cargo portion includes a stepped portion, the stepped portion extending from a first set of opposing walls of the rear body portion and being defined by a second set of opposing walls of the removable tub positioned below the first set of opposing walls and a top wall extending between the first set of opposing walls and the second set of opposing walls, wherein the first set of opposing walls are spaced farther apart than the second set of opposing walls.

19. The vehicle of claim 18, wherein the removable tub further comprises channels that are approximately V-shaped and angled rearwardly relative to the seating area.

20. The vehicle of claim 19, wherein the channels are configured to direct a fluid within the removable tub towards the drains.

21. The vehicle of claim 18, wherein the removable tub is positioned within the vehicle to direct a fluid within the removable tub through the drains and away from water-sensitive components of the vehicle.

22. The vehicle of claim 18, wherein the stepped portion is configured to support at least one of the front and rear wheels.

23. The vehicle of claim 18, wherein the removable tub is supported by the upper surface of the rear portion.

* * * * *

UNITED STATES PATENT AND TRADEMARK OFFICE
CERTIFICATE OF CORRECTION

PATENT NO. : 10,960,941 B2
APPLICATION NO. : 16/244462
DATED : March 30, 2021
INVENTOR(S) : James J. Endrizzi et al.

Page 1 of 1

It is certified that error appears in the above-identified patent and that said Letters Patent is hereby corrected as shown below:

On the Title Page

Item (72) Inventors should read:
(72) Inventors: James J. Endrizzi, Plymouth, MN (US);
Tristan M. Hipps, Buffalo, MN (US);
Garth H. Bracy, Robbinsdale, MN (US);
Anthony J. Kinsman, Wyoming, MN (US);
Jerome J. Rubatt, Stacy, MN (US);
Blake A. Anderson, Lindstrom, MN (US);
Dennis J. Lutz, Lino Lakes, MN (US);
Amanda S. Graus, Stacy, MN (US)

Signed and Sealed this
Nineteenth Day of August, 2025

Coke Morgan Stewart
*Acting Director of the United States Patent and Trademark Office*